United States Patent
Sakamoto et al.

(10) Patent No.: US 6,322,164 B1
(45) Date of Patent: Nov. 27, 2001

(54) BRAKING DEVICE

(75) Inventors: Shigeru Sakamoto, Nishikamo-gun; Yutaka Ohnuma, Toyota; Kenji Itoh, Toyota; Masakuni Suzuki, Toyota; Kouichi Sawada, Toyota; Hiroshi Isono, Susono; Noboru Noguchi, Nagoya, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/254,689

(22) PCT Filed: Sep. 19, 1997

(86) PCT No.: PCT/JP97/03348

§ 371 Date: Mar. 15, 1999

§ 102(e) Date: Mar. 15, 1999

(87) PCT Pub. No.: WO98/13244

PCT Pub. Date: Apr. 2, 1998

(30) Foreign Application Priority Data

| Sep. 26, 1996 | (JP) | 8-254320 |
| Dec. 24, 1996 | (JP) | 8-342919 |
| Mar. 17, 1997 | (JP) | 9-63229 |
| Jun. 2, 1997 | (JP) | 9-143651 |
| Jun. 20, 1997 | (JP) | 9-164555 |
| Jun. 27, 1997 | (JP) | 9-171803 |

(51) Int. Cl.$^7$ .................................................. B60T 8/42
(52) U.S. Cl. .................. 303/115.4; 303/114.3; 303/116.1; 303/119.1; 60/547.1; 60/534; 60/545
(58) Field of Search .................. 303/115.4, 114.3, 303/113.3, 113.2, 115.2, 116.1, 116.2, 119.1; 60/547.1, 542.2, 534, 545

(56) References Cited

U.S. PATENT DOCUMENTS

| 4,198,823 | 4/1980 | Mathues et al. |
| 4,199,948 | 4/1980 | Mathues et al. ........................ 60/553 |
| 4,784,442 | 11/1988 | Peterson ................................ 303/15 |
| 5,188,437 | * 2/1993 | Willmann ......................... 303/113.2 |
| 5,350,225 | 9/1994 | Steiner et al. .................... 303/113.4 |
| 5,383,720 | * 1/1995 | Schmidt ............................ 303/113.5 |
| 5,586,814 | * 12/1996 | Steiner .............................. 303/116.2 |
| 5,727,852 | 3/1998 | Pueschel et al. ................... 303/113.4 |
| 5,779,329 | 7/1998 | Takeshima ........................... 303/155 |
| 5,851,057 | 12/1998 | Terazawa et al. .................... 303/155 |
| 5,890,776 | 4/1999 | Sawada ............................. 303/116.1 |
| 5,967,628 | * 10/1999 | Abe et al. .......................... 303/116.1 |

FOREIGN PATENT DOCUMENTS

| 27 23 811 | 12/1978 | (DE) . |
| 40 02 865 A1 | 8/1991 | (DE) . |

(List continued on next page.)

Primary Examiner—Robert J. Oberleitner
Assistant Examiner—Mariano Sy
(74) Attorney, Agent, or Firm—Oliff & Berridge, PLC

(57) ABSTRACT

The pump is connected on its delivery side through an auxiliary passage to a primary passage connecting the master cylinder and brake cylinder to each other, and a pressure control valve is provided in a portion of the primary passage between the master cylinder and a point of connection thereof to the auxiliary passage. The pressure control valve releases working fluid from the pump to the master cylinder when delivery pressure of the pump is higher than the master cylinder pressure by more than a predetermined amount, and the pump is activated when the fluid pressure generated in the brake cylinder is required to be higher than the master cylinder pressure, during brake operation.

35 Claims, 106 Drawing Sheets

FOREIGN PATENT DOCUMENTS

| | | |
|---|---|---|
| 42 02 388 A1 | 8/1993 | (DE) . |
| 0 485 367 A2 | 5/1992 | (EP) . |
| 2 286 865 A | 8/1995 | (GB) . |
| A-55-76744 | 6/1980 | (JP) . |
| A-4-121260 | 4/1992 | (JP) . |
| A-4-244464 | 9/1992 | (JP) . |
| A-5-92760 | 4/1993 | (JP) . |
| A-5-229418 | 9/1993 | (JP) . |
| A-6-255472 | 9/1994 | (JP) . |
| A-6-312658 | 11/1994 | (JP) . |
| A-6-344894 | 12/1994 | (JP) . |
| A-7-81540 | 3/1995 | (JP) . |
| A-8-295231 | 11/1996 | (JP) . |
| A-9-30385 | 2/1997 | (JP) . |
| WO 93/22169 | 11/1993 | (WO) . |
| WO 95/19282 | 7/1995 | (WO) . |
| WO 96/10507 | 4/1996 | (WO) . |
| WO 96/14227 | 5/1996 | (WO) . |

\* cited by examiner

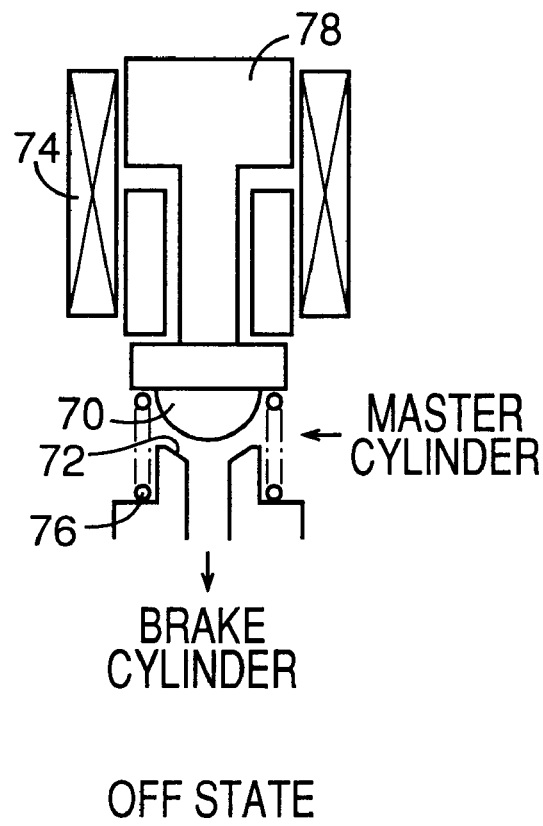
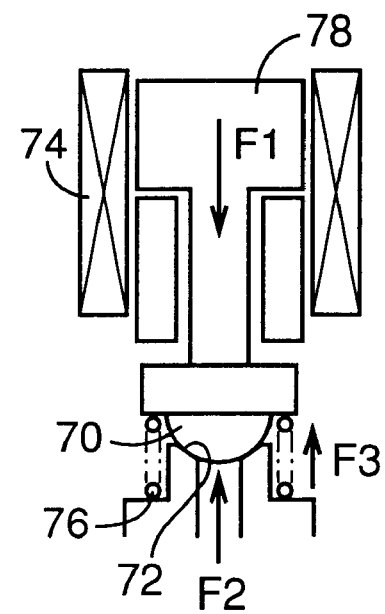
FIG. 3(a) OFF STATE
FIG. 3(b) ON STATE

TIME AFTER CONTROL INITIATION

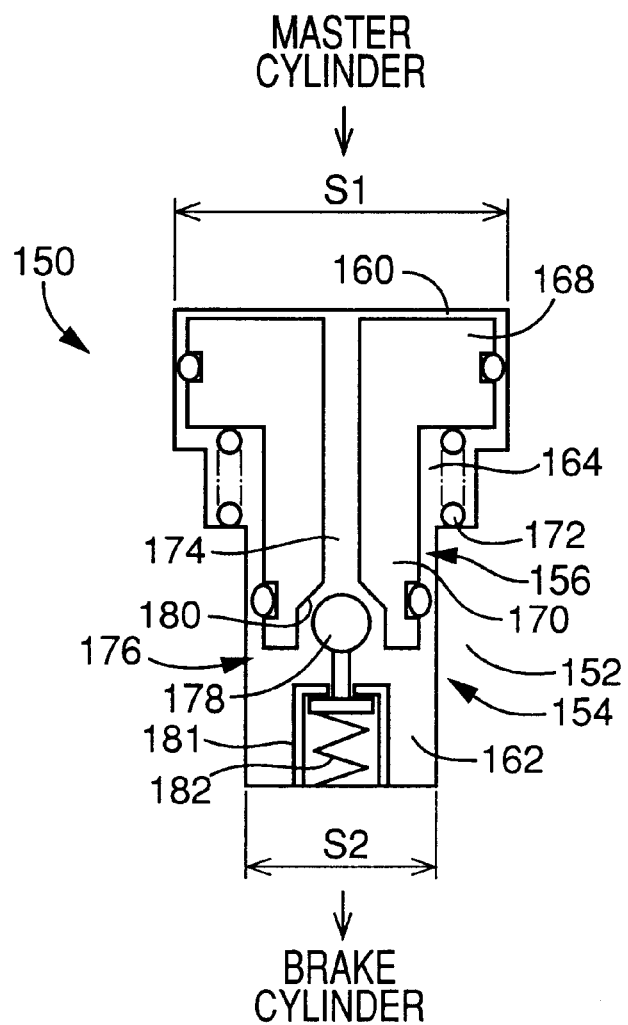
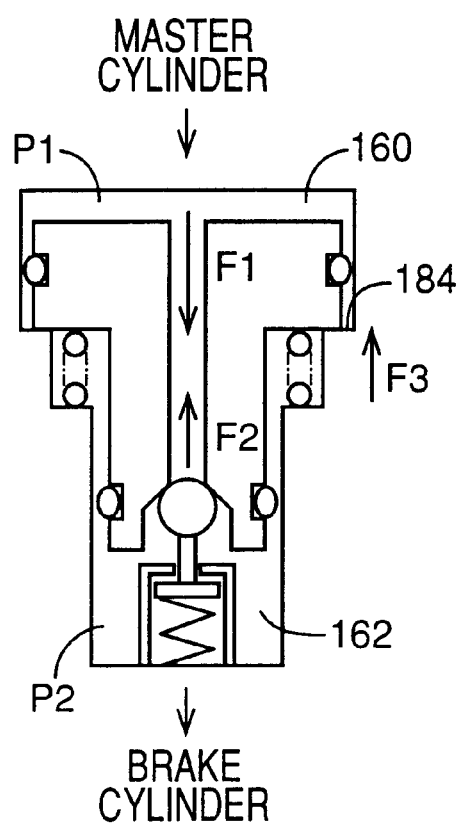
FIG. 14(a) WHEN BRAKE IS NOT APPLIED
FIG. 14(b) WHEN BRAKE IS APPLIED

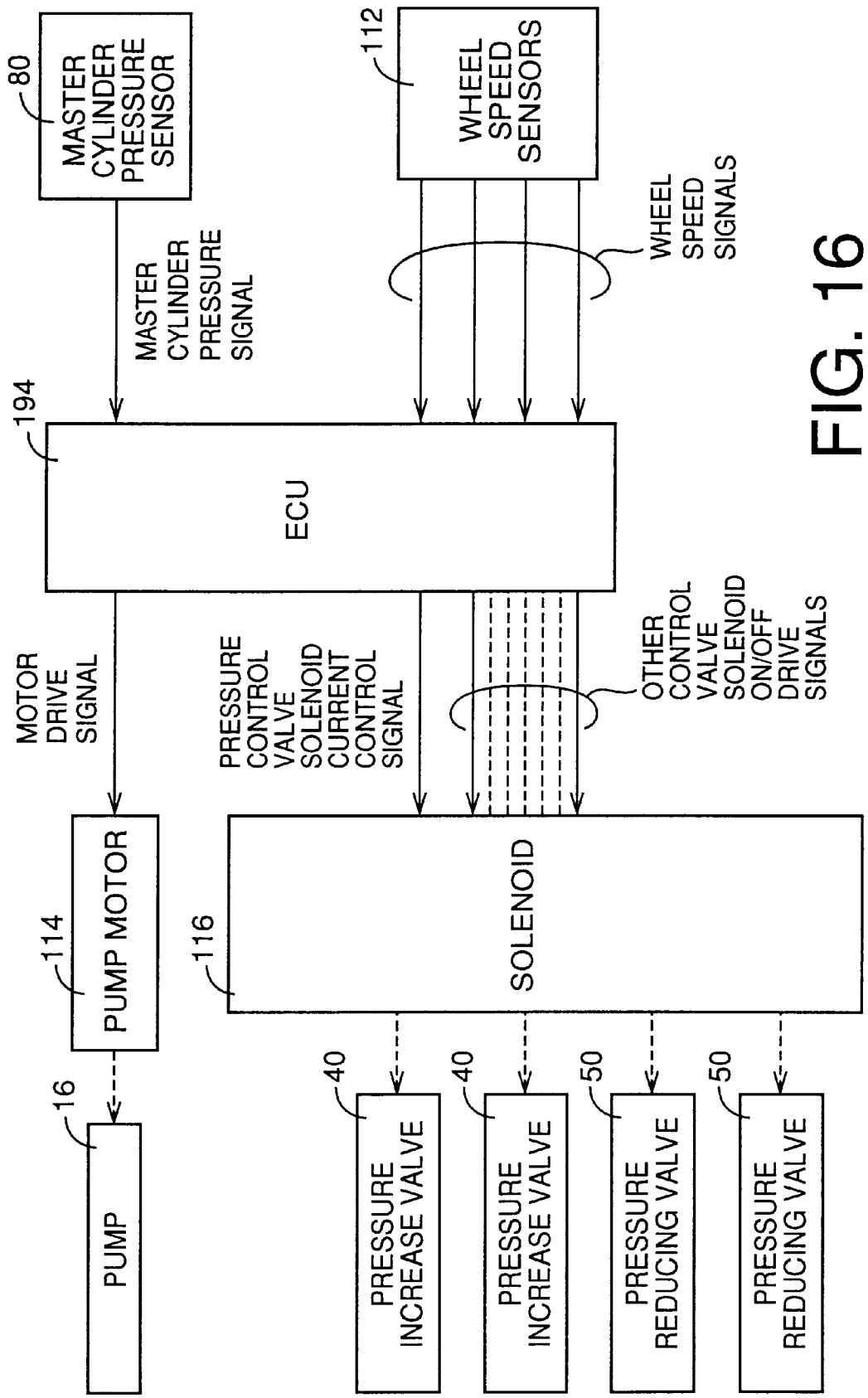

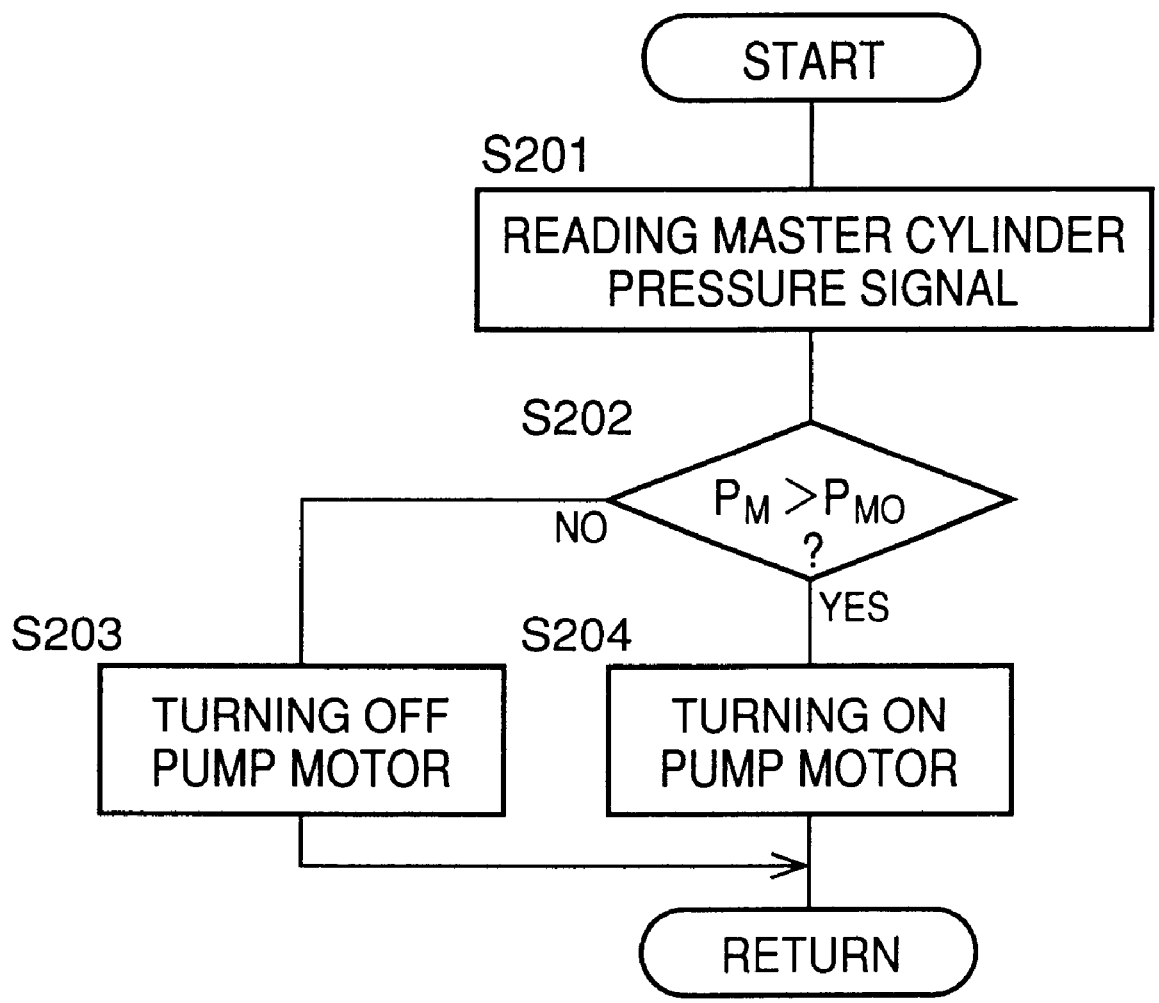

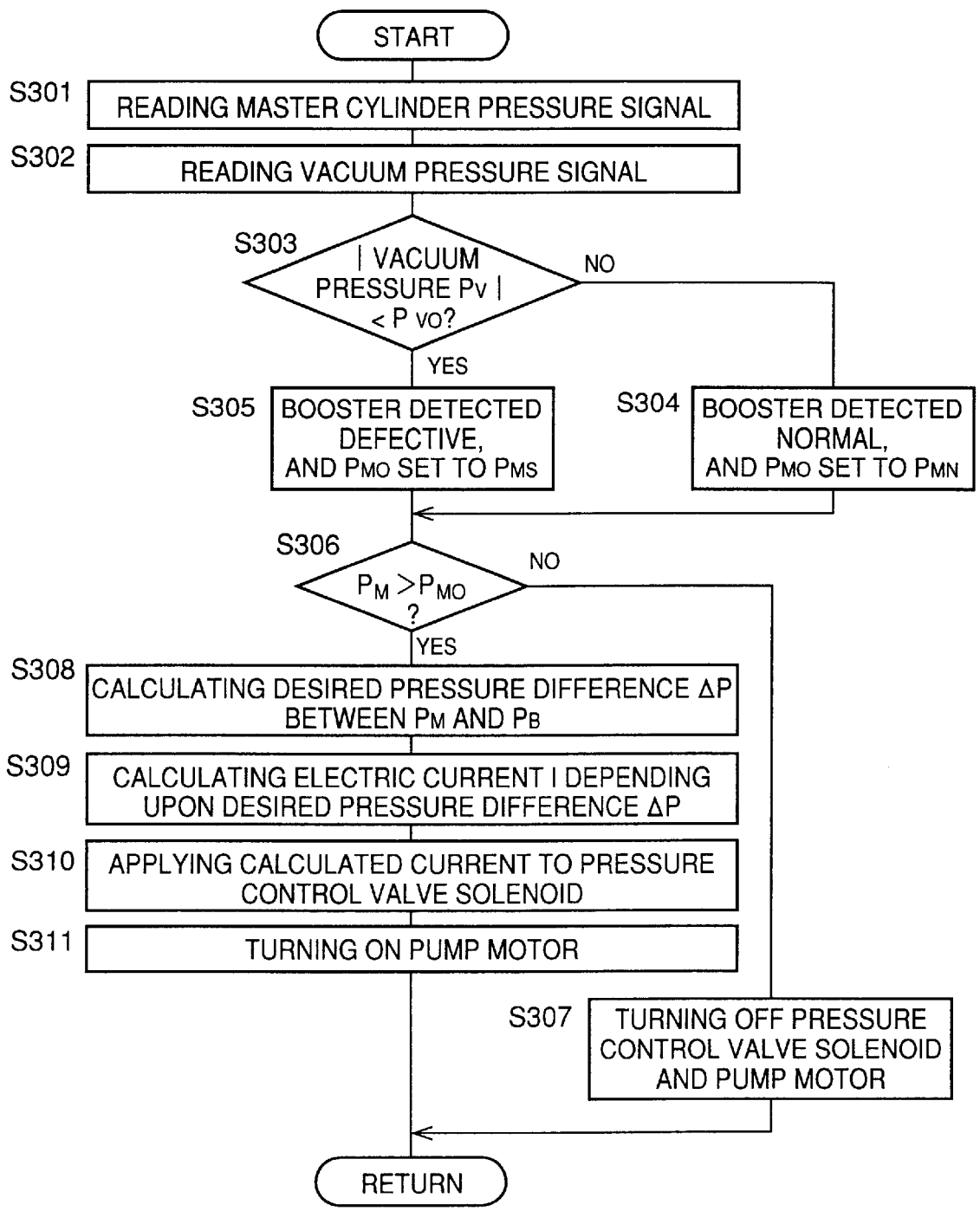

WHEN BOOSTER IS NORMAL

WHEN BOOSTER IS DEFECTIVE

CHARACTERISTIC OF BOOSTER

| PUMP MOTOR DURY RATIO | 100% | 30% | 0% | 0% | 0% |
|---|---|---|---|---|---|
| PRESSURE REDUCING VALVE | OFF(OPEN) | OFF(OPEN) | OFF(OPEN) | OFF(OPEN) | OFF(OPEN) |
| PRESSURE INCREASING VALVE | OFF(OPEN) | OFF(OPEN) | OFF(OPEN) | OFF(OPEN) | OFF(OPEN) |
| INFLOW CONTROL | ON(CLOSED) | ON(CLOSED) | ON(CLOSED) | ON/OFF ⊓⊔ | OFF(OPEN) |
| PRESSURE CONTROL MODE | RAPID INCREASE | SLOW INCREASE | HOLD | SLOW DECREASE | RAPID DECREASE |
| TOTAL CHANGE AMOUNT $\Sigma$ | POSITIVE $+\Sigma_1$ | POSITIVE $+\Sigma_2$ | | NEGATIVE $-\Sigma_3$ | NEGATIVE $-\Sigma_4$ |

FIG. 117

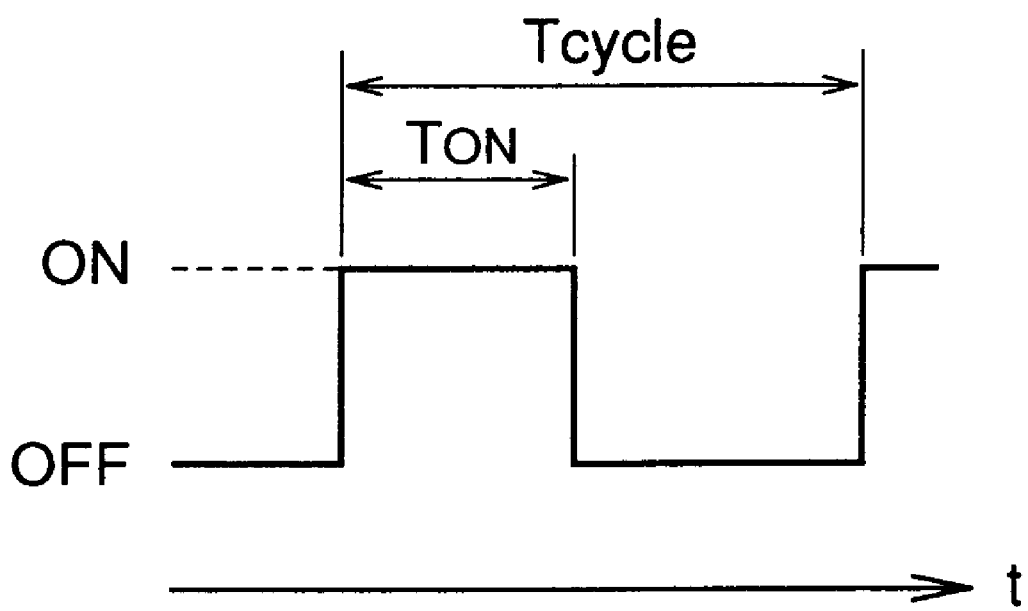

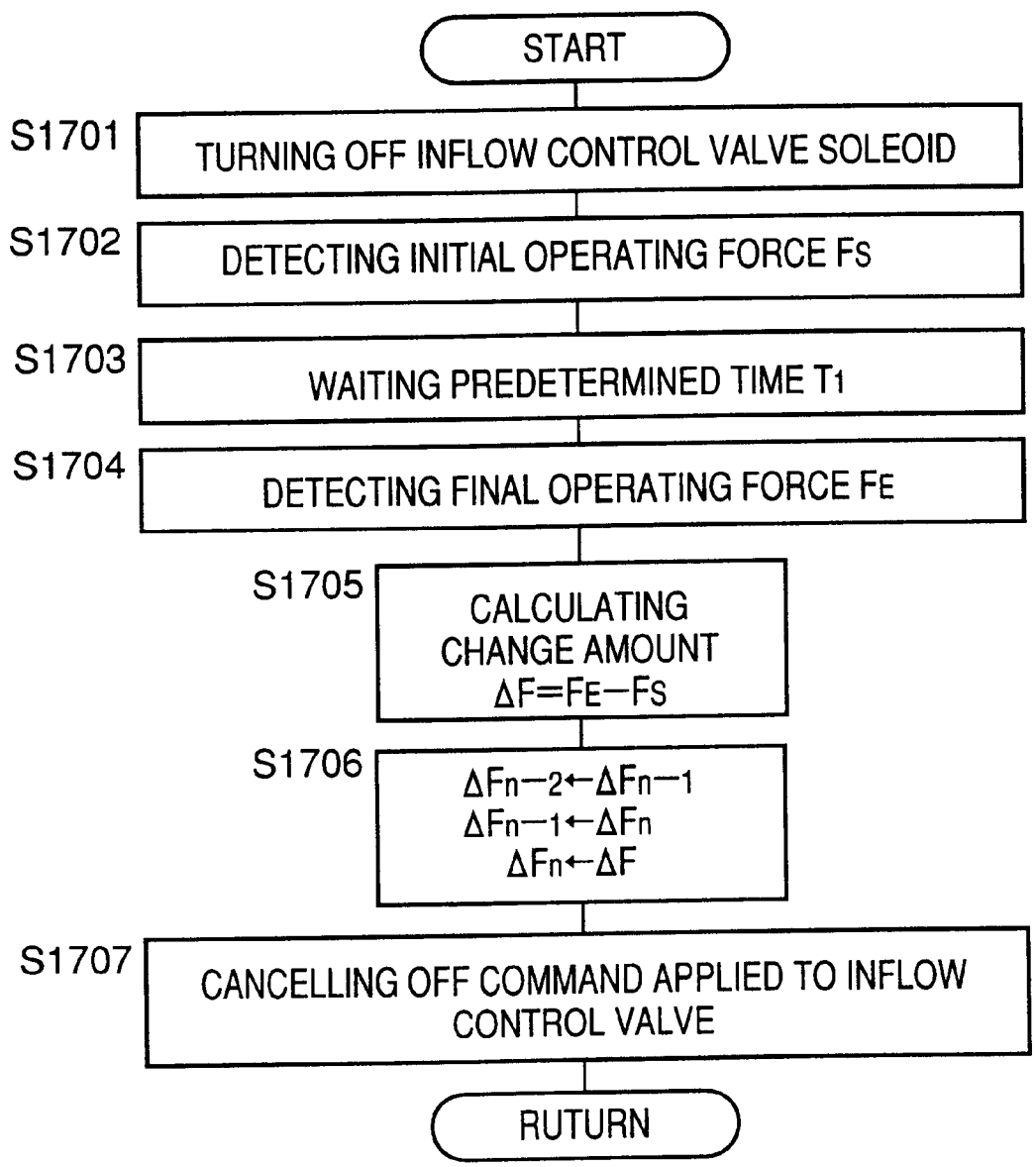

BRAKING DEVICE

TECHNICAL FIELD

The present invention relates to a braking system for a vehicle, and more particularly to techniques for controlling a relationship between a brake operating force and a fluid pressure in a brake cylinder while a brake is operated by a vehicle operator.

BACKGROUND ART

In a braking system, some elements are generally disposed in series between a brake operating member 900 and a vehicle wheel 902, for braking the vehicle upon operation of the brake operating member 900 by a vehicle operator, as schematically shown in FIG. 43. That is, there are disposed in series a brake operating mechanism 904, a booster 906, a master cylinder 908, a braking friction member 912 and a rotor 914.

The brake operating mechanism 904 is adapted to transmit to the booster 906 an operating force F which has been applied to the brake operating member 900. The booster 906 is adapted to boost the force received from the-brake operating mechanism 904, while utilizing a pressure, and transmit the boosted force to the master cylinder 908. As shown in FIG. 44, the booster 906 is able to boost the input force at a so-called "servo ratio" until a boosting limit has been reached, and is unable to boost the input force after the boosting limit has been reached. The master cylinder 908 has a pressurizing piston, which converts the output force of the booster 906 into a fluid pressure. The brake cylinder 910 has a brake piston, which converts the fluid pressure received from the master cylinder 908 into a force. The braking friction member 912 is forced by the output force of the brake cylinder 910, onto the rotor 914 (brake rotor, brake drum, etc.) rotating with the vehicle wheel 902 to be braked, and cooperates with the rotor 914 to brake the wheel 902, for thereby providing deceleration G of the vehicle body.

The braking system is required to cause the fluid pressure generated in the brake cylinder, to be as high as possible with a given brake operating force. This requirement is derived from an arrangement to reduce brake squeal and vibration. For instance, the arrangement employs a braking friction member made of a material which has a low friction coefficient or a large amount of compressive strain. This arrangement results in reducing a braking effect as represented by a ratio of the vehicle body deceleration G to the brake operating force F, as indicated in FIG. 45. To prevent the reduction in the braking effect due to the above arrangement, the brake cylinder is required to generate a fluid pressure as high as possible with a given brake operating force.

An example of an arrangement to increase the fluid pressure in the brake cylinder is to reduce the diameter of the pressurizing piston of the master cylinder. However, this arrangement results in reduction in the volume for pressing the pressurizing piston, which increases the required operating stroke of the pressurizing piston, causing another problem that the longitudinal dimension of the master cylinder is increased. Another example of the arrangement to increase the fluid pressure in the brake cylinder is to increase the servo ratio of the booster. This arrangement results in lowering the boosting point of the booster, as indicated in FIG. 46, so that the braking effect varies to a great extent while the operating force F is relatively small, causing another problem that the brake operating feel is deteriorated.

In summary, there is a limitation in an attempt to increase the fluid pressure in the brake cylinder with a given brake operating force, as long as the attempt relies on the master cylinder or booster. Thus, there has been a problem of difficulty to control as desired the relationship between the brake operating force and the fluid pressure in the brake cylinder.

DISCLOSURE OF THE INVENTION

The present invention was made in the light of the background art described above. It is an object of the present invention to provide a braking system capable of controlling the relationship between the brake operating force and the fluid pressure in the brake cylinder, by using another hydraulic pressure source in addition to the master cylinder and the booster.

The above object may be achieved by a braking system according to any one of the following modes of this invention, each of which is numbered like the appended claims, so as to indicate possible combinations of features in the two or more modes of the invention:

(1) A braking system characterized by comprising:

a brake operating member operated by an operator of a motor vehicle;

a master cylinder for generating a fluid pressure based on an operation of the brake operating member;

a brake including a brake cylinder which is connected through a primary passage to the master cylinder and which is activated by the fluid pressure supplied through the primary passage, to restrain rotation of a wheel of the motor vehicle; and a pressure increasing device for generating the fluid pressure in the above-indicated brake cylinder, which is higher than the fluid pressure in the above-indicated master cylinder, the pressure increasing device including (a) a fluid flow control device which is disposed in the above-indicated primary passage and which has a plurality of selectively established states including a first state for permitting flows of a working fluid in opposite directions between the master cylinder and the brake cylinder, and a second state for inhibiting at least the flow of the fluid from the brake cylinder toward the master cylinder, (b) a hydraulic pressure source connected through an auxiliary passage to a portion of the primary passage between the fluid flow control device and the above-indicated brake cylinder, (c) a hydraulic pressure source control device for commanding the above-indicated the hydraulic pressure source to deliver the working fluid when the fluid pressure in the above-indicated brake cylinder is required to be higher than the fluid pressure in the above-indicated master cylinder during operation of the above-indicated brake operating member, and (d) a pressure changing device for changing the fluid pressure in the above-indicated brake cylinder to a level higher than that in the above-indicated master cylinder, depending upon an operating force of the above-indicated brake operating member.

This braking system has an advantage that a relationship between the brake operating force and the fluid pressure in the braking cylinder can be controlled by a hydraulic pressure source provided in addition to the master cylinder and a booster, so that the fluid pressure generated in the brake cylinder can be easily controlled to be as high as possible for a given value of the brake operating force.

This advantage results in reduction in the required capacities of not only the master cylinder and booster but also the braking friction members, making possible to effect, for example, a braking effect characteristic control for controlling the braking effect characteristic, and a brake assisting control for emergency brake application so as to compensate for insufficiency of the brake operating force, without increasing loads on components of the braking system other than the hydraulic pressure source.

Unlike a braking system wherein the fluid pressure in the brake cylinder is determined irrespective of the brake operating force, this braking system in which the fluid pressure in the brake cylinder is determined depending upon the brake operating force permits the brake operating force to be reflected on the fluid pressure in the brake cylinder, so that the fluid pressure in the brake cylinder can be easily optimized in relation to the brake operating force.

The "hydraulic pressure source" in the present braking system may be a hydraulic pressure source provided for the braking system, or a hydraulic pressure source which is used for some other purpose, for example, a hydraulic pressure source provided for a power steering system. Further, the "hydraulic pressure source" may be a hydraulic pressure source of a type which stores the working fluid under a constant high pressure, for instance, a hydraulic pressure source including an accumulator as a major component, or alternatively, a hydraulic pressure source of a type which is operated as needed to deliver a pressurized working fluid, for instance, a hydraulic pressure source including a pump as a major component. However, where the "hydraulic pressure source" includes an accumulator as a major component, the hydraulic pressure source usually further includes a control valve which is switched between a state for permitting delivery of the pressurized working fluid from the accumulator and a state for inhibiting the delivery. In this case, the hydraulic pressure source is controlled by the control valve, so as to be switched between a state in which the pressurized fluid is delivered and a state in which the pressurized fluid is not delivered.

In the present braking system, the "hydraulic pressure source control device" may be adapted to activate the hydraulic pressure source to deliver the working fluid in one of the following instances or a combination of two or more of these instances: when a brake-operating-force-related quantity relating to the brake operating force has exceeded a reference value; when the braking operating member is abruptly operated by the vehicle operator; when the boosting operation of the booster provided in the present braking system is not normal; when the boosting limit of the booster has been reached; when the brake of the present braking system is suffering from a heat fade or a water fade; when the friction coefficient of the road surface on which the motor vehicle is running is higher than a reference value; when the movable load on the motor vehicle is larger than a reference value; and when the vehicle operator has shown an intention to increase the fluid pressure in the brake cylinder.

The "brake-operating-force-related quantity" includes, for example, physical quantities relating to a brake operation, such as an operating force of the brake operating member, an operating stroke of the brake operating member, a fluid pressure in the master cylinder, a fluid pressure in the brake cylinder, a braking force of the vehicle wheel and a vehicle body acceleration value, and a state relating to the brake operation, such as presence or absence of the brake operation.

In this braking system, the "pressure changing device" may be adapted, for example, to electrically or mechanically control the "fluid flow control device" so as to control the fluid pressure in the brake cylinder, or alternatively to control the delivery of the working fluid from the hydraulic pressure source while holding the "fluid flow control device" in the above-indicated second state, so as to control the fluid pressure in the brake cylinder. In the latter case, and the "hydraulic pressure source" includes a pump as a major component, the pressure changing device may be adapted to control the duty ratio of the electric current to be applied to a motor for driving the pump. Where the pump is provided on its suction side with a solenoid-operated suction valve having a state for permitting the flow of the working fluid into the pump and a state for inhibiting that flow, the pressure changing device may be adapted to control the duty ratio of the electric current to be applied to a solenoid of the solenoid-operated suction valve. Where the present braking system includes an electromagnetic pressure control device for performing an automatic pressure control function such as an anti-lock brake pressure control, as described later, the "pressure changing device" may be adapted to control this electromagnetic pressure control device while holding the "fluid flow control device" in the above-indicated second state, so as to control the fluid pressure in the brake cylinder.

(2) A braking system according to the above mode (1), wherein the above-indicated fluid flow control device and the above-indicated pressure changing device is constituted by a pressure control device disposed in the above-indicated primary passage and operated while the working fluid is supplied thereto from the above-indicated hydraulic pressure source such that the pressure control device is placed in the above-indicated second state when a second fluid pressure on a brake cylinder side of the pressure control device is higher than a first pressure on a master cylinder side of the pressure control device by a difference which is equal to or smaller than a desired pressure difference value, and placed in the above-indicated first state when the second fluid pressure is higher than the first pressure and when the difference is larger than the desired pressure difference value, whereby the second pressure is controlled to be higher than the first fluid pressure by the above-indicated desired pressure difference value.

In this braking system, the pressure control device causes a surplus amount of the working fluid from the hydraulic pressure source to be released to the master cylinder, and at the same time changes the fluid pressure of the hydraulic pressure source on the basis of the master cylinder pressure. The working fluid externally supplied to the master cylinder will increase the volume of the pressurizing chamber of the master cylinder, simply causing the brake operating member to be returned toward the non-operated position. With the vehicle operator's brake operating force being kept substantially constant, the surplus amount of the working fluid supplied from the hydraulic pressure source to the master cylinder will not cause a substantial increase of the brake operating force. By positively utilizing such a characteristic of the master cylinder, the fluid pressure generated in the brake cylinder is made higher than the master cylinder pressure by the desired pressure difference.

In this braking system, therefore, the brake cylinder pressure is controlled on the basis of and relative to the master cylinder pressure, so that the master cylinder pressure is easily reflected on the brake cylinder pressure, whereby the controllability of the brake cylinder pressure is advantageously improved.

The desired pressure difference value in this braking system may be constant or variable. Where the desired pressure difference value is variable, it may be changed on the basis of a brake-operating-force-related quantity relating to the brake operating force, alone, or a combination of this quantity and other variable(s) such as a quantity relating to the boosting state of the booster.

In one form of this braking system, the above-indicated pressure control device has a valve member and a valve seat for controlling flows of the working fluid through the above-indicated primary passage between the master cylinder side and the brake cylinder side. While the pressure control device is supplied with the working fluid from the hydraulic pressure source, the valve member and the valve seat permit the flows of the working fluid in the opposite directions through the above-indicated primary passage between the master cylinder side and the brake cylinder sides. While the pressure control device is supplied with the working fluid from the hydraulic pressure source, the valve member and the valve seat inhibit the flow of the working fluid from the above-indicated hydraulic pressure source toward the above-indicated master cylinder when the second fluid pressure on the brake cylinder side is higher than the first fluid pressure on the master cylinder side and when the fluid pressure difference is equal to or smaller than the desired pressure difference value, and permit the flow of the working fluid from the above-indicated hydraulic pressure source toward the master cylinder when the fluid pressure difference is larger than said desired pressure difference value, so that the second fluid pressure is controlled to be higher than the first fluid pressure such that the fluid pressure difference is equal to the above-indicated desired pressure difference value.

(3) A braking system according to the above mode (1) or (2), wherein the above-indicated hydraulic pressure source is a pump which sucks the working fluid on its suction side and delivers the working fluid from its delivery side which is connected through the above-indicated auxiliary passage to the above-indicated primary passage.

This braking system has an advantage that the brake cylinder pressure can be increased by using the pump as the hydraulic pressure source.

In particular, the following advantage is provided where the braking system according to the present mode of the invention includes the feature of the preceding mode. That is, where the pump is used as the hydraulic pressure source to deliver the working fluid directly to the above-indicated pressure control device, the pump has a characteristic that the delivery pressure of the pump depends upon the fluid pressure to which the fluid is delivered from the pump, and changes following a change in the fluid pressure to which the fluid is delivered. In this case, therefore, the fluid pressure of the hydraulic pressure source more easily follows a change in the master cylinder pressure, than where an accumulator is used as the hydraulic pressure source. Thus, the braking system according to the present mode provided with the feature of the preceding mode is particularly advantageous in that the pressure control device need not be complicated in construction, in order to change the brake cylinder pressure following a change in the master cylinder pressure.

In one form of the braking system according to the present mode of the invention provided with the feature of the preceding mode, there are provided the master cylinder 14 and the pump 16 as hydraulic pressure sources for the brake cylinder 10, as schematically shown in FIG. 1. The master cylinder 14 generates the fluid pressure whose level depends upon the operating force of the brake operating member 12, and the pump 16 sucks the working fluid on its suction side and delivers the fluid from its delivery side. The delivery side of the pump 16 is connected through the auxiliary passage 20 to the primary passage 18 which connects the master cylinder 14 and the brake cylinder 10 to each other. The pressure control valve 22 (an example of the pressure control device) is provided in a portion of the primary passage 18 between the master cylinder 14 and a point of connection thereof to the auxiliary passage 20. While the pump 16 is not in operation, the pressure control valve 22 permits the fluid flows in the opposite directions between the master cylinder 14 and the brake cylinder 10. While the pump 16 is in operation, the pressure control valve 22 releases a surplus amount of the working fluid from the pump 16 to the master cylinder 14, and at the same time changes the delivery pressure of the pump 16 on the basis of the master cylinder pressure. Further, a pump operating device 24 (an example of the hydraulic pressure source control device) is provided to activate the pump 16 when the fluid pressure generated in the brake cylinder 10 is required to be higher than the fluid pressure in the master cylinder 14, during brake operation by the vehicle operator.

(4) A braking system according to any one of the above modes (1)–(3), wherein the above-indicated hydraulic pressure source control device includes predetermined-operating-state control means for commanding said hydraulic pressure source to deliver the working fluid when the motor vehicle operated by the vehicle operator is in a predetermined operating state.

This braking system is advantageously capable of optimizing the relationship between the brake operating force and the brake cylinder pressure, in relation to the operating state of the motor vehicle.

(5) A braking system according to any one of the above modes (1)–(4), wherein the above-indicated hydraulic pressure source control device includes post-emergency-brake-operation control means for commanding the above-indicated hydraulic pressure source to deliver the working fluid when the above-indicated brake operating member is operated by the vehicle operator to apply an emergency brake to the motor vehicle.

This braking system is advantageously capable of effecting the above-indicated brake assisting control, improving the safety of the motor vehicle.

In one form of this braking system, the post-emergency-brake-operation control means is provided with emergency brake operation detecting means for detecting an operation to apply the emergency brake. This emergency brake operation detecting means may include, for example, means for detecting the operation to apply the emergency brake, by detecting a rate of change of the above-indicated brake-operating-force-related quantity (which may include an operating speed of the brake operating member, that is, a rate of change in the operated position of the brake operating member), which rate of change is higher than a reference value. Alternatively, the emergency brake operation detecting means may include means for detecting the operation to apply the emergency brake, on the basis of both the above-indicated rate of change (detected dynamic value) and the brake-operating-force-related quantity (detected static value). For instance, the operation to apply the emergency brake is detected if the operating speed of the brake operating member exceeds the reference value and if the master cylinder pressure exceeds a reference value.

(6) A braking system according to any one of the above modes (1)–(5), further comprising a booster which is disposed between the above-indicated brake operating member and the above-indicated master cylinder, to boost an operating force of the brake operating member and transmit the boosted operating force to the master cylinder, and wherein the above-indicated hydraulic pressure source control device includes post-boosting-abnormality control means for commanding the above-indicated hydraulic pressure source to deliver the working fluid when the booster is not normally functioning to perform a boosting operation.

This braking system having the booster is advantageously capable of minimizing reduction of the vehicle braking force in the event of abnormality of the booster. That is, the relationship between the brake operating force and the brake cylinder pressure can be kept optimal, irrespective of whether the booster is abnormal or not.

The "booster" in this braking system may be a vacuum booster adapted to boost the brake operating force based on the difference between a vacuum pressure and the atmospheric pressure, or a hydraulic booster adapted to boost the brake operating force based on a hydraulic pressure.

In one form of this braking system, the above-indicated post-boosting-abnormality control means is provided with boosting state detecting means for detecting a boosting state quantity indicating the boosting state of the booster. Where the booster is a vacuum booster, the boosting state detecting means may be a vacuum sensor for detecting the vacuum pressure as the boosting state quantity.

(7) A braking system according to the above mode (2), wherein said pressure control device includes (a) an electromagnetic pressure control device having a valve member and a valve seat for controlling flows of the working fluid through said primary passage between the master cylinder side and the brake cylinder side, and magnetic force generating means for generating a magnetic force which acts on at least one of the valve member and the valve seat, for controlling a relative movement between the valve member and the valve seat, so that said desired pressure difference value changes on the basis of the magnetic force, and (b) a magnetic force control device for controlling said magnetic force.

In this braking system, the relationship between the master cylinder pressure and the brake cylinder pressure is controlled by controlling the magnetic force of the magnetic force generating means, so that the difference between these two fluid pressures can be freely controlled. For instance, the brake cylinder pressure can be controlled to be higher than the master cylinder pressure such that the pressure different is held constant, or such that the brake cylinder pressure linearly or non-linearly changes according to a predetermined characteristic with respect to the master cylinder pressure.

In this braking system, the amount by which the brake cylinder pressure is higher than the master cylinder pressure in a given braking state can be made different from that in another braking state. For instance, the brake cylinder pressure can be made higher when an operation to apply an emergency brake is performed than when this operation is not performed. In this case, the above-indicated brake assisting control is effected during the operation to apply the emergency brake, and the above-indicated braking effect characteristic control is effected in the other braking state.

In this braking system, the time at which the control to raise the brake cylinder pressure with respect to the master cylinder pressure is effected can be freely controlled, by controlling the magnetic force of the magnetic force generating means. In this case, the relationship between the master cylinder pressure and the brake cylinder pressure can be more freely controlled.

In this braking system, the relationship between the pressure difference of the master cylinder and the brake cylinder and the magnetic force may be such that the pressure difference increases with an increase in the magnetic force, or conversely such that the pressure difference increases with a decrease in the magnetic force. In the latter case, the relationship can be established by giving a spring a relatively large pre-load which acts in the direction opposite to the direction in which the magnetic force acts, so that the pre-load is offset by the magnetic force.

The "magnetic force control device" in this braking system may be adapted, for example, to electromagnetically or mechanically control the magnetic force. Where the magnetic force is electromagnetically controlled, for example, the electric current or voltage to be applied to the magnetic force generating means is controlled.

In one form of this braking system, the above-indicated electromagnetic pressure control valve has a solenoid as the above-indicated magnetic force generating means, and a non-operated state and an operated state which are selectively established based on the magnetic force of the solenoid. In the non-operated position, the above-indicated valve member is inhibited from being seated onto the above-indicated valve seat. In the operated state, the valve seat is permitted to be seated onto the valve seat. The electromagnetic pressure control valve placed in the non-operated state permits the flows of the working fluid in the opposite directions through the above-indicated primary passage between the above-indicated master cylinder side and brake cylinder side. The electromagnetic pressure control valve placed in the operated state permits the flow of the working fluid from the brake cylinder side toward the master cylinder side when the above-indicated second fluid pressure is higher than the first fluid pressure by an amount larger than the desired pressure difference value which is based on the magnetic force of the above solenoid, and inhibits the flow of the working fluid from the brake cylinder side toward the master cylinder side when the difference of the second fluid pressure with respect to the first fluid pressure is equal to or smaller than the above-indicated desired pressure difference value based on the magnetic force of the above solenoid.

In another form of this braking system, the above-indicated magnetic force control device includes (a) a brake-operating-force-related sensor for detecting the above-indicated brake-operating-force-related quantity relating to the brake operating force, and (b) magnetic force control means for controlling the magnetic force of the above-indicated magnetic force generating means on the basis of the detected brake-operating-force-related quantity, for thereby changing the above-indicated desired pressure difference value on the basis of the operating force of the above-indicated brake operating member. In this respect, the "magnetic force control means" may be adapted, for example, to effect the above-indicated braking effect characteristic control such that the brake cylinder pressure increases substantially linearly with the master cylinder pressure, irrespective of whether the boosting limit of the booster has been reached or not.

In a further form of this braking system, the above-indicated magnetic force control device includes (a) the above-indicated brake-operating-force-related quantity sensor, (b) a boosting state detecting sensor for detecting the above-indicated boosting state quantity indicating the boosting state of the booster, and (c) magnetic force control means for controlling the magnetic force of the above-indicated magnetic force generating means on the basis of the detected brake-operating-force-related quantity and boosting state quantity, for thereby changing the above-indicated desired pressure difference value on the basis of the boosting state of the booster. The "magnetic force control means" may be adapted, for example, to effect the above-indicated braking effect characteristic control such that the brake cylinder pressure increases substantially linearly with the master cylinder pressure, irrespective of whether the booster is abnormal or not. Described in detail, the "magnetic force control means" may be adapted, for example, to determine that the boosting state is normal or abnormal, on the basis of the output signal of the boosting state detecting sensor, and determine the desired magnetic force to be one of two values, depending upon whether the boosting state is normal or abnormal. Alternatively, the "magnetic force control means" may be adapted to determine the boosting state on the basis of a deviation of the boosting state quantity from the nominal value, which is detected on the basis of the output signal of the boosting state detecting sensor. In this case, the magnetic force control means determines the desired magnetic force to be one of three or more values, depending upon the above deviation. In the latter case, in particularly, the magnetic force can be controlled more intricately in relation to a change in the boosting state of the booster, so as to compensate for the amount of reduction of the boosting capacity of the booster, even where the degree of abnormality of the booster is not so large as to consider the booster to be fatally defective.

In a still further form of this braking system, the above-indicated magnetic force control device includes (a) friction coefficient reduction detecting means for detecting reduction of a coefficient of friction between the above-indicated braking friction member and the above-indicated rotor, and (b) magnetic force control means for controlling the magnetic force of the above-indicated magnetic force generating means, so that the above-indicated brake cylinder pressure is higher when the reduction of the coefficient of friction is detected than when the reduction is not detected. In this respect, the "magnetic force control means" may be adapted, for example, to effect the above-indicated braking effect characteristic control such that the brake cylinder pressure increases with the master cylinder pressure, at a constant rate irrespective of whether the coefficient of friction between the braking friction member and the rotor is detected master cylinder pressure has been reduced due to heat fade or water fade, for instance.

In a yet further form of this braking system, the above-indicated magnetic force control device includes (a) emergency brake operation detecting means for detecting an operation to apply an emergency brake, and (b) magnetic force control means for controlling the magnetic force of the above-indicated magnetic force generating means, so that the above-indicated brake cylinder pressure is higher when the operation to apply an emergency brake is detected than when this operation is not detected. In this respect, the "magnetic force control means" may be adapted to effect the above-indicated braking effect characteristic control, for example.

It is noted that the braking system according to the present mode of the invention may include the feature of any one of the above modes (3)–(6).

(8) A braking system according to the above mode (7), wherein the above-indicated hydraulic pressure source is a pump which sucks the working fluid on its suction side and delivers the working fluid from its delivery side which is connected through the above-indicated auxiliary passage to the above-indicated primary passage, the braking system further comprising an automatic hydraulic pressure control device for automatically controlling the fluid pressure in the above-indicated brake cylinder, the automatic hydraulic pressure control device including (a) a reservoir which is connected to the suction side of the above-indicated pump through a pump passage and which stores the working fluid, and (b) an electromagnetic hydraulic pressure control device which are connected to a portion of the above-indicated primary passage between the above-indicated brake cylinder and a point of connection thereof to the above-indicated auxiliary passage, the electromagnetic hydraulic pressure control device having a plurality of selectively established states including a state for communication of the brake cylinder with the delivery side of the above-indicated pump, and a state for communication of the brake cylinder with the above-indicated reservoir, and wherein the above-indicated magnetic force control device includes automatic magnetic force control device for controlling the magnetic force of the above-indicated pressure control device so as to hold the valve member seated on the valve seat for thereby inhibiting the flow of the working fluid from the above-indicated pump toward the above-indicated master cylinder, during operation of the automatic hydraulic pressure control device.

In this braking system, the pressure control valve provided for controlling the relationship between the master cylinder pressure and the brake cylinder pressure is also used for automatic control of the brake cylinder pressure. Thus, the automatic control is performed by effective utilization of the pressure control valve without an influence by the master cylinder, and without an increase in the number of components of the braking system.

(9) A braking system according to the above mode (2), wherein the above-indicated pressure control device includes a mechanical pressure control device including (a) a valve member and a valve seat for controlling fluid flows through the above-indicated primary passage between the master cylinder side and the brake cylinder side, and (b) a stepped piston having a large-diameter portion and a small-diameter portion which receive said first fluid pressure and said second fluid pressure, respectively, in opposite directions, the stepped piston generating a mechanical force acting on at least one of the above-indicated valve member and valve seat, for controlling a relative movement between the valve member and the valve seat, the above-indicated pressure difference value changing on the basis of pressure-receiving areas of the large-diameter and small-diameter portions of the piston and the above-indicated first fluid pressure.

In this braking system wherein the relationship between the master cylinder pressure and the brake cylinder pressure is mechanically controlled, the relationship between those two pressures can be controlled without an increase in the amount of consumption of the electric power, and with a comparatively high degree of reliability.

In one form of this braking system, the above-indicated mechanical control valve has (a) a housing, (b) a stepped cylinder bore formed in the housing and having a large-diameter portion communicating with the above-indicated master cylinder side and a small-diameter portion communicating with the above-indicated brake cylinder side, (c) the above-indicated piston slidably fitted in the above-indicated cylinder bore such that the large-diameter portion of the piston is formed on the above-indicated master cylinder side while the small-diameter portion of the piston is formed on the above-indicated brake cylinder-side, (d) a first fluid chamber and a second fluid chamber which are formed on the respective master and brake cylinder sides, with the piston being fitted in the above-indicated housing, and an atmospheric pressure chamber formed between a shoulder portion of the cylinder bore and a shoulder portion of the piston, (e) a communication passage formed in the above-indicated piston, for communication between the above-indicated first and second fluid chambers, (f) a communication passage shut-off valve for opening and closing the communication passage, the communication shut-off valve including a valve seat which is movable with the above-indicated piston and which is held in communication with the communication passage and open in the second fluid chamber, a valve member which can be seated onto the valve seat, a nearest-position stop member for defining a shortest distance between the valve member and the valve seat, and a spring for biasing the valve member and the valve seat toward the position of the shortest distance, and (g) an advanced position stop member provided on the above-indicated housing, for abutting contact with the above-indicated piston for defining a fully advanced position of the piston such that the fully advanced position is spaced a predetermined distance in an advancing direction of the piston from a position at which the valve member of the above-indicated communication shut-off valve is seated on the valve seat.

It is noted that the braking system according to this mode of the invention may include the feature of any one of the modes (3)–(6).

(10) A braking system according to any one of the above modes (1)–(9), wherein the above-indicated hydraulic pressure source is a pump which sucks the working fluid on its suction side and delivers the working fluid from its delivery side which is connected through the above-indicated auxiliary passage to the above-indicated primary passage, the braking system further comprising a fluid supply device which is connected to an upstream portion of the above-indicated primary fluid passage between the above-indicated master cylinder and the above-indicated pressure control device and to the suction side of the above-indicated pump, for supplying the working fluid from the above-indicated upstream portion to the suction side of the above-indicated pump, without reduction of the pressure of the working fluid.

For the pump to deliver the pressurized working fluid, utilizing the working fluid from the upstream portion of the primary passage, it is considered to arrange the braking system such that the high-pressure working fluid from that upstream portion is once supplied to and stored in a reservoir under a pressure substantially equal to the atmospheric pressure so that the working fluid is then pumped up from the reservoir by the pump and delivered therefrom to the brake cylinder side. According to this arrangement, however, the working fluid pressurized by the master cylinder is lowered by the reservoir and is then pressurized by the pump. In the braking system according to the above mode (10), on the other hand, the working fluid pressurized by the master cylinder is pressurized by the pump, without reduction of the pressure of the working fluid by the reservoir, whereby the operating response of the pump is improved in the present braking system as compared with that where the working fluid once lowered is pressurized by the pump. Further, the pump is required to increase the pressure of the working fluid from the level of the master cylinder pressure by a desired pressure difference. Accordingly, the reduction of the required capacity of the pump and the energy consumption are -easily achieved.

One form of this braking system further comprises an automatic hydraulic pressure control device for automatically controlling the fluid pressure of the above-indicated brake cylinder, the automatic hydraulic pressure control device including (a) a reservoir which is connected to the suction side of the above-indicated pump and a pump passage and which stores the working fluid, and (b) an electromagnetic hydraulic pressure control device which is connected to a portion of the above-indicated primary passage between the above-indicated brake cylinder and a point of connection thereof to the above-indicated auxiliary passage' and which has a plurality of selectively established states including a state for connecting the brake cylinder to the delivery side of the above-indicated pump and a state for connecting the brake cylinder to the above-indicated reservoir, and wherein the above-indicated fluid supply device includes (c) a second auxiliary passage connecting the above-indicated pump passage and the portion of the primary passage between the master cylinder and the above-indicated pressure control device, and (d) a check valve which is provided in a portion of the above-indicated pump passage between the above-indicated reservoir and a point of connection thereof to the above-indicated second auxiliary passage, the check valve permitting a flow of the working fluid in a direction from the above-indicated reservoir toward the above-indicated pump and inhibiting a flow of the working fluid in the opposite direction. In the present form of the invention, the flow of the working fluid from the master cylinder to the reservoir is inhibited by the check valve, even through the reservoir is connected to the suction side of the pump.

In another form of this braking system, the above-indicated fluid supply device includes (a) the above-indicated second auxiliary passage, (b) the above-indicated check valve, and (c) an inflow control valve provided in the above-indicated second auxiliary passage. The inflow control valve is placed in a state for permitting the flow of the working fluid from the above-indicated master cylinder toward the above-indicated reservoir, when the above-indicated automatic fluid pressure control is not effected during operation of the above-indicated pump. When the automatic fluid pressure control is effected during operation of the pump and at least when the working fluid that can be pumped up by the pump is present in the reservoir, the inflow control valve is placed in a state for inhibiting the flow of the working fluid from the master cylinder toward the reservoir. In this form of the invention, when the working fluid is present in the reservoir and can be pumped up by the pump during the automatic fluid pressure control, the pump is prevented from pumping up the working fluid from the master cylinder, to prevent the reservoir from being kept filled with the working fluid, thereby making it possible for the reservoir to effect reduction of the pressure of the brake cylinder.

According to a further form of this braking system, the above-indicated fluid supply device includes an inflow control valve which is provided in the above-indicated second auxiliary passage. The inflow control valve is placed in s state for permitting the flow of the working fluid from the above-indicated master cylinder toward the above-indicated reservoir when the above-indicated pump is not in operation. During at least a portion of the operation of the pump, the inflow control valve inhibits the flow of the fluid therethrough. In this form of the braking system, when the pump is not in operation, that is, when the braking system is operated to increase the fluid pressure in the brake cylinder by the master cylinder rather than the pump, the working fluid flows from the master cylinder to the brake cylinder not only through the above-indicated primary passage but also through the second auxiliary passage and the inflow control valve. If the fluid flow through the primary passage is prevented by any chance, the fluid pressure is normally generated in the brake cylinder.

(11). A braking system according to any one of the above modes (1)–(10), further comprising a booster disposed between the above-indicated brake operating member and the above-indicated master cylinder, for boosting an operating force of the above-indicated brake operating member and transmitting the boosted operating force to the master cylinder, and wherein the above-indicated hydraulic pressure source control device includes post-boosting-limit control means for commanding the above-indicated hydraulic pressure source to deliver the working fluid after a boosting limit of the booster has been reached.

In this braking system, the brake operating force is boosted by the hydraulic pressure source in place of the booster after the boosting limit of the booster has been reached. Accordingly, the braking effect is stabilized irrespective of whether the boosting limit of the booster has been reached or not.

(12) A braking system according to the above mode (11), wherein the above-indicated pressure changing device includes means operated after the boosting limit of the above-indicated booster has been reached, for changing the fluid pressure in the brake cylinder with the operating force of the above-indicated brake operating member, such that a rate of change of the fluid pressure in the brake cylinder with the operating force after the boosting limit has been reached is substantially equal to that before the boosting limit has been reached.

In this braking system, the rate of change of the fluid pressure of the brake cylinder with the operating force of the brake operating member, that is, the braking effect is substantially the same before and after the boosting limit of the booster has been reached, so that the braking effect is stabilized even in the presence of the boosting limit of the booster.

(13) A braking system according to any one of the above modes (1)–(12), wherein the above-indicated pressure increasing device further includes a brake-operating-force-related quantity sensor for detecting a quantity relating to the operating force of the above-indicated brake operating member, and the above-indicated hydraulic pressure control device includes post-reference-value control means for commanding the above-indicated hydraulic pressure source to deliver the working fluid after the brake-operating-force-related quantity has reached a reference value.

In this braking system, the "reference value" may be a value which is expected to be established when the boosting limit of the booster has been reached, for example.

(14) A braking system according to the above mode, wherein the above-indicated brake-operating-force-related quantity sensor includes a vehicle deceleration sensor for detecting a deceleration value of a body of the motor vehicle.

In the braking system according to the preceding mode (13), the "brake-operating-force-related quantity sensor" may include a sensor for directly detecting the brake-operating-force-related quantity, such as a brake operating force sensor, a brake operating stroke sensor, or a master cylinder pressure sensor. In this case, however, the sensor must be adapted to directly detect the brake-operating-force-related quantity. In the event of abnormality of this sensor, the pressure increasing device cannot be operated in relation to the brake operating force.

In a motor vehicle equipped with a braking system, the brake operating force is generally reflected on the master cylinder pressure, and the master cylinder pressure is reflected on the brake cylinder pressure. The brake cylinder pressure is reflected on the braking force of the motor vehicle, and the braking force is reflected on the deceleration value of the body of the motor vehicle. Accordingly, even if the brake-operating-force-related quantity cannot be directly detected in the braking system according to the above mode (13), the pressure increasing device can be operated in relation to the brake operating force, if the vehicle deceleration value can be obtained.

Based on this finding, the braking system according to the present mode of the invention was developed, wherein the pressure increasing device can be operated in relation to the brake operating force, even if the brake-operating-force-related quantity cannot be directly detected.

In this braking system, the "vehicle deceleration sensor" may be adapted to directly detect the deceleration value of the vehicle body. However, the vehicle deceleration sensor may be adapted to indirectly detect the vehicle deceleration value, by obtaining a time derivative of the vehicle speed. That is, a motor vehicle is generally provided with a vehicle speed sensor, and the vehicle deceleration value can be obtained by differentiating the vehicle speed with respect to the time.

It is noted that the vehicle speed sensor may be adapted to directly detect the vehicle speed, like a Doppler-effect sensor. However, the vehicle speed sensor may be adapted to indirectly detect the vehicle speed, based on the wheel speeds, i.e., rotating speeds of the vehicle wheels. One example of the vehicle speed sensor of the latter type is employed by an anti-lock control device, which includes, as well known, (a) a plurality of wheel speed sensors for detecting the rotating speeds of a plurality of vehicle wheels, (b) an electromagnetic hydraulic pressure control valve for controlling the brake cylinder pressure for each vehicle wheel, and (c) a controller for controlling the electromagnetic hydraulic pressure control valve, so as to prevent an excessive locking tendency of each vehicle wheel during brake application to the motor vehicle, based on the wheel speeds detected by the plurality of wheel speed sensors. The controller is generally designed to estimate the vehicle speed on the basis of the wheel speeds detected by the plurality of wheel speed sensors, and control the electromagnetic hydraulic pressure control valve on the basis of the relationship between the estimated vehicle speed and the speed of each vehicle wheel.

Therefore, where the "vehicle deceleration sensor" in the braking system according to this braking system is adapted to indirectly detect the vehicle deceleration value by obtaining the time derivative of the vehicle speed detected by the vehicle speed sensor, this vehicle deceleration sensor can be obtained by adding only a software and without adding a hardware, so that the "vehicle deceleration sensor" may be simplified in construction with reduced weight and cost of manufacture.

(15) A braking system according to the above mode (13) or (14), wherein the above-indicated pressure increasing device includes a plurality of the above-indicated brake-operating-force-related quantity sensors.

In this braking system, the operating reliability of the pressure increasing device in the event of abnormality of the brake-operating-force-related quantity sensors is easily improved, as compared with that where only one brake-operating-force-related quantity sensor is provided.

(16) A braking system according to the above mode (15), wherein the above-indicated hydraulic pressure control device includes fail-safe means for commanding the above-indicated hydraulic pressure source to deliver the working fluid after the brake-operating-force-related quantity detected by a first sensor consisting of predetermined at least one of the above-indicated plurality of brake-operating-force-related quantity sensors has reached the above-indicated reference value, when the above-indicated first sensor is normal, and commanding the above-indicated hydraulic pressure source to deliver the working fluid after the brake-operating-force-related quantity detected by a second sensor consisting of at least one of the above-indicated plurality of brake-operating-force-related quantity sensors which is different from the above-indicated first sensor has reached the above-indicated predetermined value, when the above-indicated first sensor is not normal.

In this braking system, the pressure increasing device can be operated in relation to the brake operating force, unless all of the plurality of brake-operating-force-related quantity sensors are abnormal. Accordingly, the operating reliability of the pressure increasing device is improved.

According to one form of this braking system, the above-indicated fail-safe means includes (a) determining means for determining whether the first sensor consisting of the predetermined at least one of the above-indicated plurality of brake-operating-force-related quantity sensors is normal, (b) selecting means for selecting the first sensor when the first sensor is determined to be normal, and the second sensor consisting of at least one of the above-indicated plurality of brake-operating-force-related quantity sensors which is different from the first sensor, when the first sensor is not determined to be normal, and (c) fluid supply means for commanding the above-indicated hydraulic pressure source to deliver the working fluid when the brake-operating-force related quantity detected by the selected brake-operating-force-related quantity sensor has reached the above-indicated reference value.

(17) A braking system according to the above mode (16), wherein the above-indicated plurality of brake-operating-force-related quantity sensors includes a master cylinder pressure sensor for detecting the fluid pressure of the above-indicated master cylinder, and a vehicle deceleration sensor for detecting a deceleration value of a body of the motor vehicle, the above-indicated first sensor including the above-indicated master cylinder pressure sensor, and the above-indicated second sensor including the above-indicated vehicle deceleration sensor.

(18) A braking system according to the above mode (15), wherein the above-indicated hydraulic pressure source control device includes fail-safe means for commanding the above-indicated hydraulic pressure source to deliver the working fluid when all of the brake-operating-force-related quantities detected by the above-indicated plurality of brake-operating-force-related quantity sensors have reached respective reference values.

Where the plurality of brake-operating-force-related quantity sensors are all normal, the brake-operating-force-related quantities detected by these plurality of brake-operating-force-related quantity sensors have reached the reference values, when the braking system is brought to a state in which the pressure increasing device should be operated. Where some of the plurality of brake-operating-force-related quantity sensors is/are abnormal, all of the brake-operating-force-related quantities have not reached the reference values even when the braking system is brought to the state in which the pressure increasing device should be operated. Therefore, if the hydraulic pressure source is commanded to deliver the working fluid when all of the brake-operating-force-related quantities have reached the reference values, the working fluid is delivered from the hydraulic pressure source only where the brake-operating-force-related quantity sensors are all normal. This arrangement prevents erroneous delivery of the working fluid from the hydraulic pressure source due to abnormality of one of the plurality of brake-operating-force-related quantity sensors.

In the braking system according to this mode of the invention adapted to prevent the erroneous delivery of the working fluid from the hydraulic pressure source due to abnormality of the brake-operating-force-related quantity sensors, the reliability of the pressure increasing device is improved.

(19) A braking system according to the above mode (18), wherein the above-indicated plurality of brake-operating-force-related quantity sensors include a master cylinder pressure sensor for detecting the fluid pressure of the above-indicated master cylinder, and a brake operation sensor for detecting an operation of the above-indicated brake operating member, the above-indicated fail-safe means including first means for commanding the above-indicated hydraulic pressure source control device to deliver the working fluid when the fluid pressure of the master cylinder detected by the above-indicated master cylinder pressure sensor has reached the above-indicated reference value and when the operation of the above-indicated brake operating member is detected by the above-indicated brake operation sensor.

This braking system prevents erroneous delivery of the working fluid from the hydraulic pressure source which would be caused when the master cylinder pressure detected by the master cylinder pressure sensor has reached the reference value due to abnormality of the master cylinder pressure sensor, even while the brake operating member is not operated. Accordingly, the reliability of the pressure increasing device is improved.

(20) A braking system according to the above mode (19), wherein the above-indicated plurality of brake-operating-force-related quantity sensors further include a vehicle deceleration sensor for detecting a deceleration value of a body of the motor vehicle, and the above-indicated first means commands the above-indicated hydraulic pressure source to deliver the working fluid when the fluid pressure of the master cylinder detected by the above-indicated master cylinder pressure sensor has reached the above-indicated reference value and when the operation of the above-indicated brake operating member is detected by the above-indicated brake operation sensor, where the above-indicated brake operation sensor is normal, the above-indicated fail-safe means including second means for commanding the above-indicated hydraulic pressure source to deliver the working fluid when the fluid pressure of the master cylinder detected by the above-indicated master cylinder pressure sensor has reached the above-indicated reference value and when the deceleration value of the body of the motor vehicle detected by the above-indicated vehicle deceleration sensor has reached the above-indicated reference value, where the above-indicated brake operation sensor is not normal.

This braking system wherein the vehicle deceleration sensor is used in the event of abnormality of the brake operating sensor prevents erroneous delivery of the working fluid from the hydraulic pressure source, not only where the master cylinder pressure sensor is abnormal in that the detected master cylinder pressure is higher than the actual value, but also where the brake operating sensor is abnormal in that the operation of the brake operating member is detected while the brake operating member is not in fact operated. Accordingly, the reliability of the pressure increasing device is improved.

According to one form of this form of the braking system, the above-indicated second means includes (a) determining means for determining whether the above-indicated brake operation sensor is normal or not, (b) selecting means for selecting the brake operation sensor when the brake operation sensor is determined to be normal, and the above-indicated vehicle deceleration sensor when the brake operation sensor is not determined to be normal, and (c) fluid supply means for commanding the hydraulic pressure source to deliver the working fluid when the master cylinder pressure detected by the master cylinder pressure sensor has reached the above-indicated reference value and when the operation of the brake operating member is detected by the brake operation sensor, where the brake operation sensor is determined to be normal, and commanding the hydraulic pressure source to deliver the working fluid when the master cylinder pressure detected by the master cylinder pressure sensor has reached the above-indicated reference value and when the vehicle deceleration value detected by the vehicle deceleration sensor has reached the above-indicated reference value, where the brake operation sensor is not determined to be normal.

Although the "vehicle deceleration sensor" in the braking system according to the present mode is used in place of the brake operation sensor in the event of abnormality of the brake operation sensor, the vehicle deceleration sensor may be used in place of the master cylinder pressure sensor in the event of abnormality of the master cylinder pressure sensor.

(21) A braking system according to any one of the above modes (1)–(20), wherein the above-indicated pressure increasing device includes (a) vehicle stationary state detecting means for detecting that the motor vehicle is in a stationary state, and (b) operation initiation control means for operating such that an operation of the pressure increasing device is less likely to be initiated when the stationary state of the motor vehicle is detected than when the stationary state is not detected.

If, for instance, the braking system according to the above mode (1) is adapted to necessarily activate the pressure increasing device when the brake-operating-force-related quantity has reached the reference value, the pressure increasing device is activated even where the brake-operating-force-related quantity sensor has reached the reference value while the motor vehicle is in a stationary state. However, the operation of the pressure increasing device provides an operating noise, and the hydraulic pressure source is rarely operated to increase the fluid pressure of the brake cylinder while the motor vehicle is stationary. Therefore, the braking system according to the above mode (1) adapted to necessarily activate the pressure increasing device when the brake-operating-force-related quantity has reached the reference value suffers from a problem that the pressure increasing device is unnecessarily activated in the stationary state of the motor vehicle in which the operating noises of the vehicle components are likely to be perceived by the vehicle operator.

Based on this finding, the braking system according to the present mode was developed so as to prevent unnecessary activation of the pressure increasing device, for thereby reducing the noise within the motor vehicle.

It is noted that the braking system according to this mode of the invention may be operated without the pressure changing device described with respect to the mode (1).

(22) A braking system according to the above mode (21), wherein the above-indicated pressure increasing device further includes a brake-operating-force-related quantity sensor for detecting a quantity relating to an operating force of the above-indicated brake operating member, and the above-indicated hydraulic pressure source control device includes post-reference-value control means for commanding the above-indicated hydraulic pressure source to deliver the working fluid when the brake-operating-force-related quantity has reached a reference value, the above-indicated operation initiation control means including reference value determining means for determining the above-indicated reference value such that the above-indicated brake-operating-force-related quantity is less likely to have reached the above-indicated reference value when the above-indicated stationary state of the motor vehicle is detected than when the above-indicated stationary state is not detected.

(23) A braking system according to any one of the above modes (1)–(22), further comprising:

a vacuum booster for boosting the operating force of the above-indicated brake operating member by a pressure difference between a negative pressure chamber and a pressure changing chamber which is selectively communicated with the negative pressure chamber and an atmosphere, and transferring the boosted operating force to the above-indicated master cylinder;

booster-pressure-related quantity detecting means for detecting a quantity relating to at least one of pressures in the above-indicated negative pressure chamber and the above-indicated pressure changing chamber, and generating a signal representative of the above-indicated quantity; and a determining device for determining, on the basis of the output signal of the booster-pressure-related quantity detecting means, whether a boosting limit of the above-indicated vacuum booster has been reached as a result of an increase of the pressure of the above-indicated pressure changing chamber to an atmospheric pressure.

There is already available a motor vehicle braking system of a type wherein a vacuum booster is provided between a brake operating member and a master cylinder which generates a hydraulic pressure by operation of a pressurizing piston. The vacuum booster is a device for boosting the operating force of the brake operating member by an operation of a power piston with a pressure difference which is caused between a pressure changing chamber and a negative pressure chamber (generally called a constant pressure chamber), by selective communication of the pressure changing chamber with an atmosphere and the negative pressure chamber connected to a negative pressure source, on the basis of a relative movement of the brake operating member and the pressurizing piston.

A conventional example of this type of braking system is disclosed in JP-A-55-76744. This braking system is provided with a vacuum booster for boosting the operating force of the brake operating member, and a hydraulic booster as a second boosting device which is activated when the boosting limit of the vacuum booster has been reached with the pressure of the pressure changing chamber having increased to the atmospheric pressure.

In this conventional braking system, a moment at which the boosting limit of the vacuum booster has been reached is mechanical detected. In response to this mechanical detection, the hydraulic booster is mechanically activated. In some braking system provided with a vacuum booster, it is required to electrically detect the moment when the boosting limit of the vacuum booster has been reached. For instance, the electrical detection is required, when it is desired to electrically activate the second boosting device or other device adapted to prevent insufficient fluid pressure in the brake cylinder, or when it is desired to activate a buzzer, a light or other warning device to inform the vehicle operator that the boosting limit of the vacuum booster has been reached.

On the other hand, the master cylinder pressure when the boosting limit of the vacuum booster has been reached is determined by the pressure of the negative pressure chamber of the vacuum booster. However, the pressure of the negative pressure chamber is not always constant, but may vary. The boosting limit of the vacuum booster has not been necessarily reached when the master cylinder pressure has changed to a predetermined value. Where the negative pressure chamber is connected to the intake pipe of the engine which serves as the negative pressure source, for example, the pressure (negative pressure) in the engine intake pipe varies depending upon the rotating speed of the engine and the opening angle of the throttle valve during operation of the brake operating member. As a result, the pressure of the negative pressure chamber varies. Accordingly, it is important to take into account the variation of the pressure of the negative pressure chamber, in detecting the moment when the boosting limit of the vacuum booster has been reached.

The braking system according to the present mode of this invention was developed in view of the background discussed above. It is an object of this mode of the invention to provide a braking system which is capable of electrically detecting that the boosting limit of the vacuum booster has been reached, while taking into account the variation of the pressure in the negative pressure chamber.

The above object may be achieved by providing the braking system according to any one of the above modes (1)–(22) with (a) a vacuum booster for boosting the operating force of the above-indicated brake operating member by a pressure difference between a negative pressure chamber and a pressure changing chamber which is selectively communicated with the negative pressure chamber and an atmosphere, and transferring the boosted operating force to the above-indicated master cylinder, (b) booster-pressure-related quantity detecting means for detecting a quantity relating to at least one of pressures in the above-indicated negative pressure chamber and pressure changing chamber, and generating a signal representative of the quantity, and (c) a determining device for determining, on the basis of the output signal of the booster-pressure-related quantity detecting means, whether a boosting limit of the above-indicated vacuum booster has been reached as a result of an increase in the pressure in the above-indicated pressure changing chamber to an atmospheric pressure.

The moment when the boosting limit of the vacuum booster has been reached can be detected by monitoring the pressure of the pressure changing chamber, both of the pressure of the pressure changing chamber and the master cylinder pressure, or both of the pressure of the negative pressure chamber and the master cylinder pressure. Namely, the moment when the boosting limit of the vacuum booster has been reached can be detected on the basis of a booster-pressure-related quantity relating to at least one of the pressures of the negative pressure chamber and the pressure changing chamber. The booster-pressure-related quantity can be electrically detected by a sensor or a switch.

Where the moment when the boosting limit of the vacuum booster has been reached is detected by monitoring the pressure of the pressure changing chamber, this moment varies depending upon the pressure of the negative pressure chamber. Where the moment when the boosting limit of the vacuum booster has been reached is detected by monitoring both the pressure of the pressure changing chamber and the master cylinder pressure, or both the pressure of the negative pressure chamber and the master cylinder pressure, the master cylinder pressure when the moment at which the boosting limiting has been reached is detected varies depending upon the pressure of the negative pressure chamber. That is, where the moment when the boosting limit of the vacuum booster has been reached is detected on the basis of at least the booster-pressure-related quantity, the variation in the actual pressure of the negative pressure chamber is reflected on the detection.

In the braking system according to the present mode of the invention wherein the moment at which the boosting limit of the vacuum booster has been reached is electrically detected, this detection can be readily utilized for an electrically operated device such as a device for preventing insufficiency of the brake cylinder pressure and a warning device. Further, since the variation in the pressure in the negative pressure chamber is taken into account in detecting the moment when the boosting limit of the vacuum booster has been reached, the accuracy of the detection is improved.

The present braking system may be adapted to determine that the boosting limit of the vacuum booster has been reached, when a master-cylinder-pressure-related quantity which continuously changes with the master cylinder pressure has reached a boosting limit value determined by the booster-pressure-related quantity of the pressure changing chamber of the negative pressure chamber, or when the booster-pressure-related quantity which continuously changes with the pressure of the negative pressure chamber has increased to the atmospheric pressure. In either of these cases, the quantity used for the determination is a quantity which continuously changes. Accordingly, the change in the operating state of the vacuum booster can be continuously detected. This arrangement permits the detection of not only the moment at which the boosting limit of the vacuum booster has been reached, but also a moment (pre-limit moment) immediately before the moment at which the boosting limit is expected to have been reached. In the braking system provided with the vacuum booster, it is desired in some cases to detect the pre-limit moment as well as the moment of the boosting limit. For example, it is desired to detect the pre=limit moment for the purpose of providing a warning to the vehicle operator or activating the device for preventing insufficiency of the brake cylinder pressure, before the boosting limit of the vacuum booster has been reached. The device indicated above tends to have a delay in operation.

Therefore, the present braking system makes it possible to easily satisfy a need of initiating the warning to the vehicle operator or activating the above-indicated device, before the moment at which the boosting limit of the vacuum booster has been reached.

In the present braking system, the "vacuum booster" may be adapted such that a space within its housing is divided by a power piston into the negative pressure chamber on the side of the master cylinder and the pressure changing chamber on the side of the brake operating member. The power piston is movable relative to a valve operating rod which is mechanically linked with the pressurizing piston of the master cylinder. In this case, a valve mechanism (for example, an air valve, a control valve, a vacuum valve or a valve control spring, as described below) is provided for selective communication of the pressure changing chamber with the negative pressure chamber connected to the negative pressure source and the atmosphere. The valve mechanism is controlled based on a relative movement of the above-indicated power piston and the valve operating rod, so that the operating force of the brake operating force is boosted by utilization of the pressure difference between the negative pressure and the atmospheric pressure.

Further, the "booster-pressure-related quantity detecting means" in the present braking system may be pressure detecting means which is subjected to a pressure and generates a signal representative of this pressure. The "pressure detecting means" may be used either exclusively for the vacuum booster, or commonly for the vacuum booster and other device or devices. For instance, an electronic engine control device for a motor vehicle may be provided with an intake pipe pressure sensor (intake pipe negative pressure sensor) for detecting the pressure (negative pressure) in the intake pipe of the engine. Where the negative pressure chamber of the vacuum booster is connected to the intake pipe of the engine serving as the negative pressure source, the pressure of the engine intake pipe can be used as a value approximating to the pressure of the negative pressure chamber. Therefore, where the "booster-pressure-related quantity detecting means" is adapted to detect the pressure of the negative pressure chamber connected to the engine intake pipe, the booster-pressure-related quantity detecting means may utilize the intake pipe pressure sensor for detecting the pressure of the negative pressure chamber. This arrangement eliminates pressure detecting means exclusively used for the vacuum booster, and permits the present braking system to be available at a reduced cost. In this case, the pressure in the engine intake pipe is an example of the "booster-pressure-related quantity".

The "booster-pressure-related quantity detecting means" in this braking system may be adapted to electrically detect a physical quantity not representing a pressure, and indirectly obtain the booster-pressure-related quantity by calculating the pressure on the basis of the detected physical quantity. For instance, the above-indicated electronic engine control device may be provided with a throttle opening sensor for detecting the opening angle of a throttle valve disposed in the engine intake pipe, and an engine speed sensor for detecting the rotating speed of the engine. The pressure of the engine intake pipe can be calculated on the basis of the throttle opening angle and the engine speed. Further, the pressure of the engine intake pipe can be used as a value approximating to the pressure of the negative pressure chamber. Therefore, where the "booster-pressure-related quantity detecting means" is adapted to detect the pressure of the negative pressure chamber connected to the engine intake pipe, the pressure of the negative pressure chamber can be detected indirectly on the basis of the output signals of the throttle opening sensor and engine speed sensor. This arrangement also eliminates pressure detecting means exclusively used for the vacuum booster, and permits the present braking system to be available at a reduced cost. In this arrangement, therefore, the throttle opening angle and the engine speed are considered to be an example of the "booster-pressure-related quantity".

Alternatively, the present braking system may be adapted to include at least one of means for detecting the booster-pressure-related quantity relating to the negative pressure chamber or the pressure changing chamber and means for detecting a master-cylinder-pressure-related quantity, and determine that the boosting limit of the above-indicated vacuum booster has been reached, on the basis of the booster-pressure-related quantity relating to the pressure changing chamber, or both of the booster-pressure-related quantity relating to the pressure changing chamber and the master-cylinder-pressure-related quantity, or alternatively both of the booster-pressure-related quantity relating to the negative pressure changer and the master-cylinder-pressure-related quantity.

It is noted that the braking system according to this mode of the invention may be operated without the pressure changing device described with respect to the mode (1).

(24) A braking system according to the above mode (23), further comprising master-cylinder-pressure-related quantity detecting means for detecting a quantity relating to the fluid pressure of the above-indicated master cylinder and generating a signal representative of the quantity, and wherein the above-indicated determining device includes means for determining whether the boosting limit of the above-indicated vacuum booster has been reached, on the basis of the output signals of the above-indicated master-cylinder-pressure-related quantity detecting means and the above-indicated booster-pressure-related quantity detecting means.

The "master-cylinder-pressure-related quantity detecting means" in the present braking system may of course be a pressure sensor for detecting the master cylinder pressure per se, but may be a force sensor for detecting the operating force of the brake operating member, a stroke sensor for detecting the operating stroke of the brake operating member, or vehicle deceleration detecting means for detecting the deceleration value of the vehicle during braking of the motor vehicle. The operating force and stroke of the brake operating member and the vehicle deceleration value are physical quantities relating to the master cylinder pressure. The vehicle deceleration detecting means may be adapted to directly detect the deceleration value of the motor vehicle, or indirectly detect the deceleration value of the motor vehicle by detecting the rotating speeds of a plurality of vehicle wheels, estimating the vehicle speed based on the detected rotating speeds of the vehicle wheels and obtaining a time derivative of the estimated vehicle speed.

(25) A braking system according to the above mode (23) or (24), wherein the above-indicated booster-pressure-related quantity detecting means includes pressure-changing-chamber-pressure-related quantity detecting means for detecting a quantity relating to the pressure of the above-indicated pressure changing chamber and generating a signal representative of this quantity, the above-indicated braking system further comprising master-cylinder-pressure-related quantity detecting means for detecting a quantity relating to the fluid pressure of the above-indicated master cylinder and generating a signal representative of this quantity, and wherein the above-indicated determining device includes first determining means for determining whether the boosting limit of the above-indicated vacuum booster has been reached, on the basis of the output signals of the above-indicated pressure-changing-chamber-pressure-related quantity detecting means and the above-indicated booster-pressure-related quantity detecting means.

In the vacuum booster, the amount of increase of the pressure of the pressure changing chamber and the amount of increase of the master cylinder pressure have a given relationship while the pressure of the negative pressure chamber remains unchanged, so that the amount of increase of the master cylinder pressure can be estimated from the amount of increase of the pressure of the pressure changing chamber. On the other hand, the pressure of the negative pressure chamber during an operation of the brake operating member may be different from that during another operation of the brake operating member, but the pressure of the negative pressure chamber is assumed to be held substantially constant during each operation of the brake operating member. Therefore, if the pressure of the pressure changing chamber at a certain moment before the boosting limit of the vacuum booster has been reached during each operation of the brake operating member is known, it is possible to estimate the master cylinder pressure at the moment when the boosting limit of the vacuum booster has been reached as a result of the increase of the pressure of the pressure changing chamber to the atmospheric pressure.

Based on this finding, the braking system according to the mode of the invention is adapted such that the above-indicated booster-pressure-related quantity detecting means includes pressure-changing-chamber-pressure-related quantity detecting means for detecting a quantity relating to the pressure of the above-indicated pressure changing chamber and generating a signal representative of this quantity, and the braking system further comprises master-cylinder-pressure-related quantity detecting means for detecting a quantity relating to the fluid pressure of the above-indicated master cylinder and generating a signal representative of this quantity. The above-indicated determining device includes first determining means for determining whether the boosting limit of the above-indicated vacuum booster has been reached, on the basis of the output signals of the above-indicated pressure-changing-chamber-pressure-related quantity detecting means and the above-indicated booster-pressure-related quantity detecting means.

(26) A braking system according to the above mode (25), wherein the above-indicated first determining means includes means for determining that the boosting limit of the above-indicated vacuum booster has been reached, when an actual amount of increase of the fluid pressure of the above-indicated master cylinder after the pressure of the above-indicated pressure changing chamber has reached a reference value has become equal to an expected amount of increase thereof during a period of increase of the pressure of the pressure changing chamber from the above-indicated reference value to an atmospheric pressure.

According to one form of the "means" in the present braking system, the expected amount of increase of the master-cylinder-pressure-related quantity during the period of increase of the pressure of the pressure changing chamber from the reference value to the atmospheric pressure is determined (by a master-cylinder-pressure-related quantity increase amount determining portion) when the actual pressure of the pressure changing chamber has reached the reference value, and a sum of the determined expected amount of increase and the master-cylinder-pressure-related quantity when the pressure of the pressure changing chamber has reached the reference value is determined (by a (boosting-limit-master-cylinder-pressure-related quantity determining portion) as a boosting-limit-master-cylinder-pressure-related quantity which is the master-cylinder-pressure-related quantity when the boosting limit of the vacuum booster has been reached. Further, the determination that th boosting limit of the vacuum booster has been reached is made (by a determining portion) when the actual master-cylinder-pressure-related quantity has increased to the boosting-limit-master-cylinder-pressure-related quantity.

(27) A braking system according to the above mode (23), wherein the above-indicated booster-pressure-related quantity detecting means includes pressure-changing-chamber-pressure-related quantity detecting means for detecting a quantity relating to the pressure of the above-indicated pressure changing chamber and generating a signal representative of this quantity, and the above-indicated determining device includes second determining means for determining, on the basis of the output signal of the above-indicated pressure-changing-chamber-pressure-related quantity detecting means, that the boosting limit of the above-indicated vacuum booster has been reached, when the pressure of the above-indicated pressure changing chamber has increased to an atmospheric pressure.

When the boosting limit of the vacuum booster has been reached, the pressure of the pressure changing chamber has increased to the atmospheric pressure. Therefore, the moment at which the boosting limit has been detected can be detected by detecting that the pressure of the pressure changing chamber has increased to the atmospheric pressure.

Based on this finding, the present braking system is adapted such that the above-indicated booster-pressure-related quantity detecting means includes pressure-changing-chamber-pressure-related quantity detecting means for detecting a quantity relating to the pressure of the above-indicated pressure changing chamber and generating a signal representative of this quantity, and such that the above-indicated determining device includes second determining means for determining, on the basis of the output signal of the above-indicated pressure-changing-chamber-pressure-related quantity detecting means, that the boosting limit of the above-indicated vacuum booster has been reached, when the pressure of the above-indicated pressure changing chamber has increased to an atmospheric pressure.

Therefore, the present braking system need not be based on an assumption that the pressure of the negative pressure changer is held substantially constant during each operation of the brake operating member, and makes it possible to determine the moment at which the boosting limit has been reached, while taking into account a variation in the pressure of the negative pressure changer during each operation of the brake operating member.

Further, the present braking system does not require the provision of master-cylinder-pressure-related quantity detecting means for determining whether the boosting limit of the vacuum booster has been reached.

(28) A braking system according to the above mode (23) or (24), wherein the above-indicated booster-pressure-related quantity detecting means includes negative-pressure-chamber-pressure-related quantity detecting means for detecting a quantity relating to the pressure of the above-indicated negative pressure chamber and generating a signal representative of this quantity, the above-indicated braking system further comprising master-cylinder-pressure-related quantity detecting means for detecting a quantity relating to the fluid pressure of the above-indicated master cylinder and generating a signal representative of this quantity, the above-indicated determining means including third determining means for determining whether the boosting of the above-indicated vacuum booster has been reached, on the basis of the above-indicated output signals of the above-indicated negative-pressure-chamber-pressure-related quantity detecting means and the above-indicated master-cylinder-pressure-related quantity detecting means.

The pressure of the negative pressure chamber of the vacuum booster and the master cylinder pressure when the boosting limit of the vacuum booster has been reached have a given relationship. Therefore, the master cylinder pressure when the boosting limit of the vacuum booster has been reached can be estimated from the pressure of the negative pressure chamber. Accordingly, if the pressure of the negative pressure chamber is known at a moment before the boosting limit of the vacuum booster has been reached, it is possible to estimate the master cylinder pressure at the moment when the boosting limit of the vacuum booster has been reached.

Based on this finding, the braking system according to this mode of the invention is adapted such that the the above-indicated booster-pressure-related quantity detecting means includes negative-pressure-chamber-pressure-related quantity detecting means for detecting a quantity relating to the pressure of the above-indicated negative pressure chamber and generating a signal representative of this quantity, the above-indicated braking system further comprising master-cylinder-pressure-related quantity detecting means for detecting a quantity relating to the fluid pressure of the above-indicated master cylinder and generating a signal representative of this quantity, the above-indicated determining means including third determining means for determining whether the boosting of the above-indicated vacuum booster has been reached, on the basis of the above-indicated output signals of the above-indicated negative-pressure-chamber-pressure-related quantity detecting means and the above-indicated master-cylinder-pressure-related quantity detecting means.

Therefore, the present braking system need not be based on an assumption that the pressure of the negative pressure changer is held substantially constant during each operation of the brake operating member, and makes it possible to determine the moment at which the boosting limit has been reached, while taking into account a variation in the pressure of the negative pressure changer during each operation of the brake operating member.

(29) A braking system according to the above mode (28), wherein the above-indicated third determining means includes means for determining that the boosting limit of the above-indicated vacuum booster has been reached, when the actual fluid pressure of the above-indicated master cylinder has increased to a value which is expected to be established when the pressure of the above-indicated pressure changing chamber has increased to an atmospheric pressure under the actual pressure of the above-indicated negative pressure chamber.

According to one form of the "means" in this braking system, a boosting-limit-master-cylinder-pressure-related quantity corresponding to the actual pressure of the negative pressure chamber is determined (by a boosting-limit-master-cylinder-pressure-related quantity determining portion) on the basis of the actual pressure of the negative pressure chamber and according to a predetermined relationship between the pressure of the negative pressure chamber and the master-cylinder-pressure-related quantity when the boosting limit of the vacuum booster has been reached, and the determination that the boosting limit of the vacuum booster has been reached is made (by a determining portion) when the actual master-cylinder-pressure-related quantity has increased to the boosting-limit-master-cylinder-pressure-related quantity.

(30) A braking system according to any one of the above modes (23)–(29), wherein the above-indicated booster-pressure-related quantity detecting means includes a pressure switch which is subjected to the pressure of at least one of the above-indicated negative pressure chamber and the above-indicated pressure changing chamber and which generates respective two different signals when the pressure is higher and not higher than a predetermined value.

For detecting the boosting limit of the vacuum booster, in some case, the continuously changing pressure to be detected is not required to be continuously detected, as described above, but it is suffice to detect that the pressure has reached a predetermined value. In this case, the "booster-pressure-related quantity detecting means" may be a pressure switch which generates respective two different signals depending upon whether the pressure is higher than the predetermined value or not. Such a pressure switch can be manufactured at a lower cost than a pressure sensor whose output signal continuously changes with a continuous change in the pressure to be detected. Further, the pressure switch makes it possible to simplify the construction of the above-indicted determining device which serves as a signal processing device for processing the output signal of the pressure detecting means.

Based on this finding, the braking system according to this mode of the invention is adapted such that the above-indicated booster-pressure-related quantity detecting means includes a pressure switch which is subjected to the pressure of at least one of the above-indicated negative pressure chamber and the above-indicated pressure changing chamber and which generates respective two different signals when the pressure is higher and not higher than a predetermined value.

The present braking system is advantageous in that the booster-pressure-related quantity can be easily and economically detected.

(31) A braking system according to any one of the above modes (23)–(30), wherein the above-indicated determining device generates an output signal indicative of a result of its determination, and the above-indicated pressure increasing device is activated on the basis of the output signal of the determining device, to increase the fluid pressure in said brake cylinder only after the boosting limit of the above-indicated vacuum booster has been reached.

In this braking system, the brake cylinder pressure is increased by the pressure increasing device to increase the braking force of the vehicle wheel after the boosting limit of the vacuum booster has been reached, whereby the braking capability of the motor vehicle is effectively improved.

In this braking system, the pressure increasing device need not be disposed between the master cylinder and the brake cylinder, as described with respect to the above mode (1) of the invention, but may be disposed at any position in a force transfer path from the brake operating member to the brake for restraining the rotation of the vehicle wheel. For instance, the pressure increasing device may be provided in the operating mechanism of the brake operating member, between the brake operating member and the master cylinder, in the master cylinder or brake cylinder, or between the brake cylinder and a braking friction member which is forced onto a rotor rotating with the vehicle wheel, to restrain the rotation of the rotor. Described in detail, the pressure increasing device may be provided between the brake operating member and the master cylinder, for example, as an electrically operated hydraulic booster (second boosting device).

(32) A braking system according to the above mode (31), wherein the above-indicated pressure increasing device includes (a) a hydraulic pressure source connected through an auxiliary passage to a primary passage which connects the above-indicated master cylinder and brake cylinder, (b) a hydraulic pressure source control device for commanding the above-indicated hydraulic pressure source to deliver the pressurized working fluid when the fluid pressure in the above-indicated brake cylinder is required to be higher than the fluid pressure in the above-indicated master cylinder during operation of the above-indicated brake operating member by the vehicle operator, and (c) a pressure control device disposed in a portion of the above-indicated primary passage between the above-indicated master cylinder and a point of connection thereof to the above-indicated auxiliary passage, for controlling a second fluid pressure in a portion of the primary passage on the brake cylinder side, relative to a first fluid pressure in a portion of the primary passage on the master cylinder side, the pressure control device inhibiting a flow of the working fluid from the above-indicated hydraulic pressure source toward the above-indicated master cylinder when the working fluid is delivered from the above-indicated hydraulic pressure source and when the second fluid pressure is higher than the first fluid pressure with a difference therebetween being smaller than a desired value, and permitting the flow of the working fluid from the hydraulic pressure source toward the master cylinder when the difference between the higher second fluid pressure and the lower first fluid pressure is going to exceed the above-indicated desired value, whereby the second fluid pressure is controlled to be higher than the first fluid pressure such that the difference coincides with the desired value.

The "hydraulic pressure source" in this braking system may be, for example, a hydraulic pressure source for the brake, or a hydraulic pressure source for a device other than the brake, such as a hydraulic pressure source for a power steering device.

The "hydraulic pressure source" may be, for example, a hydraulic pressure source of a type to store the working fluid under a high pressure, such as an accumulator, or alternatively a hydraulic pressure source of a type to pressurize the working fluid as needed, for example, a pump.

The "pump" may be adapted to suck the working fluid on its suction side, and deliver the pressurized working fluid from its delivery side, which is connected to the above-indicated primary passage through the above-indicated auxiliary passage. Where the pump is used as the hydraulic pressure source and the pressurized fluid is delivered from the pump directly to the pressure control device, the delivery pressure of the pump can more easily follow a change in the master cylinder pressure, than the pressure of the fluid supplied from the accumulator, since the delivery pressure of the pump has a property that the delivery pressure depends upon the fluid pressure in the device to which the pressurized fluid is delivered, and changes following a change in the fluid pressure in that device.

For example, the "desired value" may be a constant value, or a variable which increases with an increase of the actual value of the master cylinder pressure from a boosting limit value thereof (master cylinder pressure when the boosting limit of the booster has been reached).

(33) A braking system according to the above mode (24), (25), (26), (28) or (29), wherein the above-indicated master-cylinder-pressure-related quantity detecting means includes vehicle deceleration detecting means for detecting a deceleration value of the motor vehicle as the quantity relating to the fluid pressure of the above-indicated master cylinder and generating an output signal representative of this quantity.

The "master-cylinder-pressure-related quantity detecting means" in the braking system according to the above mode (24), (25), (26), (28) or (29) may be, for example, master-cylinder-pressure-directly-related quantity detecting means for detecting the master cylinder pressure per se or a quantity directly relating to the master cylinder pressure (hereinafter referred to as "master-cylinder-pressure-directly-related quantity"), such as a master cylinder pressure sensor, a brake operating force sensor or a brake operating stroke sensor. Where the master-cylinder-pressure-directly-related quantity detecting means is used, the boosting limit cannot be determined in the event of a defect of this detecting means.

In a motor vehicle equipped with a braking system, the brake operating force is generally reflected on the master cylinder pressure, which in turn is reflected on the brake cylinder pressure, which in turn is reflected on the braking force of the motor vehicle, which in turn is reflected on the deceleration value of the vehicle body. That is, the deceleration value of the vehicle body is a quantity which indirectly relates to the master cylinder pressure. Accordingly, the braking system according to the mode (24), (25), (26), (28) or (29) is capable of determining the boosting limit if the deceleration value of the vehicle body can be obtained, even where the quantity directly relating to the master cylinder pressure cannot be detected.

Based on this finding, the braking system according to the present mode of the invention is adapted such that the above-indicated master-cylinder-pressure-related quantity detecting means includes vehicle deceleration detecting means for detecting a deceleration value of the motor vehicle as the quantity relating to the fluid pressure of the above-indicated master cylinder and generating an output signal representative of this quantity.

This braking system is advantageous in that the boosting limit can be determined even where the quantity directly relating to the master cylinder pressure cannot be detected.

The "vehicle deceleration detecting means" in this braking system may be adapted to directly detect the deceleration value of the vehicle body. However, the motor vehicle is generally provided with a vehicle speed sensor, and the deceleration value of the vehicle body can be obtained by differentiating the vehicle speed with respect to the time. Based on this fact, the vehicle deceleration detecting means may be adapted to indirectly detect the deceleration value of the vehicle body, by differentiating the vehicle speed with respect to the time.

The vehicle speed sensor may be a Doppler-effect sensor or other sensor adapted to directly detect the vehicle speed. However, the vehicle speed sensor may be adapted to indirectly detect the vehicle speed on the basis of the wheel speeds, namely, the rotating speeds of the vehicle wheels. An example of the vehicle speed sensor of the latter type is employed in an anti-lock brake pressure control device, which includes, as well known, (a) a plurality of wheel speed sensors for detecting the rotating speeds of a plurality of vehicle wheels, respectively, (b) an electromagnetic pressure control valve for controlling the brake cylinder pressure for each vehicle wheel, and (c) a controller for controlling the above-indicated electromagnetic pressure control valve, on the basis of the wheel speeds detected by the plurality of wheel speed sensors, so as to prevent an excessive locking tendency of each wheel during brake application to the motor vehicle. The controller is generally adapted to estimate the vehicle speed on the basis of the plurality of wheel speeds detected by the plurality of wheel speed sensors, and control the electromagnetic pressure control valve according to a relationship between the estimated vehicle speed and the speed of each vehicle wheel.

Where the "vehicle deceleration detecting means" in the braking system according to the present mode of the invention is adapted to indirectly detect the deceleration value of the vehicle body by obtaining a time derivative of the vehicle speed detected by the vehicle speed sensor, this vehicle deceleration detecting means may be obtained by adding only a software without adding a hardware. In this case, therefore, the vehicle deceleration detecting means advantageously has simplified construction and reduced weight and cost of manufacture.

The present braking system may include the feature of any one of the above modes (30)–(32) of the invention.

(34) A braking system according to the above mode (24), (25), (26), (28) or (29), wherein the above-indicated master-cylinder-pressure-related quantity detecting means includes (a) vehicle deceleration detecting means for detecting a deceleration value of the motor vehicle as the quantity relating to the fluid pressure of the above-indicated master cylinder and generating a signal representative of this quantity, and (b) master-cylinder-pressure-directly-related quantity detecting means for detecting a quantity which more directly relates to the fluid pressure of the above-indicated master cylinder than the above-indicated deceleration value of the motor vehicle, and wherein the above-indicated determining device determines whether the above-indicated boosting limit has been reached, on the basis of the output signals of the above-indicated master-cylinder-pressure-directly-related quantity detecting means and the above-indicated booster-pressure-related quantity detecting means, when the above-indicated master-cylinder-pressure-directly-related quantity detecting means is normal, and determines whether the above-indicated boosting limit has been reached, on the basis of the output signals of the above-indicated vehicle deceleration detecting means and the above-indicated booster-pressure-related quantity detecting means, when the above-indicated master-cylinder-pressure-directly-related quantity detecting means is defective.

Thus, the present braking system is advantageous in that the determination as to whether the boosting limit has been reached can be made even where the master-cylinder-pressure-directly-related quantity detecting means is defective.

Where this braking system includes the feature of the above-indicated mode (31) or (32), the brake cylinder pressure can be effectively increased after the boosting limit of the vacuum booster has been reached, even where the master-cylinder-pressure-directly-related quantity detecting means is defective.

The "master-cylinder-pressure-directly-related quantity detecting means" in this braking system may include at least one of a master cylinder pressure sensor, a brake operating force sensor and a brake operating stroke sensor, for example.

(35) A braking system according to the above mode (33) or (34), wherein the above-indicated master cylinder-pressure-related quantity detecting means includes (a) vehicle deceleration detecting means for detecting a deceleration value of the motor vehicle as the quantity relating to the fluid pressure of the above-indicated master cylinder and generating a signal representative of this quantity, and (b) master-cylinder-pressure-directly-related quantity detecting means for detecting a quantity which more directly relates to the fluid pressure of the above-indicated master cylinder than the above-indicated deceleration value of the motor vehicle, and wherein the above-indicated first determining means is operated on the basis of the output signals of the above-indicated master-cylinder-pressure-directly-related quantity detecting means and the above-indicated pressure-changing-chamber-pressure-related quantity detecting means, where the above-indicated master cylinder-pressure-directly-related quantity detecting means is normal, to determine that the boosting limit of the above-indicated vacuum booster has been reached, when an actual amount of increase of the fluid pressure of the above-indicated master cylinder after the pressure of the above-indicated pressure changing chamber has reached a reference value has become equal to an expected amount of increase thereof during a period of increase of the pressure of the pressure changing chamber from the above-indicated reference value to an atmospheric pressure, and operated on the basis of the above-indicated vehicle deceleration detecting means and the above-indicated pressure-changing-chamber-pressure-related quantity detecting means, where the above-indicated master-cylinder-pressure-directly-related quantity detecting means is defective, to determine that the boosting limit of the above-indicated vacuum booster has been reached, when an actual amount of increase of the deceleration value of the motor vehicle after the pressure of the pressure changing chamber has reached the reference value has become equal to an expected amount of increase thereof during a period of increase of the pressure of the pressure changing chamber from the above-indicated reference value to the atmospheric pressure.

(36) A braking system according to any one of the above modes (23)–(35), further comprising vehicle deceleration detecting means for detecting a deceleration value of the motor vehicle as the quantity relating to the fluid pressure of said master cylinder and generating a signal representative of this quantity, and wherein said determining device determines whether said boosting limit has been reached, on the basis of at least the output signal of said vehicle deceleration detecting means, where said booster-pressure-related quantity detecting means is defective.

Thus, this braking system is advantageous in that the boosting limit can be determined even where the booster-pressure-related quantity detecting means is defective.

Where this braking system includes the feature of the above-indicated mode (31) or (32) of the invention, the brake cylinder pressure can be effectively increased after the boosting limit of the vacuum booster has been reached, even where the booster-pressure-related quantity detecting means is defective.

(37) A braking system comprising:
  a brake operating member operated by an operator of a motor vehicle;
  a master cylinder for generating a fluid pressure based on an operation of the above-indicated brake operating member;
  a vacuum booster for boosting the operating force of the above-indicated brake operating member by a pressure difference between a negative pressure changer connected to a negative pressure source and a pressure changing chamber which is selectively communicated with the negative pressure chamber and an atmosphere, and transferring the boosted operating force to the above-indicated master cylinder; and
  a brake including a brake cylinder which is connected through a fluid passage to the above-indicated master cylinder and which is activated by the fluid pressure supplied through the fluid passage, to restrain rotation of a wheel of the motor vehicle, the above-indicated braking system being characterized by comprising:
  booster-pressure-related quantity detecting means for detecting a quantity relating to at least one of pressures of the above-indicated negative pressure chamber and the above-indicated pressure changing chamber, and generating a signal representative of this quantity; and
  a pressure increasing device operated on the basis of at least the output signal of the above-indicated booster-pressure-related quantity detecting means, to increase the fluid pressure of the above-indicated brake cylinder, after the boosting limit of the above-indicated vacuum booster has been reached as a result of an increase of the pressure of the above-indicated pressure changing chamber to an atmospheric pressure.

This braking system is adapted such that the brake cylinder pressure is increased by the pressure increasing device after the moment when the boosting limit of the vacuum booster has been reached is detected with a variation in the pressure of the negative pressure chamber being taken into account. Accordingly, the moment at which the pressure increase by the pressure increasing device is initiated is optimized in relation to the pressure of the negative pressure chamber, so that the relationship between the brake operating force and the brake cylinder pressure is advantageously held optimum, irrespective of the pressure variation of the negative pressure chamber.

(38) A braking system according to any one of the above modes (23)–(37), further comprising (a) master-cylinder-pressure-related quantity detecting means for detecting a quantity relating to the fluid pressure of the above-indicated master cylinder and generating a signal representative of this quantity, and (b) a normal/defective determining device operated on the basis of the output signals of the master-cylinder-pressure-related quantity detecting means and the above-indicated booster-pressure-related quantity detecting means, to determine whether the present braking system is normal or defective.

The relationship between the value detected by the master-cylinder-pressure-related quantity detecting means and the value detected by the booster-pressure-related quantity detecting means changes depending upon whether the braking system is normal, or whether any one of the master cylinder, the master-cylinder-pressure-related quantity detecting means, the vacuum booster and the booster-pressure-related quantity detecting means is defective. Further, there is a given relationship between the relation between those two detected values and the condition of the braking system as to whether it is normal or defective.

Based on this finding, the braking system according to the present mode of the invention is adapted to comprise a normal/defective determining device operated on the basis of the output signals of the master-cylinder-pressure-related quantity detecting means and the above-indicated booster-pressure-related quantity detecting means, to determine whether the present braking system is normal or defective. Thus, this braking system is advantageous in that the determination as to whether the braking system is normal or defective can be effected by utilizing at least the booster-pressure-related quantity detecting means which is provided for determining the boosting limit.

(39) A braking system comprising:
  a brake operating member operated by an operator of a motor vehicle;
  a master cylinder for generating a fluid pressure based on an operation of the above-indicated brake operating member;
  a vacuum booster for boosting the operating force of the above-indicated brake operating member by a pressure difference between a negative pressure changer connected to a negative pressure source and a pressure changing chamber which is selectively communicated with the negative pressure chamber and an atmosphere, and transferring the boosted operating force to the above-indicated master cylinder; and
  a brake including a brake cylinder which is connected through a fluid passage to the above-indicated master cylinder and which is activated by the fluid pressure supplied through the fluid passage, to restrain rotation of a wheel of the motor vehicle,
  the above-indicated braking system being characterized by comprising:
    master-cylinder-pressure-related quantity detecting means for detecting a quantity relating to the fluid pressure of the above-indicated master cylinder, and generating a signal representative of this quantity;
    booster-pressure-related quantity detecting means for detecting a quantity relating to at least one of pressures of the above-indicated negative pressure chamber and pressure changing chamber, and generating a signal representative of this quantity; and
    a normal/defective determining device operated on the basis of the output signals of the above-indicated master-cylinder-pressure-related quantity detecting means and booster-pressure-related quantity detecting means, to determine whether the present braking system is normal or defective.

In this braking system, the determination as to whether the present braking system is normal or defective can be effected by utilizing a given relationship between a relationship between the value detected by the master-cylinder-related quantity detecting means and a value detected by the booster-pressure-related quantity detecting means, and the condition of the braking system as to whether the braking system is normal or defective.

(40) A braking system according to any one of the above forms (1)–(22), further comprising:
  a booster for boosting the operating force of the above-indicated brake operating member and transferring the boosted operating force to the above-indicated master cylinder;
  an operating-stroke-related quantity sensor for detecting a quantity relating to an operating stroke of the above-indicated brake operating member;
  a master-cylinder-pressure-related quantity sensor for detecting a quantity relating to the fluid pressure of the above-indicated master cylinder; and
  boosting ratio reduction determining means for determining, on the basis of signals of the above-indicated operating-stroke-related sensor and said master-cylinder-pressure-related quantity sensor, that a boosting ratio of said booster has been reduced below a normal value, when a rate of increase of the above-indicated operating stroke with an increase in the above-indicated master cylinder pressure has increased.

A braking system for a motor vehicle generally includes (a) a brake operating member such as a brake pedal, which is operated by an operator of the motor vehicle, (b) a master cylinder for generating a fluid pressure based on an operation of the brake operating member, (c) a booster for boosting the operating force of the brake operating member and transferring the boosted operating force to the master cylinder, and (d) a brake having a brake cylinder which is connected through a fluid passage to the master cylinder and which is activated by the fluid pressure applied through the fluid passage, to restrain rotation of a wheel of the motor vehicle. Generally, the booster includes (a) an input member displaced based on an operation of the brake operating member, (b) a power piston disposed displaceably relative to the input member, (c) a stopper for determining a minimum distance between the input member and the power piston, (d) a power piston drive device for operating the power piston with a power from a drive power source, on the basis of a relative displacement between the input member and the power piston, and (e) an output member for transferring an operating force of the power piston to the master cylinder.

The present inventors previously proposed to provide the above-indicated braking system with a boosting ratio reduction determining device for detecting that the boosting ratio of the booster has been reduced during a braking operation. The inventors further proposed to embody the boosting ration reduction determining device as a post-boosting-limit state determining device for determining that the boosting ratio has been reduced, if the boosting limit of the booster has been reached. This determination is based on a fact that the boosting ratio of the booster has been reduced when the boosting limit of the booster has been reached. The proposed post-boosting-limit state determining means includes (a) a master cylinder pressure sensor for detecting the fluid pressure of the master cylinder, and (b) post-boosting-limit state determining means for determining, on the basis of a signal of the master cylinder pressure sensor, that the boosting limit of the booster has been reached, when the master cylinder pressure has reached a value which is expected to be established when the boosting limit of the booster has been reached while the booster is placed in a standard operating condition. Where the booster is a vacuum booster, the operating condition of the booster is the pressure in the negative pressure chamber of the vacuum booster, for example. The boosting ability of the booster when the boosting limit has been reached depends upon the pressure in the negative pressure chamber.

However, the inventors recognized that this embodiment of the boosting ratio reduction determining device had a room for improvement. That is, the booster is not always placed in the standard operating condition. When the operating condition of the booster is not standard, the master cylinder pressure when the boosting limit of the booster has been actually reached is not standard. However, since the above arrangement is based on an assumption that the booster is always placed in the standard operating condition, the accuracy of determination of the boosting ratio reduction determining device may be deteriorated. Therefore, the arrangement in question is required to be improved for increasing the accuracy of determination.

The braking system according to the present mode of the invention was developed in the light of the above background situation. The object of this mode of the invention is to provide a braking system capable of accurately detecting reduction in the boosting ratio of the booster.

The above object may be achieved by providing the braking system according to any one of the above modes (1)–(22) with (a) a booster for boosting the operating force of the above-indicated brake operating member and transferring the boosted operating force to the above-indicated master cylinder, (b) an operating-stroke-related quantity sensor for detecting a quantity relating to an operating stroke of the above-indicated brake operating member, (c) a master-cylinder-pressure-related quantity sensor for detecting a quantity relating to the fluid pressure of the above-indicated master cylinder, and (d) boosting ratio reduction determining means for determining, on the basis of signals of the above-indicated operating-stroke-related sensor and said master-cylinder-pressure-related quantity sensor, that a boosting ratio of said booster has been reduced below a normal value, when a rate of increase of the above-indicated operating stroke with an increase in the above-indicated master cylinder pressure has increased.

The present inventors recognized that the booster generally has the following characteristics. That is, the rate of increase of the operating stroke with an increase in the master cylinder pressure after the boosting limit of the booster has been reached and before the above-indicated input member comes into abutting contact with the stopper is higher than that before the boosting limit has been reached, and that the rate of increase of the operating stroke before the boosting limit of the booster has been reached is higher when the brake operating member is operated relatively rapidly than when it is operated at a normal velocity.

Based on these general characteristics of the booster, the above-indicated braking system is adapted to determine that the boosting ratio of the booster has been reduced, if the rate of increase of the operating stroke has increased.

Accordingly, where this braking system is adapted to determine that the boosting ratio of the booster has been reduced when the boosting limit has been reached, the determination that the boosting limit of the booster has been reached is made when the boosting limit has been actually reached, irrespective of whether the booster is placed in the standard operating condition or not. Thus, the accuracy of determination can be improved.

This braking system may be adapted to determine that the boosting ratio has been reduced, if the power piston has a delayed response to the operating stroke of the input member, that is, if the operating force of the power piston is not able to increase following an increase in the operating stroke of the input member, due to rapid operation of the brake operating member. In this case, the delayed response of the booster can be correctly detected.

In the present braking system, the "operating-stroke-related quantity sensor" may be an operating-stroke sensor for detecting the operating stroke of the brake operating member, or a sensor for detecting the operating stroke of a linkage member which is linked with the input member and which is other than the brake operating member. The "master-cylinder-pressure-related quantity sensor" may be a master cylinder pressure sensor for detecting the master cylinder pressure, an output member operating force sensor for detecting the operating force of the output member, a vehicle deceleration sensor for detecting the deceleration value of the motor vehicle, or a sensor for detecting a physical quantity which varies with the operating force of the output member and which is other than the master cylinder pressure and the vehicle deceleration value.

The "booster" in this braking system may be a vacuum booster operated by a negative pressure source as a drive power source, or a hydraulic booster operated by a high-pressure source as the drive power source.

The "normal value of the boosting ratio" in this braking system may be defined as a value which is expected to be established when the operating condition of the booster is normal, that is, before the boosting limit of the booster has been reached and when the booster is free from a delayed response.

It is noted that the braking system according to the present mode of the invention may be constructed without the pressure increasing device described with respect to the mode (1).

(41) A braking system according to the above mode (40), wherein the above-indicated booster includes (a) an input member displaced based on the operation of the above-indicated brake operating member, (b) a power piston disposed displaceably relative to the input member, (c) a stopper for determining a minimum distance between the input member and the power piston, (d) a power piston driving device for operating the power piston with a power from a drive power source, on the basis of a relative displacement between the input member and the power piston, and (e) an output member for transferring the operating force of the power piston to the master cylinder.

(42) A braking system according to the above mode (40), wherein the above-indicated booster is a vacuum booster in which the above-indicated drive power source is a negative pressure source, and the above-indicated power piston is provided movably within a booster housing, so as to divide the interior space of the booster housing into a negative pressure chamber communicating with the negative pressure source, and a pressure changing chamber, the above-indicated power piston driving device being operated on the basis of the relative displacement between the above-indicated input member and the power piston, for selective communication of the above-indicated pressure changing chamber with the negative pressure chamber and an atmosphere, so as to operate the power piston by a pressure difference of those negative pressure and pressure changing chambers.

(43) A braking system according to any one of the above modes (40)–(42), wherein the above-indicated increase of the above-indicated rate of increase of the operating stroke includes an absolute increase exceeding a predetermined value.

(44) A braking system according to the above mode (43), wherein the above-indicated boosting ration reduction determining means includes boosting limit reaching determining means for determining that a boosting limit of the above-indicated booster has been reached, when the above-indicated rate of increase of the operating stroke has exceeded the above-indicated value after the above-indicated operating stroke or the above-indicated master cylinder pressure has exceeded a reference value.

The rate of increase of the operating stroke exceeds the predetermined value, not only when the boosting limit of the booster has been reached, but also when the booster has a delayed response. Therefore, the mere determination as to whether the rate of increase of the operating has exceeded the predetermined value does not permit a distinction between the reaching of the boosting limit of the booster and the delayed response of the booster. On the other hand, it is noted that the operating stroke or master cylinder pressure is usually increased to a certain extent when the boosting limit of the booster has been reached.

In view of this, the present braking system is adapted to determine that the boosting limit of the booster has been reached, when the rate of increase of the operating stroke has exceeded the predetermined value after the operating stroke or master cylinder pressure has exceeded the reference value.

This braking system is therefore capable of accurately determining whether the boosting limit of the booster has been reached.

(45) A braking system according to any one of the above modes (40)–(42), wherein the above-indicated boosting ratio reduction determining means repeatedly obtains the above-indicated rate of increase of the operating stroke, and the above-indicated increase of the rate of increase of the operating stroke includes an absolute increase in which a value of the rate of increase of the operating stroke obtained in a present cycle is higher than that obtained in a last cycle.

(46) A braking system according to any one of the above modes (40)–(45), wherein the above-indicated boosting ratio reduction determining means includes post-boosting-limit state determining means for determining, on the basis of the above-indicated rate of increase of the operating stroke, whether the boosting limit of the booster has been reached, and determining, after the determination that the boosting limit has been reached, that the boosting limit of the booster has been reached, as long as the above-indicated operating stroke or the above-indicated master cylinder pressure is equal to or more than a value at which the determination that the boosting limit has been reached is made.

The rate of increase of the operating stroke is increased only at a point of time immediately after the boosting limit of the booster has been reached, and will not be increased thereafter. On the other hand, after the determination that he boosting limit of the booster has been reached is made during a given braking operation, the operating condition of the booster is not considered to vary in a significant degree. Accordingly, after the determination on the rate of increase of the operating stroke that the boosting limit of the booster has been reached, another physical quantity which changes before and after the boosting limit of the booster is compared with a reference value, which may be determined to be a value which is expected to be established when the determination that the boosting limit has been reached is made on the basis of the rate of increase of the operating stroke.

Based on the above finding, the above-indicated braking system is adapted to determine, after the determination on the rate of increase of the operating stroke, that the boosting limit of the booster has been reached, as long as the above-indicated operating stroke or the above-indicated master cylinder pressure is equal to or more than a value at which the determination that the boosting limit has been reached is made.

Thus, this braking system is capable of accurately determining whether the boosting limit of the booster has been reached.

(47) A braking system according to any one of the above modes (40)–(46), wherein the above-indicated booster is a vacuum booster for boosting the above-indicated operating force on the basis of a pressure difference between a negative pressure chamber communicating with a negative pressure source and a pressure changing chamber which is selectively communicated with the negative pressure chamber and an atmosphere, the braking system in question further comprising a booster pressure sensor for detecting a pressure in the negative pressure chamber or pressure changing chamber of the above-indicated vacuum booster, and wherein the above-indicated boosting ratio reduction determining means includes post-boosting-limit state determining means for determining whether the boosting limit of the above-indicated vacuum booster has been reached, the post-boosting-limit state determining means having (a) sensor-defect determining means for determining whether the above-indicated booster pressure sensor is defective, and (b) limit determining means for determining whether the boosting limit of the vacuum booster has been reached, on the basis of at least the signal from the booster pressure sensor, where the sensor-defect determining means does not determines that the booster pressure sensor is defective, and determining whether the boosting limit of the vacuum booster has been reached, on the basis of the above-indicated rate of increase of the operating stroke, where the sensor-defect determining means determines that the booster pressure sensor is defective.

(48) A braking system according to any one of the above modes (40)–(47) further comprising a pressure increasing device for increasing the fluid pressure of the above-indicated brake cylinder with respect to the fluid pressure of the above-indicated master cylinder, when the above-indicated boosting ratio reduction determining means determines that the above-indicated boosting ratio has been reduced.

According to this braking system, the operating force is boosted by the pressure increasing device after the boosting ratio has been reduced, so that the braking effect is advantageously increased to improve the braking performance even after the boosting ratio has been reduced.

(49) A braking system according to the above mode (48), wherein the pressure increasing device includes (a) a control valve disposed in the above-indicated fluid passage and having a plurality of selectively established operating states including a state for permitting flows of the working fluid in opposite directions between the above-indicated master cylinder and brake cylinder, and a state for inhibiting at least the flow of the working from from the brake cylinder toward the master cylinder, (b) a pump whose delivery side is connected to a portion of the fluid passage between the control valve and the above-indicated brake cylinder and which sucks the working fluid on its suction side and delivers the working fluid from its delivery side, and (c) a pump operating device for activating the above-indicated pump after the above-indicated boosting ratio reduction determining means has determined that the boosting ratio has been reduced.

(50) A braking system according to the above mode (49), wherein the suction side of the above-indicated pump is connected to a portion of the above-indicated fluid passage between the above-indicated master cylinder and the above-indicated control valve.

According to this braking system, the fluid pressure generated by the master cylinder during a braking operation is effectively utilized to increase the pressure of the brake cylinder.

In this braking system, the "portion of the fluid passage between the master cylinder and the control valve" should not be interpreted to exclude points of connection of the fluid passage to the master cylinder and the control valve, and therefore the "suction side of the pump" may be connected directly to the pressurizing chamber of the master cylinder, or to the fluid passage extending from this pressurizing chamber.

(51) A braking system according to any one of the above modes (10)–(50), wherein the above-indicated master cylinder has a pressurizing chamber formed between a master cylinder housing and a pressurizing piston slidably received in the master cylinder housing, the above-indicated braking system further comprising operation-related quantity detecting means for detecting an operation amount consisting of at least one of an operating force and an operating stroke of the above-indicated brake operating member, and wherein the above-indicated pressure increasing device is adapted such that the above-indicated pump is activated to pump up the working fluid from the pressurizing chamber of the above-indicated master cylinder and deliver the working fluid toward the brake cylinder to thereby increase the fluid pressure of the brake cylinder to be higher than the fluid pressure of the master cylinder, after a pressure increase initiating condition is satisfied during an operation of the brake operating member, while at least a flow of the working fluid from the above-indicated brake cylinder toward the above-indicated master cylinder is inhibited by the above-indicated fluid flow control device, and such that pumping of the working fluid by the above-indicated pump is temporarily stopped at least once after the above-indicated pressure increase initiating condition is satisfied, the above-indicated pressure increasing device controlling the fluid pressure of the above-indicated brake cylinder on the basis of at least one value detected by the above-indicated operation-related quantity detecting means while the pumping is stopped.

A braking system for a motor vehicle generally includes (a) a brake operating member such as a brake pedal, which is operated by an operator of the motor vehicle, (b) a master cylinder having a pressurizing chamber formed between a master cylinder housing and a pressurizing piston slidably received in the master cylinder housing, and (c) a a brake having a brake cylinder which is connected through a fluid passage to the master cylinder and which is activated by the fluid pressure applied through the fluid passage, to restrain rotation of a wheel of the motor vehicle.

The present inventors previously developed a braking system, which includes (a) operation-related quantity detecting means, such as an operating force sensor or an operating stroke sensor, for detecting an operation amount consisting of at least one of an operating force and an operating stroke of a brake operating member, and (b) a pressure increasing device for activating an pump to pump up the working fluid from the master cylinder and deliver the working fluid toward the brake cylinder, to increase the fluid pressure of the brake cylinder to be higher than the fluid pressure of the master cylinder, after a pressure increase initiating condition is satisfied, while at least a flow of the working fluid from the brake cylinder toward the master cylinder is inhibited, the pressure increasing device controlling the pump on the basis of a value detected by the operation-related quantity detecting means after the pressure increase initiating condition is satisfied. The "pressure increase initiating condition" may be satisfied, for example, when the boosting limit of a booster for boosting the operating force of the brake operating member and transferring the boosted operating force to the master cylinder has been reached, when the operating speed of the brake operating member has exceeded a reference value, or when the brake operating member is operated abruptly with the operating speed exceeding a reference value. The booster may be a vacuum booster adapted to boost the operating force with a pressure difference between a negative pressure chamber and a pressure changing chamber which is selectively communicated with the negative pressure chamber and the atmospheric, or a hydraulic booster adapted to boost the operating force with a pressure in a hydraulic power chamber which is selectively communicated with a high-pressure source and a low-pressure source.

However, a study by the present inventors revealed that this braking system developed has a problem that the accuracy of detection of the operator's desire regarding the braking system (vehicle deceleration value or a rate of change thereof) is lowered while the pressure of the brake cylinder is increased by the pump. During the increase of the brake cylinder pressure in which the working fluid is pumped up by the pump from the master cylinder, the pressurizing piston is advanced due to a decrease in the volume of the pressurizing chamber. As a result, the operating stroke of the brake operating member tends to be larger, or the operating force tends to be smaller, than that desired by the operator. That is, the operating stroke or force is influenced by the pump. Thus, the developed braking system has a problem that the operation amount is different from that desired by the operator during an increase of the brake cylinder pressure by the pump, and that the operator's desire cannot be accurately detected.

The braking system according to the present mode of this invention was developed in view of the above background situation. The object of this mode is to provide a braking system capable of correctly detecting the operator's desire while the brake cylinder pressure is increased by the pump.

This object is achieved by the braking system according to any one of the above modes (10)–(40), wherein the above-indicated master cylinder has a pressurizing chamber formed between a master cylinder housing and a pressurizing piston slidably received in the master cylinder housing, the above-indicated braking system further comprising operation-related quantity detecting means for detecting an operation amount consisting of at least one of an operating force and an operating stroke of the above-indicated brake operating member, and wherein the above-indicated pressure increasing device is adapted such that the above-indicated pump is activated to pump up the working fluid from the pressurizing chamber of the above-indicated master cylinder and deliver the working fluid toward the brake cylinder to thereby increase the fluid pressure of the brake cylinder to be higher than the fluid pressure of the master cylinder, after a pressure increase initiating condition is satisfied during an operation of the brake operating member, while at least a flow of the working fluid from the above-indicated brake cylinder toward the above-indicated master cylinder is inhibited by the above-indicated fluid flow control device, and such that pumping of the working fluid by the above-indicated pump is temporarily stopped at least one after the above-indicated pressure increase initiating condition is satisfied, the above-indicated pressure increasing device controlling the fluid pressure of the above-indicated brake cylinder on the basis of at least one value detected by the above-indicated operation-related quantity detecting means while the pumping is stopped.

It is considered that while the pumping of the working fluid by the pump is stopped, the pump does not have influences on the operating force and on the rate of change (changing speed) of the operating force and stroke. In the present braking system, the pumping of the working fluid by the pump is temporarily at least one after the pressure increase initiating condition is satisfied, until the increase of the brake pressure is terminated, and the brake cylinder pressure is controlled on the basis of at least one value detected by the operation-related quantity detecting means while the pumping is stopped. Accordingly, the present braking system is capable of correctly detecting the operator's desire, without an influence by the pump, after the pressure increase initiating condition is satisfied (after the pressure increase control is initiated), so that the operator's desire is correctly reflected on the brake cylinder pressure after the pressure increase initiating condition is satisfied, as well as before the condition is satisfied (before the pressure increase control is initiated). As a result, the braking system can be easily manipulated by the operator.

The "stopping of the pumping" in this braking system may be effected by turning off the pump, or by controlling a control valve provided on the suction or delivery side of the pump while holding the pump in operation.

Further, the "pressure increasing device" in this braking system may be adapted to control the brake cylinder pressure on the basis of the value detected by an operating force sensor as the operation-related quantity detecting means, while the pumping is stopped. In this arrangement, the "pressure increasing device" may include operating force depending type control means for controlling the brake cylinder pressure on the basis of the detected value of the operating force sensor, such that the brake cylinder pressure increases with the detected value.

Further, the "pressure increasing device" in this braking system may be adapted to control the brake cylinder pressure on the basis of one value detected each time the pumping is stopped, as "at least one value detected by the operation-related quantity detecting means", or on the basis of a plurality of values detected each time the pumping is stopped, as "at least one value detected by the operation-related quantity detecting means". In the latter arrangement, the braking cylinder pressure may be controlled on the basis of an average of the plurality of values detected, or on the basis of a rate of change of the plurality of detected values.

The braking system according to this mode of this invention may be constructed without the pressure changing device described with respect to the above mode (1).

(52) A braking system according to the above mode (51), wherein said pressure increasing device includes change rate depending type control means for controlling the above-indicated brake cylinder pressure on the basis of a rate of change of the value detected by the above-indicated operation-related quantity detecting means while the above-indicated pumping is stopped.

In this braking system, the brake cylinder pressure is controlled on the basis of the rate of change of the value detected by the operation-related quantity detecting means during stopping of the pumping. accordingly, this braking system is capable of correctly detecting the rate of change of the operating force or the rate of change of the operating stroke, without an influence of the pump, so that the rate of change of the operating force or the rate of change of the operating stroke after the increase of the brake cylinder pressure is initiated is correctly reflected on the brake cylinder pressure. As a result, the braking system can be easily manipulated by the operator.

The "pressure increasing device" in this braking system may include control means for controlling the above-indicated brake cylinder pressure on the basis of the value detected while the pumping is temporarily stopped at least once for a predetermined time. In this arrangement, the relationship between the predetermined time and the amount of change of the detected value for the predetermined time represents the "rate of change of the value detected". The "predetermined time" in this arrangement may be a constant value or may be changed as needed. Where the "predetermined time" is constant, the above-indicated control means may be adapted to control the brake cylinder pressure on the basis of the amount of change of the value detected during stopping of the pumping, since the "rate of change" and the "amount of change" are directly proportional to each other in this case wherein the "predetermined time"is held unchanged. In this case, the "pressure increasing device" may be adapted to obtain the "amount of change" as a difference between an initial value detected at the beginning of each period of stopping of the pumping and a final value detected at the end of that period.

(53) A braking system according to the above mode (52), wherein the above-indicated change rate depending type control means includes pressure increase rate control means for controlling a rate of increase of the above-indicated brake cylinder pressure such that the rate of increase is higher when the above-indicated rate of change is relatively high than it is relatively low.

IN this braking system, the rate of increase of the brake cylinder pressure is determined such that the rate of increase is higher when the rate of change of the value detected during stopping of the pumping is relatively high than it is relatively low. In this braking system, therefore, the rate of increase of the brake cylinder pressure is higher when the operation amount of the brake operating member by the operator is changed relatively rapidly than when it is not changed relatively rapidly, so that the rate of increase of the brake cylinder pressure is optimized in relation to the operator's desire to change the deceleration value of the motor vehicle.

(54) A braking system according to any one of the above modes (51)–(53), wherein said pressure increasing device includes (a) pumping stop means for temporarily stopping the pumping of the working fluid by the above-indicated pump at least once for a predetermined time after the above-indicated pressure increase initiating condition is satisfied, (b) control state determining means for determining the control state of the above-indicated brake cylinder pressure on the basis of the rate of change of the value detected by the above-indicated operation-related quantity detecting means during stopping of the pumping, and (c) control means for controlling the above-indicated brake cylinder pressure in the determined control state.

As the "control state of the brake cylinder pressure" in this braking system, a rate of increase of the brake cylinder pressure may be selected.

(55) A braking system according to the above mode (54), wherein said pumping stop means includes means for stopping the above-indicated pumping a plurality of times each for the above-indicated predetermined time after the above-indicated pressure increase initiating condition is satisfied, and means for determining the above-indicated control state on the basis of a sum of amounts of change of the values detected by the above-indicated operation-related quantity detecting means during the above-indicated plurality of times of stopping of the pumping.

In this braking system, the pumping is stopped the plurality of times after the pressure increase initiating condition is satisfied, and the brake cylinder pressure is controlled on the basis of the sum of the amounts of change of the values detected during the plurality of times of stopping of the pumping. In this braking system, therefore, the operator's desire can be detected for a longer length of time, than in the braking system according to the preceding mode wherein the pumping is stopped only once after the pressure increase initiating condition is satisfied, and the brake cylinder pressure is controlled on the basis of the amount of change during the single stopping of the pumping. Accordingly, the accuracy of detection of the operator's desire can be easily improved.

The "pressure increasing device" in this braking system may be adapted to determine the present control state of the brake cylinder pressure depending upon the present value of the sum of the amounts of change, and according to a predetermined relationship between the sum of the amounts of change and the control state of the brake cylinder pressure. Alternatively, the "pressure increasing device" may be adapted to determine the present control state of the brake cylinder pressure depending upon an average of the sum of the amounts of change, namely, a value obtained by dividing the sum by the number of times of stopping of the pumping, and according to a predetermined relationship between the amount of change during each stopping of the pumping and the control state of the brake cylinder pressure.

(56) A braking system according to any one of the above mode (51)–(55), wherein the above-indicated pressure increasing device includes (a) an inflow control valve switchable between a first first state for permitting a flow of the working fluid from the above-indicated pressurizing chamber into the above-indicated pump and a second state for inhibiting this flow of the working fluid, and (b) inflow control valve utilizing type pumping stop means for placing the inflow control valve in the second state, for thereby stopping the pumping of the working fluid by the above-indicated pump.

In this braking system, the pumping of the working fluid by the pump is temporarily stopped by the inflow control valve disposed between the suction side of the pump and the pressurizing chamber of the master cylinder. On the other hand, the inflow control valve generally has a higher operating response to an external signal, than the pump. Accordingly, the pumping of the working fluid by the pump can be stopped and resumed with a higher response, where the inflow control valve is used to stop and resume the pumping, than where the pump is turned on and off to stop and resume the pumping. In this braking system, therefore, the period of time during which the pumping of the working fluid is stopped to detect the operator's desire can be shortened, permitting correct detection of the operator's desire without considerably sacrificing the pressure increase by the pump.

(57) A braking system according to any one of the above modes (51)–(56), further comprising a booster for boosting the above-indicated operating force and transferring the boosted operating force to the above-indicated master cylinder, and wherein said pressure increase initiating condition includes a condition that the boosting limit of this booster has been reached.

In this braking system, the fluid pressure of the brake cylinder is increased by the pressure increasing device, to be higher than the fluid pressure of the master cylinder after the boosting limit of the booster has been reached during an operation of the brake operating member. Accordingly, this braking system permits the brake cylinder pressure to be sufficiently high for improving the braking capacity of the motor vehicle, even after the boosting limit has been reached.

(58) A braking system according to any one of the above modes (51)–(57), wherein said pressure increasing device further includes a fluid flow control valve disposed in the above-indicated fluid passage and switchable between a first state for permitting flows of the working fluid in opposite directions between the above-indicated master cylinder and brake cylinder and inhibiting at least the flow of the working fluid from the brake cylinder toward the master cylinder, and the above-indicated pump is connected at its suction side to the above-indicated master cylinder and at its delivery side to a portion of the above-indicated fluid passage between the fluid flow control valve and the brake cylinder, the above-indicated pressure increasing device activating the above-indicated pump with the above-indicated fluid flow control valve placed in the second state, for thereby increasing the fluid pressure of the above-indicated brake cylinder.

The "fluid flow control valve" in this braking system may be an electromagnetic type having a solenoid and a plurality of operating states which are selectively established by a magnetic force, or a mechanical type having a plurality of operating states which are selectively established by a pressure difference between the master cylinder and the brake cylinder. Where the fluid flow control valve is the mechanical type, the pressure difference between the master cylinder and the brake cylinder may be mechanically controlled, or electromagnetically controlled with a magnetic force of the solenoid.

(59) A braking system according to the above mode (58), wherein the above-indicated fluid flow control valve has the above0=-indicated first and second states which are electromagnetically selected, and the above-indicated pressure control valve further includes a pressure control valve disposed between a portion of the above-indicated fluid passage between the above-indicated fluid flow control valve and a point of connection of the fluid passage to the delivery side of the above-indicated pump, the pressure control valve being electromagnetically switchable between a state for communication of the above-indicated brake cylinder with the fluid flow control valve and the pump, and a state for disconnection of the brake cylinder from the fluid flow control valve and the pump, the pressure control valve cooperating with the fluid flow control valve to control the fluid pressure of the brake cylinder.

(60) A braking system according to the above mode (59), wherein the above-indicated pressure increasing valve includes (a) pump control means for activating the above-indicated pump, and (b) control valve control means for electromagnetically controlling the above-indicated fluid flow control valve and pressure control valve while the above-indicated pump is in operation.

(61) A braking system according to the above mode (58) or (59), wherein the above-indicated pressure increasing device includes (a) fluid flow control valve control means for placing the above-indicated fluid flow control valve in the above-indicated second state, and (b) delivery amount control means for controlling a delivery amount of the working fluid from the above-indicated pump when the above-indicated fluid flow control valve is placed in the second state.

(62) A braking system according to the above mode (61), wherein the above-indicated delivery amount control means includes motor duty control means for controlling a duty ratio of a current for energizing a motor for driving the above-indicated pump.

(63) A braking system according to the above mode (61), wherein the above=indicated delivery amount control means includes an inflow control valve duty control means for controlling a duty ratio of a current for energizing a solenoid of the above-indicated inflow control valve.

BRIEF DESCRIPTION OF THE DRAWINGS

FIGS. 3 are cross sectional views for explaining the construction and operation of a pressure control valve in FIG. 2.

FIGS. 14 are cross sectional views for explaining the construction and operation of a pressure control valve in FIG. 13.

FIG. 16 is a block diagram showing an electrical arrangement of the above-indicated third embodiment.

FIG. 17 is a flow chart showing a braking effect characteristic control routine executed by a computer of an ECU in FIG. 16.

FIG. 21 is a flow chart showing a braking effect characteristic control routine executed by a computer of an ECU in FIG. 20.

FIG. 117 is a view showing in a tabular form a relationship among total change amount Σ, pressure control mode, control state of valve device, and duty ratio of pump motor, in the twenty-fifth embodiment.

FIG. 118 is a time chart indicating a definition of the duty ratio of the pump motor in the twenty-fifth embodiment.

FIG. 120 is a block diagram showing an electrical arrangement of the twenty-sixth embodiment.

FIG. 121 is a functional block diagram showing an arrangement of the twenty-sixth embodiment.

FIG. 122 is a flow chart showing a pressure control mode determining routine stored in ROM of a computer of an ECU in FIG. 120.

FIG. 123 is a flow chart showing an operating force change amount detecting routine stored in the ROM of the computer in FIG. 120.

BEST MODES FOR CARRYING OUT THE PRESENT INVENTION

Figure 1:
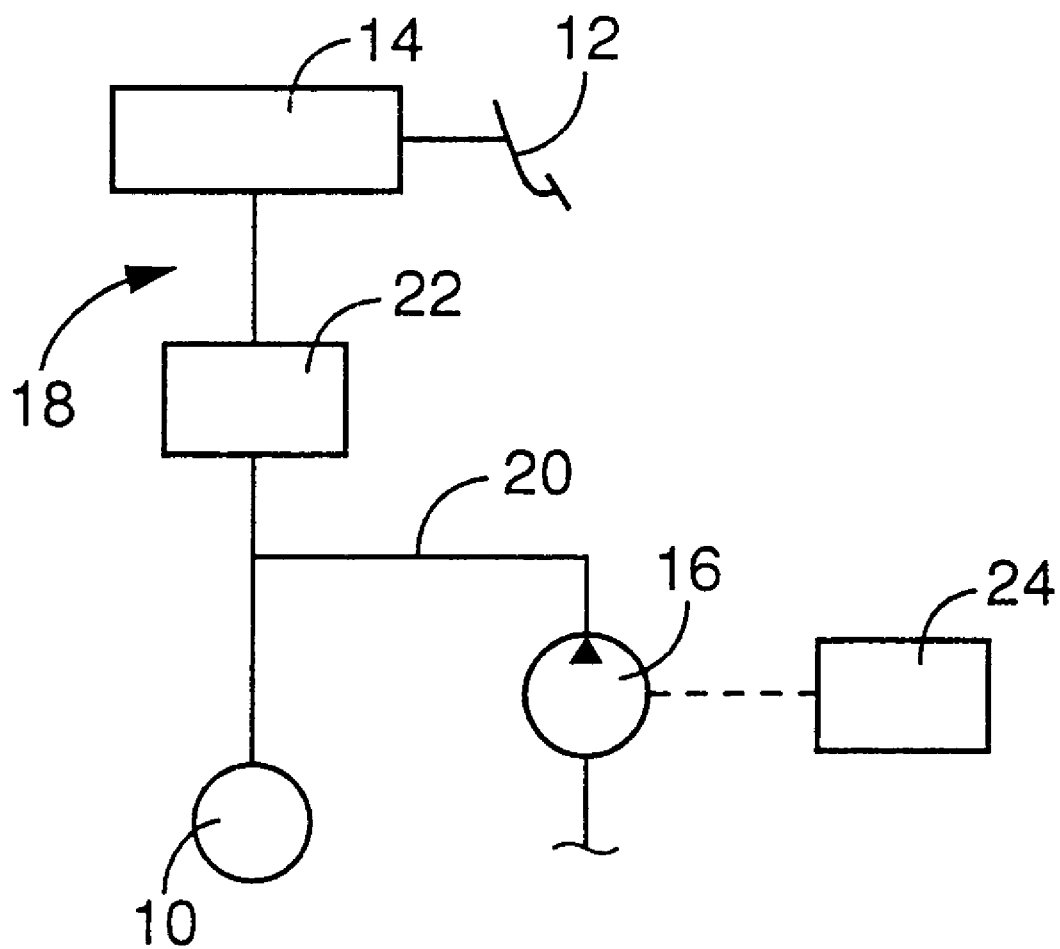
FIG. 1 is a schematic view schematically showing a general arrangement of an anti-lock type braking system of a first embodiment of this invention.

There will be described in detail some best modes for carrying out the present invention, by reference to the drawings. It is noted that elements provided in a plurality of embodiments of the invention will be described in detail only with respect to the embodiment in which the elements in question appear for the first time, and that detailed descriptions of those elements are omitted with respect to the other embodiments, in favor of the use of the same reference characters or reference to the appropriate figures of the drawings.

The first embodiment of the invention will be explained first.

There is schematically shown in FIG. 1 a general arrangement of a braking system of the present embodiment. This braking system has, as a hydraulic pressure source for a brake cylinder 10, a master cylinder 14 for generating a hydraulic pressure whose level corresponds to an operating force of a brake operating member 12, and a pump 16. In this braking system, the delivery side of the pump 16 is connected through an auxiliary passage 20 to a primary passage 18 which connects the master cylinder 14 and the brake cylinder 10. A pressure control valve 22 is connected to a portion of the primary passage 18 between the master cylinder 14 and a point of connection of the auxiliary passage 20 to the primary passage 18. When the pump 16 is not in operation, the pressure control valve 22 permits flows of a working fluid between the master cylinder 14 and the brake cylinder 10 in opposite directions. When the pump 16 is in operation, on the other hand, the pressure control valve 22 permits the fluid received from the pump 16, to be returned to the master cylinder 14, such that the delivery pressure of the pump 16 varies depending upon the hydraulic pressure in the master cylinder 14. A pump operating device 24 is provided for operating the pump 16 when it is necessary to apply to the brake cylinder 10 a hydraulic pressure higher than the hydraulic pressure of the master cylinder 14, during operation of the braking system by the vehicle operator.

Figure 2:
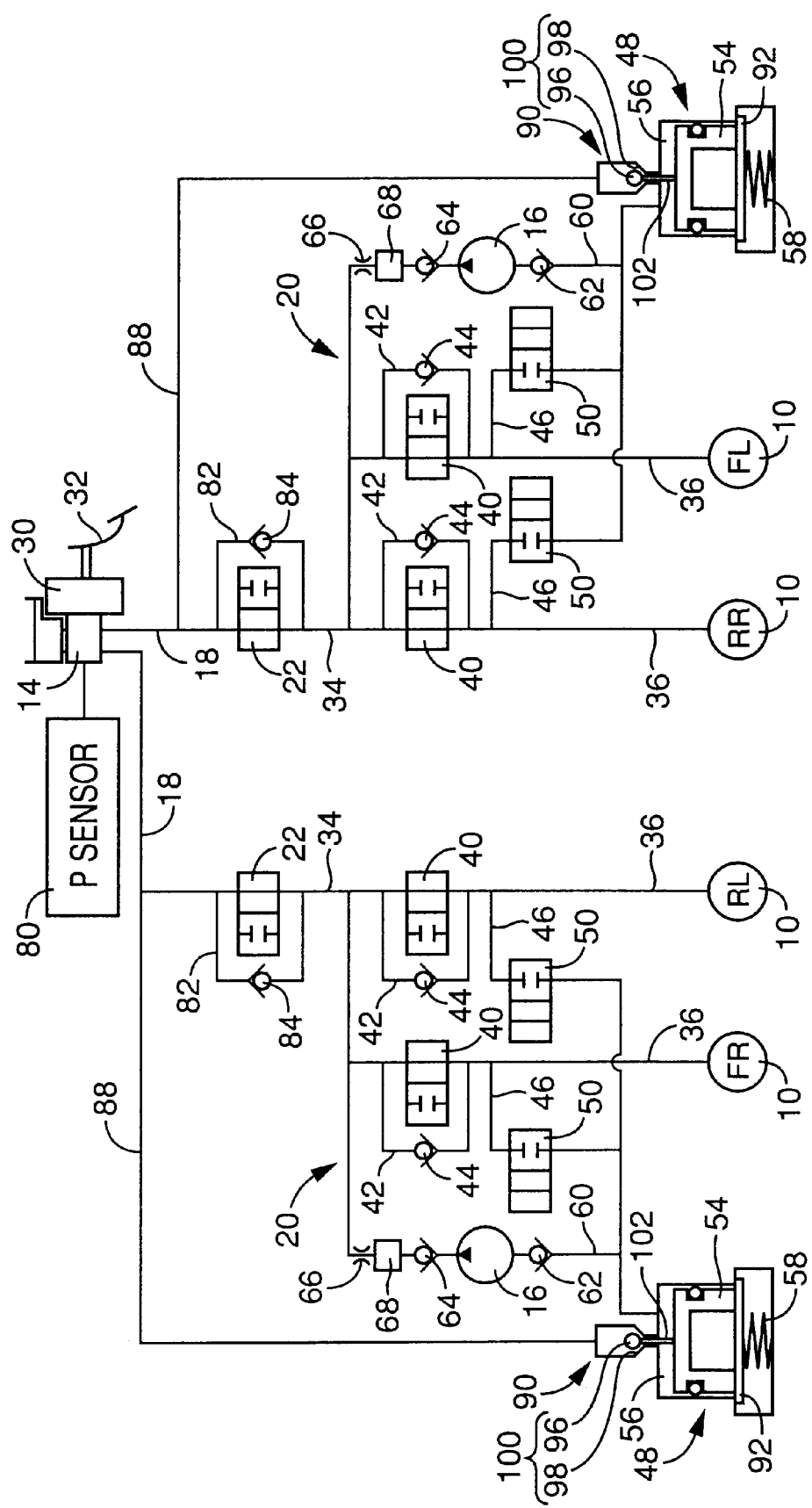
FIG. 2 is a view showing a mechanical arrangement of the first embodiment.
Figure 42:
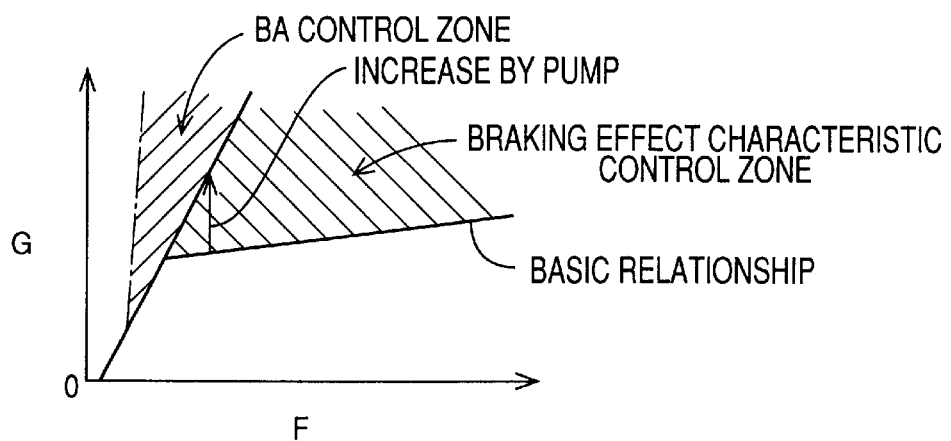
FIG. 42 is a graph for explaining the contents of the braking effect characteristic control routines and BA characteristic control routines executed in the several embodiments, and a relationship among them.
Figure 43:
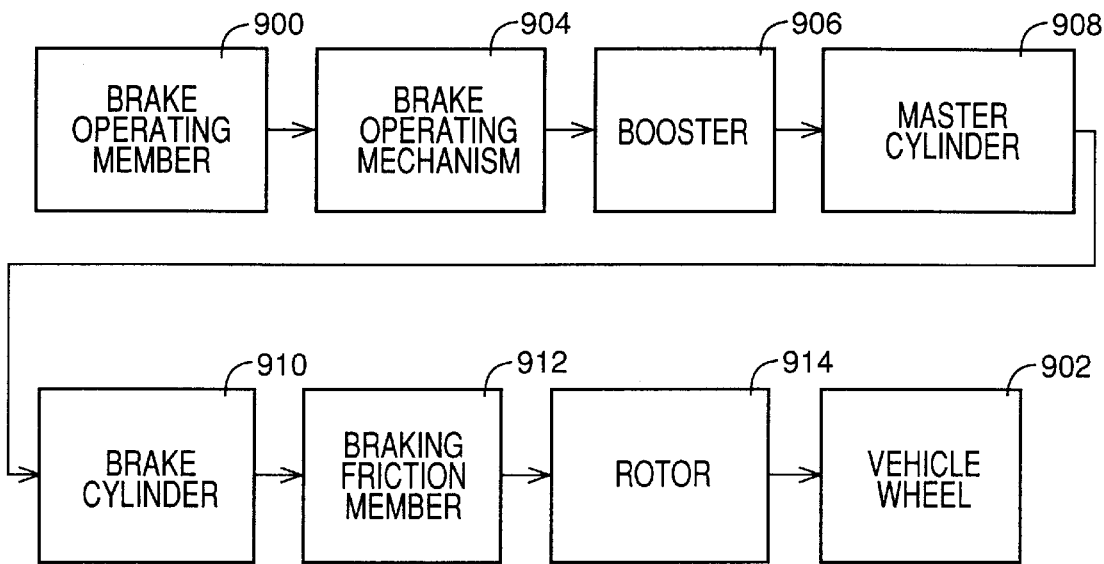
FIG. 43 is a block diagram showing a general arrangement of a braking system.
Figure 44:
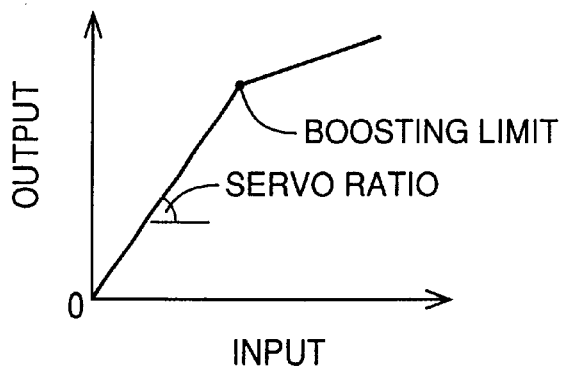
FIG. 44 is a graph for explaining a general characteristic of a booster.
Figure 45:
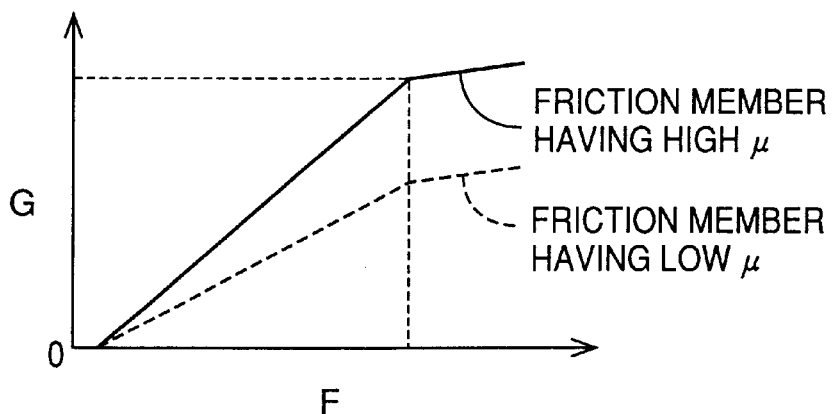
FIG. 45 is a graph for explaining a change in relationship between brake operating force F and vehicle deceleration G, due to a friction coefficient of braking friction member.
Figure 46:
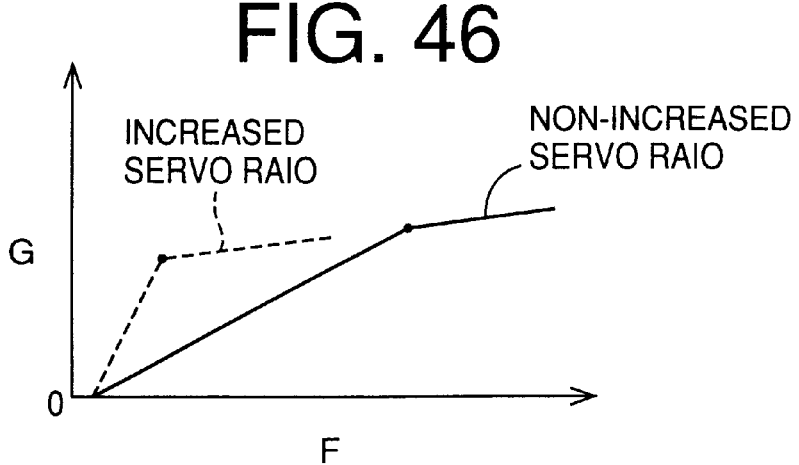
FIG. 46 is a graph for explaining a change in relationship between brake operating force F and vehicle deceleration G, due to a servo ratio of booster.

In FIG. 2, there is shown a mechanical arrangement of the present embodiment. The braking system of the present embodiment is a diagonal type system having two braking sub-systems adapted for use on a four-wheel vehicle. This braking system has an anti-lock control function for performing an anti-lock brake pressure control operation in which the pump 16 is operated to circulate the working fluid in the brake circuit. Further, the present embodiment is arranged to implement a braking effect characteristic control utilizing the pump 16, during operation of the braking system. The braking effect characteristic control is implemented to compensate a basic relationship between a brake operating force F and a deceleration value G of the vehicle body, which relationship is determined by the characteristic of a booster (as shown FIG. 44) provided to boost the brake operating force F and transmit the boosted brake operating force F to the master cylinder 14. This basic relationship is represented by bent lines as indicated in FIG. 42. The the basic relationship is compensated so as to establish an ideal relationship between the brake operating force F and the deceleration value G of the vehicle body, so that the deceleration value G increases with the brake operating force F, at an ideal rate (for example, at a substantially constant rate, both before and after the boosting limit of the booster has been reached).

The master cylinder 14 is a tandem type having two mutually independent pressurizing chambers disposed in series. As shown in FIG. 2, the master cylinder 14 is linked through a vacuum type booster 30 to the brake operating member 12 in the form of a brake pedal 32. The master cylinder 14 is mechanically operated by a force of depression acting on the brake pedal 32, to generate hydraulic pressures of the same level in the two pressurizing chambers.

One of the two pressurizing chambers of the master cylinder 14 is connected to a first braking sub-system for a front left wheel FL and a rear right wheel RR, while the other pressurizing chamber is connected to a second braking sub-system for a front right wheel FR and a rear left wheel RL. Since these braking sub-systems are identical in construction with each other, only the first braking sub-system will be described by way of example, and a description of the second braking sub-system will not be provided.

In the first braking sub-system, the master cylinder 14 is connected through the primary passage 18 to the brake cylinder 10 for the front left wheel FL and the brake cylinder 10 for the rear right wheel RR. The primary passage 18 extending from the master cylinder 14 is branched at the end of a single main passage 34, into two branch passages 36 connected to the main passage 34. Each branch passage 36 is connected at its end to the corresponding brake cylinder 10. A pressure increasing valve 40 in the form of a normally-open solenoid-operated shut-off valve is provided in each of the branch passages 36. When the pressure increasing valve 40 is open or placed in a pressure-increasing state, the pressure increasing valve 40 permits a flow of the working fluid from the master cylinder 14 toward the brake cylinder 10. A by-pass passage 42 is connected to each pressure increasing valve 40, and a check valve 44 is provided in the by-pass passage 42, to permit the fluid to flow from the brake cylinder 10 toward the master cylinder 14. A reservoir passage 46 is connected at one end thereof to a portion of each branch passage 36 between the pressure increasing valve 40 and the brake cylinder 10, and at the other end to a reservoir 48. A pressure reducing valve 50 in the form of a normally-closed solenoid-operated shut-off valve is provided in each reservoir passage 46. When the pressure reducing valve 50 is open or placed in a pressure-reducing state, the pressure reducing valve 50 permits a flow of the fluid from the brake cylinder 10 toward the reservoir 48.

The reservoir 48 is constructed such that a reservoir piston 54 is substantially air-tightly and slidably received in a housing, so as to form a reservoir chamber 56 which accommodates the working fluid under a pressure produced by an elastic member in the form of a spring 58. The reservoir 48 is connected by a pump passage 60 to the suction side of the pump 16. A suction valve 62 which is a check valve is connected to the suction side of the pump 16, while a delivery valve 64 which is a check valve is connected to the delivery side of the pump 16. In the auxiliary passage connecting the delivery side of the pump 16 and the primary passage 18, there are provided a throttle in the form of an orifice 66 and a fixed damper 68, so that pressure pulsations of the pump 16 are reduced by the orifice 66 and fixed damper 68.

The elements which have been described above are provided in a known anti-lock type braking system. There will be described elements of the present braking system, which are not provided in the known anti-lock type braking system.

The pressure control valve 22 is arranged to electromagnetically control the relationship between the master cylinder pressure and the brake cylinder pressure.

Described in detail, the pressure control valve 22 includes a housing not shown, a valve member 70, a valve seat 72, and a solenoid 74 for generating a magnetic force for controlling a relative movement of the valve member 70 and the valve seat 72 so as to control flows of the working fluid between the master cylinder side and the brake cylinder side through the primary passage 18.

In a non-operated state (off state) of the pressure control valve 22 with the solenoid 74 being de-energized, the valve member 70 is held apart from the valve seat 72 under the biasing force of the spring 76 as the elastic member, so that the working fluid is permitted to flow through the primary passage 18 in the opposite directions between the master cylinder side and the brake cylinder side. When the braking system is operated in this state, the brake cylinder pressure changes with the master cylinder pressure such that the brake cylinder pressure is equal to the master cylinder pressure. In this operation of the braking system wherein a force acts on the valve member 70 so as to move the valve member 70 in the direction away from the valve seat 72, an increase in the master cylinder pressure, namely, in the brake cylinder pressure will not cause the valve member 70 to be seated on the valve seat 72, as long as the solenoid 74 is held in the de-energized state. Thus, the pressure control valve 22 is a normally-open valve.

When the pressure control valve 22 is placed in an operated state (on state) with the solenoid 74 being energized, an armature 78 is attracted by the magnetic force of the solenoid 74, so that a movable member in the form of the valve member 70 movable with the armature 78 is seated onto a stationary member in the form of the valve seat 72. At this time, an attracting force $F_1$ based on the magnetic force of the solenoid 74, and a sum of a force $F_2$ and an elastic force $F_3$ of the spring 76 act on the valve member 70 in the opposite directions. The force $F_2$ is generated based on a difference between the brake cylinder pressure and the master cylinder pressure, and is represented by this pressure difference multiplied by an effective pressure-receiving area of the valve member 70 which receives the brake cylinder pressure.

When the solenoid 74 is energized or on and when the delivery pressure of the pump 16, namely, the brake cylinder pressure is not as high as to satisfy a formula $F_2 \leq F_1 - F_3$, the valve member 70 is seated on the valve seat 72, inhibiting the flow of the fluid from the pump 16 to the master cylinder 14, and the delivery pressure of the pump 16 is increased so that the fluid pressure in the brake cylinder 10 is made higher than the master cylinder pressure. After the delivery pressure of the pump 16, that is, the brake cylinder pressure has been further increased so as to satisfy a formula $F_2 < F_1 - F_3$, the valve member 70 is unseated from the valve seat 72, and the fluid is returned from the pump 16 to the master cylinder 14, with a result of inhibiting a further increase in the delivery pressure of the pump 16, namely, in the brake cylinder pressure. Thus, the fluid pressure in the brake cylinder 10 is made higher than the master cylinder pressure by an amount of a pressure difference based on the attracting force $F_1$ of the solenoid, if the biasing force $F_3$ of the spring 76 is ignored.

The magnetic force of the solenoid 74 is controlled on the basis of the brake operating force. To this end, the master cylinder 14 is provided with a master cylinder pressure sensor 80, as shown in FIG. 2 (wherein the sensor 80 is indicated as "P sensor"). The master cylinder pressure sensor 80 is an example of a braking-force-related quantity sensor for detecting the master cylinder pressure as a braking-force-related quantity. Described in more detail, the master cylinder pressure sensor 80, when it receives the fluid pressure in the master cylinder 14, generates a master cylinder pressure signal indicative of the level of the master cylinder pressure $P_M$. The value of the master cylinder pressure signal continuously varies as the master cylinder pressure $P_M$ continuously varies.

The pressure control valve 20 is provided with a by-pass passage 82 in which a check valve 84 is provided. The check valve 84 permits a flow of the fluid from the master cylinder 14 toward the brake cylinder 10, but inhibits a flow of the fluid in the opposite direction. The passage 82 by-passing the pressure control valve 22 and provided with the check valve 84 is provided for the following reason. That is, the valve member 70 as the movable member is moved for seating on the valve seat 72 as the stationary member in the direction in which the movable member is moved by a fluid force produced by a flow of the fluid from the master cylinder 14 toward the brake cylinder 10 upon depression of the brake pedal 32. Therefore, there is a possibility that the pressure control valve 22 is closed upon depression of the brake pedal 32. The passage 82 by-passing the pressure control valve 22 and provided with the check valve 84 is provided to assure a flow of the fluid from the master cylinder 14 toward the brake cylinder 10 even if the pressure control valve 22 is closed, by any chance, due to the fluid force upon depression of the brake pedal 32.

During the braking effect characteristic control, the fluid pumped up by the pump 16 from the reservoir 48 is delivered to each brake cylinder 10, so as to increase the pressure in each brake cylinder 10. However, unless the braking system is operated in the anti-lock control mode, the fluid is not usually present in the reservoir 48. To permit the braking effect characteristic control irrespective of whether the braking system is operated in the anti-lock control mode or not, the fluid must be supplied to the reservoir 48. To this end, the present embodiment is adapted such that the main passage 34 is connected to the reservoir 48 through a fluid supply passage 88, which extends from a portion of the main passage 34 between the master cylinder 14 and the pressure control valve 22.

If the master cylinder 14 and the reservoir 48 were held in communication with each other through the fluid supply passage 88, the hydraulic pressure in the master cylinder 14 would not be raised upon depression of the brake pedal 32, until the reservoir piston 54 of the reservoir 48 has been moved bottomed, so that brake application is delayed. To avoid this, the fluid supply passage 88 is provided with an inflow control valve 90.

The inflow control valve 90 is opened when it is necessary to feed the fluid from the master cylinder 14 to the reservoir 48. The inflow control valve 90 placed in the open state permits a flow of the fluid from the master cylinder 14 to the reservoir 48. When it is not necessary to feed the fluid from the master cylinder 14 to the reservoir 48, the inflow control valve 90 is closed, to inhibit the flow of the fluid from the master cylinder 14 to the reservoir 48, making it possible to raise the hydraulic pressure in the master cylinder 14.

In the present embodiment, the inflow control valve 90 is a pilot-controlled type, which cooperates with the reservoir piston 54 to control the fluid flow into the reservoir 48. To achieve this purpose, the reservoir 48 is constructed as described below. That is, the reservoir piston 54 is moved from a normal position to an increased-volume position when the volume of the reservoir chamber 56 is increased from a normal value, and is moved from the normal position to a reduced-volume position when the volume of the reservoir chamber 56 is reduced from the normal value. The reservoir piston 54 is biased by the spring 58 through a retainer 92 in the direction from the normal position toward the reduced-volume position. The normal position of the reservoir piston 54 is determined by abutting contact of the retainer 92 with a shoulder surface of the housing. As the volume of the reservoir chamber 56 is reduced from the normal value, the reservoir piston 54 alone is advanced from the normal position. As the volume of the reservoir chamber 56 is increased from the normal value, the reservoir piston 54 is retracted from the normal position together with the retainer 92 while compressing the spring 58.

The inflow control valve 90 has a check valve 100 including a valve member 96 and a valve seat 98 for permitting a flow of the fluid from the reservoir 48 toward the master cylinder 14 and inhibiting a flow of the fluid in the opposite direction, and a valve opening member 102 for moving the valve member 96 away from the valve seat 98 to forcibly open the check valve 100. The valve opening member 102 is associated with the reservoir piston 54 so that the valve opening member 102 is not in contact with the valve member 96 when the reservoir piston 54 is placed in its normal position, and is brought into abutting contact with the valve member 96 to forcibly open the check valve 100 when the reservoir piston 54 is advanced from the normal position due to a decrease in the volume of the reservoir chamber 56. With the check valve 100 being thus opened, the flow of the fluid from the master cylinder 14 into the reservoir 48 is permitted, so that the reservoir chamber 56 is supplied with the fluid from the master cylinder 14. While the inflow control valve 90 is slightly open when the reservoir piston 54 is placed in the normal position, as indicated in FIG. 2, the inflow control valve 90 may be designed such that the valve 90 is closed when the reservoir piston 54 is placed in the normal position.

Figure 4:
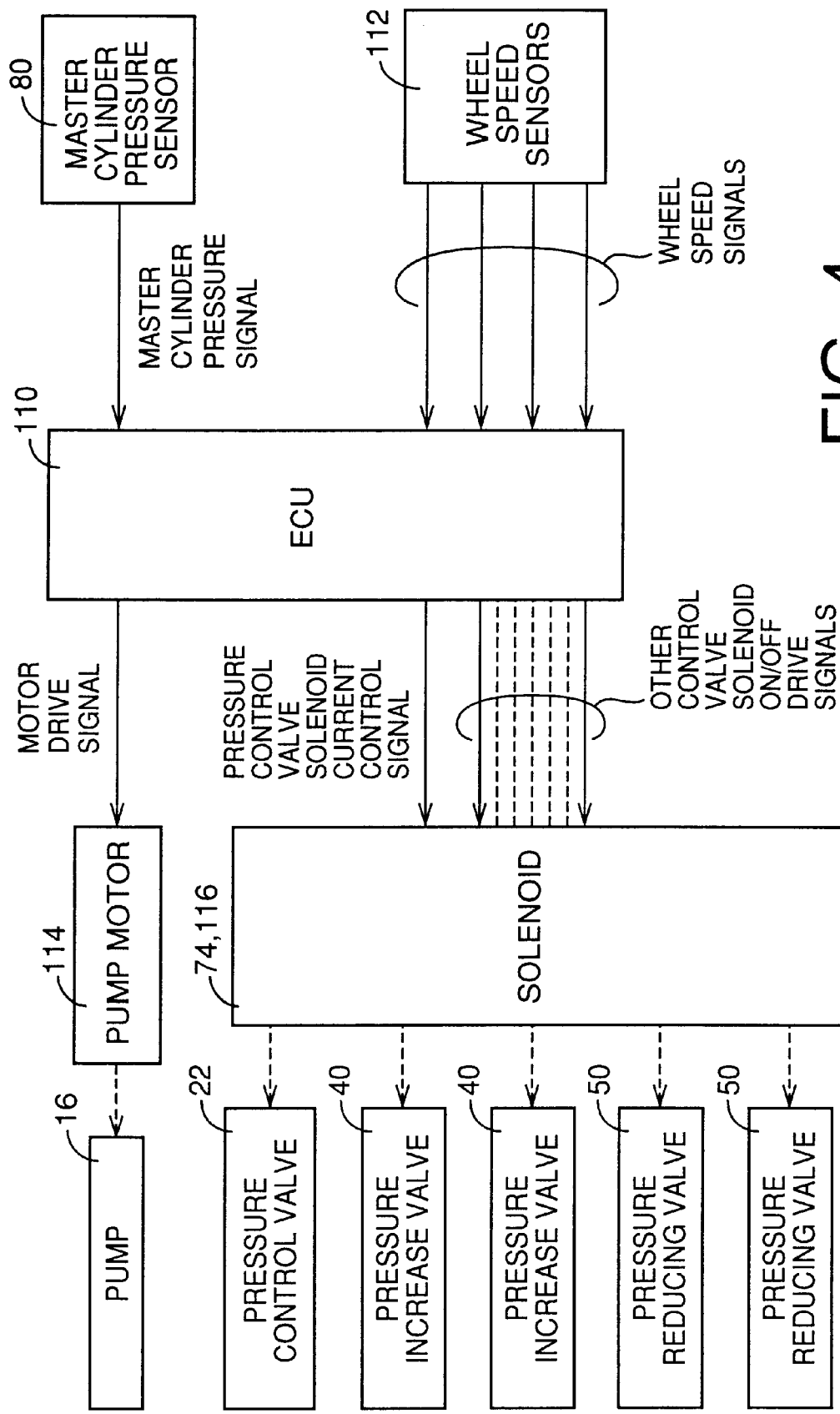
FIG. 4 is a block diagram showing an electrical arrangement of the above-indicated first embodiment.

There is shown in FIG. 4 an electrical arrangement of the present embodiment. The present embodiment is provided with an electronic control unit (hereinafter abbreviated as "ECU"). The ECU 110 is constituted principally by a computer including a CPU (an example of a processor), a ROM (an example of a memory) and a RAM (another example of a memory). A braking effect characteristic control routine and an anti-lock brake pressure control routine which are stored in the ROM are executed by the CPU while utilizing the RAM, to implement the braking effect characteristic control and the anti-lock brake pressure control.

To the input side of the ECU 110, there is connected the above-indicated master cylinder pressure sensor 80, so that the ECU 110 receives from the sensor 80 the master cylinder pressure signal indicative of the master cylinder pressure. To the input side of the ECU 110, there is also connected wheel speed sensors 112, so that the ECU 110 receives from the sensors 112 wheel speed signals indicative of the rotating speeds of the vehicle wheels. To the output side of the ECU 110, there is connected a pump motor 114 for driving the above-indicated pump 16, so that the ECU 110 applies a motor drive signal for driving the driver circuit for the pump motor 114. To the output side of the ECU 110, there are also connected the solenoid 74 of the above-indicated pressure control valve 22, and solenoids 116 of the pressure increasing valve 40 and pressure reducing valve 50. The ECU 110 applies a current control signal to the solenoid 74 of the pressure control valve 20, for linearly controlling an electric current for energizing the solenoid 74. On the other hand, the ECU 110 applies an ON/OFF drive signal to the solenoids 116 of the pressure increasing valve 40 and pressure reducing valve 50, for energizing and de-energizing the solenoids 116.

Figure 5:
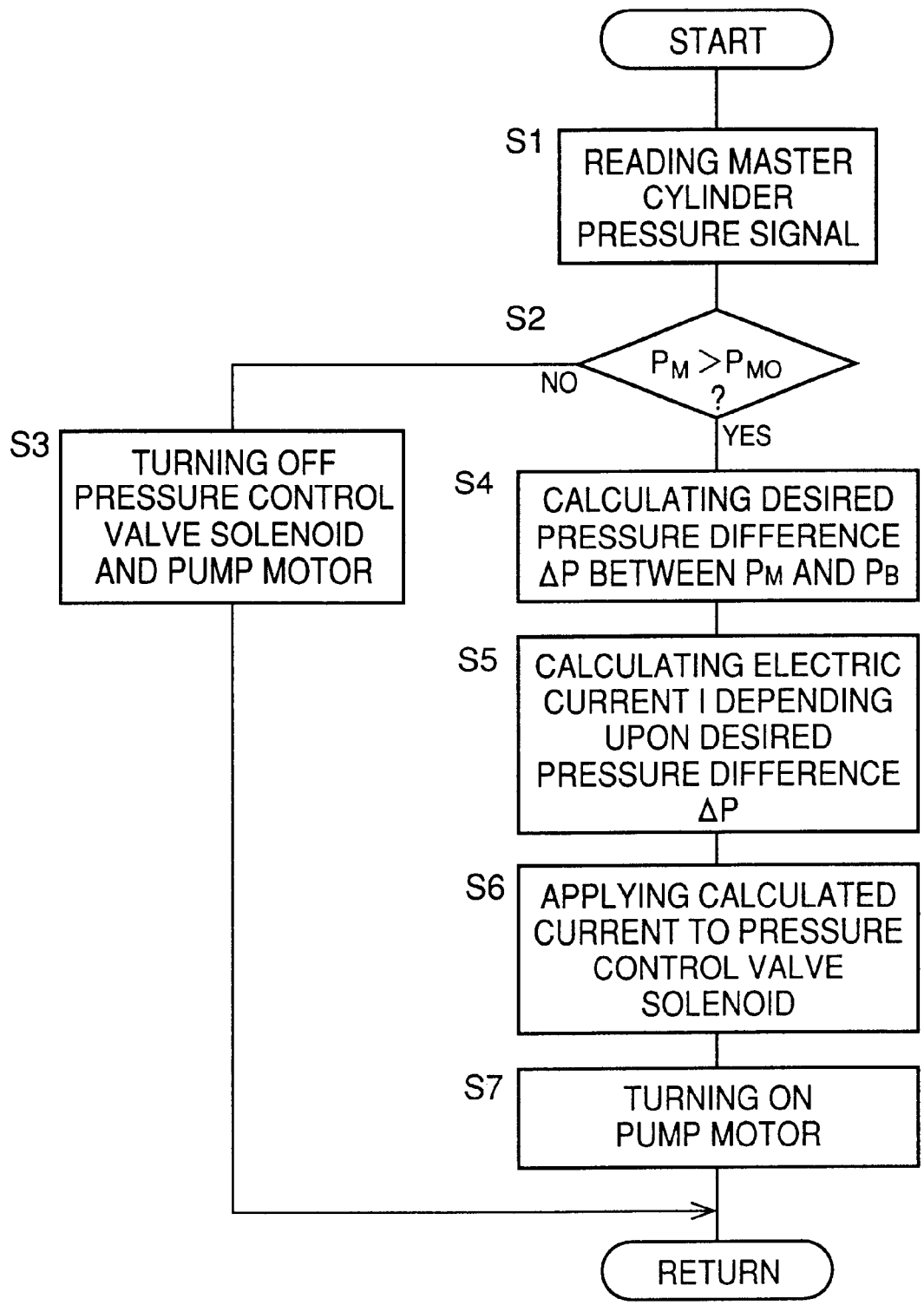
FIG. 5 is a flow chart showing a braking effect characteristic control routine executed by a computer of an ECU in FIG. 4.

In FIG. 5, the above-indicated braking effect characteristic control routine is illustrated by a flow chart. This routine is repeatedly executed. Each cycle of execution of the routine is initiated with step S1 (hereinafter referred to simply as "S1"; the other steps being similarly identified), in which the master cylinder pressure signal is received from the master cylinder pressure sensor 80. Then, S2 is implemented to determine whether the master cylinder pressure $P_M$ represented by the master cylinder pressure signal is higher than a reference value $P_{MO}$ above which the braking effect characteristic control is implemented. The reference value $P_{MO}$ is determined to be the master cylinder pressure $P_M$ at which the boosting limit of the booster 30 has been reached. If the master cylinder pressure $P_M$ is not higher than the reference value $P_{MO}$ in the present cycle of execution, a negative decision (NO) is obtained, and the control flow goes to S3 to generate a signal for de-energizing the solenoid 74 of the pressure control valve 22 and a signal for turning off the pump motor 114. Thus, one cycle of execution of the present routine is terminated.

Figure 6:
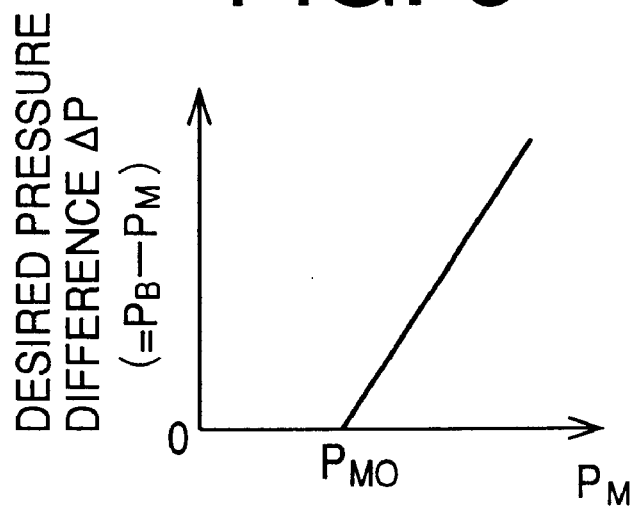
FIG. 6 is a graph showing a relationship between master cylinder $P_M$ and desired pressure difference $\Delta P$ in the above-indicated first embodiment.

If the master cylinder pressure $P_M$ is higher than the reference value $P_{MO}$, on the other hand, an affirmative decision (YES) is obtained in S2, and the control flow goes to S4 to calculate a desired pressure difference $\Delta P$ by which the brake cylinder pressure $P_B$ should be higher than the master cylinder pressure $P_M$. The desired pressure difference $\Delta P$ is calculated on the basis of the present value of the master cylinder pressure $P_M$ and according to a relationship between the master cylinder pressure $P_M$ and the desired pressure difference $\Delta P$, which relationship is stored in the ROM. A graph of FIG. 6 shows an example of the relationship between the master cylinder pressure $P_M$ and the desired pressure difference $\Delta P$. In this example, the desired pressure difference $\Delta P$ changes linearly with the master cylinder pressure $P_M$.

The relationship between the master cylinder pressure $P_M$ and the desired pressure difference $\Delta P$ is based on the reference value $P_{MO}$ which is equal to the master cylinder pressure $P_M$ when the boosting limit of the booster 30 has been reached. For example, this relationship may be a relationship between the master cylinder pressure $P_M$ and an amount of difference by which the value of the brake cylinder pressure $P_B$ which changes after the boosting limit of the booster 30 has been reached is lower than the corresponding value of the brake cylinder pressure $P_B$ which would be changed by the booster 30 if the booster 30 did not have the boosting limit. Where this relationship is used, the above-indicated amount of difference of the brake cylinder pressure $P_B$ due to the boosting limit is compensated for by the pump 16, so that the brake cylinder pressure $P_B$ is not influenced by reduction of the boosting point of the booster 30 which is caused by an increase in the servo ratio of the booster 30. This arrangement provides an improved braking effect while assuring a good brake operating feel.

Figure 7:
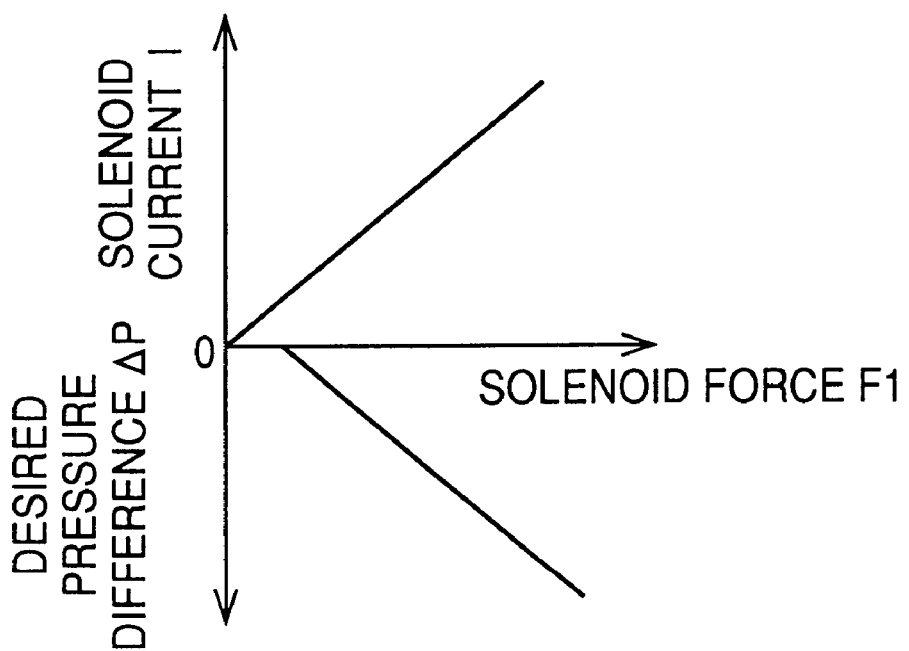
FIG. 7 is a graph showing a relationship among the desired pressure difference $\Delta P$, solenoid attracting force F1 and solenoid current I in the above-indicated first embodiment.

Then, S5 is implemented to calculate an electric current I to be applied to the solenoid 74 of the pressure control valve 22, depending upon the calculated desired pressure difference. Namely, a relationship between the desired pressure difference $\Delta P$ and the electric current I is stored in the ROM, so that the solenoid electric current I corresponding to the desired pressure difference $\Delta P$ is calculated according to that relationship. FIG. 7 shows an example of the relationship between the desired pressure difference $\Delta P$ and the solenoid electric current I, in the form of an indirect relationship between the desired pressure difference $\Delta P$ and the solenoid electric current I, which indirect relationship uses the attracting force $F_1$ of the solenoid as a medium. That is, the relationship between the desired pressure difference $\Delta P$ and the solenoid electric current I is represented by a relationship between the desired pressure difference $\Delta P$ and the solenoid attracting force $F_1$, and a relationship between the solenoid attracting force $F_1$ and the solenoid electric current I.

Figure 8:
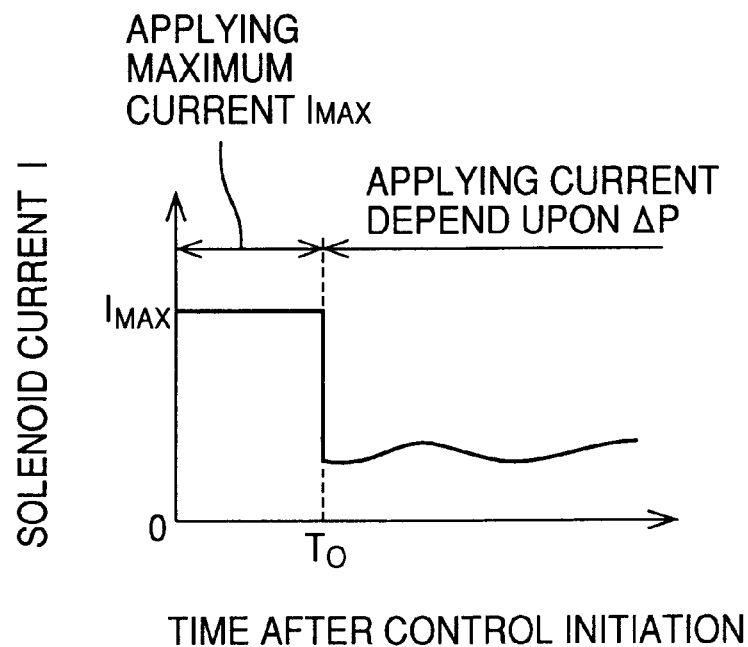
FIG. 8 is a graph for explaining the content of step S6 in FIG. 5.
Figure 9:
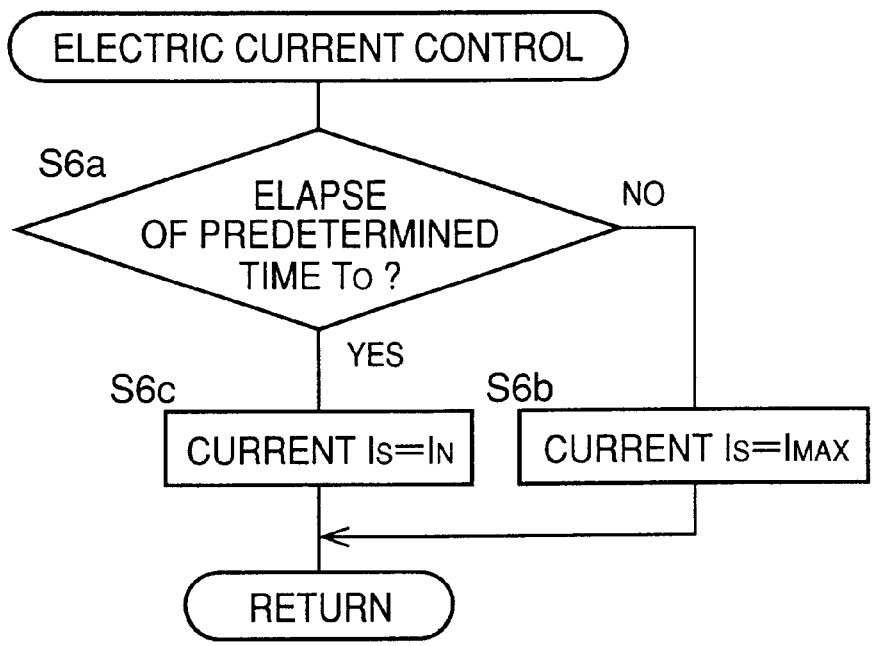
FIG. 9 is a flow chart showing details of step S6 in FIG. 5.

Then, the control flow goes to S6 to effect an electric current control of the solenoid 74 of the pressure control valve 22, in which the calculated electric current I is applied to the solenoid 74. In an initial period of this electric current control, however, the electric current value I higher than the value determined by the master cylinder pressure $P_M$, for example, the maximum current value $I_{MAX}$, is applied to the solenoid 74, as indicated in FIG. 8. The initial period of the electric current control is terminated when a time T after the initiation of the braking effect characteristic control has reached a predetermined value $T_0$. This arrangement improves an operating response of the valve member 70 of the pressure control valve 22, enabling the valve member 70 to be rapidly seated onto the valve seat 72. That is, S6 is initiated with S6a to determine whether the predetermined time $T_0$ has elapsed after the initiation of the braking effect characteristic control, as shown in FIG. 9. If the time $T_0$ has not elapsed, a negative decision (NO) is obtained, and the control flow goes to S6b in which the electric current $I_S$ to be applied to the solenoid 74 is set to be the maximum electric current $I_{MAX}$. If the predetermined time $T_0$ has elapsed after the initiation of the braking effect characteristic control, on the other hand, an affirmative decision (YES) is obtained in S6a, and the control flow goes to S6c in which the electric current $I_S$ to be applied to the solenoid 74 is determined to be a normally controlled value $I_N$ based on the pressure difference $\Delta P$.

S7 is then implemented to generate a signal for turning on the pump motor 114, so that the fluid is pumped up by the pump 16 from the reservoir 48, and is delivered to each brake cylinder 10. As a result, the fluid pressure in each brake cylinder 10 is made higher than the master cylinder pressure $P_M$ by an amount depending upon the master cylinder pressure $P_M$. Thus, one cycle of execution of the present braking effect characteristic control routine is terminated.

While the braking effect characteristic control routine has been described in detail by reference to the drawings, the anti-lock brake pressure control routine will be described only briefly since this routine does not directly relate to the present invention. The anti-lock brake pressure control routine is formulated to prevent locking of each vehicle wheel during brake application to the vehicle, by selectively establishing a pressure-increasing state, a pressure-holding state and a pressure-reducing state, while monitoring the rotating speed of each wheel with the wheel speed sensor 112 and the running speed of the vehicle. In the pressure-increasing state, the pressure increasing valve 50 is placed in the open state, while the pressure reducing valve 50 is placed in the closed state. In the pressure-holding state, the pressure increasing valve 40 and the pressure reducing valve 50 are both placed in the closed state. In the pressure-reducing state, the pressure increasing valve 40 is placed in the closed state while the pressure reducing valve 50 is placed in the open state. The anti-lock brake pressure control routine is further formulated such that the pump motor 114 is activated during an anti-lock brake pressure control operation, to operate the pump 16 to return the fluid from the reservoir 48 to the primary passage 18.

It follows from the foregoing description that the present embodiment is capable of effecting the braking effect characteristic control, by simply adding the master cylinder pressure sensor 80, pressure control valve 22 and inflow control valve 90 as hardware components to a known anti-lock type braking system, and by positively utilizing the pump 16 originally provided for the purpose of performing the anti-lock brake pressure control.

It is noted that while the present embodiment is arranged to effect the braking effect characteristic control for operating the pump 16 so as to deliver the fluid pressure higher than the master cylinder pressure $P_M$ while the master cylinder pressure $P_M$ is higher than the reference value $P_0$, irrespective of whether the anti-lock brake pressure control is effected or not, the present embodiment may be modified to inhibit the braking effect characteristic control while the anti-lock brake pressure control is effected.

It will be understood from the foregoing explanation of the present embodiment that the master cylinder pressure sensor 80 and a portion of the ECU 110 assigned to implement S2, S3 and S7 of FIG. 8 constitute the pump operating device 24. It will also be understood that the pump 16 corresponds to a "hydraulic pressure source", and the pump operating device 24 corresponds to a "predetermined-operating-state control device", a "post-boosting-limit control means" and a "post-reference-value control means", while the pressure control valve 22 corresponds to a "pressure control device", which is an example of a "fluid flow control device" and a "pressure changing device". An operating state in which the brake pedal 32 is operated by the vehicle operator so as to cause the master cylinder pressure $P_M$ to exceed the reference value $P_{M0}$ corresponds to "a predetermined operating state". The pressure control valve 22 corresponds to an "electromagnetic pressure control device", and the master cylinder pressure sensor 80 and a portion of the ECU 110 assigned to implement S4–S6 of FIG. 5 correspond to an "electromagnetic force control device". It will also be understood that the pressure control device 22, pump 16 and pump operating device 24 constitute an example of a "pressure increasing device".

There will next be described a second embodiment of this invention. This embodiment has a number of elements which are identical with those of the first embodiment and are identified by the same reference signs as used in the first embodiment. Detailed description of these elements will not be provided, and only the elements specific to the second embodiment will be described in detail.

In the first embodiment, the pressurized fluid delivered from the master cylinder 14 during the braking effect characteristic control is once accommodated in the reservoir 48 and thus reduced, before the fluid is pumped up by the pump 16 from the reservoir 48. In the present embodiment, however, the pressurized fluid delivered from the master cylinder 14 is delivered directly to the suction side of the pump 16, without being once accommodated in the reservoir 48. Described specifically, the second embodiment is arranged such that a fluid supply passage 130 is provided to connect a portion of the main passage 34 between the master cylinder 14 and the pressure control valve 22 and a portion of the pump passage 60 between the suction valve 62 and a reservoir 132. Further, a check valve 134 is provided in a portion of the pump passage 60 between the fluid supply passage 130 and the reservoir 132. The check valve 134 inhibits a flow of the fluid from the fluid supply passage 130 toward the reservoir 132 and permits a flow of the fluid in the opposite direction.

Each reservoir passage 46 is connected to a portion of the pump passage 60 between the check valve 134 and the reservoir 132.

An inflow control valve 138 which is a normally-closed solenoid-operated shut-off valve is provided in the fluid supply passage 130. When an anti-lock brake pressure control operation is initiated, an ECU 140 commands the inflow control valve 138 to be switched to an open state. A determination as to whether the fluid is required to be delivered from the master cylinder 14 through the inflow control valve 138 during an anti-lock brake pressure control operation, by determining whether the fluid that can be pumped up by the pump 16 is absent or present in the reservoir 132. In the present embodiment, this determination as to whether the fluid is absent or present is made by calculating a cumulative time in which the pressure increasing valve 40 is placed in the pressure-increasing state and a cumulative time in which the pressure reducing valve 50 is placed in the pressure-reducing state, and by estimating the amount of the fluid remaining in the reservoir 132, on the basis of a relationship between those pressure increasing and reducing times.

In the present embodiment, the inflow control valve 138 is an electromagentically operated, unlike the inflow control valve used in the first embodiments which is a pilot-operated type. Accordingly, the construction of the reservoir 132 is different from that of the reservoir 48. That is, the reservoir 132 is constructed to simply store the fluid under pressure.

Figure 11:
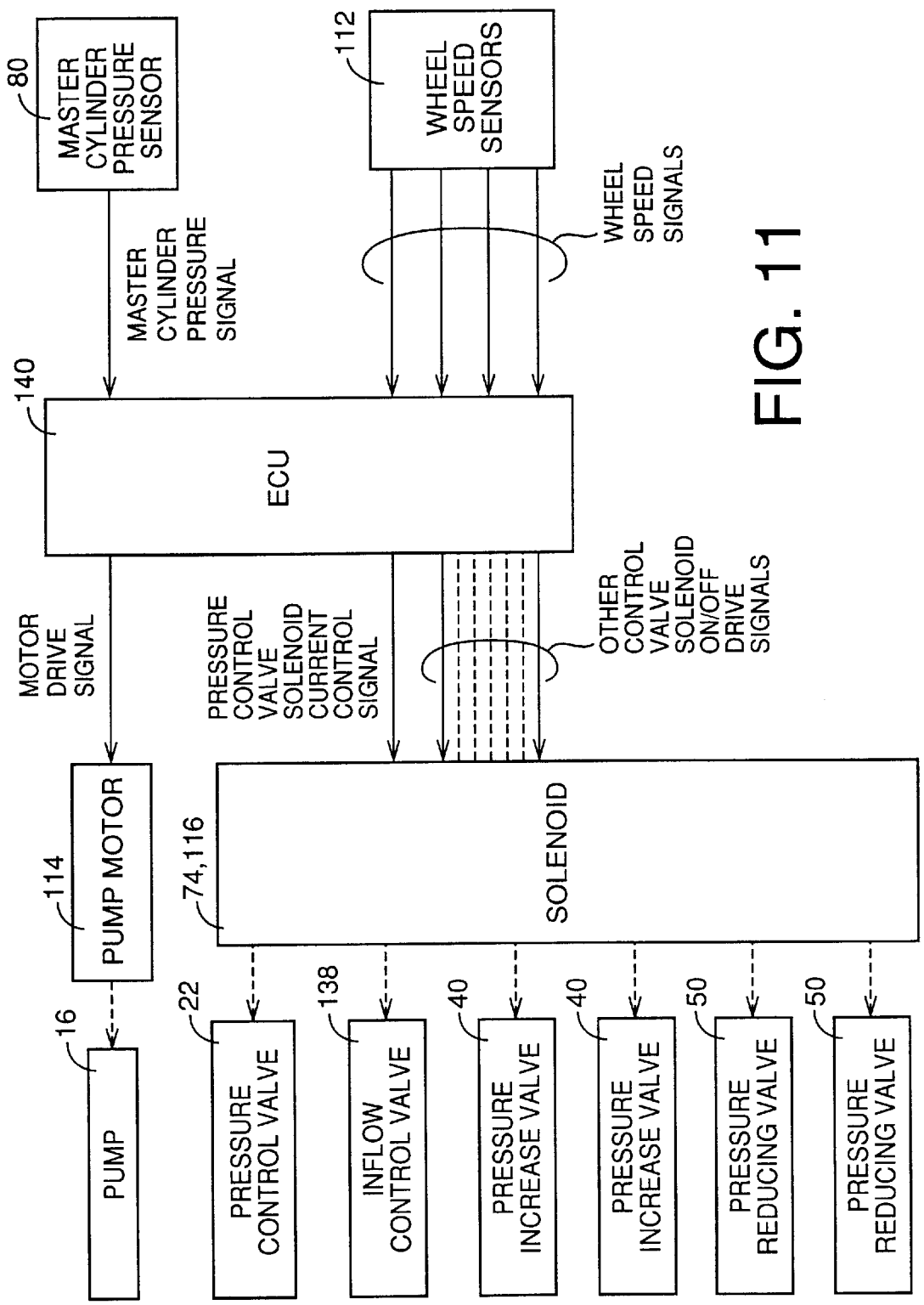
FIG. 11 is a block diagram showing an electrical arrangement of the second embodiment.

FIG. 11 shows an electrical arrangement (including software arrangement) of the present embodiment.

Figure 12:
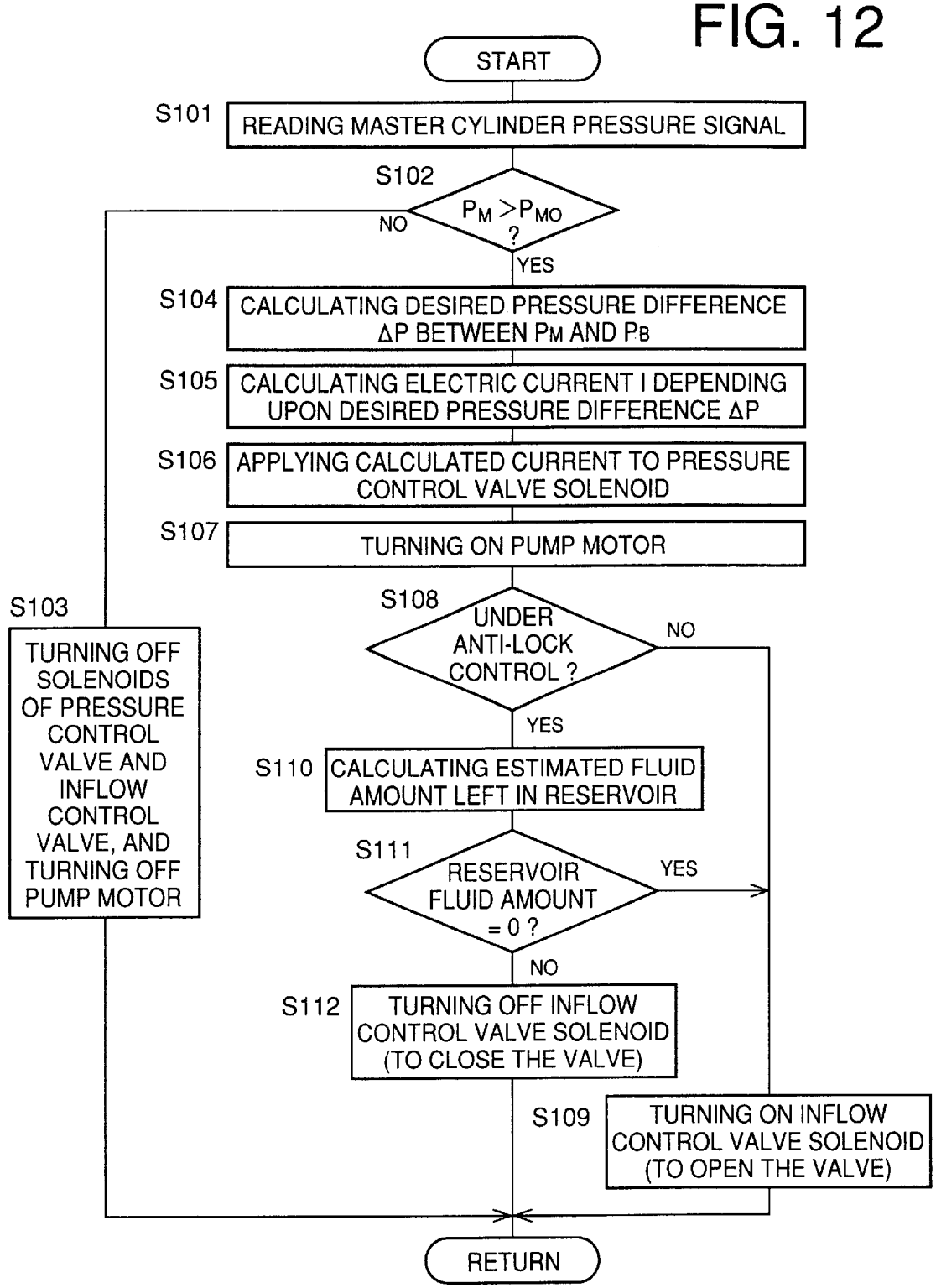
FIG. 12 is a flow chart showing a braking effect characteristic control routine executed by a computer of an ECU in the second embodiment.

A braking effect characteristic control routine stored in a ROM of the ECU 140 is illustrated in the flow chart of FIG. 12. This routine will be described referring to the flow chart. The same aspects of the present routine as in the first embodiment will be briefly described.

The present routine is initiated with S101 in which the master cylinder pressure signal is received from the master cylinder pressure sensor 90. Then, S102 is implemented to determine whether the master cylinder pressure $P_M$ represented by the master cylinder pressure signal is higher than a reference value $P_{M0}$. If the master cylinder pressure $P_M$ is not higher than the reference value $P_{M0}$ in the present cycle of execution, a negative decision (NO) is obtained, and the control flow goes to S103 to generate signals for de-energizing the solenoid 74 of the pressure control valve 22 and a solenoid 116 of the inflow control valve 138, and a signal for turning off the pump motor 114. Thus, one cycle of execution of the present routine is terminated.

If the master cylinder pressure $P_M$ is higher than the reference value $P_{M0}$, on the other hand, an affirmative decision (YES) is obtained in S102, and the control flow goes to S104 to calculate a desired pressure difference ΔP between the master cylinder pressure $P_M$ and the brake cylinder pressure $P_B$. Then, S105 is implemented to calculate an electric current I to be applied to the solenoid 74 of the pressure control valve 22, depending upon the calculated desired pressure difference. S106 is then implemented to effect an electric current control of the solenoid 74 of the pressure control valve 22, in which the calculated electric current I is applied to the solenoid 74. Then, the control flow goes to S107 to generate a signal for turning on the pump motor 114.

Then, S108 is implemented to determine whether an anti-lock brake pressure control operation is performed. If the anti-lock brake pressure control operation is not performed, a negative decision (NO) is obtained, and the control flow goes to S109 to generate a signal for energizing the solenoid 116 of the inflow control valve 138, that is, a signal for opening the inflow control valve 138. As a result, the fluid delivered from the master cylinder 14 is supplied to the pump 16 without a pressure reduction, whereby the braking effect characteristic control is suitably achieved. Thus, one cycle of execution of the present routine is terminated.

If the anti-lock brake pressure control operation is performed, an affirmative decision (YES) is obtained in S108, and the control flow goes to S110 to estimate the amount of the fluid which is present in the reservoir 132 and which can be pumped up by the pump 16, that is, obtain an estimated amount of the fluid left in the reservoir 132. Then, S111 is implemented to determine whether the estimated amount of the fluid left in the reservoir 132 is zero, that is, determine whether the fluid that can be pumped up by the pump 16 is absent in the reservoir 132. If the amount of the fluid left in the reservoir is not zero, an affirmative decision (NO) is obtained, and the control flow goes to S112 to generate a signal for de-energizing the solenoid 116 of the inflow control valve 138, that is, a signal for closing the inflow control valve 138. If the amount of the fluid left in the reservoir 132 is zero, an affirmative decision (YES) is obtained in S111, and the control flow goes to S109 to generate a signal for opening the inflow control valve 138. In either case, one cycle of execution of the present routine is terminated.

In the present embodiment described above, the fluid delivered from the master cylinder 14 is not reduced before it is pressurized by the pump 16 and supplied to the brake cylinder 10 to increase the fluid pressure in the brake cylinder 10. Since the pump 16 is operated for increasing the master cylinder pressure to the desired brake cylinder pressure, the load acting on the pump motor 114 is reduced, and the size and operating noise of the pump motor can be accordingly reduced, while the initial operating response of the pump motor 114 is improved and the service life of the pump motor 114 is prolonged.

It will be understood from the foregoing explanation of the present embodiment that the pressure increasing valve 40 and the pressure reducing valve 50 correspond to an "electromagnetic hydraulic pressure control device", while these valves 40, 50 and a portion of the ECU 140 assigned to execute the anti-lock brake pressure control routine correspond to an "automatic hydraulic pressure control device", and that the fluid supply passage 130, check valve 134, inflow control valve 138 and a portion of the ECU 140 assigned to implement steps S102, S103 and S108–S112 of FIG. 11 correspond to a "fluid supply device".

Then, a third embodiment of this invention will be described.

Figure 13:
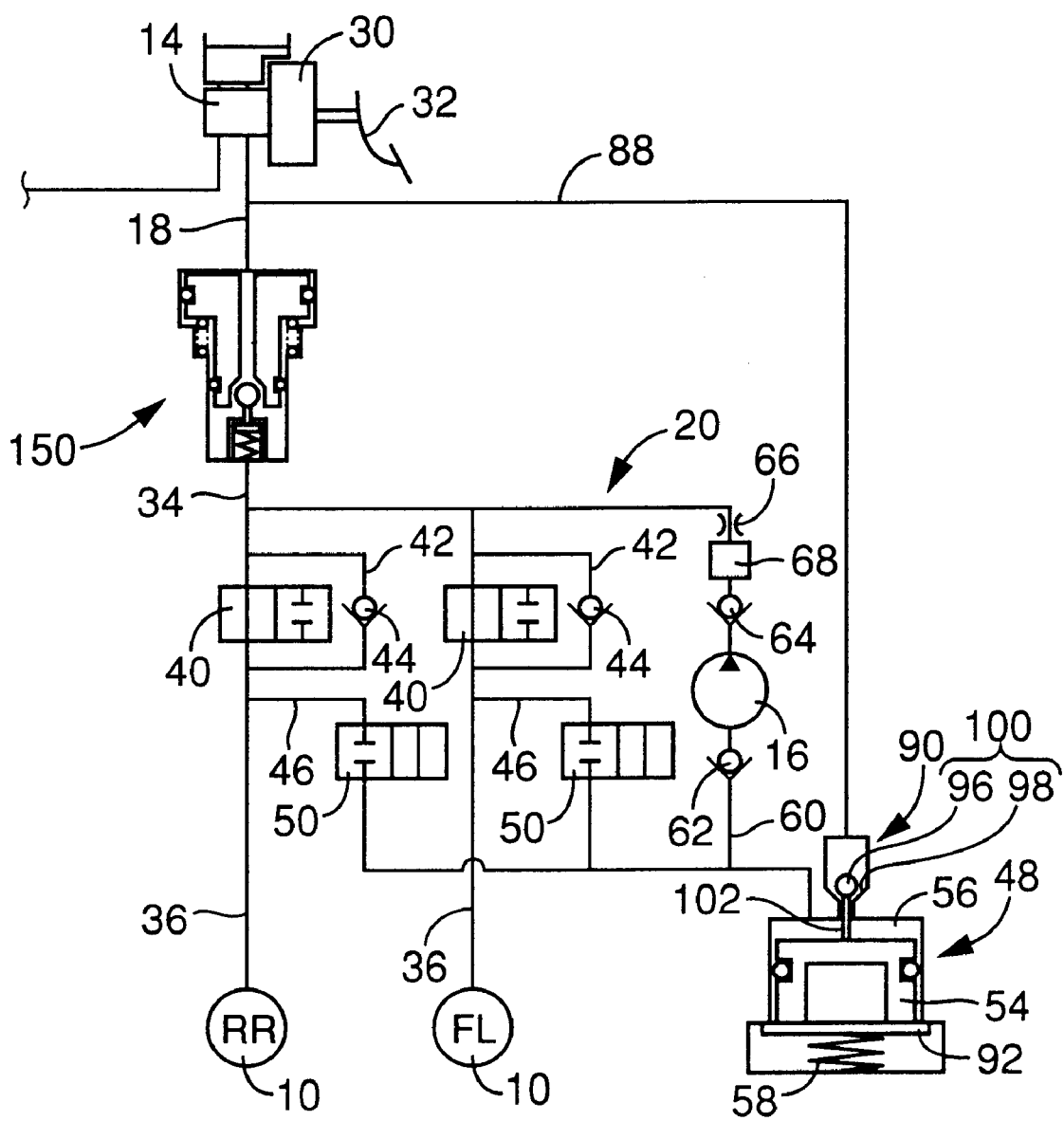
FIG. 13 is a view showing an anti-lock type braking system of a third embodiment of this invention.

FIG. 13 shows a mechanical arrangement of the present embodiment. This embodiment is different from the first embodiment in the elements relating to the pressure control valve, and is identical with the first embodiment in the other elements. Therefore, only the elements relating the pressure control valve will be described in detail.

A pressure control valve 150 is adapted to mechanically control a relationship between the master cylinder pressure and the brake cylinder pressure.

The pressure control valve 150 has a housing 150, as shown in FIG. 14. This housing 152 has a stepped cylinder bore 154 formed therein. The cylinder bore 154 communicates at its large-diameter portion with the master cylinder side, and at its small-diameter portion with the brake cylinder side. A piston 156 is slidably received in the cylinder bore 154. The piston 156 is also stepped, and the large-diameter and small-diameter portions of the piston 156 substantially air-tightly and slidably engage the respective large-diameter and small-diameter portions of the cylinder bore 154. With the piston 156 received in the cylinder bore 154, there are formed in the housing 152 a first fluid chamber 160 on the master cylinder side, a second fluid chamber 162 on the brake cylinder side, and an atmospheric pressure chamber 164 located between the shoulder surfaces of the cylinder bore 154 and piston 156. The large-diameter portion 168 of the piston 156 has a pressure-receiving surface area $S_1$ which receives a first fluid pressure $P_1$ in the first fluid chamber 160, while the small-diameter portion 170 of the piston 156 has a pressure-receiving surface area $S_2$ ($<S_1$) which receives a second fluid pressure $P_2$ in the second fluid chamber 162. In the atmospheric pressure chamber 164, there is disposed an elastic member in the form of a spring 172 such that the spring 172 is interposed and compressed between the housing 152 and the piston 156, so as to bias the piston 156 with a force $F_3$ in a direction for increasing the volume of the atmospheric pressure chamber 164, namely, in a direction toward a non-operated position at which the large-diameter portion 168 abuts on the bottom of the large-diameter portion of the cylinder bore 154. The fully retracted position (non-operated position) of the piston 156 is determined by abutting contact of the end face of the large-diameter portion 168 of the piston 156 with the bottom of the large-diameter portion of the cylinder bore 154, while the fully advanced position of the piston 156 is determined by abutting contact of the shoulder surface of the piston 145 with the shoulder surface of the housing 152.

A communication passage 174 is formed through the piston 156, for communication between the first fluid chamber 170 and the second fluid chamber 162. The communication passage 174 is opened and closed by a shut-off valve 176. The shut-off valve 176 includes a valve member 178, a valve seat 180, a nearest-position stop member 181 for determining a position of the valve member 178 nearest to the valve seat 180, and an elastic member in the form of a spring 182 which biases the valve member 178 toward the above-indicated nearest position. The valve seat 180 is movable with the piston 156 as a unit, and is formed so as to face the second fluid chamber 162. The nearest-position stop member 181 is fixed to the housing 152. That is, the shut-off valve 176 is adapted such that the relative movement of the valve member 178 and the valve seat 180 is controlled by the piston 156.

Then, an operation of the pressure control valve 150 will be explained referring to FIG. 14.

When the braking system is in the non-operated state in which the braking effect characteristic control is not effected and the fluid is not delivered from the pump 16 to the second fluid chamber 162, with the pump 16 being at rest (when the braking system is in a state in which the braking effect characteristic control is not effected), the piston 156 is placed at its fully retracted position indicated at (a) in FIG. 14, with the valve member 178 being unseated from the valve seat 180, so that the communication passage 174 is open.

When the braking system is operated in this state and the first fluid pressure $P_1$ is increased by the master cylinder 14, the second fluid pressure $P_2$ increases with the first fluid pressure $P_1$, since the communication passage 174 is open. As a result, the piston 156 receives an axial force (=$F_1$-$F_2$) which is equal to a force $F_1$ (first pressure $P_1$×pressure-receiving surface area $S_1$) based on the first fluid pressure $P_1$ minus a force $F_2$ (second pressure $P_2$×pressure-receiving surface area $S_2$) based on the second fluid pressure $P_2$ (which is equal to $P_1$ in this state).

If, as a result of a subsequent increase in the the brake operating force, the first fluid pressure $P_1$, that is, the second fluid pressure $P_2$ is increased to a level at which the axial force acting on the piston 156 exceeds the biasing force $F_3$ of the spring 172, namely, to a level at which a relationship represented by a formula $P_1 \times (S_1-S_2) \geq F_3$ is established, the piston 156 is advanced from the fully retracted position, and the valve seat 180 is moved with the piston 156, so that the valve member 178 which has been located at the position nearest to the valve seat 180 is seated on the valve seat 180. As a result, the communication passage 174 is closed. When the piston 156 is further advanced by a small distance from the position at which the valve member 178 is seated on the valve seat 180, the piston 156 has reached its fully advanced position at which the shoulder surface of the piston 156 comes into abutting contact with the shoulder surface of the housing 152, so that a further advancement of the piston 156 is inhibited. Thus, the shoulder surface of the housing 152 on which the shoulder surface of the piston 156 in the fully advanced position abuts provides an advanced-position stop member 184.

When the piston 156 is placed in its fully advanced position, the first and second fluid pressures $P_1$, $P_2$ act on the valve member 178 in the opposite directions. When the first fluid pressure $P_1$ is made higher than the second fluid pressure $P_2$ (provided the elastic force of the spring 180 is so small and can be ignored), the valve member 178 is retracted away from the valve seat 180, so that the communication passage 174 is again opened, permitting the fluid to flow from the first fluid chamber 160 toward the second fluid chamber 162, whereby the second fluid pressure $P_2$ increases with the first fluid pressure $P_1$ such that the second fluid pressure $P_2$ increases with the first fluid pressure $P_1$.

Thus, when the braking effect characteristic control is not effected the function of the pressure control valve 150 is substantially inhibited by the advanced-position stop member 184, so that the fluid pressure in the brake cylinder 10 is equal to the master cylinder pressure.

There will next be described an operation of the pressure control valve 150 when the the braking effect characteristic control is effected during brake application, with the fluid delivered from the activated pump 16 to the second fluid chamber 162 (when the braking system is in a state in which the braking effect characteristic control is effected).

When the second fluid pressure $P_2$ is made higher than the first fluid pressure $P_1$ in this state, the valve member 178 is first seated on the valve seat 180. With a further increase in the second fluid pressure $P_2$, the valve member 178 is retracted with the piston 156 from the fully advanced position. In this state, the valve member 178 and the piston 156 are moved to a position of equilibrium of forces represented by the following equation:

$$P_1 \times S_1 = P_2 \times S_2 + F_3$$

Therefore, the second fluid pressure $P_2$ is represented by the following equation:

$$P_2 = P_1 \times (S_1/S_2) - F_3/S_2$$

Thus, the fluid pressure in the brake cylinder 10 is controlled to be higher than the first fluid pressure $P_1$, that is, than the master cylinder pressure $P_M$, by an amount $$P_1 \times \{(S_1/S_2) - 1\} - F_3/S_2.$$

When the piston 156 is retracted beyond the position of the valve member 178 nearest to the valve seat 180, as a result of a further increase of the second fluid pressure $P_2$ by operation of the pump 16, the fluid is permitted to flow from the second fluid chamber 172 toward the first fluid chamber 160, so that an increase in the second fluid pressure $P_2$ is inhibited, whereby the second fluid pressure $P_2$ is maintained at the level represented by the above equation. That is, the fluid delivered from the pump 16 is returned to the master cylinder 14 through the pressure control valve 150, so that the second fluid pressure $P_2$ is maintained at the level represented by the above equation.

Figure 15A:
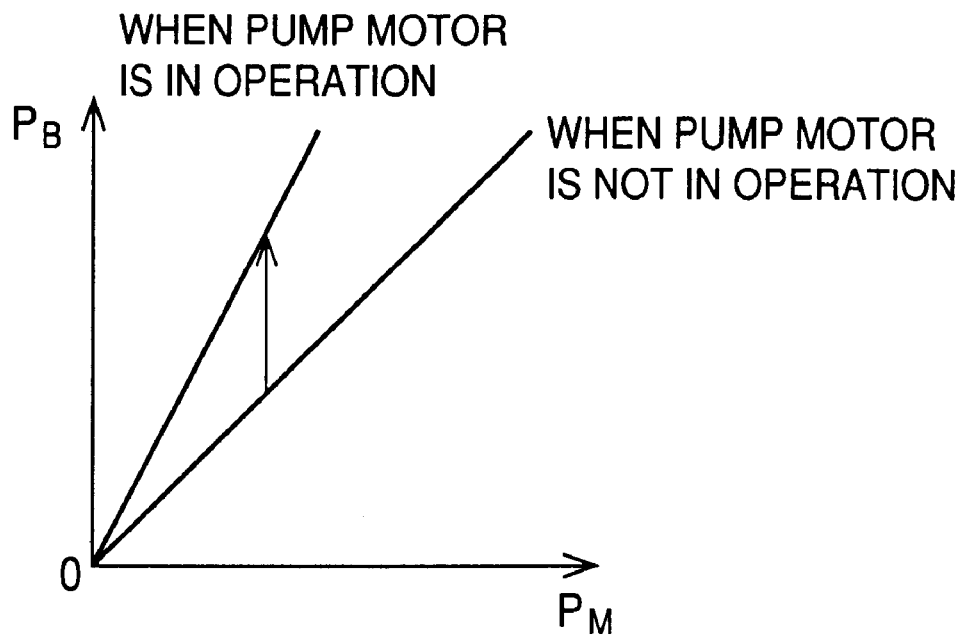
FIGS. 15 are graphs showing a relationship between master cylinder pressure $P_M$ and brake cylinder pressure $P_B$ and a relationship between brake operating force F and vehicle deceleration G in the above-indicated third embodiment.
Figure 15B:
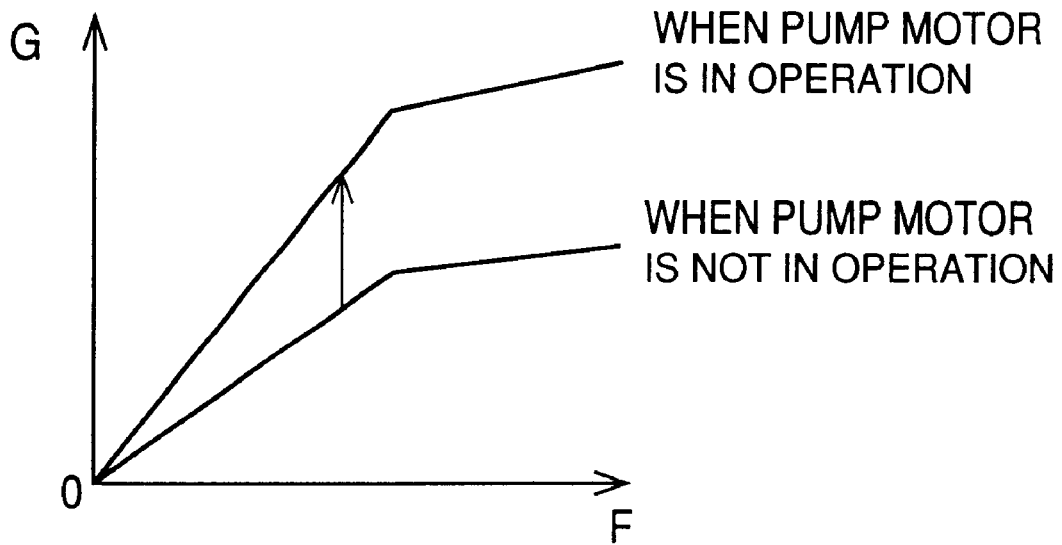

It will be understood from the above equation that the second fluid pressure $P_2$ is equal to the first fluid pressure $P_1$ multiplied by a value obtained by dividing the pressure-receiving surface area $S_1$ of the large-diameter portion 168 of the piston 156 by the pressure-receiving surface area $S_2$ of the small-diameter portion 170 (provided the elastic force $F_3$ is so small and can be ignored). Accordingly, the relationship between the master cylinder pressure $P_M$ and the brake cylinder pressure $P_B$ is such that the brake cylinder pressure $P_B$ increases with the master cylinder pressure $P_M$ at a higher rate when the pump motor is in operation than when the pump motor is not in operation, as indicated in the graph of FIG. 15(a). The relationship between the brake operating force F and the deceleration value G of the vehicle body is such that the deceleration value G increases with the brake operating force F at a higher rate when the pump motor is in operation than when the pump motor is not in operation, as indicated in the graph of FIG. 15(b). However, the rate of increase of the deceleration value G is different before and after the boosting limit of the booster 30 has been reached.

In the present embodiment, it is noted that the direction of movement of the valve member 178 as the movable member for seating on the valve seat 180 as the stationary member (in the fully advanced position) is opposite to the direction of movement of the movable member by the fluid force acting on the movable member due to the fluid flow from the master cylinder 14 toward the brake cylinder 10 upon depression of the brake pedal 32, so that there is not a possibility that the pressure control valve 150 is closed by the fluid force acting on the movable member upon depression of the brake pedal 32. Therefore, unlike the first and second embodiments, the present embodiment does not have a by-pass passage with a check valve, which by-passes the pressure control valve 150.

FIG. 16 shows an electrical arrangement of the present embodiment. In the present embodiment wherein the the pressure control valve 150 is a mechanically operated type unlike that in the first embodiment, only the solenoids 116 of the pressure increasing valve 40 and the pressure reducing valve 50 are electrically controlled.

A braking effect characteristic control routine stored in a ROM of a computer of an ECU 194 is illustrated in the flow chart of FIG. 17. The present routine is initiated with S201 to read the master cylinder pressure signal received from the master cylinder pressure sensor 80. Then, S202 is implemented to determine whether the master cylinder pressure $P_M$ represented by the master cylinder pressure signal is higher than the reference value $P_{M0}$. If the master cylinder pressure $P_M$ is not higher than the reference value $P_{M0}$ in the present cycle of execution of the routine, a negative decision (NO) is obtained, and the control flow goes to S203 to generate a signal for turning off the pump motor. 114. If the master cylinder pressure $P_M$ is higher than the reference value $P_{M0}$ in the present cycle, on the other hand, an affirmative decision (YES) is obtained in S202, and the control flow goes to S204 to generate a signal for turning off the pump motor 114. In the present embodiment, only the pump motor 114 is electrically controlled in the braking effect characteristic control.

While the present embodiment is adapted to initiate the braking effect characteristic control depending upon the fluid pressure in the master cylinder 14, the braking effect characteristic control may be initiated when any other condition is satisfied, for instance, when the brake pedal 32 as the brake operating member is operated at a higher rate than usual.

Then, a fourth embodiment of this invention will be described.

Figure 18:
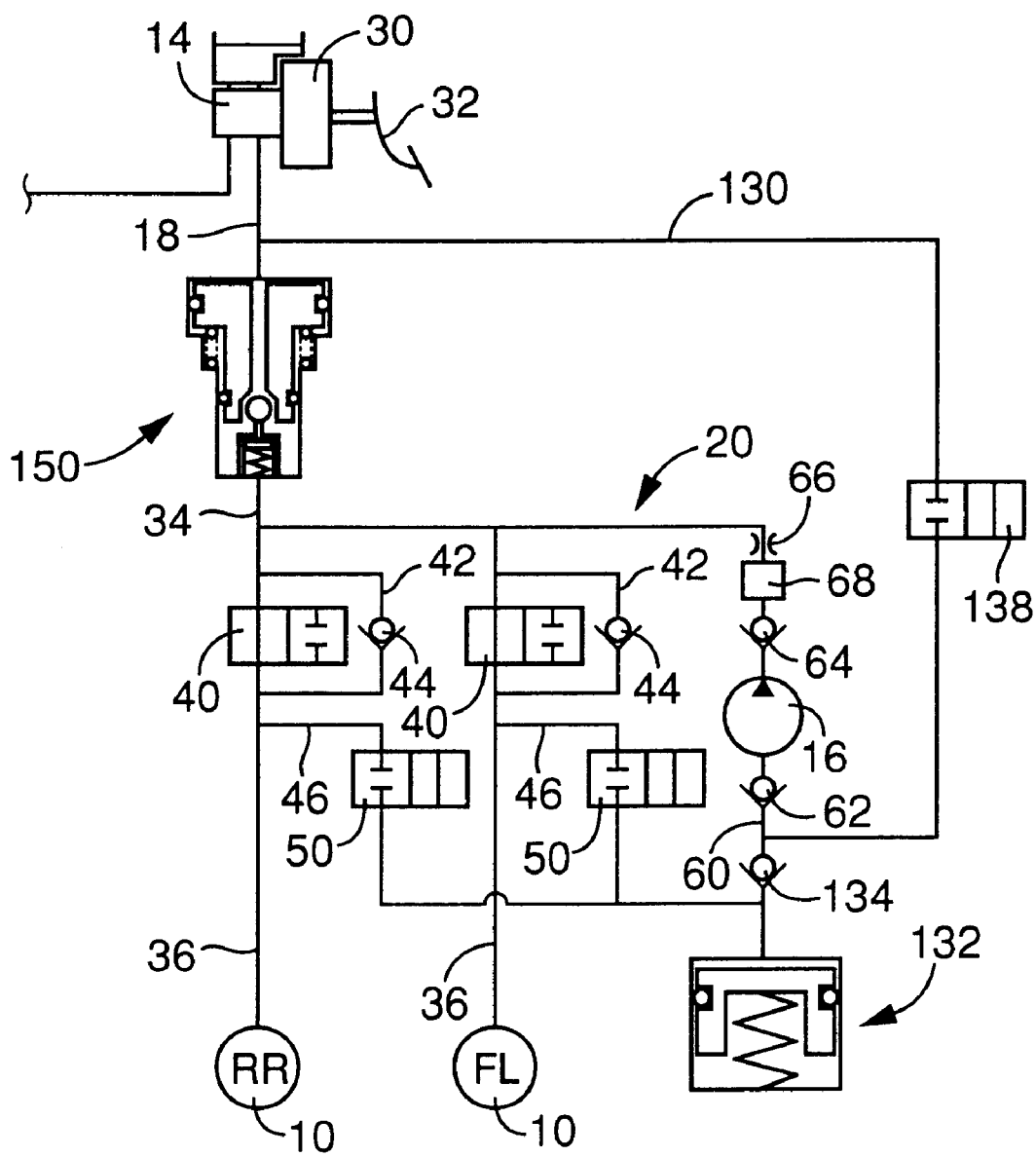
FIG. 18 is a schematic view showing an anti-lock type braking system of a fourth embodiment of this invention.

FIG. 18 shows a mechanical arrangement of the present embodiment. The present embodiment is different from the second embodiment in that the pressure control valve 22 is replaced by the mechanically operated pressure control valve 150 used in the third embodiment. Thus, the present embodiment incorporates a combination of the specific features of the second and third embodiments which use common elements in the other aspects, and no detailed description of this embodiment will not be provided.

Then, a fifth embodiment of this invention will be described.

Figure 19:
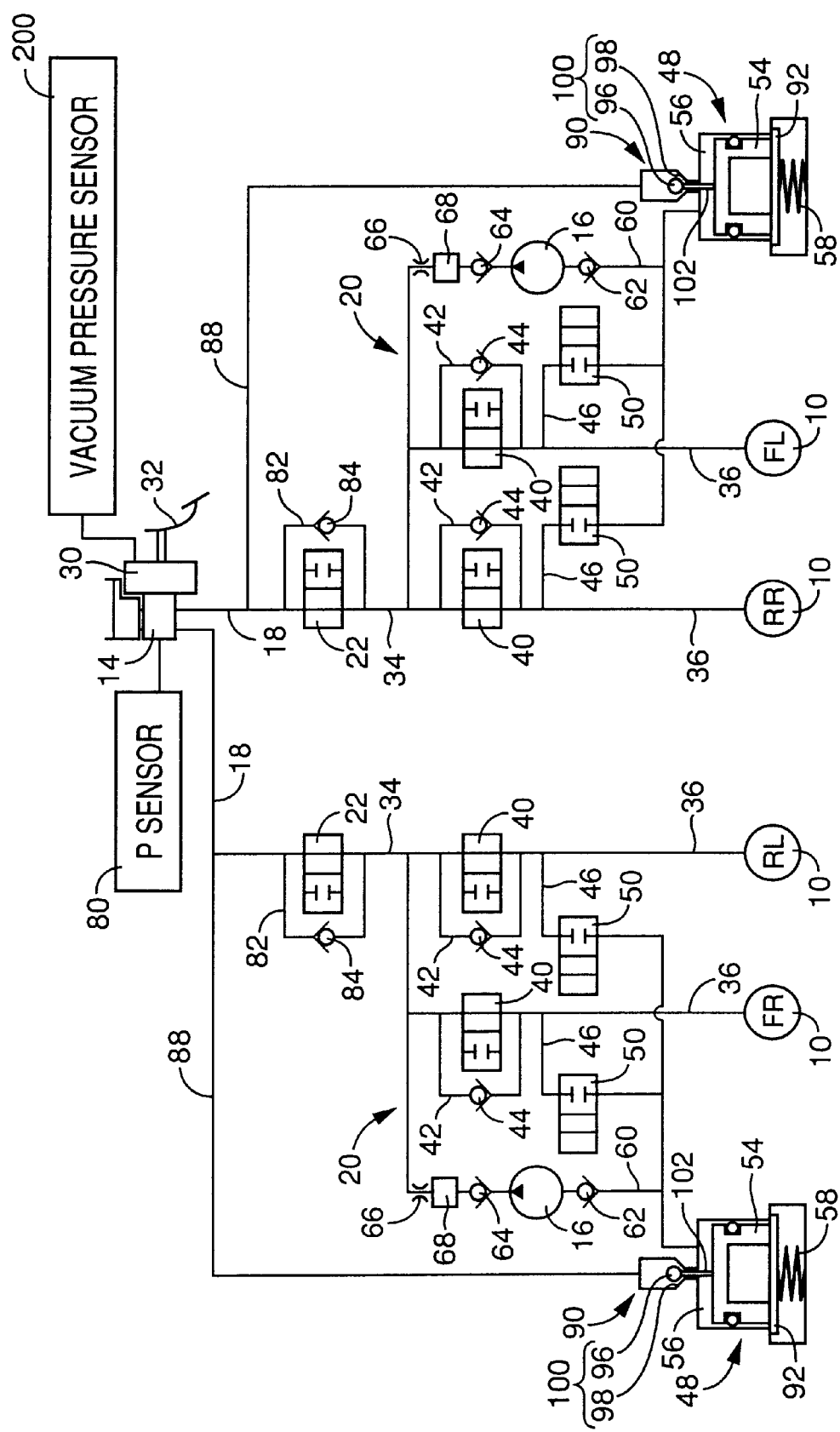
FIG. 19 is a schematic view showing an anti-lock type braking system of a fifth embodiment of this invention.

FIG. 19 shows a mechanical arrangement of this embodiment.

In all of the preceding embodiments wherein the brake cylinder pressure can be made higher than the master cylinder pressure by utilizing the pump 16, the braking effect can be improved while avoiding a drawback which would arise from reduction of the boosting limit of the booster 30 with an increase in the servo ratio of the booster 30. It is noted, however, that an increase in the servo ratio of the booster 30 means an increase in the degree of contribution of the booster 30 to an increase in the brake cylinder pressure, and that the moment of initiation of the braking effect characteristic control depends upon the master cylinder pressure as influenced by the operation of the booster 30. On the other hand, it cannot be said that the booster 30 will not fail at all. If, for instance, the booster 30 failed, the master cylinder pressure $P_M$ could not exceed the reference value $P_{M0}$, and the braking force would be reduced not only due to the failure of the booster 30 but also due to failure of the braking effect characteristic control to be initiated. In the view of this, the present embodiment uses the pressure control valve 22 which is electromagnetically controlled to control the relationship between the master cylinder pressure and the brake cylinder pressure, such that the pressure difference by which the brake cylinder pressure is higher than the master cylinder pressure is determined not only on the basis of the brake operating force F, but also depending upon whether the booster 30 is defective or not.

The present embodiment is characterized in that the pressure difference by which the brake cylinder pressure is higher is determined also depending upon whether the booster 30 is defective or not. Namely, the first embodiment is modified into the present embodiment, by introducing this characteristic technique. Accordingly, this embodiment has a number of elements which are identical with those of the first embodiment and are identified by the same reference signs as used in the first embodiment. Detailed description of these elements will not be provided, and only the elements specific to the second embodiment will be described in detail.

Figure 20:
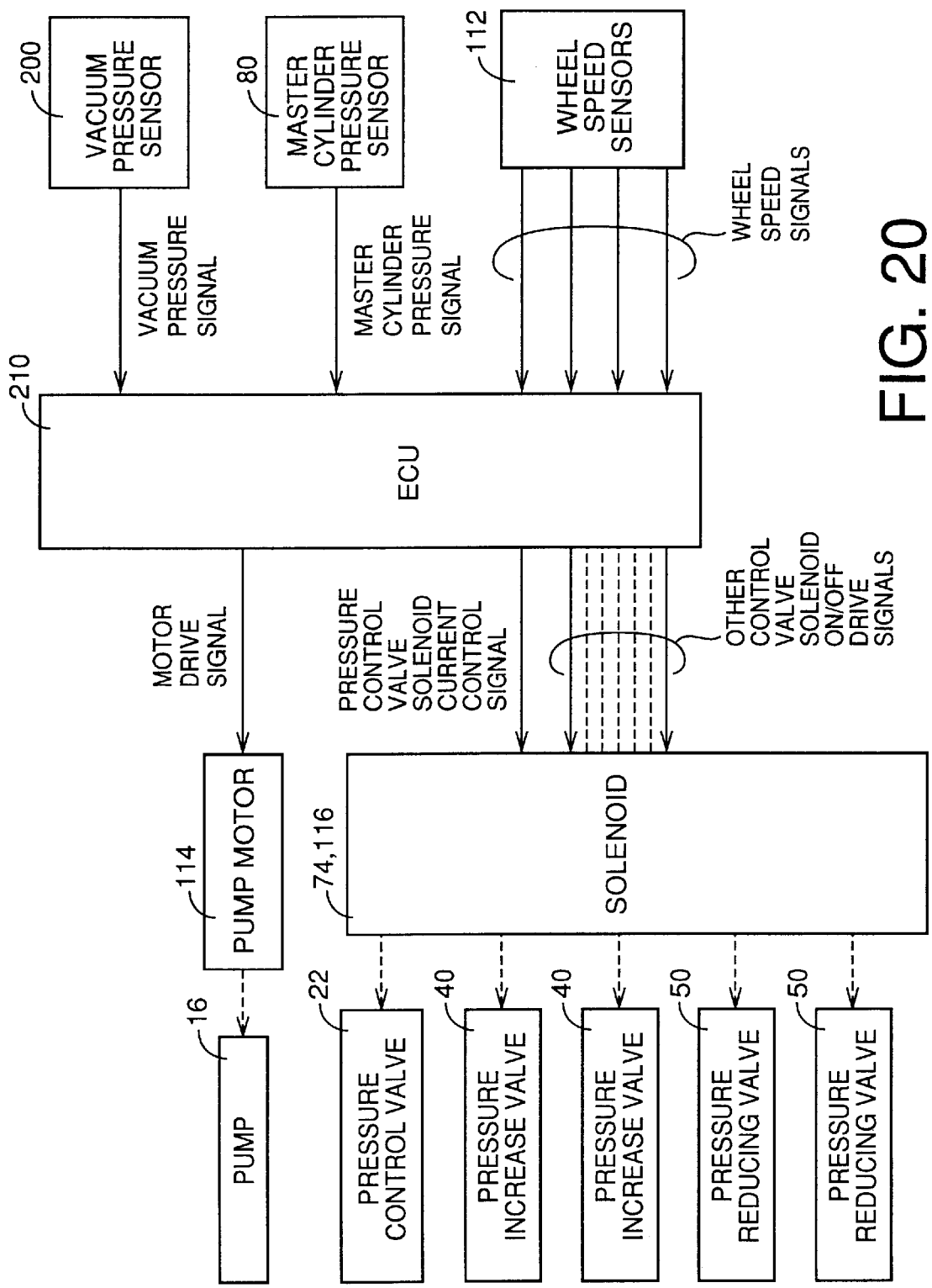
FIG. 20 is a block diagram showing an electrical arrangement of the fifth embodiment.

In the present embodiment, wherein the booster 30 is a vacuum type, whether the booster 30 is defective or not is determined on the basis of the vacuum pressure in the booster 30. To this end, the present embodiment uses a vacuum pressure sensor 200, as shown in FIGS. 19 and 20, in addition to the elements of the first embodiment shown in FIGS. 2 and 4. The vacuum pressure sensor 200 detects a vacuum pressure $P_V$, and applies to an ECU 210 a vacuum pressure signal indicative of the detected vacuum pressure $P_V$.

A ROM of the computer of the ECU 210 stores a braking effect characteristic control routine illustrated in the flow chart of FIG. 21. While this routine will be described in detail by reference to FIG. 21, the same steps as in the braking effect characteristic control routine (FIG. 5) of the first embodiment will be explained only briefly.

The present routine is initiated with S301 to read the master cylinder pressure signal received from the master cylinder pressure sensor 90. Then, S302 is implemented to read the vacuum pressure signal received from the vacuum pressure sensor 200. Then, the control flow goes to S303 to determine whether an absolute value of the vacuum pressure $P_V$ represented by the vacuum pressure signal is smaller than a threshold value $P_{V0}$, namely, to determine whether the booster 30 is capable of normally performing a boosting operation. If the absolute value of the vacuum pressure $P_V$ in this control cycle is not smaller than the threshold value $P_{V0}$, a negative decision (NO) is obtained, and the control flow goes to S304 to determine that the booster 30 is in a normal state, and set the reference value $P_{M0}$ to a normal value $P_{MN}$. If the absolute value of the vacuum pressure $P_V$ in the present control cycle is smaller than the threshold value $P_{V0}$, an affirmative decision (YES) is obtained in S303, and the control flow goes to S305 to determine that the booster 300 is in a defective state, and set the reference value $P_{M0}$ to a special value $P_{MS}$ which is lower than the normal value $P_{MN}$. For instance, the special value $P_{MS}$ is zero. Thus, the reference value $P_{M0}$ is set to be lower when the booster 30 is defective than when the booster 30 is normal, so that the braking effect characteristic control is more easily initiated so as to increase the brake cylinder pressure, when the booster is defective.

In either case, the control flow then goes to S307 to determine whether the master cylinder pressure $P_M$ is higher than the reference value $P_{M0}$. If the master cylinder pressure $P_M$ in the present control cycle is not higher than the reference value, a negative decision (NO) is obtained, and the control flow goes to S307 to turn off the solenoid 74 of the pressure control valve 22 and the pump motor 114. Thus, one cycle of execution of the present routine is terminated.

Figure 22A:
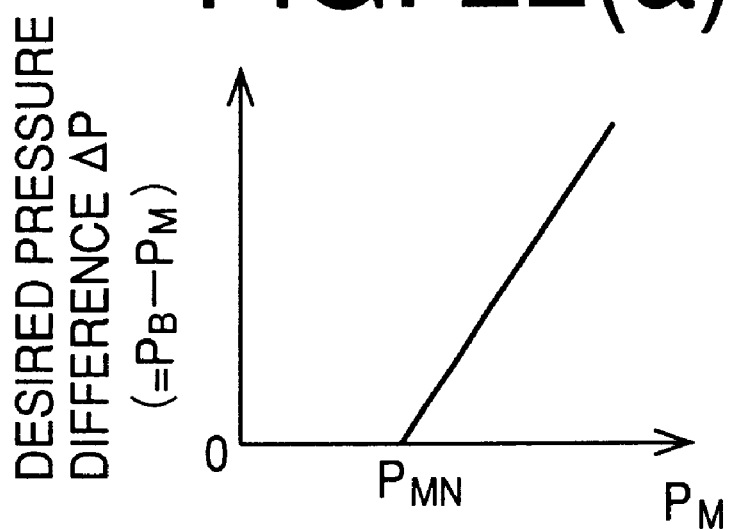
FIGS. 22 are graphs respectively showing relationships between master cylinder pressure $P_M$ and desired pressure difference $\Delta P$ when booster is normal and abnormal.
Figure 22B:
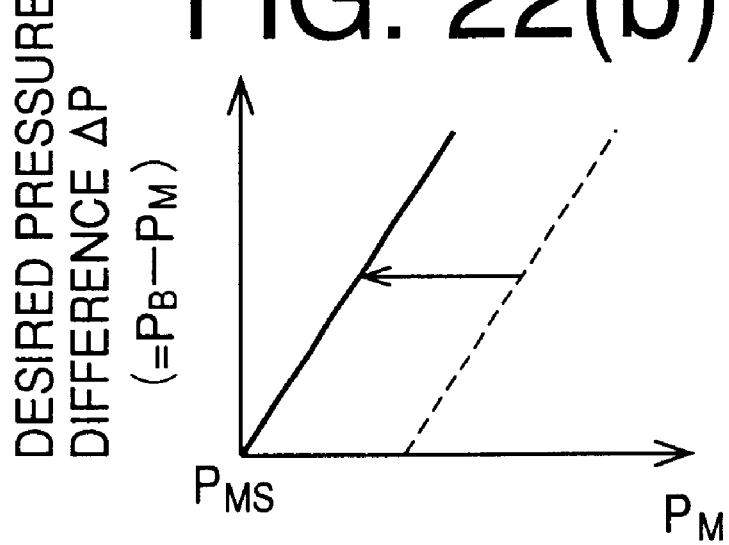

If the master cylinder pressure $P_M$ in the present control cycle is higher than the reference value $P_{M0}$, an affirmative decision (YES) is obtained in S306, and the control flow goes to S308 to calculate the desired pressure difference $\Delta P$ of the brake cylinder pressure $P_B$ from the master cylinder pressure $P_M$. Described more specifically, when the booster is normal, the desired pressure difference $\Delta P$ is zero while the master cylinder pressure $P_M$ is within a range between zero and the normal value $P_{MN}$, and linearly increases with an increase in the master cylinder pressure $P_M$ from the normal value $P_{MN}$, as indicated in FIG. 22(a). When the booster is defective, on the other hand, the desired pressure difference $\Delta P$ linearly increases with an increase in the master cylinder pressure $P_M$ from zero, as indicated in FIG. 22(b). Then, S309 is implemented to calculate the electric current value I on the basis of the calculated desired pressure difference $\Delta P$. Successively, the control flow goes to S310 to apply the desired electric current I to the solenoid 74 of the pressure control valve 22. Then, S311 is implemented to turn on the pump motor 311. Thus, one cycle of execution of the present routine is terminated.

In the present embodiment, therefore, the amount of reduction of the brake cylinder is minimized when the booster 30 is defective. For instance, the brake cylinder pressure when the booster is defective can be increased to a level which is substantially the same level as when the booster is normal, so that the operating reliability of the braking system is improved.

Although the present embodiment is obtaining by applying to the first embodiment the characteristic feature that the brake cylinder pressure is determined also depending upon whether the booster 30 is defective or not, the characteristic feature may be equally applied to the preceding several embodiments and the following several embodiments.

It will be understood from the above explanation of the present embodiment that the case where the absolute value of the vacuum pressure $P_V$ in the booster 30 is smaller than the threshold value $P_{V0}$ corresponds to a case where the booster is not normally functioning to perform a boosting operation", and that the vacuum pressure sensor 200 and a portion of the ECU 210 assigned to implement S303–S305 of FIG. 21 correspond to "post-boosting-abnormality control means". It will also be understood that a portion of the ECU 210 assigned to implement S303–S305 and S308–S310 provides a post-booster-defect magnetic force control device"for controlling the magnetic force generated by the pressure control valve 22 so as to avoid reduction of the brake cylinder pressure due to abnormality of the boosting function of the booster 30.

Then, a sixth embodiment of this invention will be described.

Figure 10:
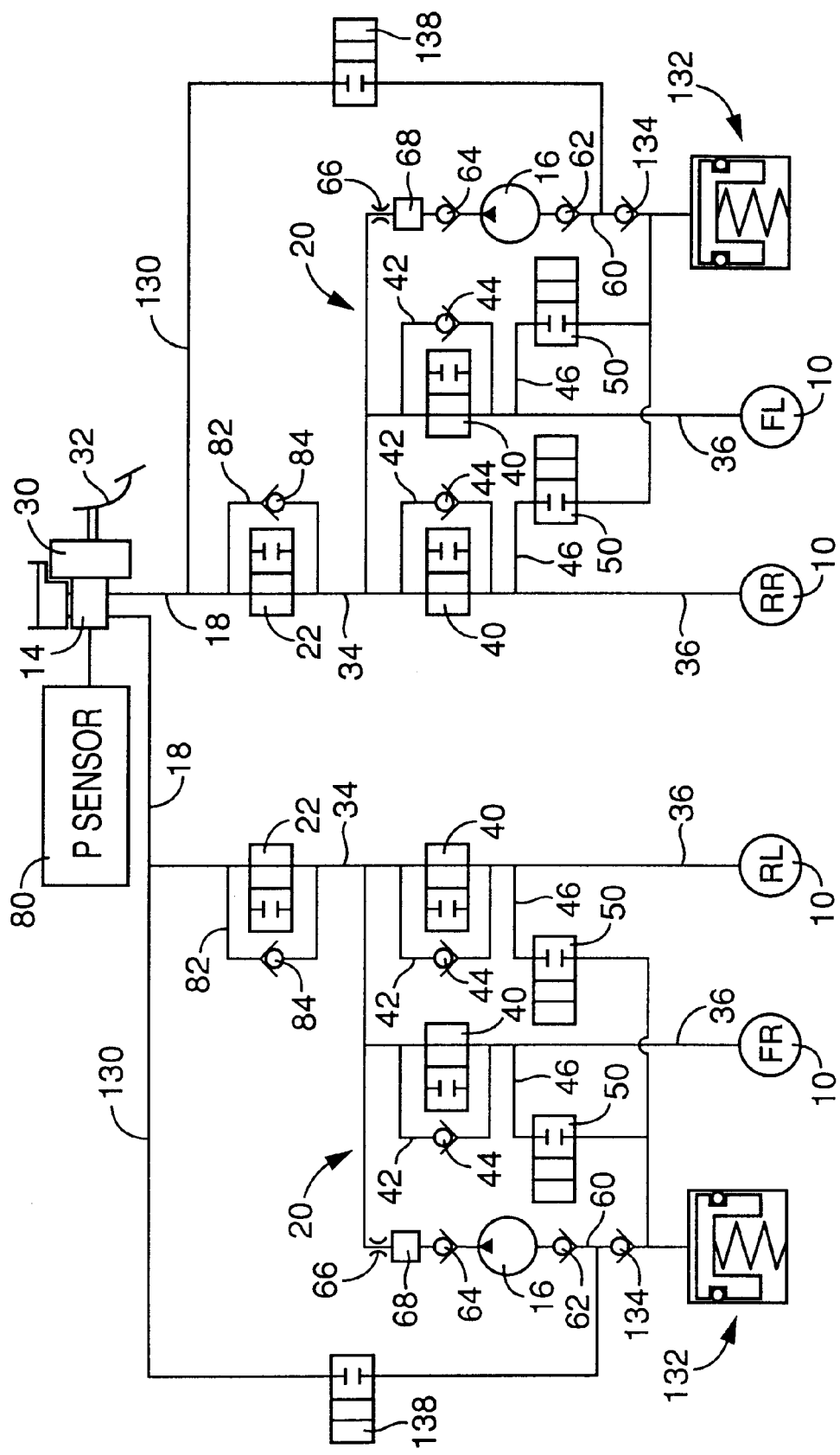
FIG. 10 is a schematic view showing an anti-lock type braking system of a second embodiment of this invention.
Figure 23:
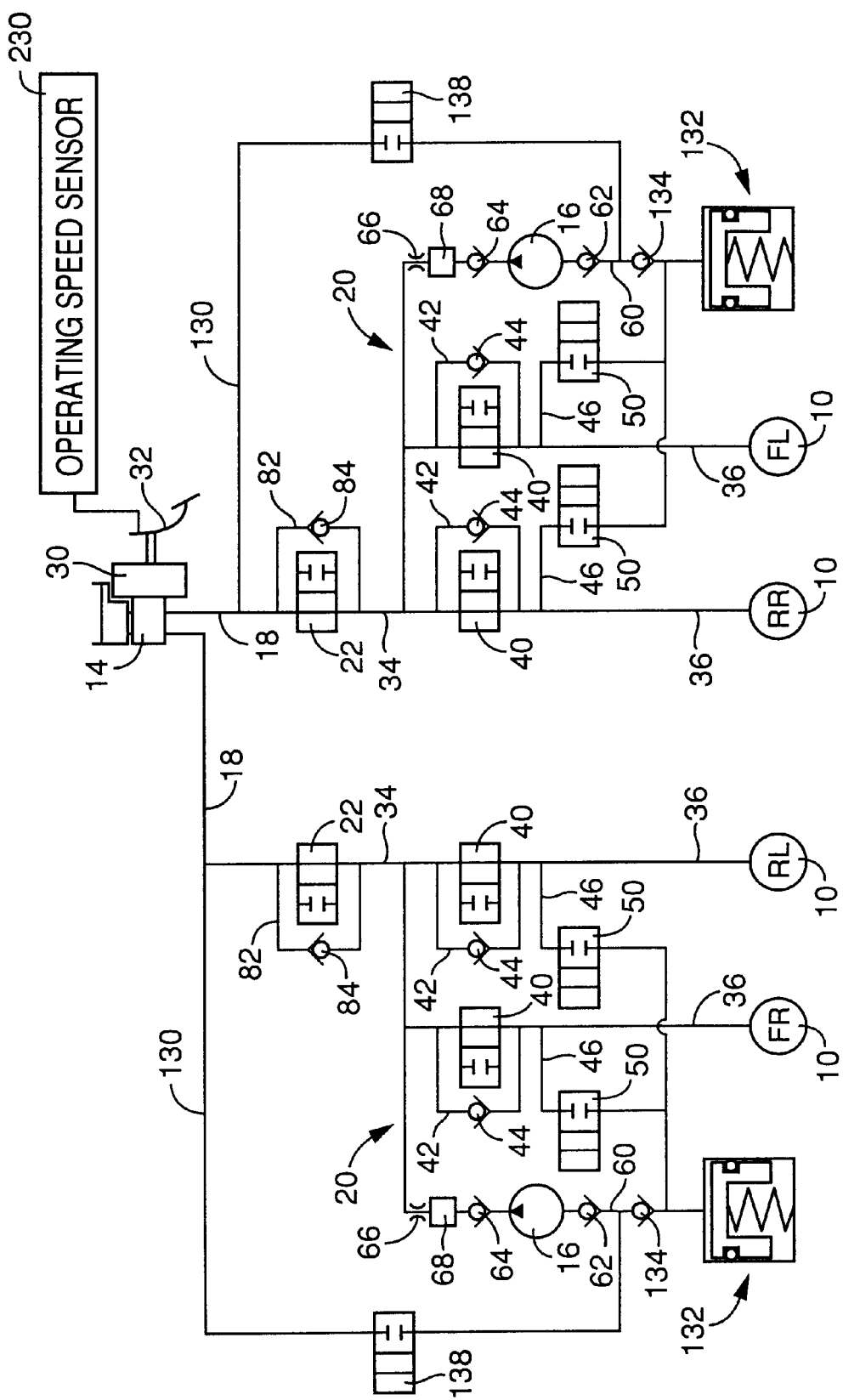
FIG. 23 is a schematic view showing an anti-lock type braking system of a sixth embodiment of this invention.

FIG. 23 shows a mechanical arrangement of the present embodiment. The present embodiment is basically identical in the mechanical arrangement with the second embodiment of FIG. 10, except in that while the second embodiment is adapted to effect the braking effect characteristic control for increasing the brake cylinder pressure by utilizing the pump 16, the present embodiment is adapted to increase the brake cylinder pressure by a BA control. The "BA control" is effected during emergency brake application, so as to avoid a failure of the braking system to provide a required deceleration value of the vehicle body due to insufficiency of the operator's brake operating force F. In the BA control, the brake cylinder pressure for a given value of the brake operating force F is increased to increase the vehicle body deceleration G, by compensating the basic relationship between the braking force F and the vehicle body deceleration G, as indicated in FIG. 42.

Figure 24:
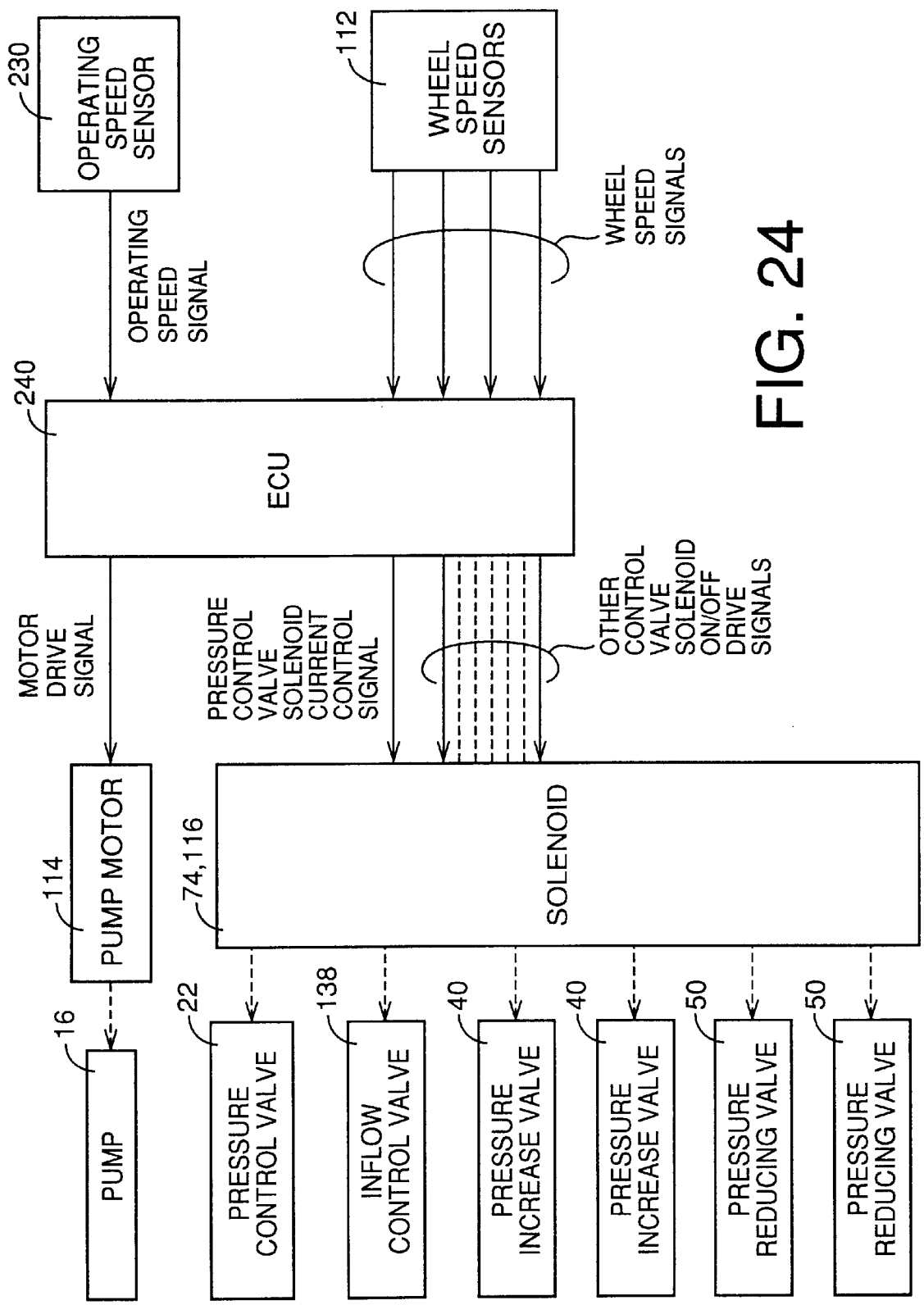
FIG. 24 is a block diagram showing an electrical arrangement of the sixth embodiment.

To this end, the present embodiment is provided with brake operating state detecting means in the form of an operating speed sensor 230 for detecting the operating state of the brake pedal 32 which functions as the brake operating member, as indicated in FIGS. 23 and 24. The operating speed sensor 230 detects the operating speed and applies to an ECU 240 an operating speed signal indicative of the detected operating speed. For example, the operating speed sensor 230 includes a sensor for detecting the operating position of the brake pedal 32, and an arithmetic circuit for calculating, as the operating speed of the brake pedal 32, a rate at which the operating position is changed.

Figure 25:
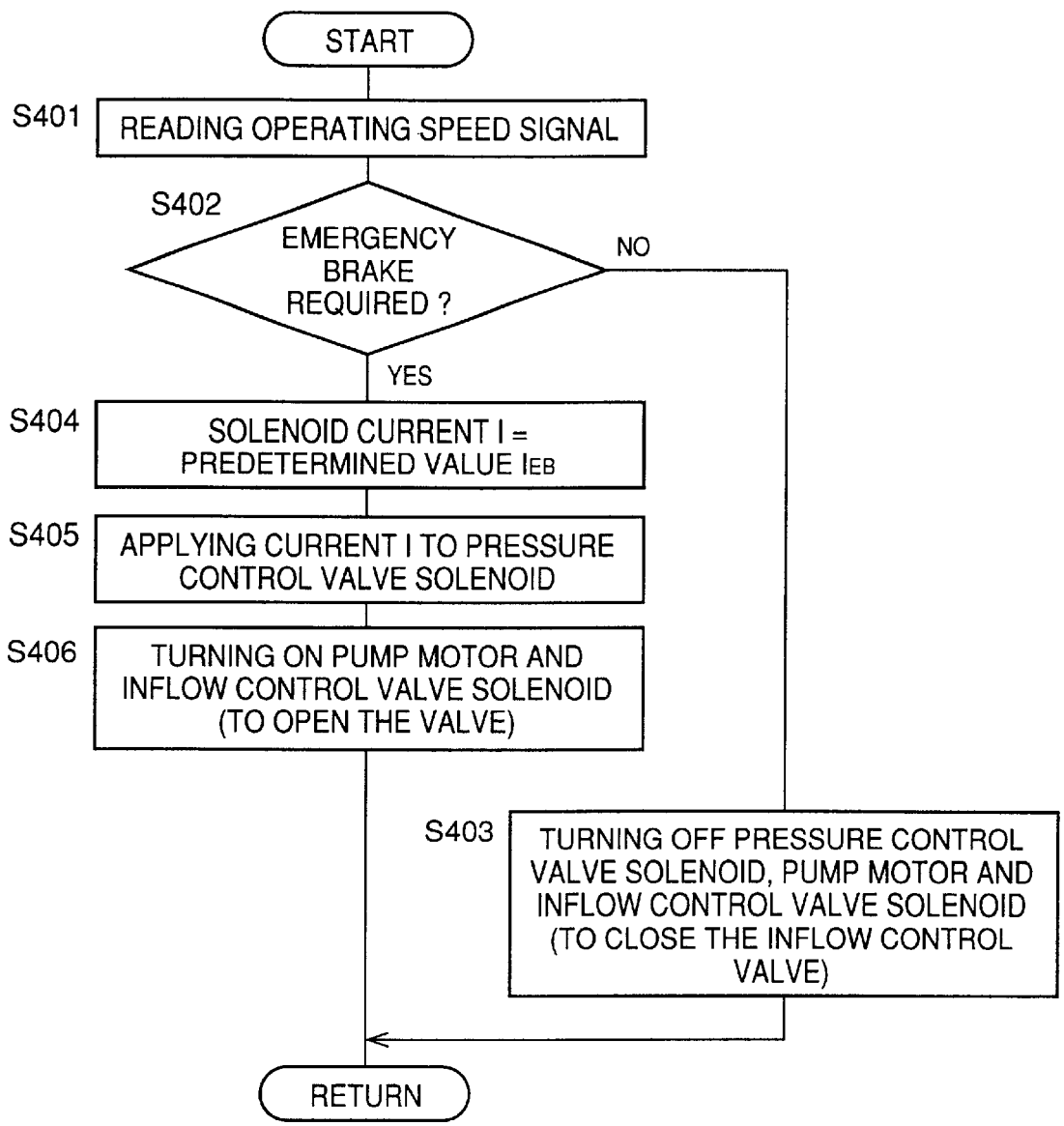
FIG. 25 is a flow chart showing a BA characteristic control routine executed by a computer of an ECU in FIG. 24.

To effect the BA control in the present embodiment, a ROM of a computer of the ECU 240 stores a BA control routine illustrated in the flow chart of FIG. 25.

The present routine is initiated with S401 to read the operating speed signal received from the operating speed sensor 230. Then, S402 is implemented to determine whether the vehicle operator has required application of an emergency brake. This determination is made on the basis of the operating speed represented by the operating speed signal. For instance, the operation for emergency brake application is detected when the operating speed is higher than a predetermined threshold. If the operation for emergency brake application is not detected, a negative decision (NO) is obtained, and the control flow goes to S403 to generate a signal for turning off the solenoid 74 of the pressure control valve 22, a signal for turning off the pump motor 114, and a signal for turning off the solenoid 116 of the inflow control valve 138 to close this valve. Thus, one cycle of execution of the present routine is terminated.

If the operation for emergency brake application is detected, an affirmative decision (YES) is obtained in S402, and the control flow goes to S404 in which the electric current to be applied to the solenoid 74 of the pressure control valve 22 is set to a predetermined current value $I_{EB}$ which is suitable for applying an emergency brake to the vehicle. For example, the predetermined current value $I_{EB}$ is determined such that the fluid pressure in the brake cylinder 10 as a result of the BA control is as high as to initiate an anti-lock brake pressure control operation. Further, the current value $I_{EB}$ is determined such that a pressure difference arises between the brake cylinder 10 and the master cylinder 14. Then, S405 is implemented to apply the electric current I to the solenoid 74 of the pressure control valve 22. Successively, the control flow goes to S406 to generate a signal for turning on the pump motor 114, and a signal for turning on the solenoid 116 of the inflow control valve 138 to open this valve. As a result, the fluid pressure in the brake cylinder 10 is raised to a level higher than the master cylinder pressure, and the anti-lock brake pressure control operation is eventually initiated so as to stop the vehicle with a vehicle running distance as short as possible.

It is noted that the BA control in the present embodiment is applicable to the mechanical arrangements of the preceding second through fifth embodiments and mechanical arrangements of the following several embodiments. Further, the feature of the BA control may be provided, together with the feature of the braking effect characteristic control in the first through fifth embodiments and the following several embodiments. In the latter case, the braking effect characteristic control is selected and effected when the operator's brake operation does not require an emergency brake application, while the BA control is selected and effected when the operator's brake application requires an emergency brake application.

It will be understood from the above explanation of the present embodiment that the vehicle operator operation of the brake pedal 32 at a speed higher than the predetermined value corresponds to a "state in which the brake operating member is operated by the vehicle operator, so as to apply an emergency brake to the vehicle". It will also be understood that the operating speed sensor 230 and a portion of the ECU 240 assigned to implement steps S401–S403 and S406 of FIG. 25 correspond to "post-emergency-brake-operation control means", while a portion of the ECU 240 assigned to implement steps S401, S402, S404 and S405 provides a "post-emergency-brake-operation magnetic force control device" for effecting the BA control during emergency brake application so as to compensate for insufficiency of the brake operating force F.

Thee will next be described a seventh embodiment of this invention.

Figure 26:
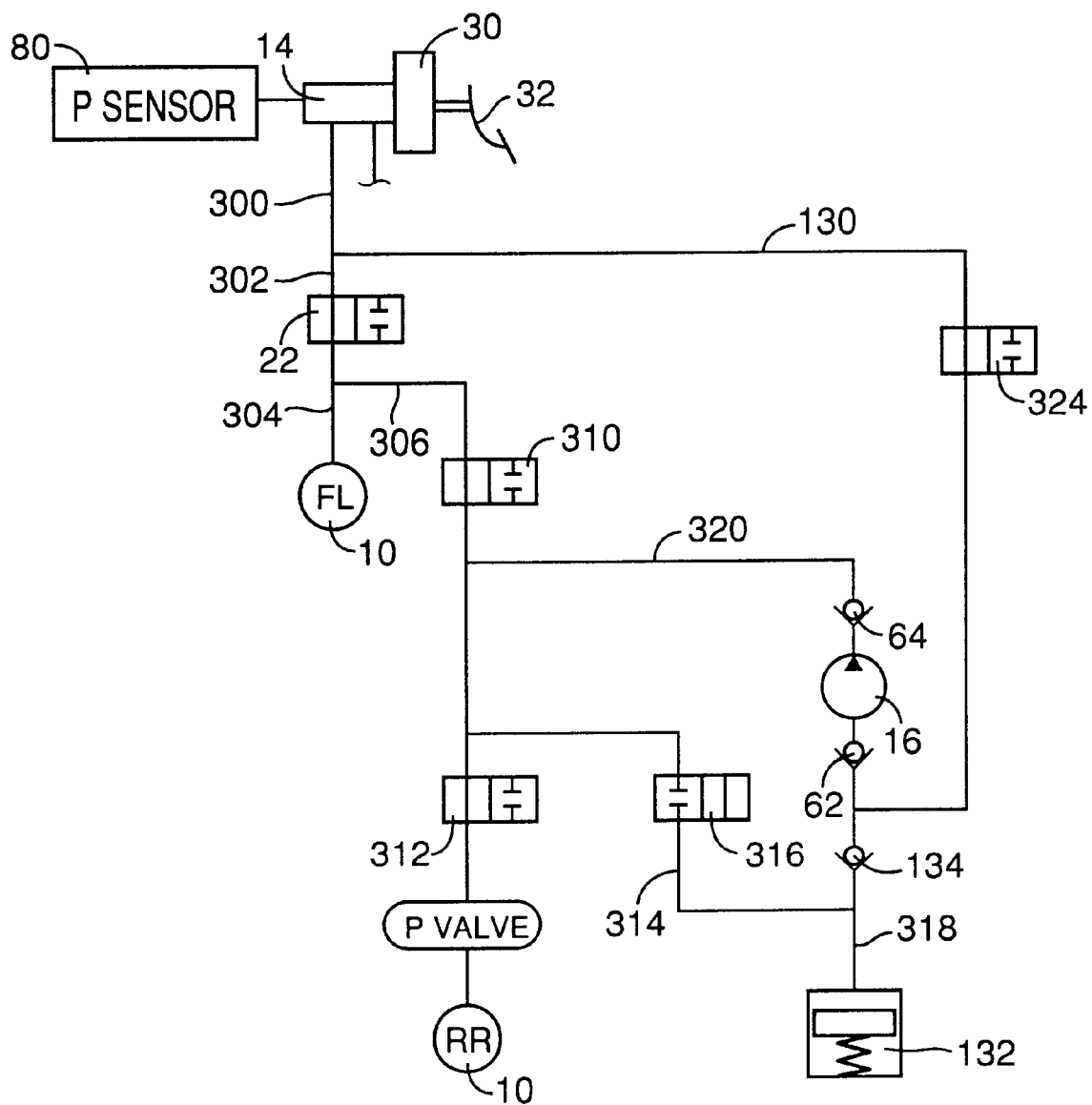
FIG. 26 is a schematic view showing an anti-lock type braking system of a seventh embodiment of this invention.

FIG. 26 shows a mechanical arrangement of this embodiment. The present embodiment is identical with all of the preceding embodiments in that all of these embodiments are anti-lock type diagonal braking systems each having two braking sub-systems. However, the present embodiment is different from the preceding embodiments, in hydraulic circuit arrangement and control valve arrangement. The same reference signs as used in the preceding embodiments will be used in the present embodiment to identify the same elements, and detailed description of these elements will not be provided. Only the elements specific to the present embodiment will be described in detail.

One of the two braking sub-systems of the present braking system will be described by way of example. One of the pressurizing chambers of the master cylinder 14 is connected through a primary fluid passage 300 to the brake cylinder 10 for the front left wheel FL and the brake cylinder 10 for the rear right wheel RR. The primary fluid passage 300 consists of a single main passage 302 and two branch passages 304, 306 connected to the main passage 302. The brake cylinder 10 for the front left wheel FL is connected to the end of the branch passage 304, while the brake cylinder 10 for the rear right wheel RR is connected to the end of the other branch passage 306. In the main passage 302, there is provided the same pressure control valve 22 as provided in the first, second, fifth and sixth embodiments. The pressure control valve 22 is electromagnetically controlled to control the relationship between the master cylinder pressure and the brake cylinder pressure.

In the branch passage 307, there are provided a first solenoid-operated valve 310 and a second solenoid-operated valve in the order of description. These solenoid-operated valves 310, 312 are both normally-open solenoid-operated shut-off valves. A reservoir passage 314 is connected to a portion of the branch passage 306 between the first and second solenoid-operated valves 310, 312. To the end of the reservoir passage 314, there is connected the same reservoir 132 as provided in the second embodiment. In the reservoir passage 314, there is provided a third solenoid-operated valve 316. This third solenoid-operated valve 316 is a normally-closed solenoid-operated shut-off valve.

The reservoir 132 is connected through a pump passage 318 to the suction side of the pump 16, and the delivery side of the pump 16 is connected through an auxiliary passage 320 to a portion of the branch passage 306 between the first solenoid-operated valve 310 and a point of connection of the branch passage 306 to the reservoir passage 314. The pump 16 is provided with the suction valve 62 and the delivery valve 64.

As in the second and fourth embodiments, the fluid supply passage 130 is provided to connect a portion of the main passage 302 between the master cylinder 14 and the pressure control valve 22, to a portion of the pump passage 318 between the suction valve 62 and the reservoir 132. As in the second and fourth embodiments, the check valve 134 is provided in a portion of the pump passage 318 between its points of connection to the auxiliary passage 130 and the reservoir passage 314. The check valve 134 inhibits a flow of the fluid from the master cylinder 14 toward the reservoir 132. Thus, the present embodiment is also adapted to supply the fluid from the master cylinder 14 directly to the suction side of the pump 16, without the fluid being once stored in the reservoir 132.

In the fluid supply passage 130, there is provided an inflow control valve 324. As in the second and fourth embodiments, this inflow control valve 324 is electromagnetically controlled. Unlike the inflow control valve in those embodiments, the inflow control valve 324 is normally open. The inflow control valve 324 is designed to be normally open for the following reason: That is, the inflow control valve 138 in the second embodiment is normally closed, and is held open only while the braking effect characteristic control is effected. During operation of the braking system, only the primary passage 18 is always available for supplying the working fluid from the master cylinder 14 to the brake cylinder 10. The pressure control valve 22 provided in this primary passage 18 may possibly be closed by the fluid force acting on the movable member in the form of the valve member 70 upon depression of the brake pedal 32. To permit a flow of the fluid from the master cylinder 14 to the brake cylinder 10 even in the event of closure of the pressure control valve 22, the passage 82 provided with the check valve 84 is provided to by-pass the pressure control valve 22. On the other hand, the inflow control valve 324 which is normally open permits the fluid to be delivered from the master cylinder 14 to the two brake cylinders 10 through the fluid supply passage 130, inflow control valve 324, pump 16, auxiliary passage 320, and portions of the branch passages 306, 304, during operation of the braking system, even in the event of closure of the pressure control valve 22, and irrespective of whether the braking effect characteristic control is effected or not. The normally open inflow control valve 324 eliminates the provision of a passage which by-passes the pressure control valve 22 and which is provided with a check valve. Thus, the present embodiment which uses the same pressure control valve 22 as used in the second embodiment employs the normally-open inflow control valve 324, in order to eliminate the passage which by-passes the pressure control valve 22 and which is provided with a check valve.

While all of the preceding embodiments include the pressure increasing valve 40 and the pressure reducing valve 50 for each of the two brake cylinders 10 in the same braking sub-system, the present embodiment employs a control valve arrangement which is different from those of the preceding embodiments, for reducing the number of control valves. That is, the first, second and third solenoid-operated valves 310, 312, 316 are provided for controlling the fluid pressures in the two brake cylinders 10.

Described in detail, the fluid pressure in the brake cylinder 10 for the front left wheel FL is increased by opening the first solenoid-operated valve 310 and closing both of the second and third solenoid-operated valves 312 and 316, held at the same level by closing the first solenoid-operated valve 310, and reduced by opening both of the first and third solenoid-operated valves 310 and 316 and closing the second solenoid-operated valve 312. On the other hand, the fluid pressure in the brake cylinder 10 for the rear right wheel RR is increased by opening the second solenoid-operated valve 312 and closing the third solenoid-operated valve 316, held at the same level by closing the second solenoid-operated valve 312, and reduced by opening both of the second and third solenoid-operated valves 312 and 316. In the present embodiment, when the fluid pressure in the brake cylinder 10 for the front left wheel FL is required to be reduced, the fluid pressure in that brake cylinder 10 can be reduced alone, by closing the second solenoid-operated valve 312. When the fluid pressure in the brake cylinder 10 for the rear right wheel RR is required to be reduced, the fluid pressure in that brake cylinder 10 can be reduced along, by closing the first solenoid-operated valve 310. Thus, although the present embodiment uses the same reservoir passage 314 for the brake cylinders 10 for the front left wheel FL and rear right wheel RR, the fluid pressure in each of the brake cylinders 10 can be reduced alone.

It is also noted that all of the preceding embodiments are adapted such that while the braking effect characteristic control is not effected during anti-lock brake pressure control operation, the pressure control valve 22, 150 is in a state permitting a flow of the fluid from the master cylinder 14 toward the brake cylinders 10, the fluid cannot be delivered from the pump 16 unless the delivery pressure of the pump 16 is higher than the master cylinder pressure. In the present embodiment, on the other hand, the pressure control valve 22 inhibits a flow of the fluid from the master cylinder 14 toward the brake cylinder 10 during an anti-lock brake pressure control operation, so that the fluid can be delivered from the pump 16 even when the delivery pressure is not higher than the master cylinder pressure. Therefore, the present embodiment is adapted to control the electric current for energizing the solenoid 74 of the pressure control valve 22 for the valve member 70 to be seated on the valve seat 72, even while the braking effect characteristic control is not effected during the anti-lock brake pressure control operation.

Figure 27:
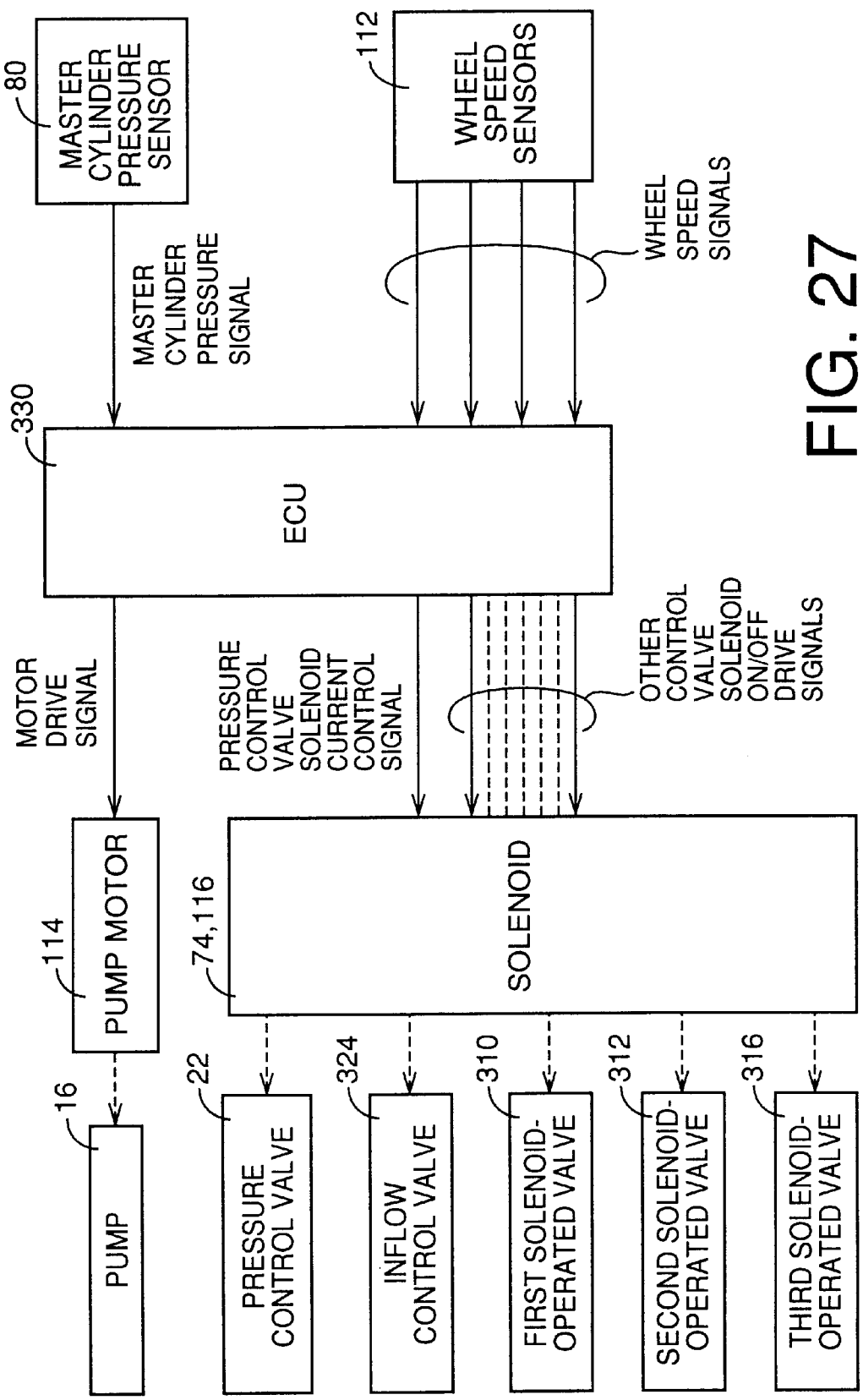
FIG. 27 is a block diagram showing an electrical arrangement of the seventh embodiment.

FIG. 27 shows an electrical arrangement of the present embodiment.

While the second embodiment requires six solenoid-operated valves for each braking sub-system in order to effect both the anti-lock brake pressure control operation and the braking effect characteristic control, five solenoid-operated valves are sufficient in the present embodiment. Further, the fluid pressures in the two brake cylinders 10 in each braking sub-system can be increased, held and reduced independently of each other. Thus, the present embodiment is capable of mutually independently controlling the fluid pressures in the brake cylinders, with the smaller number of solenoid-operated valves.

A routine for controlling the pressure control valve 22 and the inflow control valve 324 of the five solenoid-operated valves which have been described is stored in a ROM of an ECU 330. This routine is illustrated in the flow chart of FIG. 28. The pressure control valve 22 is not only involved in the braking effect characteristic control, but also required to perform a function of disconnecting the brake cylinder 10 from the master cylinder 14 during an anti-lock brake pressure control operation. Accordingly, the present routine includes a portion for controlling the pressure control valve 22 during the anti-lock brake pressure control operation, as well as a portion relating to the braking effect characteristic control. The routine further includes a portion for controlling the pump motor 114 during the anti-lock brake pressure control operation. While the content of the present routine will be described, the same steps as in the second embodiment will be described only briefly.

To begin with, there will be described an operation of the sub-system where neither the braking effect characteristic control nor the anti-lock brake pressure control operation is performed.

In this case, S501 is initially implemented to read the master cylinder pressure signal received from the master cylinder pressure sensor 80. Then, S502 is implemented to determine whether the master cylinder pressure $P_M$ represented by the master cylinder pressure signal is higher than the reference value $P_{M0}$. Since it is assumed that the braking effect characteristic control is not effected with the master cylinder pressure $P_M$ being not higher than the reference value $P_{M0}$ in the present control cycle, a negative decision (NO) is obtained, and the control flow goes to S503 to determine whether an anti-lock brake pressure control operation is performed. Since it is assumed that the anti-lock brake pressure control operation is not performed in this control cycle, a negative decision (NO) is obtained, and the control flow goes to S504 to generate a signal for de-energizing the solenoid of the inflow control valve 324 (for opening the valve 324), and a signal for turning off the pump motor 114. Thus, one cycle of execution of the present routine is terminated.

There will next be described an operation where the braking effect characteristic control is effected without an anti-lock brake pressure control operation.

In this case, an affirmative decision (YES) is obtained in S502, and the control flow goes to S505 to calculate the desired pressure difference ΔP between the master cylinder pressure $P_M$ and the brake cylinder pressure $P_B$. Then, S506 is implemented to calculate the desired solenoid electric current I depending upon the desired pressure difference ΔP. Successively, the control flow goes to S507 to control the electric current to be applied to the solenoid 74 of the pressure control valve 22, on the basis of the desired solenoid electric current I. The, S508 is implemented to turn on the pump motor 114. Successively, S509 is implemented to determine whether an anti-lock brake pressure control operation is performed. Since it is assumed that the anti-lock brake pressure control is not effected in this control cycle, a negative decision (NO) is obtained, and the control flow goes to S510 to generate a signal for de-energizing the solenoid of the inflow control valve 324, that is, a signal for opening the inflow control valve 324. Thus, one cycle of execution of the present routine is terminated.

There will next be described an operation where the braking effect characteristic control and the anti-lock brake pressure control are both effected.

In this case, the affirmative decision (YES) is obtained in S502, and S505–S509 are implemented as in the above case. Since it is assumed that the anti-lock brake pressure control is effected in this control cycle, an affirmative decision (YES) is obtained in S508, and the control flow goes to S511 to estimate the amount of the fluid which is present in the reservoir 132 and which can be pumped up by the pump 16. Then, S512 is implemented to determine whether the estimated amount of the reservoir fluid is zero. If the amount of the reservoir fluid is not zero, a negative decision (NO) is obtained, and the control flow goes to S513 to generate a signal for energizing the solenoid of the inflow control valve 324, that is, a signal for closing the inflow control valve 324. If the amount of the reservoir fluid is zero, an affirmative decision (YES) is obtained in S512, and the control flow goes to S510 to generate the signal for de-energizing the solenoid of the inflow control valve 324, that is, the signal for opening the inflow control valve 324. In either case, one cycle of execution of the present routine is terminated.

It is noted that where both the braking effect characteristic control and the anti-lock brake pressure control are effected, the anti-lock brake pressure control is effected while the valve member 70 of the pressure control valve 22 is seated on the valve seat 72, so that the fluid can be delivered from the pump 16 even when the delivery pressure is lower than the master cylinder pressure.

Then, an operation where the anti-lock brake pressure control is effected without the braking effect characteristic control will be described.

In this case, the negative decision (NO) is obtained in S502, while an affirmative decision (YES) is obtained in S503, and the control flow goes to S514 to generate a signal for turning on the pump motor 114. The pump motor 114 is turned on to increase the fluid pressure in each brake cylinder 10 by operation of the pump 16 during the anti-lock brake pressure control operation. Then, S515 is implemented to determine whether a predetermined time has elapsed after the initiation of the anti-lock brake pressure control operation. If the predetermined time has not elapsed, a negative decision (NO) is obtained, and the control flow goes to S516 to apply the maximum electric current $I_{MAX}$ to the solenoid 74 of the pressure control valve 22, so that the valve member 70 is rapidly seated onto the valve seat 72. If the predetermined time has elapsed after the, initiation of the anti-lock brake pressure control operation, an affirmative decision (YES) is obtained in S515, and the control flow goes to S517 to zero the electric current to be applied to the pressure control valve 22.

Immediately after the initiation of the anti-lock brake pressure control operation, the fluid pressure difference between the master cylinder side and the brake cylinder side of the valve member 70 of the pressure control valve 22 is substantially zero, so that the solenoid 74 is required to be energized with a large amount of electric current, for rapidly seating the valve member 70 onto the valve seat 72. Once the fluid pressure in the brake cylinder 10 has been reduced after the initiation of the anti-lock brake pressure control operation, the fluid pressure on the master cylinder side of the valve member 70 of the pressure control valve 22 becomes higher than that on the brake cylinder side of the valve member 70, so that the valve member 70 remains seated on the valve seat 70 without a magnetic force generated by the solenoid 74. That is, the valve member 70 remains seated on the valve seat 72 based on the difference between the fluid pressures in the master cylinder 14 and the brake cylinder 10. Accordingly, the present embodiment is adapted not to hold the solenoid 74 of the pressure control valve 22 in the energized state throughout the anti-lock brake pressure control operation, but to energize the solenoid 74 as long as the energization is required, so that the amount of consumption of the electric power is saved. When the difference between the master cylinder pressure and the brake cylinder pressure becomes unable to overcome the elastic force $F_3$ of the spring 76 due to reduction in the amount of depression of the brake pedal 32 during the anti-lock brake pressure control operation, the valve member 70 is unseated from the valve seat 72, and the fluid pressure in the brake cylinder 10 is reduced by the master cylinder 14.

In either case, S511 and the following steps are subsequently implemented, so that the inflow control valve 324 is opened only where the reservoir 132 does not store the fluid that can be pumped up by the pump 16.

It is noted that the present embodiment advantageously permit the use of the pump 16 and pump motor 114 having reduced capacities, since the fluid can be supplied from the master cylinder 14 directly to the suction side of the pump 16 without the fluid being once accommodated in the reservoir 132, during the braking effect characteristic control, and since the pump 16 and the master cylinder 14 are disconnected from each other during the anti-lock brake pressure control operation so that the delivery pressure of the pump 16 need not be higher than the master cylinder pressure when the fluid is returned by the pump 16 to the primary passage 300.

It is also noted that although all of the embodiments which have been described are adapted to effect the braking effect characteristic control or BA control in the presence of the booster, the braking effect characteristic control or the BA control can be effected in the absence of the booster.

Figure 28:
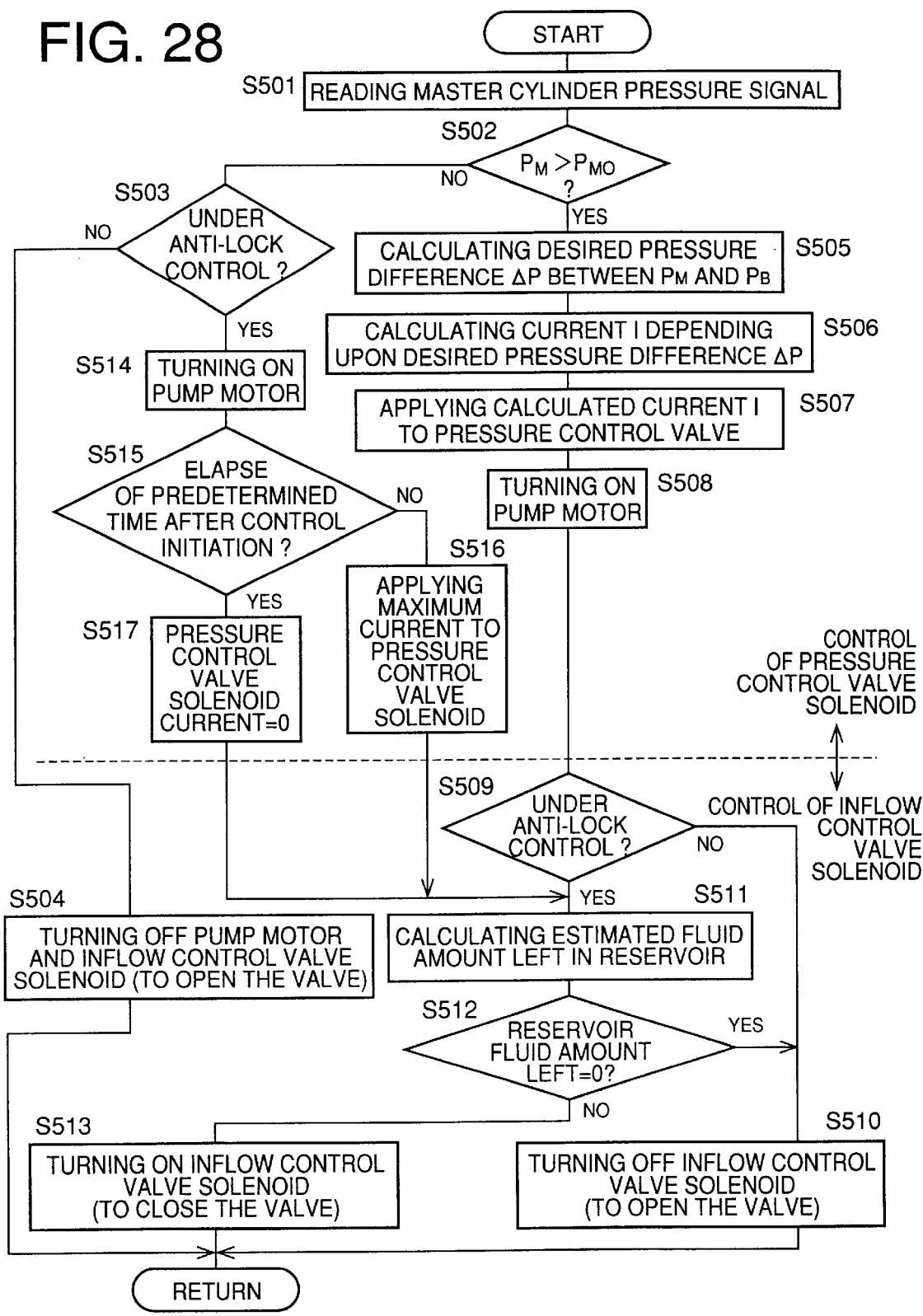
FIG. 28 is a flow chart showing a braking effect characteristic control routine executed by a computer of an ECU in FIG. 27.

It will be understood from the above explanation of the present embodiment that the first through third solenoid-operated valves 310, 312, 316 correspond to an "electromagnetic fluid pressure control device", and that the first through third solenoid-operated valves 310, 312, 316, the reservoir 132 and a portion of the ECU 330 assigned to effect the anti-lock brake pressure control correspond to an "automatic fluid pressure control device", while a portion of the ECU 330 assigned to implement steps S503 through S517 of FIG. 28 corresponds to an "automatic magnetic force control device".

Then, there will be described an eighth embodiment of this invention.

Figure 29:
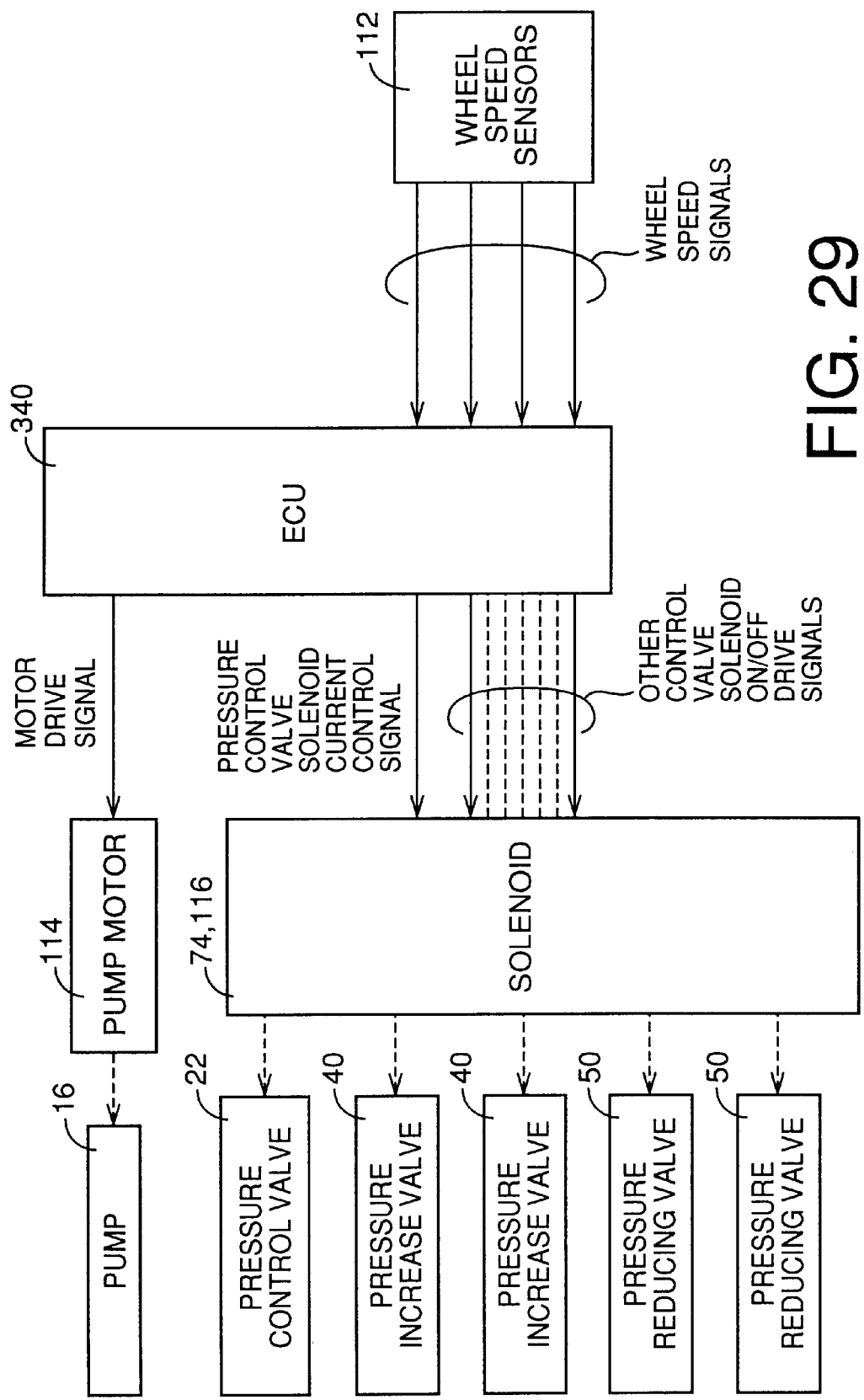
FIG. 29 is a block diagram showing an electrical arrangement of an anti-lock type braking system of an eighth embodiment of this invention.

FIG. 29 shows an electrical arrangement of the present embodiment. The present embodiment is identical in the mechanical arrangement with the first embodiment, but is different therefrom in the electrical arrangement.

As shown in the figure, the present embodiment is not provided with the master cylinder pressure sensor 80, unlike the first embodiment. A ROM of a computer of an ECU 340 stores a braking effect characteristic control routine illustrated in the flow chart of FIG. 30. The braking effect characteristic control according to this routine is to control the pump 16 in relation to the vehicle body deceleration value G as a brake-operating-force-related quantity.

Figure 31:
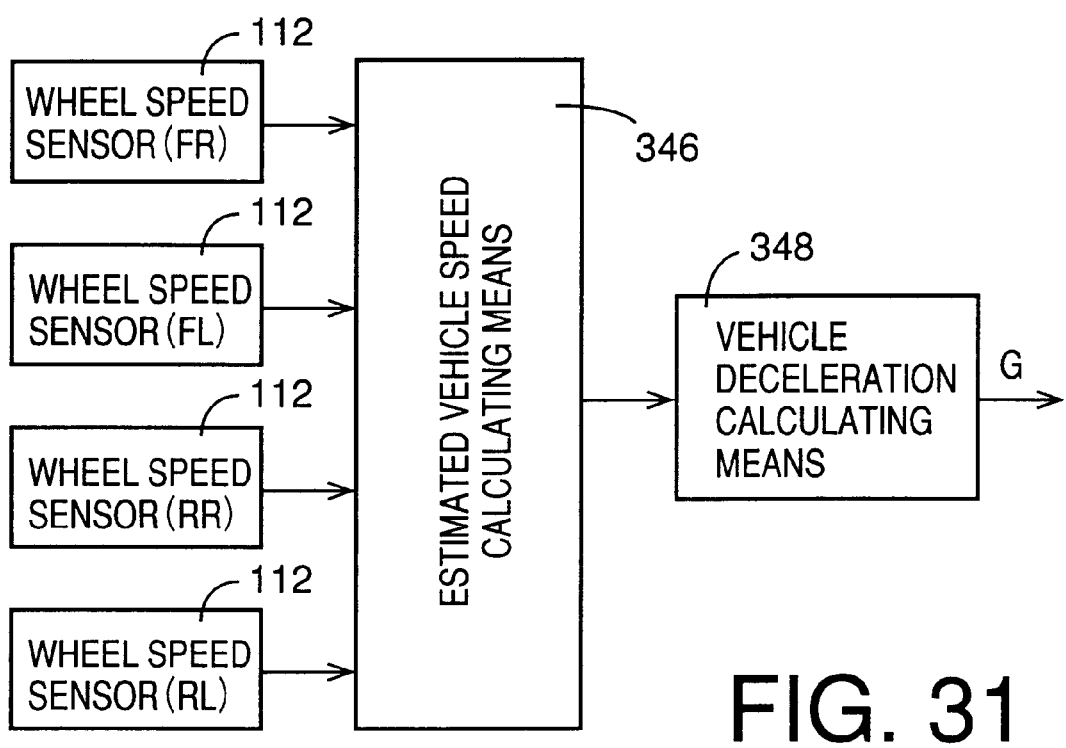
FIG. 31 is a block diagram for explaining a principle of detecting vehicle deceleration in the above-indicated eighth embodiment.

Described in detail, S551 is initially implemented to calculate the vehicle body deceleration value G. In the present embodiment, an estimated vehicle speed is calculated on the basis of the rotating speed of each wheel detected by the wheel speed sensors 112 during execution of the anti-lock brake pressure control routine. In S551, the vehicle body deceleration value G is calculated as a time derivative of that estimated vehicle speed. FIG. 31 is a functional block diagram showing a process in which the wheel speeds are first detected and the vehicle body deceleration value G is eventually calculated. The output of the wheel speed sensor 112 for each wheel is connected to the input of estimated vehicle speed calculating means 346, and the output of this estimated vehicle speed calculating means 346 is connected to the input of vehicle deceleration calculating means 348. A portion of the ECU 340 assigned to implement S551 corresponds to the vehicle deceleration calculating means 348.

Then, S552 is implemented to determine whether the the boosting limit of the booster 30 has been reached, more specifically, whether the vehicle body deceleration value G has exceeded a reference value $G_0$ which is expected to be established when the booting limit of the booster 30 has been reached. If the vehicle body deceleration value G has not exceeded the reference value $G_0$ in this control cycle, a negative decision (NO) is obtained, and the control flow goes to S553 in which a processing to terminate the brake pressure increase control. Described in detail, a signal for de-energizing the solenoid 74 of the pressure control valve 30 is generated as in S3 of FIG. 5, and a signal for turning off the pump motor 114 is generated. If the vehicle body deceleration value G has exceeded the reference value $G_0$, an affirmative decision (YES) is obtained in S552, and the control flow goes to S554 to effect the brake pressure increase control. Described in detail, the desired pressure difference ΔP is calculated on the basis of the vehicle body deceleration value G (used as a value corresponding to the master cylinder pressure $P_M$), the solenoid electric current I is calculated on the basis of the desired pressure difference ΔP, the solenoid 74 of the pressure control valve 30 is de-energized, and the pump motor 114 is turned off, as in S4–S7 of FIG. 4. In either case, one cycle of execution of the present routine is terminated.

It will be understood from the above explanation of the present embodiment that the "brake-operating-force-related quantity sensor" is provided not as an exclusive hardware element, but is provided as a software element in the form of the vehicle deceleration calculating means 348. Further, a determination as to whether the brake pressure increase control is required or not is effected on the basis of the vehicle body deceleration value G.

Accordingly, the present embodiment wherein the pump 16 is controlled in relation to the brake operating force is advantageously capable of increasing the brake pressure while avoiding increase in the size and cost of manufacture of the braking system, without adding an exclusive sensor for detecting a quantity relating to the brake operating force.

Figure 30:
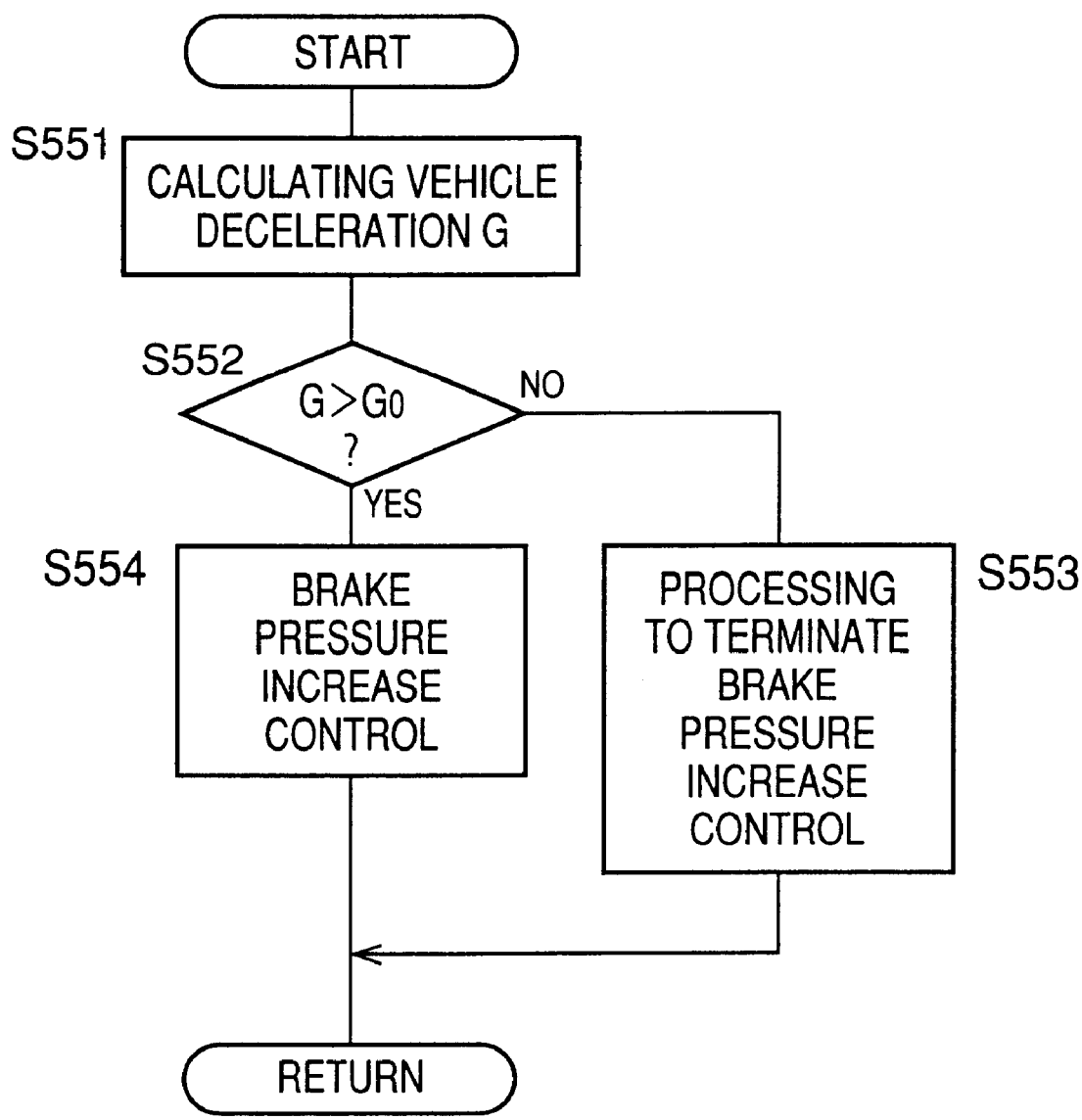
FIG. 30 is a flow chart showing a braking effect characteristic control routine executed by a computer of an ECU in FIG. 29.

It will be understood from the above explanation of the present embodiment that the vehicle deceleration calculating means 348 is an example of a "brake-operating-force-related quantity sensor", while a portion of the ECU 340 assigned to implement step S552 of FIG. 30 corresponds to a "hydraulic pressure source control device", "predetermined-operated-state control means", "post-boosting-limit control means" and "post-predetermined-value control value".

There will next be described a ninth embodiment of this invention.

Figure 32:
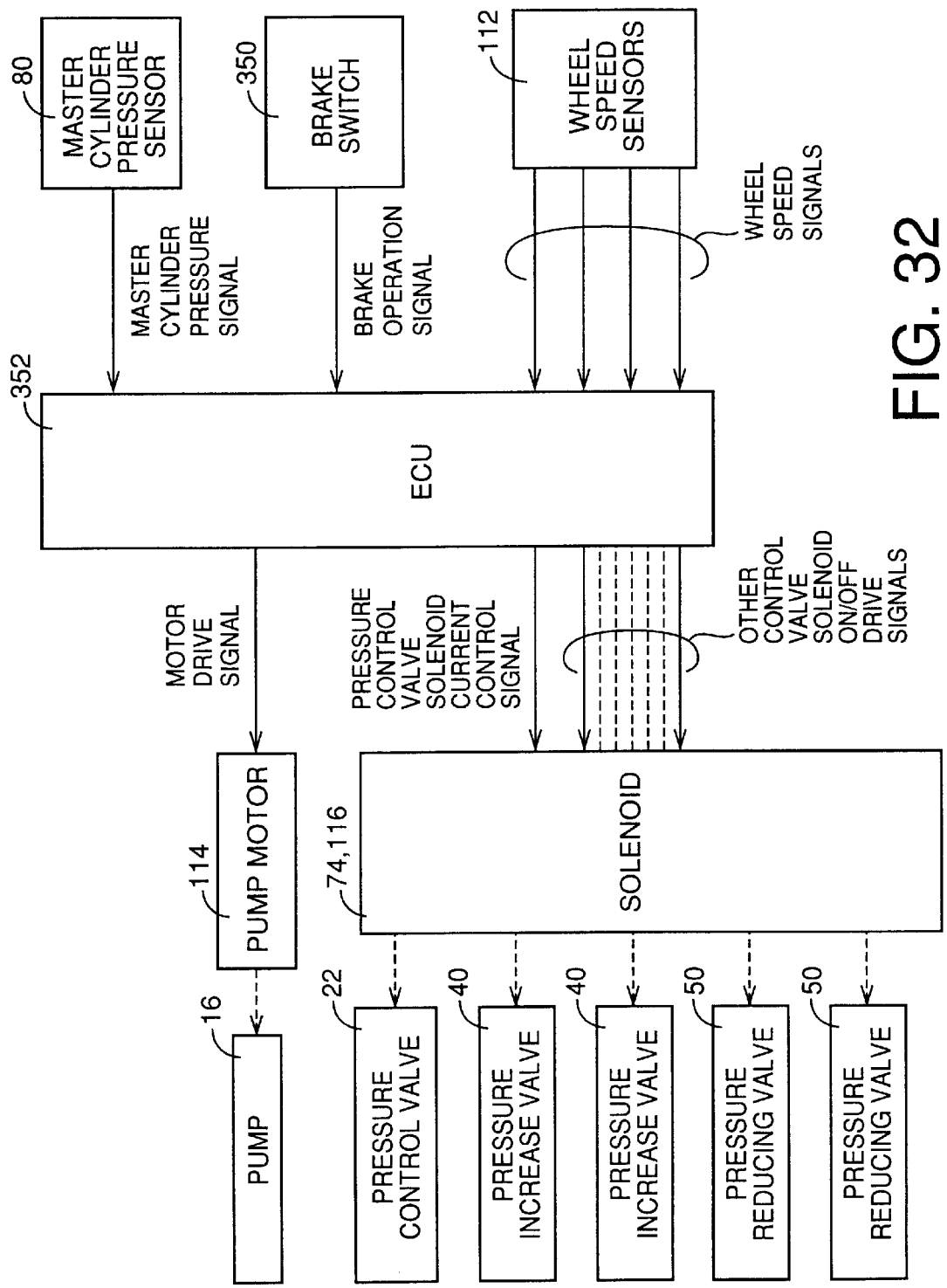
FIG. 32 is a block diagram showing an electrical arrangement of an anti-lock type braking system of a ninth embodiment of this invention.

FIG. 32 shows an electrical arrangement of the present embodiment. This embodiment is identical in the mechanical arrangement with the first embodiment, but is different therefrom in the electrical arrangement.

As shown in FIG. 32, the present embodiment is provided with a brake switch 350, unlike the first embodiment. The brake switch 350 detects an operation of the brake pedal 32, and generates a brake operating signal indicating whether the brake operating member has been operated. In the present embodiment, the brake operating signal is in an ON state when the brake operating member is in operation, and in an OFF state when the brake operating member is not in operation. That is, the brake switch 350 is an example of a "brake operation sensor", which is an example of a "brake-operating-force-related quantity sensor". A ROM of a computer of an ECU 352 stores a braking effect characteristic control routine illustrated in the flow chart of FIG. 38. The braking effect characteristic control executed according to this routine is to control the pump 16 in relation to the master cylinder pressure $P_M$, the operation or non-operation of the brake operating member and the vehicle body deceleration value G.

Described in detail, S601 is initially implemented to determine whether the master cylinder pressure sensor 80 is in a normal state. For example, this determination is made by determining whether the master cylinder pressure sensor 80 suffers from electrical disconnection or short-circuiting. If none of these defects is detected, the master cylinder pressure sensor 80 is determined to be normal. If the master cylinder pressure sensor 80 is normal in this control cycle, an affirmative decision (YES) is obtained, and the control flow goes to S602 to read the master cylinder pressure signal received from the master cylinder pressure sensor 80, and then S703 to determine whether the boosting limit of the booster 30 has been reached, more specifically, whether the master cylinder pressure $P_M$ represented by the master cylinder pressure signal has exceeded the reference value $P_{M0}$ which is expected to be established when the boosting limit of the booster 30 has been reached. If the master cylinder pressure $P_M$ has not exceeded the reference value $P_{M0}$ in this control cycle, a negative decision (NO) is obtained in S603, and the control flow goes to S604 in which a processing to terminate the brake pressure increase control is effected. If the master cylinder pressure $P_M$ has exceeded the reference value $P_{M0}$, an affirmative decision (YES) is obtained in S603, and the control flow goes to S605 to effect the brake pressure increase control. Described in detail, the desired pressure difference ΔP is calculated on the basis of the master cylinder pressure $P_M$, the solenoid electric current I is calculated, the solenoid 74 of the pressure control valve 30 is controlled, and the pump motor 114 is turned off, as in S4–S7 of FIG. 4. In either case, one cycle of execution of the present routine is terminated.

While the operation where the master cylinder pressure sensor 80 is in the normal state has been described, a negative decision (NO) is obtained in S601 if the master cylinder pressure sensor 80 is not in the normal state. In this case, S606 is implemented to calculate the vehicle body deceleration value G as in S551 of FIG. 30. Then, S607 is implemented to determine whether the brake switch 350 is on or not, that is, whether the brake operating member is in operation. If the brake switch 350 is not on in this control cycle, a negative decision (NO) is obtained, and the control flow goes to S608 in which the processing to terminate the brake pressure increase control is effected. If the brake switch 350 is on, on the other hand, an affirmative decision (YES) is obtained in S607, and the control flow goes to S609 to determine whether the vehicle body deceleration value G has exceeded the reference value $G_0$. In the present embodiment, the reference value $G_0$ is determined to be a vehicle body deceleration value G which is expected to be established when the boosting limit of the booster 30 has been reached. That is, the present embodiment is adapted such that S609 is functionally substituted for S703 in the event the master cylinder pressure sensor 80 is defective. If the vehicle deceleration value G has not exceeded the reference value $G_0$ in the present control cycle, a negative decision (NO) is obtained, and the control flow goes to S608 in which a processing to terminate the brake pressure control is effected. If vehicle deceleration value G has exceeded the reference value $G_0$ in the present control cycle, an affirmative decision (YES) is obtained, and the control flow goes to S610 to effect the brake pressure increase control. In either case, one cycle of execution of the present routine is terminated.

It will be understood from the above explanation of the present embodiment that the master cylinder pressure sensor 80 and the brake switch 350 are provided as the "brake-operating-force-related quantity sensor", and that the determination as to whether the brake pressure increase control is required is made on the basis of the master cylinder pressure $P_M$ where the master cylinder pressure sensor 80 is normal, and on the basis of both the operation or non-operation of the brake operating member and the vehicle body deceleration value G where the master cylinder pressure sensor 80 is defective.

Accordingly, the present embodiment is capable of accurately determination as to whether the brake pressure increase control is required, even when the master cylinder pressure sensor 80 is defective, and assures improved operating reliability of the braking system.

It will be understood from the above explanation of the present embodiment that a portion of the ECU 352 assigned to implement steps S601–S603, S606 and S609 corresponds to a "fail-safe means", while the vehicle deceleration calculating means 348 corresponds to a "vehicle deceleration sensor".

Then, a tenth embodiment of this invention will be described.

Figure 33:
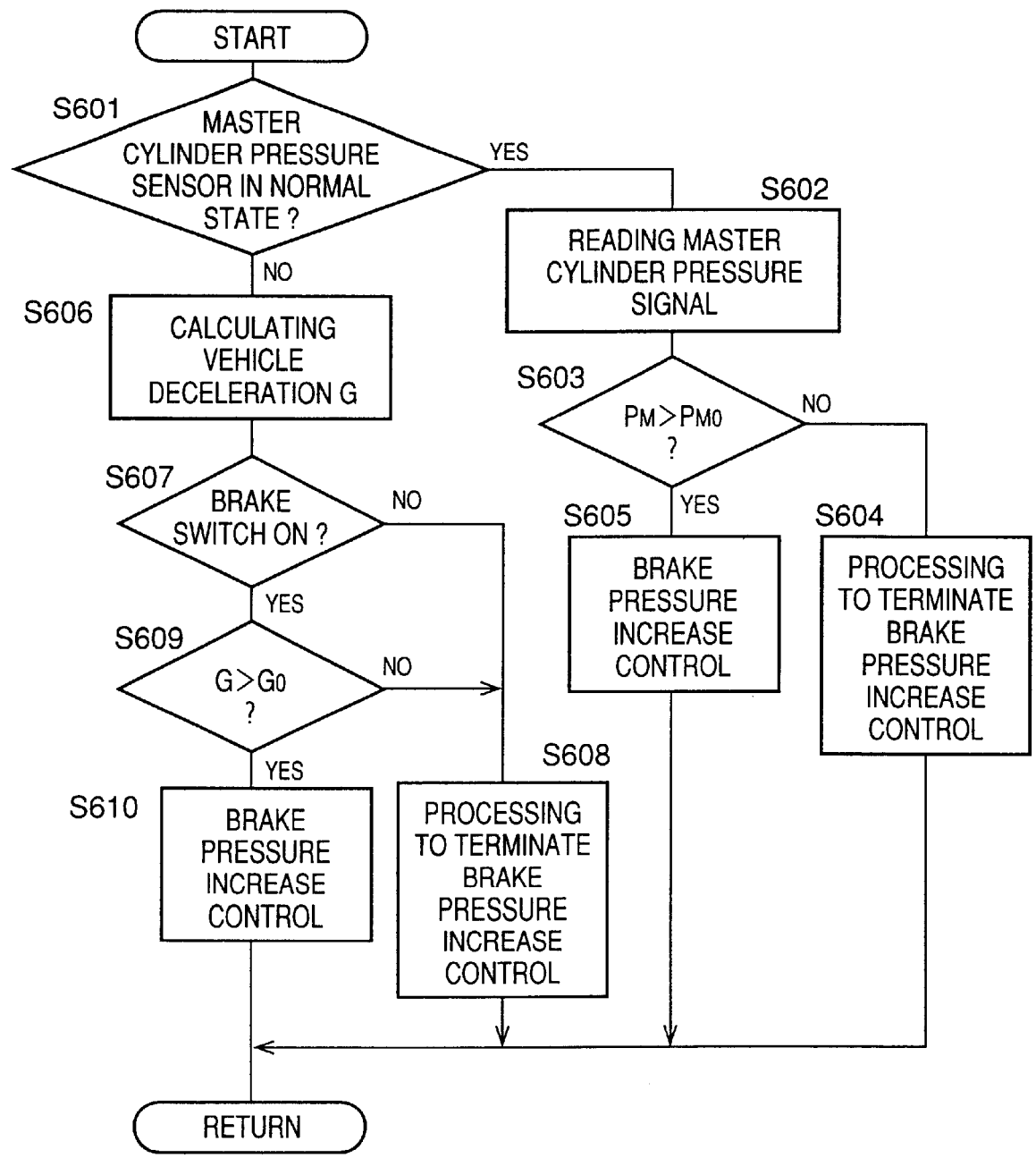
FIG. 33 is a flow chart showing a braking effect characteristic control routine executed by a computer of an ECU in FIG. 32.
Figure 34:
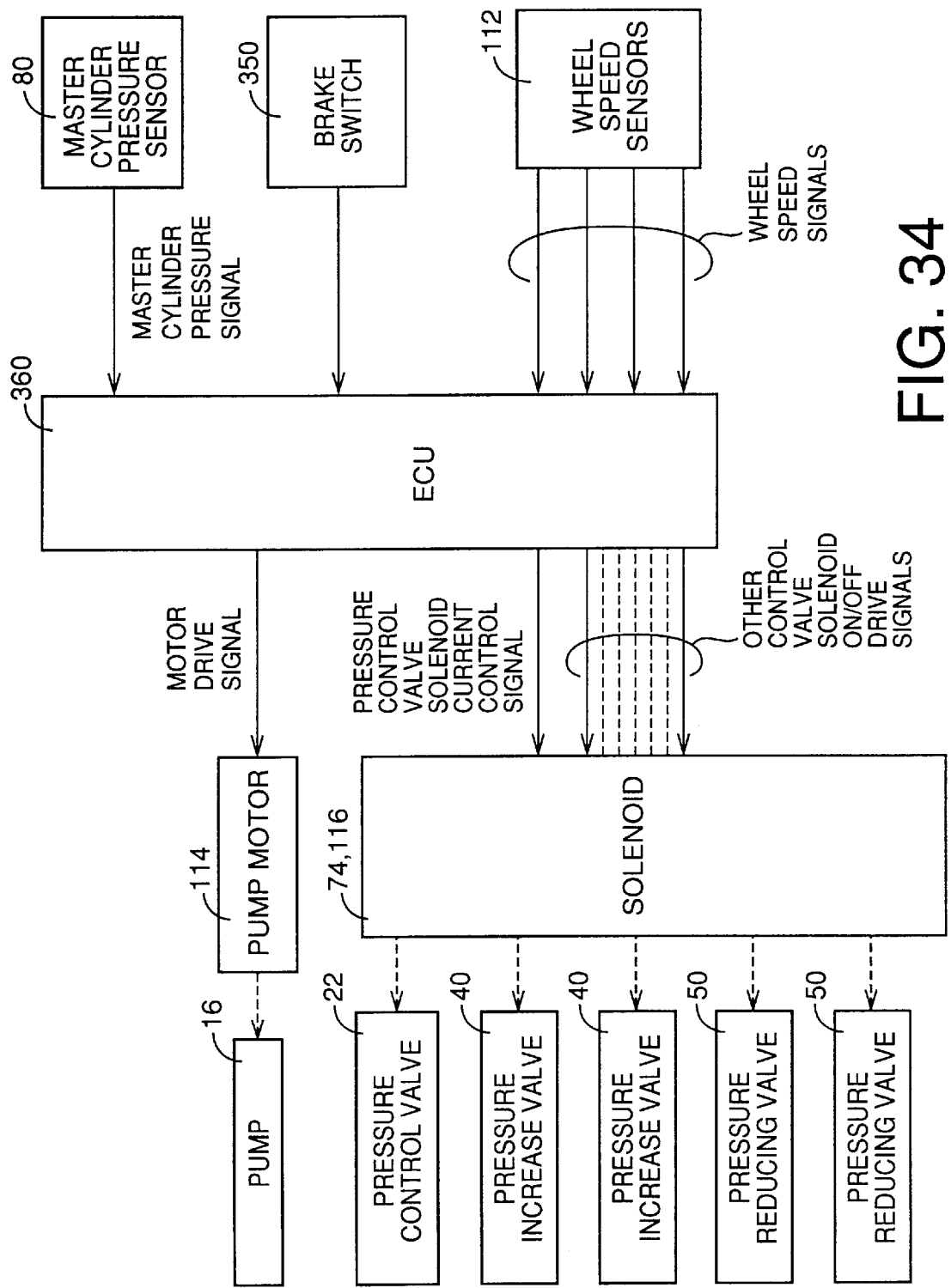
FIG. 34 is a block diagram showing an electrical arrangement of an anti-lock type braking system of a tenth embodiment of this invention.

FIG. 34 shows an electrical arrangement of the present embodiment. The present embodiment is different from the ninth embodiment of FIGS. 32 and 33, in the braking effect characteristic control routine. The braking effect characteristic control routine is stored in a ROM of a computer of an ECU 360.

Figure 35:
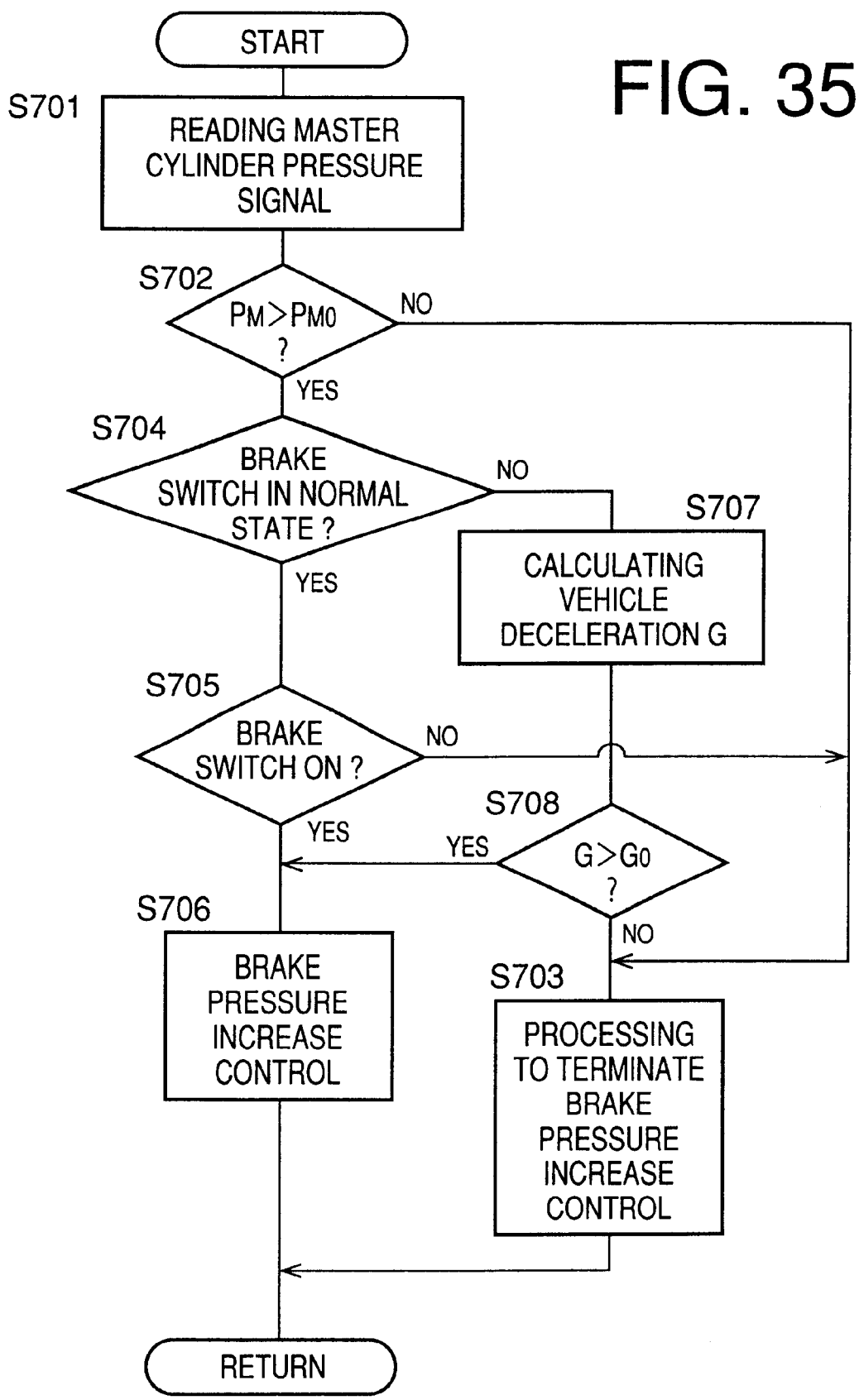
FIG. 35 is a flow chart showing a braking effect characteristic control routine executed by a computer of an ECU in FIG. 34.

The braking effect characteristic control routine is illustrated in the flow chart of FIG. 35. This routine is initiated with S701 to read the master cylinder pressure signal received from the master cylinder pressure sensor 80. Then, S702 is implemented to determine whether the boosting limit of the booster 30 has been reached, that is, whether the master cylinder pressure $P_M$ has exceeded the reference value $P_{M0}$ described above. If the master cylinder pressure $P_M$ has not exceeded the reference value $P_{M0}$ in this control cycle, a negative decision (NO) is obtained, and the control flow goes to S703 in which the processing to terminate the brake pressure increase control is effected. Thus, one cycle of execution of the present routine is terminated.

If the master cylinder pressure $P_M$ has exceeded the reference value $P_{M0}$ in this control cycle, an affirmative decision (YES) is obtained in S702, and the control flow goes to S704 to determine whether the brake switch 350 is in a normal state or not. This determination is effected in a manner similar to that specifically described with respect to S601 of FIG. 33. If the brake switch 350 is in the normal state in this control cycle, an affirmative decision (YES) is obtained, and the control flow goes to S705 to determine whether the brake switch 350 is on or not. If the brake switch 350 is not on in this control cycle, a negative decision (NO) is obtained, and the control flow goes to S703. If the brake switch 350 is on in this control cycle, an affirmative decision (YES) is obtained, and the control flow goes to S706 to effect the brake pressure increase control.

If the brake switch 350 is not in the normal state in this control cycle, a negative decision (NO) is obtained in S704, and the control flow goes to S707 to calculate the vehicle body deceleration value G as in S707 of FIG. 30. Then, S708 is implemented to determine whether the vehicle body deceleration value G has exceeded the reference value $G_0$. In this embodiment, the reference value $G_0$ is determined to be a vehicle body deceleration value G which is expected to be established during operation of the brake operating member. For example, the reference value $G_0$ is determined to be 0.3 G. It will be understood that the present embodiment is adapted such that S708 is functionally substituted for S705 when the brake switch 300 is defective. If the vehicle body deceleration value G has not exceeded the reference value $G_0$ in this control cycle, a negative decision (NO) is obtained, and the control flow goes to S703 in which the processing to terminate the brake pressure increase control is effected. If the vehicle body deceleration value G has exceeded the reference value $G_0$ in this control cycle, an affirmative decision (YES) is obtained, and the control flow goes to S706 to effect the brake pressure increase control. IN either case, one cycle of execution of the present routine is terminated.

It will be understood from the above explanation of the present embodiment that the master cylinder pressure sensor 80, the brake switch 350 and the above-indicated vehicle deceleration calculating means 348 are provided as the "brake-operating-force-related quantity sensor", and that the determination as to whether the brake pressure increase control is required is made on the basis of the master cylinder pressure $P_M$ and the operation or non-operation of the brake operating member where the brake switch 350 is in the normal state, and on the basis of the master cylinder pressure $P_M$ and the vehicle body deceleration value G.

Accordingly, the present embodiment is capable of accurate determination as to whether the brake pressure increase control is required, even when the brake switch 350 is defective, and assures improved operating reliability of the braking system.

It will be understood from the above explanation of the present embodiment that a portion of the ECU 360 assigned to implement steps S704, S705 and S708 corresponds to "fail-safe means", while the vehicle deceleration calculating means 348 corresponds to a "vehicle deceleration sensor".

Then, an eleventh embodiment of this invention will be described.

Figure 36:
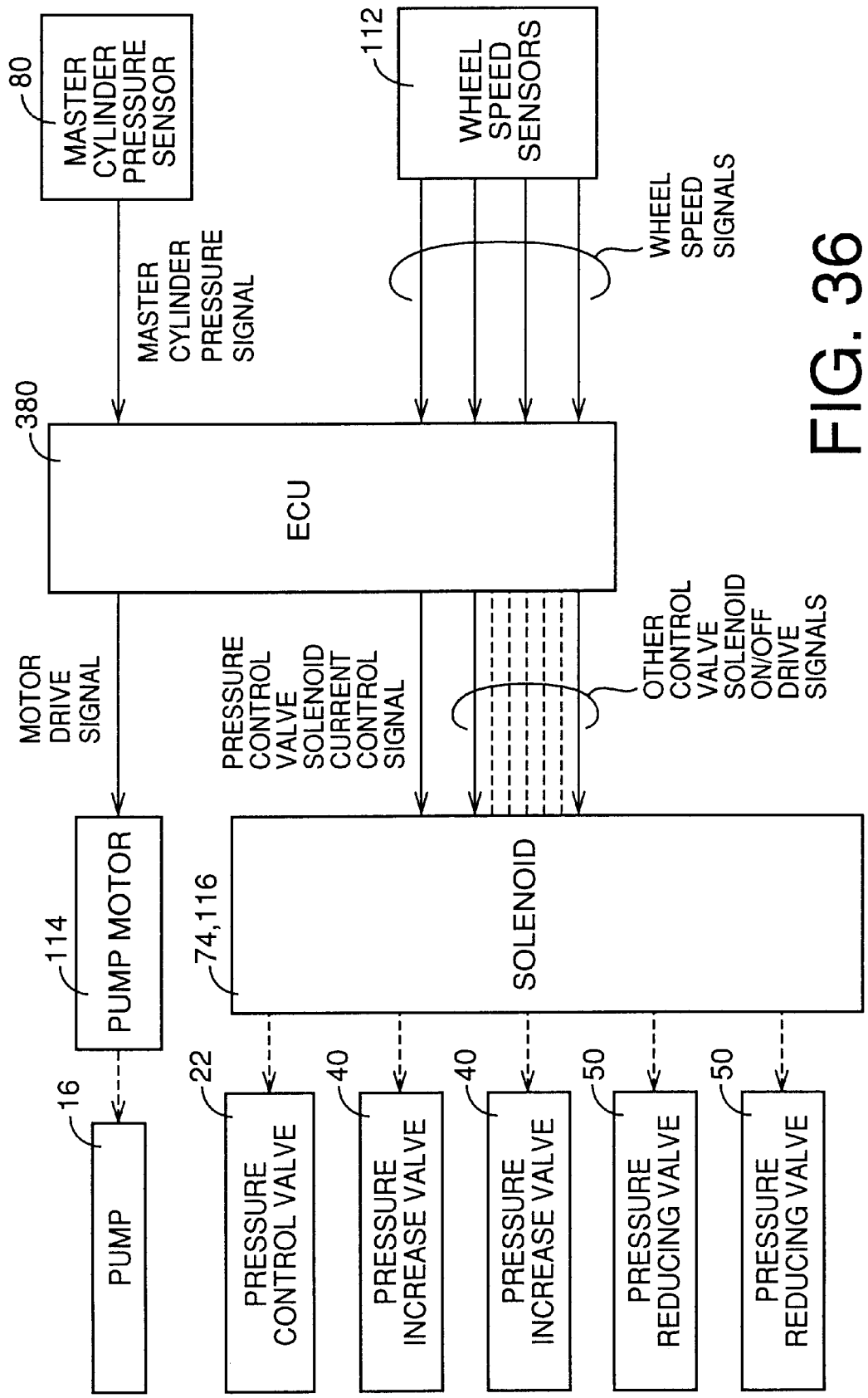
FIG. 36 is a block diagram showing an electrical arrangement of an anti-lock type braking system of an eleventh embodiment of this invention.

FIG. 36 shows an electrical arrangement of this embodiment. This embodiment is different from the first embodiment shown in FIGS. 2–10, only in the braking effect characteristic control routine. This braking effect characteristic control routine is stored in a ROM of an ECU 380.

Figure 37:
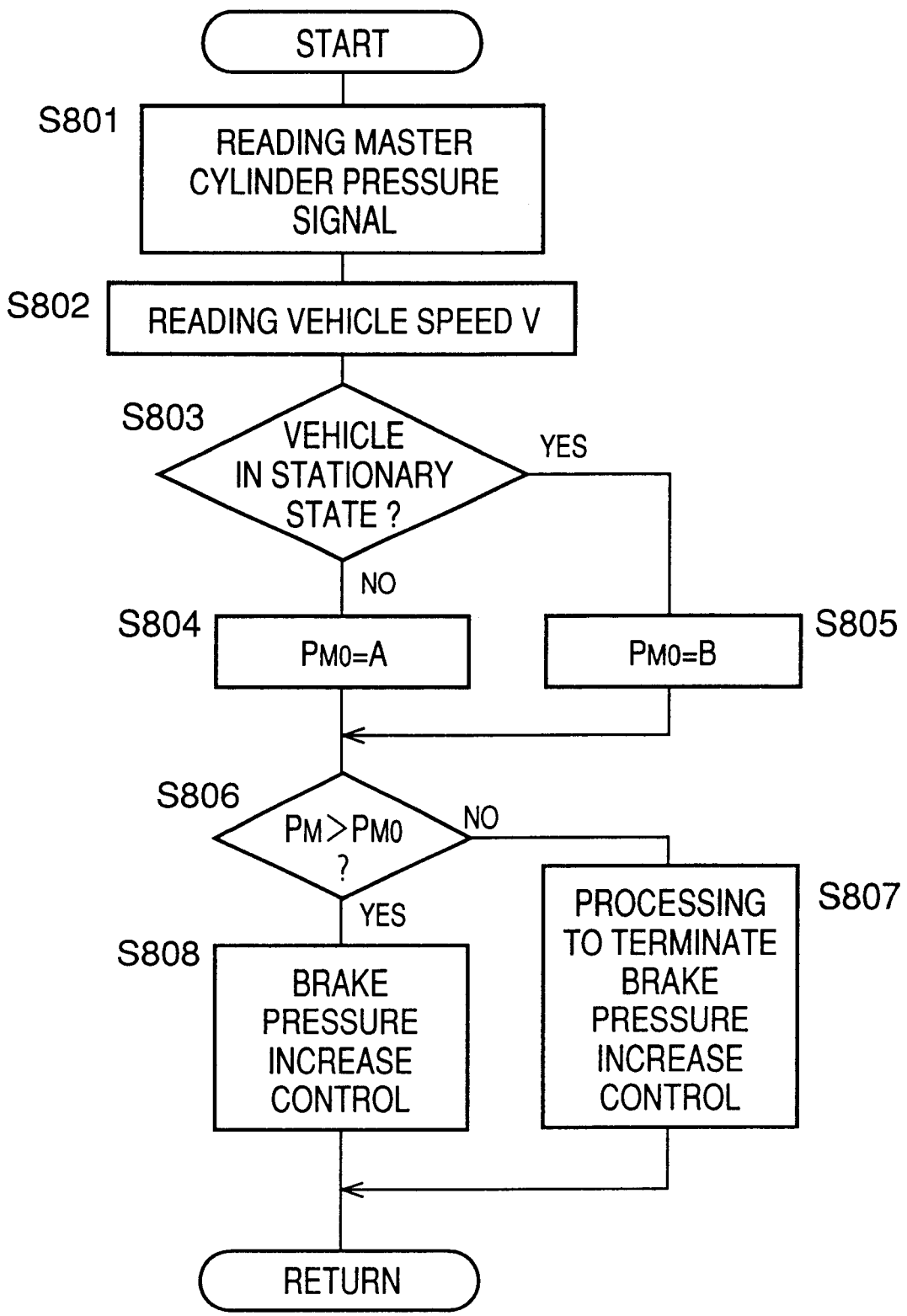
FIG. 37 is a flow chart showing a braking effect characteristic control routine executed by a computer of an ECU in FIG. 36.
Figure 38:
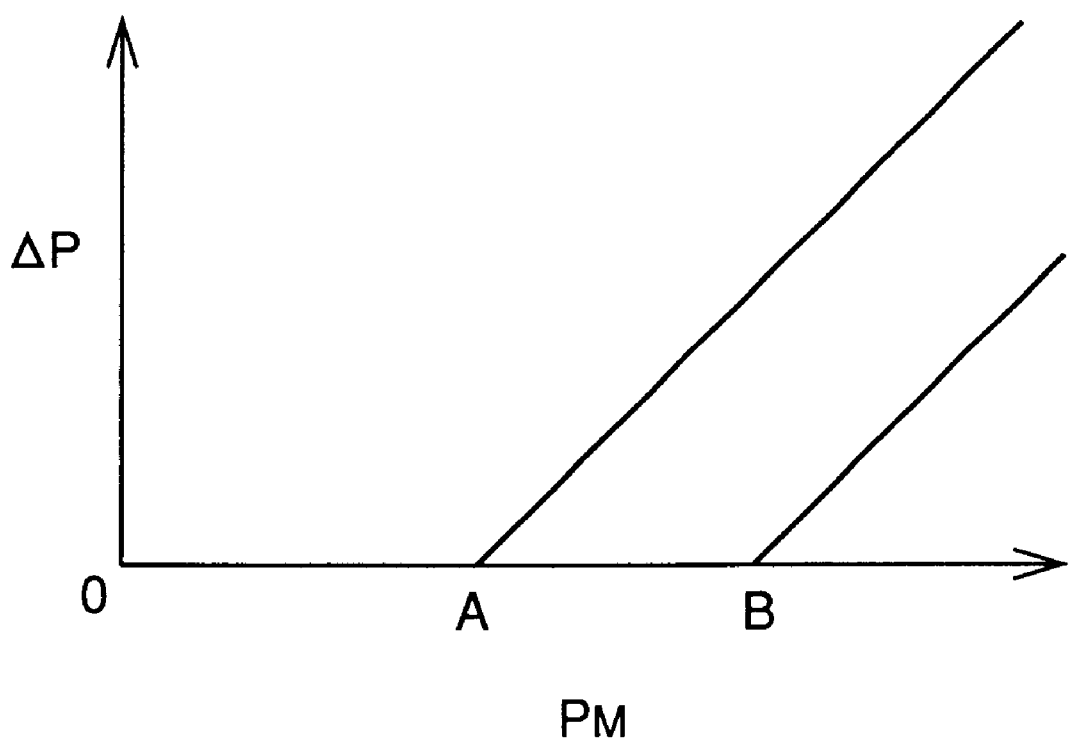
FIG. 38 is a graph showing a relationship between master cylinder pressure $P_M$ and desired pressure difference $\Delta P$ in the above-indicated eleventh embodiment.

The braking effect characteristic control routine is illustrated in the flow chart of FIG. 37. The routine is initiated with S801 to read the master cylinder pressure signal received from the master cylinder pressure sensor 80. Then, S802 is implemented to read an estimated vehicle speed received from the estimated vehicle speed calculating means 346 as the vehicle speed V. Then, S803 is implemented to determine whether the vehicle is in a stationary state. For instance, the vehicle is determined to be in a stationary state if the vehicle speed V is lower than a predetermined value (e.g., 5 km/h), or if the vehicle speed V is lower than the predetermined value and if the absolute value of the vehicle body deceleration or acceleration is smaller than a predetermined value. The vehicle body deceleration or acceleration can be obtained as a time derivative of the vehicle speed V. If the vehicle is not in a stationary state in this control cycle, a negative decision (NO) is obtained, and the control flow goes to S804 in which the reference value $P_{MO}$ of the master cylinder pressure $P_M$ above which the brake pressure increase control is effected is set to a predetermined value A. If the vehicle is in the stationary state in this control cycle, on the other hand, an affirmative decision (YES) is obtained, and the control flow to S805 in which the reference value $P_{MO}$ is set to a predetermined value B. The predetermined value A is equal to the reference value $P_{MO}$ used in the first embodiment, while the predetermined value B is larger than the predetermined value A, as indicated in the graph of FIG. 38. Accordingly, the reference value $P_{MO}$ is set to be larger when the vehicle is in the stationary state than when the vehicle is not in the stationary state, so that the master cylinder pressure $P_M$ is less likely to exceed the reference value $P_{MO}$ when the vehicle is in the stationary state than when the vehicle is not in the stationary state, whereby the brake pressure increase control is less likely to be initiated when the vehicle is in the stationary state.

In either case, S806 is subsequently implemented to determine whether the master cylinder pressure $P_M$ has exceeded the reference value $P_{MO}$. If the master cylinder pressure $P_M$ has not exceeded the reference value $P_{MO}$ in this control cycle, a negative decision (NO) is obtained, and the control flow goes to S807 in which the processing to terminate the brake pressure increase control is effected. If the master cylinder pressure $P_M$ has exceeded the reference value $P_{MO}$ in this control cycle, an affirmative decision (YES) is obtained, and the control flow goes to S808 to effect the brake pressure increase control. In either case, one cycle of execution of the present routine is terminated.

Accordingly, the present embodiment wherein the brake pressure increase control is less likely to be initiated when the vehicle is in a stationary state is adapted to avoid generation of operating noises of the pump 16, pump motor 114, etc. when the vehicle is in the stationary state in which the operating noises are more likely to be perceived. Thus, the present embodiment has an advantage of reduced noise in the vehicle.

It is also noted that the present embodiment is adapted such that the pump 16 receives the fluid which is delivered from the master cylinder 14 after activation of the pump 16. In this arrangement, the operated position of the brake pedal 32 tends to be lowered while the force of operation of the brake pedal 32 by the vehicle operator is kept constant. However, the present embodiment wherein the pump 16 is less likely to be activated in the stationary state of the vehicle makes it possible to avoid such lowering of the operated position of the brake pedal 32, thereby preventing deterioration of operating feel of the brake operating member.

It will be understood from the above explanation of the present embodiment that a portion of the ECU 380 assigned to implement steps S802 and S803 of FIG. 37 corresponds to "vehicle stationary state detecting means", while a portion of the ECU 380 assigned to selectively implement step S804 and saos corresponds to "operation initiation control means" and "reference value determining means".

Then, a twelfth embodiment of this invention will be described.

Figure 39:
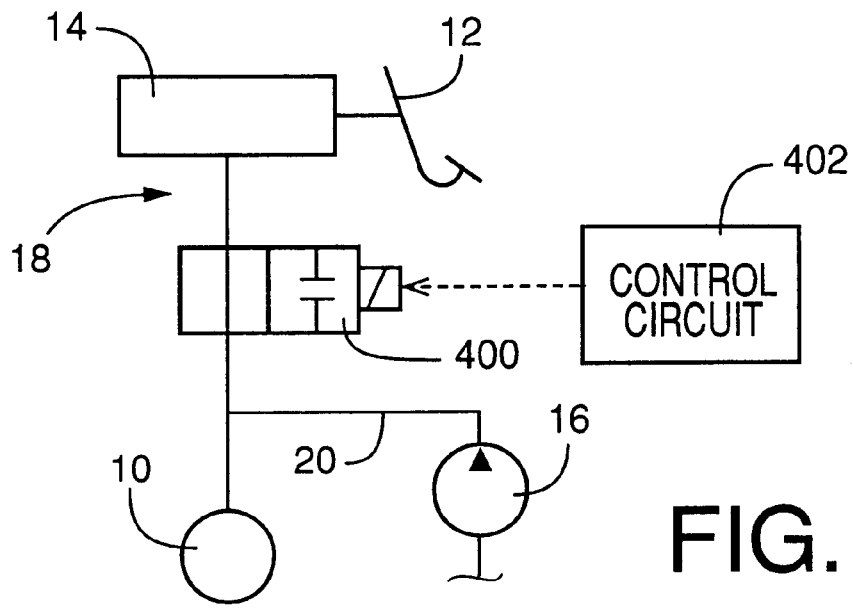
FIG. 39 is a schematic view showing an anti-lock type braking system of a twelfth embodiment of this invention.

FIG. 39 shows a general arrangement of the present embodiment. This embodiment is provided with a "fluid flow control device" and a "pressure changing device" which are different from those in all of the preceding embodiments. In the other aspects, the present embodiment is identical in the mechanical and electrical arrangements with all of the preceding embodiments.

The present embodiment is provided with a solenoid-operated valve 400 which is disposed in the primary passage 18 and which has a solenoid that generates a magnetic force based on an electric current applied thereto for energization. The solenoid-operated valve 400 has a first state and a second state which are selectively established depending upon the magnetic force generated by the solenoid. The solenoid-operated valve 400 placed in the first state permits flows of the fluid in opposite directions between the master cylinder 14 and the brake cylinder 10. The solenoid-operated valve 400 placed in the second state inhibits at least a flow of the fluid in the direction from the brake cylinder 10 toward the master cylinder 14. The present embodiment is further provided with a control circuit 502 for controlling the electric current to be applied to the solenoid of the solenoid-operated valve 400. The control circuit 502 is adapted to control the duty ratio of the electric current to be applied to the solenoid so that a distribution of the fluid from the pump 16 as the hydraulic pressure source to the master cylinder 14 and the brake cylinder 10 is controlled so that the fluid pressure difference between the master cylinder 14 and the brake cylinder 10 coincides with a desired value.

In the present embodiment described above, the solenoid-operated valve 400 is an example of a "fluid flow control valve", while the control circuit 402 is an example of a "pressure changing device".

Then, a thirteenth embodiment of this invention will be described.

Figure 40:
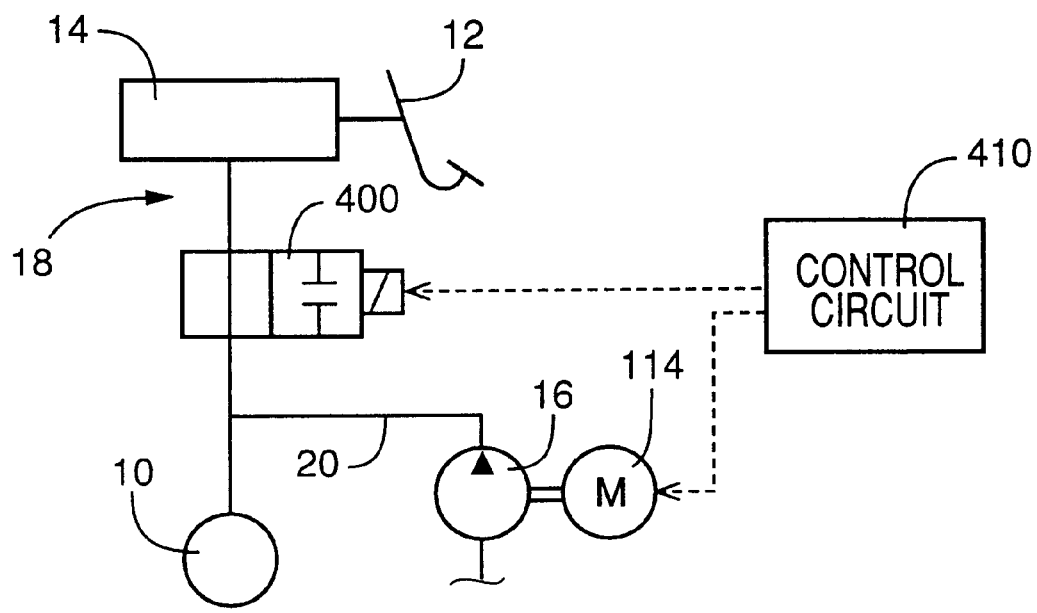
FIG. 40 is a schematic view showing an anti-lock type braking system of a thirteenth embodiment of this invention.

FIG. 40 shows a general arrangement of the present embodiment. This embodiment is provided with a "fluid flow control device" and a "pressure changing device", which are different from those in the twelfth embodiment described above.

The present embodiment is provided with the solenoid-operated valve 400 described above, and is further provided with a control circuit 410 f or controlling the solenoid-operated valve 400. The control circuit 410 is adapted to control the duty ratio of the electric current to be applied to the pump motor 114 so that the fluid pressure difference between the master cylinder 14 and the brake cylinder 10 coincides with a desired value, while holding the solenoid-operated valve 400 in the state for inhibiting the fluid flow from the brake cylinder 10 toward the master cylinder 14.

In the present embodiment described above, the solenoid-operated value 400 is another example of the "fluid flow control device, while the control circuit 410 is another example of the "pressure changing device".

Then, a fourteenth embodiment of this invention will be described.

Figure 41:
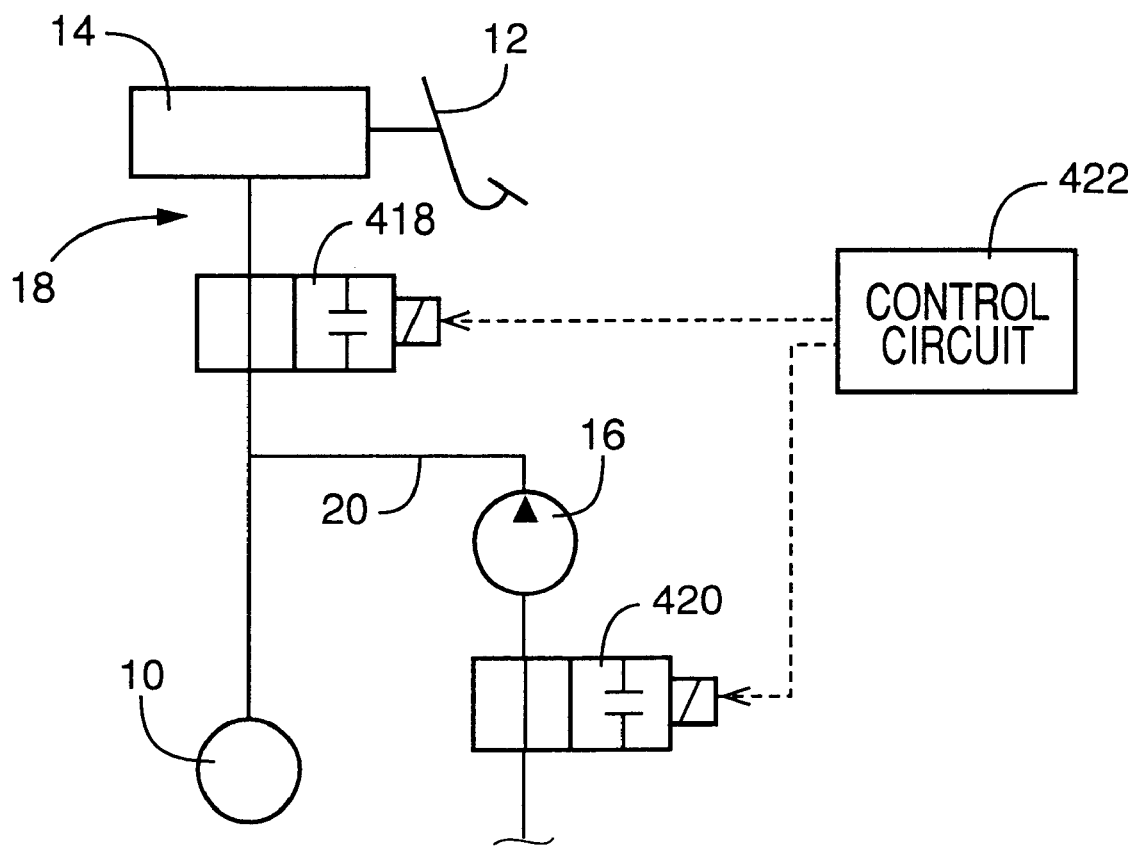
FIG. 41 is a schematic view showing an anti-lock type braking system of a fourteenth embodiment of this invention.

FIG. 41 shows a general arrangement of this embodiment. This embodiment is provided with a "flow control device" and a "pressure changing device" which are different from those in the twelfth embodiment described above.

The present embodiment is provided with a first solenoid-operated valve 418 similar to the above-described solenoid-operated valve. The present embodiment is further provided with a second solenoid-operated valve 420 which is connected to the suction side of the ump 16 and which has a solenoid that generates a magnetic force based on an electric current applied thereto for energization. The second solenoid-operated valve 420 has states for respectively permitting and inhibiting a fluid flow into the pump 16, which states are selectively established depending upon the magnetic force of the solenoid. Further, the present embodiment is provided with a control circuit 422 for controlling those first and second solenoid-operated valves 418, 420. The control circuit 422 is adapted to control the duty ratio of the electric control to be applied to the solenoid of the second solenoid-operated valve 520, so as to control the fluid suction amount of the pump 16 and thereby control the fluid delivery amount of the pump 16 so that the fluid pressure difference between the master cylinder 14 and the brake cylinder 10 coincides with a desired value, while holding the first solenoid-operated valve 418 in its state for inhibiting the fluid flow from the brake cylinder 10 toward the master cylinder 14.

In the present embodiment described above, the first solenoid-operated valve 418 is a further example of the "fluid flow control device", while the second solenoid-operated valve 420 and the control circuit 422 cooperate to constitute a further example of the "pressure changing device".

It is noted that the inflow control valve 138 in each of the preceding embodiments of FIGS. 10, 18, 23 and 26 may be used as the above-indicated second solenoid-operated valve 420, so that the duty ratio of the inflow control valve 138 is controlled so as to effect the pressure increase control of the brake cylinder 10, as in the present embodiment.

Then, a fifteenth embodiment of this invention will be described.

Figure 47:
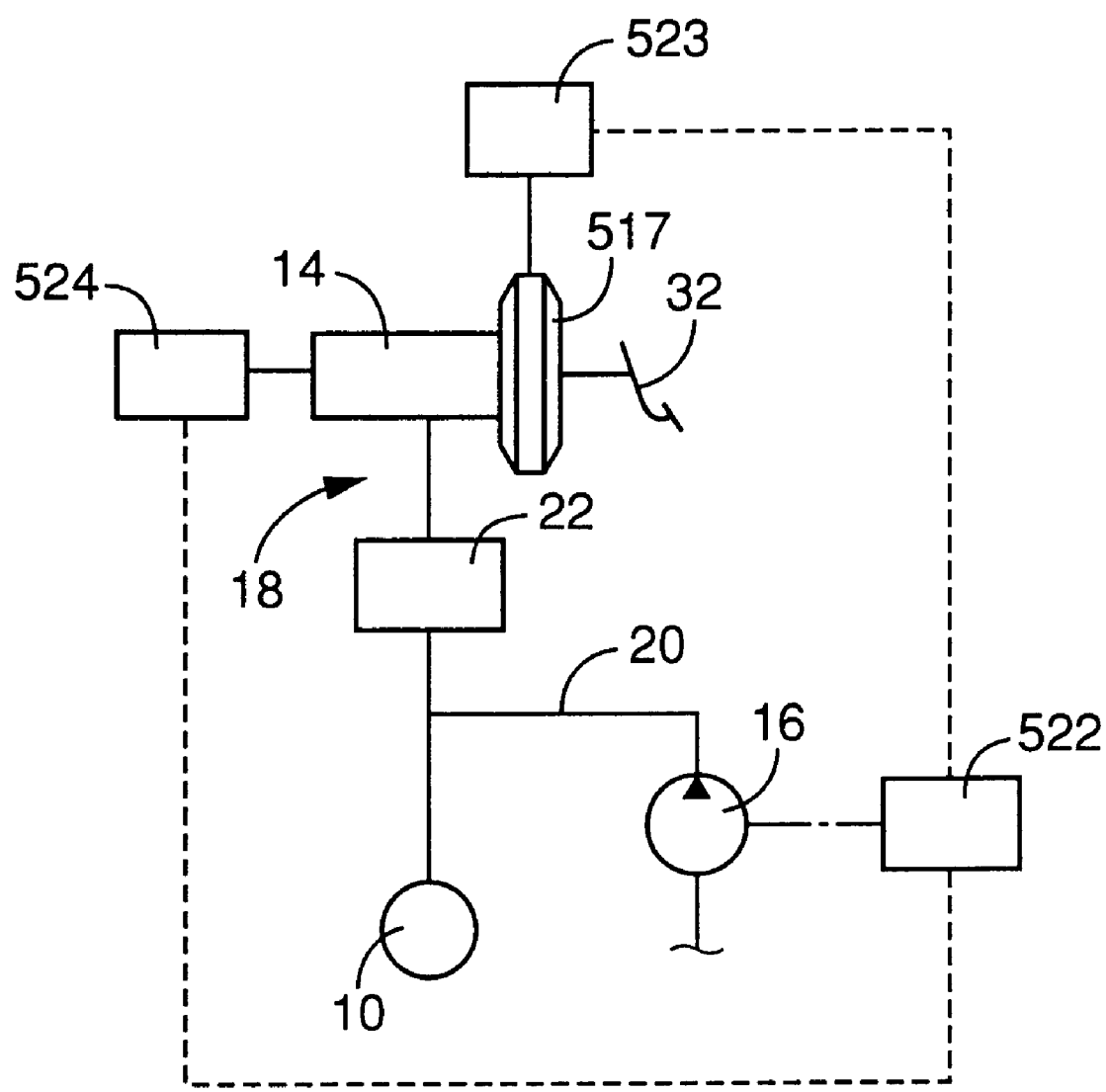
FIG. 47 is a schematic view schematically showing a general arrangement of a braking system of a fifteenth embodiment of this invention.

FIG. 47 schematically shows a general arrangement of this embodiment. This braking system has the master cylinder 14 as a hydraulic pressure source for the brake cylinder 10 for applying a brake to restrain rotation of the vehicle wheel. Between the master cylinder 14 and the brake pedal 32 as the brake operating member, there is connected a vacuum booster 517. The master cylinder 14 and the brake cylinder 10 are connected to each other by the primary passage 18. The primary passage 18 is connected to the delivery side of the pump 16 through the auxiliary passage 20. The above-indicated pressure control valve 22 is connected to a portion of the primary passage 18 between the master cylinder 14 and a point of connection of the auxiliary passage 20 to the primary passage 18. As described above, the pressure control valve 22 permits flows of a working fluid between the master cylinder 14 and the brake cylinder 10 in opposite directions when the pump 16 is not in operation, and permits the fluid received from the pump 16, to be returned to the master cylinder 14 when the pump 16 is in operation, such that the delivery pressure of the pump 16 varies depending upon the hydraulic pressure in the master cylinder 14. An electronic control unit (hereinafter abbreviated as "ECU") 522 is provided for the pump 16. The ECU 522 activates the pump 16 based on output signals of booster-pressure-related quantity detecting means 523 and master-cylinder-pressure-related detecting means 524, when the fluid pressure generated in the brake cylinder 10 is required to be higher than the fluid pressure in the master cylinder 14 during a brake operation by the vehicle operator.

Figure 48:
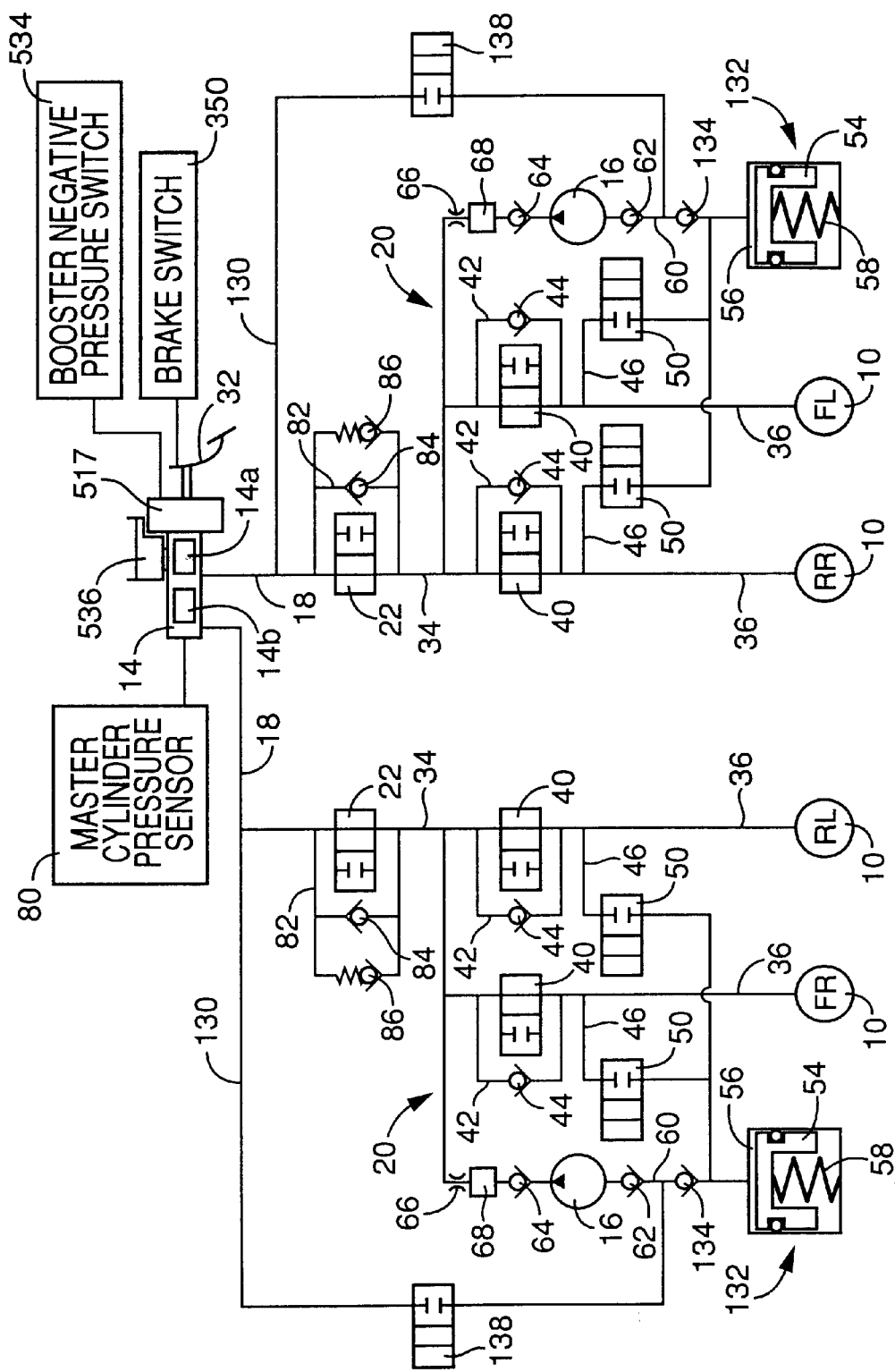
FIG. 48 is a schematic view showing a mechanical arrangement of the fifteenth embodiment.

In FIG. 48, there is shown a mechanical arrangement of the present embodiment. The braking system of the present embodiment is a diagonal type system having two braking sub-systems adapted for use on a four-wheel vehicle. This braking system has an anti-lock control function for performing an anti-lock brake pressure control operation in which the pump 16 is operated to circulate the working fluid in the brake circuit. Further, the present embodiment is arranged to implement a braking effect characteristic control utilizing the pump 16, during operation of the braking system. As described above, the braking effect characteristic control is implemented, in view of the vacuum booster 517 having a boosting limit, to control the braking effect characteristic, namely, a relationship between the brake operating force F (by which the vehicle operator depresses the brake pedal 32) and the deceleration value G of the vehicle body, so that the vehicle deceleration value G increases with the brake operating force F, at an ideal rate (for example, at a substantially constant rate, both before and after the boosting limit of the vacuum booster 517 has been reached).

As shown in FIG. 48, the master cylinder 14 is a tandem type having two pressurizing pistons 14a, 14b slidably disposed in series with each other in a housing, so as to form two mutually independent pressurizing chambers in front of the respective pressurizing pistons. This master cylinder 14 is linked through the vacuum booster 517 to the brake pedal 32. The brake operating force F in the form of the depression force acting on the brake pedal 32 is boosted by the vacuum booster 517 and transmitted to the pressurizing piston 14a, which is one of the two pressurizing pistons 14a, 14b that is located on the side of the vacuum booster 517.

Figure 49:
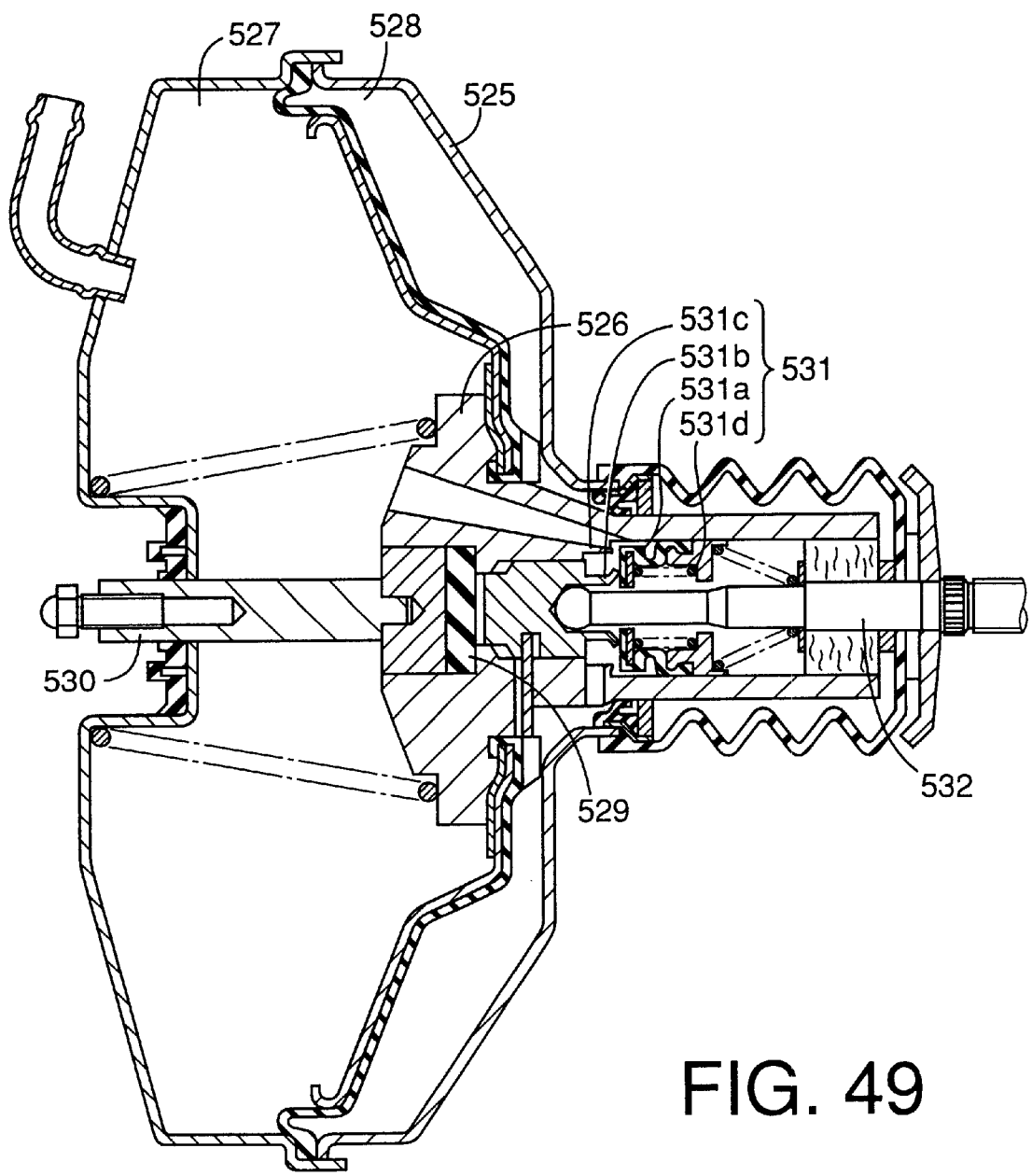
FIG. 49 is a side view in cross section of a vacuum booster in FIG. 48.

As shown in FIG. 49, the vacuum booster 517 has a hollow housing 525. The interior space within the housing 525 is divided by a power piston 526 into a negative pressure chamber 527 on the side of the master cylinder 14 and a pressure changing chamber 528 on the side of the brake pedal 32. The negative pressure chamber 527 is held in communication with the intake pipe of the engine as a negative pressure source. The power piston 526 is linked, through a reaction disc 529 made of a rubber material, with a booster piston rod 530 disposed on the side of the master cylinder 14. The booster piston rod 530 is linked with the pressurizing piston 14a of the master cylinder 14, so as to transmit the operating force of the power piston 526 to the pressurizing piston 14a.

A valve mechanism 531 is disposed between the negative pressure chamber 527 and the pressure changing chamber 528. The valve mechanism 531 is operated based on a relative movement between the power piston 526 and a valve operating rod 532 linked with the brake pedal 32. The valve mechanism 531 is provided with a control valve 531a, an air valve 531b, a vacuum valve 531c and a control valve spring 531d. The air valve 531b cooperates with the control valve 531a to selectively connect or disconnect the pressure changing chamber 528 to or from the atmosphere. The air valve 531b is adapted to be movable integrally with the valve operating rod 532. The control valve 531a is attached to the valve operating rod 532 such that the control valve 531a is biased by the control valve spring 531d in a direction for seating onto the air valve 531b. The vacuum valve 531c cooperates with the control valve 531a to selectively connect or disconnect the pressure changing chamber 528 to or from the negative pressure chamber 527, and is adapted to be movable integrally with the power piston 526.

When the thus constructed vacuum booster 517 is not in operation, the control valve 531a is seated on the air valve 531b and spaced apart from the vacuum valve 531c, so that the pressure changing chamber 528 is disconnected from the atmosphere and is connected to the negative pressure chamber 527. In this state, the negative pressure chamber 527 and the pressure changing chamber 528 both have the same negative pressure (not higher than the atmospheric pressure). When the vacuum booster 517 is in operation, on the other hand, the valve operating rod 532 is moved toward the power piston 526, and the control valve 531a is eventually seated onto the vacuum valve 531c, so that the pressure changing chamber 528 is disconnected from the negative pressure chamber 527. When the valve operating rod 532 is subsequently moved a further distance toward the power piston 526, the air valve 531b is spaced apart from the control valve 531a, whereby the pressure changing chamber 528 is connected to the atmosphere. In this state, the pressure in the pressure changing chamber 528 is raised, and there arises a pressure difference between the negative pressure chamber 527 and the pressure changing chamber 528, so that the power piston 526 is operated by the pressure difference.

As shown in FIG. 48, one of the two pressurizing chambers of the master cylinder 14 is connected to the first braking sub-system for the front left wheel FL and the rear right wheel RR, while the other pressurizing chamber is connected to the second braking sub-system for the front right wheel FR and the rear left wheel RL. Since these braking sub-systems are identical in construction with each other, only the first braking sub-system will be described by way of example, and a description of the second braking sub-system will not be provided. Since the first and second braking sub-systems are basically identical with those in the first embodiment, the same reference signs will used for the same elements in the following description.

In the first braking sub-system, the master cylinder 14 is connected through the primary passage 18 to the brake cylinder 10 for the front left wheel FL and the brake cylinder 10 for the rear right wheel RR, as in the first embodiment. The primary passage 18 extending from the master cylinder 14 is branched at the end of the single main passage 34, into the two branch passages 36 connected to the main passage 34. Each branch passage 36 is connected at its end to the corresponding brake cylinder 10. The pressure increasing valve 40 in the form of a normally-open solenoid-operated shut-off valve is provided in each of the branch passages 36. When the pressure increasing valve 40 is open or placed in a pressure-increasing state, the pressure increasing valve 40 permits a flow of the working fluid from the master cylinder 14 toward the brake cylinder 10. The by-pass passage 42 is connected to each pressure increasing valve 40, and the check valve 44 is provided in the by-pass passage 42, to permit the fluid to flow from the brake cylinder 10 toward the master cylinder 14. The reservoir passage 46 is connected at one end thereof to a portion of each branch passage 36 between the pressure increasing valve 40 and the brake cylinder 10, and at the other end to the reservoir 132 (which is the same as used in the second embodiment). The pressure reducing valve 50 in the form of a normally-closed solenoid-operated shut-off valve is provided in each reservoir passage 46. When the pressure reducing valve 50 is open or placed in a pressure-reducing state, the pressure reducing valve 50 permits a flow of the fluid from the brake cylinder 10 toward the reservoir 132.

The reservoir 132 is connected by the pump passage 60 to the suction side of the pump 16. The suction valve 62 which is a check valve is connected to the suction side of the pump 16, while the delivery valve 64 which is a check valve is connected to the delivery side of the pump 16. In the auxiliary passage connecting the delivery side of the pump 16 and the primary passage 18, there are provided the orifice 66 as a throttle and the fixed damper 68, so that pressure pulsations of the pump 16 are reduced by the orifice 66 and fixed damper 68.

The pressure control valve 22 described above is provided with the by-pass passage 82 in which the check valve 84 is provided. The by-pass passage 82 is provided to permit a flow of the fluid from the master cylinder 14 toward the brake cylinders 10, even if the pressure control valve 22 is closed, by any chance, due to the force of the fluid acting on the movable member in the pressure control valve 22 upon depression of the brake pedal 32. The pressure control valve 22 is further provided with a relief valve 86 connected in parallel therewith, in order to prevent an excessive rise of the delivery pressure of the pump 16.

Like the second embodiment, the present embodiment has the fluid supply passage 130 which extends from a portion of the main passage 34 between the master cylinder 14 and the pressure control valve 22, to the reservoir 132. This fluid supply passage 130 is provided with the inflow control valve 138. The inflow control valve 138 is opened when it is necessary to feed the fluid from the master cylinder 14 to the pump 16. The inflow control valve 138 placed in the open state permits a flow of the fluid from the master cylinder 14 to the pump passage 60 to combine with fluid flow from the reservoir 132. When it is not necessary to feed the fluid from the master cylinder 14 to the pump 16, the inflow control valve 138 is closed, to inhibit the flow of the fluid from the master cylinder 14 to the pump 16, making it possible to raise the hydraulic pressure in the master cylinder 14. In the present embodiment, too, the inflow control valve 138 is a normally closed solenoid-operated valve, and the determination as to whether the working fluid is required to be supplied from the master cylinder 14 to the pump 16 is effected by determining whether the working fluid that can be pumped up by the pump is present in the reservoir 132 during an anti-lock brake pressure control operation. To this end, the amount of the working fluid left in the reservoir 132 is estimated on the basis of the cumulative pressure increasing time during which the pressure increasing valve 40 is placed in the pressure increasing state and the cumulative pressure reducing time during which the pressure reducing valve 50 is placed in the pressure reducing state.

Like the second embodiment, the present embodiment has the check valve 134 disposed in a portion of the pump passage 60 between the points of connection to the fluid supply passage 130 and the reservoir passage 46. The check valve 134 inhibits a flow of the fluid from the fluid supply passage 130 toward the reservoir 132, and permits a flow of the fluid in the opposite direction.

Figure 50:
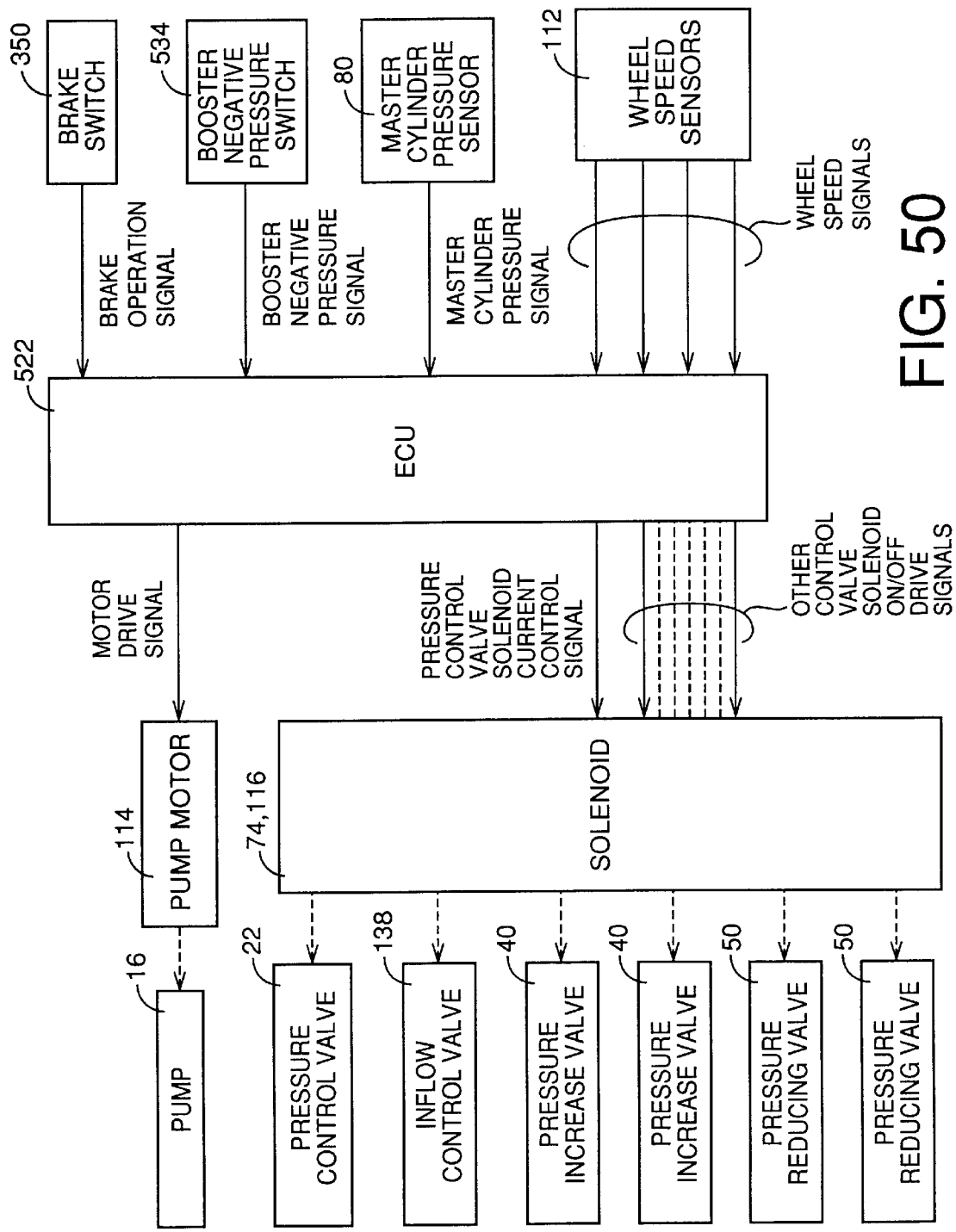
FIG. 50 is a block diagram showing an electrical arrangement of the above-indicated fifteenth embodiment.

There is shown in FIG. 50 an electrical arrangement of the present embodiment. The above-indicated ECU 522 is constituted principally by a computer including a CPU, a ROM and a RAM. A braking effect characteristic control routine and an anti-lock brake pressure control routine which are stored in the ROM are executed by the CPU while utilizing the RAM, to implement the braking effect characteristic control and the anti-lock brake pressure control.

To the input side of the ECU 522, there are connected the above-indicated brake switch 350, a booster negative pressure switch 534 (an example of the booster-pressure-related quantity detecting means 523), the above-indicated master cylinder pressure sensor 80 (an example of the master-cylinder-pressure-related detecting means 524), and the above-indicated wheel speed sensors 112.

Figure 51:
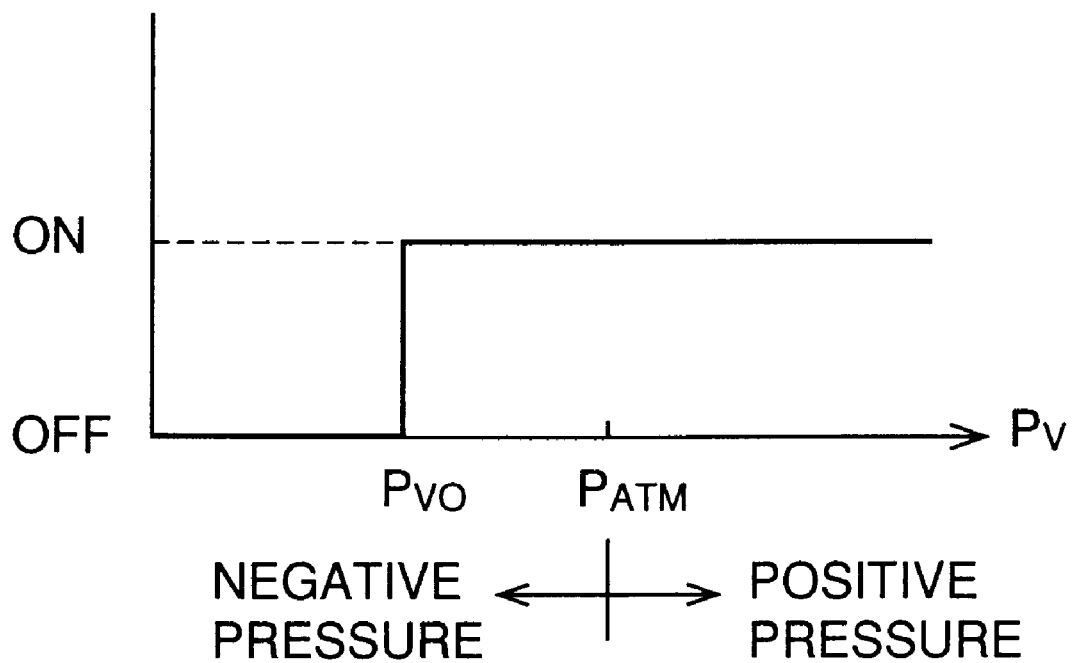
FIG. 51 is a graph showing an operating state of a booster negative pressure switch in FIG. 48.

The booster negative pressure switch 534 is attached to the vacuum booster 517, and is subjected to a pressure $P_V$ in the pressure changing chamber 528. When the pressure $P_V$ in the pressure changing chamber 528 is lower than a reference value $P_{V0}$ lower than an atmospheric pressure $P_{ATM}$, the booster negative pressure switch 534 generates a booster negative pressure signal (a first signal) indicative of an OFF state, as indicated in the graph of FIG. 51. When the pressure $P_V$ is equal to or higher than the reference value $P_{V0}$, the booster negative pressure switch 534 generates a booster positive pressure signal (a second signal) indicative of an ON state. It will be understood that the booster negative pressure switch 534 is an example of "pressure-changing-chamber-pressure-related quantity detecting means", and an example of a "pressure switch" which operates in response to the pressure $P_V$ in the pressure changing chamber 528.

To the output side of the ECU 522, there is connected the pump motor 114, as indicated in FIG. 50, so that the motor drive signal is applied to the driver circuit of the pump motor 114. To the output side of the ECU 522, there are also connected the solenoid 74 of the above-indicated pressure control valve 22, and the solenoids 116 of the pressure increasing valve 40 and pressure reducing valve 50. The ECU 522 applies a current control signal to the solenoid 74 of the pressure control valve 22, for linearly controlling the magnetic force of the solenoid 74. On the other hand, the ECU 522 applies an ON/OFF drive signal to the solenoids 116 of the pressure increasing valve 40 and pressure reducing valve 50, for energizing and de-energizing the solenoids 116.

There will be explained a braking effect characteristic control using the pressure control valve 22, which is effected by the ECU 522. First, this control will be briefly explained.

Figure 52:
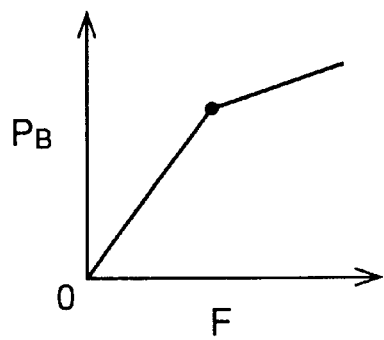
FIG. 52 is a graph showing a relationship between brake operating force F and brake cylinder pressure $P_B$ in a braking system equipped with a vacuum booster.
Figure 53:
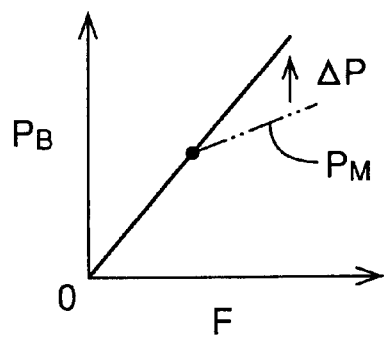
FIG. 53 is a graph for explaining a braking effect characteristic control in the above-indicated fifteenth embodiment.
Figure 54:
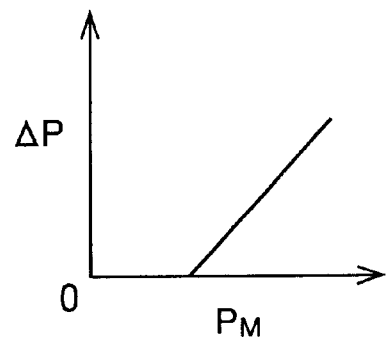
FIG. 54 is a graph showing a relationship between master cylinder pressure $P_M$ and pressure difference $\Delta P$ between master and brake cylinder pressures, in the braking effect characteristic control.

The boosting limit of the vacuum booster 517 is reached when the pressure $P_V$ in the pressure changing chamber 528 has been raised to the atmospheric pressure $P_{ATM}$ as a result of an increase of the brake operating force F to a certain value. After the boosting limit has been reached, the brake operating force F cannot be boosted by the vacuum booster 517. Where any suitable measure is not taken in this connection, the braking effect, that is, the brake cylinder pressure $P_B$ corresponding to the brake operating force F higher than the boosting limit is lower than the value according to the relationship between the brake operating force F and the braking pressure $P_B$, which relationship would be maintained in the absence of the boosting limit, as indicated in the graph of FIG. 52. In the light of this fact, the braking effect characteristic control is implemented. Described in detail, the pump 16 is activated after the boosting limit of the vacuum booster 517 has been reached, so that the fluid pressure generated in the brake cylinder 10 is higher than the master cylinder pressure $P_M$ by a pressure difference $\Delta P$, as indicated in the graph of FIG. 53, so as to stabilize the braking effect irrespective of whether the boosting limit of the vacuum booster 517 has been reached or not. An example of the relationship between the pressure difference $\Delta P$ and the master cylinder pressure $P_M$ is indicated in the graph of FIG. 54.

Figure 55:
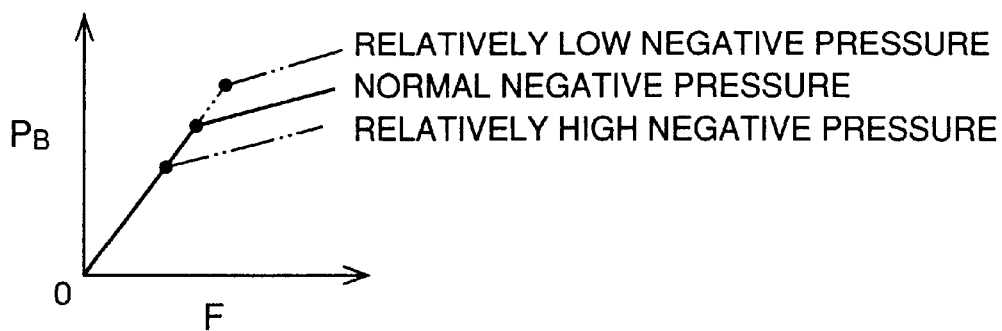
FIG. 55 is a graph showing a change in relationship between brake operating force F and brake cylinder pressure $P_B$, with a change in pressure in negative pressure chamber of vacuum booster, in a braking system equipped with the vacuum booster.
Figure 56:
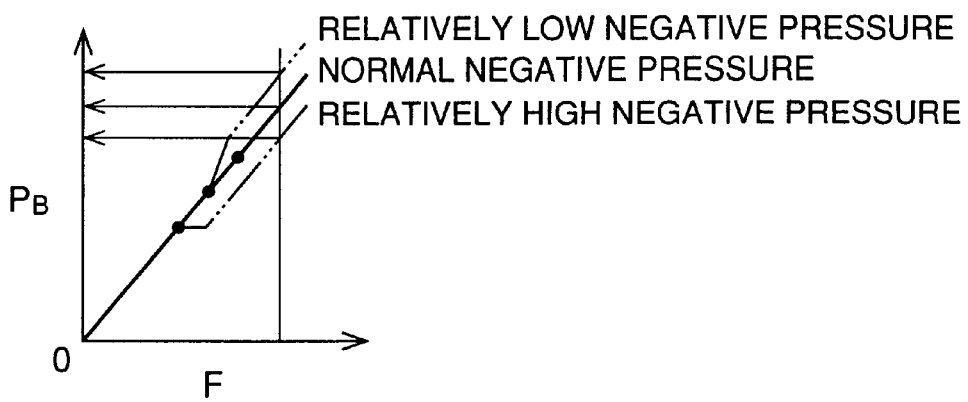
FIG. 56 is a graph showing a relationship between brake operating force F and brake cylinder $P_B$ in the case where the above-indicated braking effect characteristic control is effected without taking account of pressure change in the negative pressure chamber of the vacuum booster.

To effect the braking effect characteristic control, therefore, it is necessary to determine whether the boosting limit of the vacuum booster 517 has been reached. However, the brake operating force F and the master cylinder pressure $P_M$ when the boosting limit of the vacuum booster 517 has been reached are not always constant, but vary depending upon the condition of the motor vehicle, for instance, changes with a change in pressure $P_C$ in the negative pressure chamber 527, which change takes place depending upon whether an operation to accelerate the vehicle has been performed by the vehicle operator, and depending upon the acceleration value and the engine load. Described in detail, the brake operating force F and the master cylinder pressure $P_M$ when the boosting limit of the vacuum booster 517 has been reached become larger and higher than normal values if the pressure $P_C$ in the negative pressure chamber 527 changes from a normal value to a relatively low value in the negative direction (so as to increase a difference from the atmospheric pressure), and become smaller and lower than the normal values if the pressure $P_C$ changes from the normal value to a relatively high value in the positive direction (so as to reduce the difference from the atmospheric pressure), as indicated in the graph of FIG. 55. If the determination that the boosting limit of the vacuum booster 517 has been reached is made when the brake operating force F and the master cylinder pressure $P_M$ have increased to predetermined values, without taking into account the change in the pressure $P_C$ in the negative pressure chamber 527, the resulting activation of the pump 16 to increase the brake cylinder pressure $P_B$ by an amount of the pressure difference $\Delta P$ will result in a variation in the brake cylinder pressure $P_B$ for the same value of the brake operating force F, depending upon the change in the pressure $P_C$ in the negative pressure chamber 527, as indicated in the graph of FIG. 56. In this case, the braking effect is not stable.

In a force transmitting system whose major portion consists of the brake pedal 32, vacuum booster 517 and master cylinder 14, a relationship represented by the following equation (1) is satisfied among the brake operating force, the master cylinder pressure $P_M$ and a booster negative pressure $P_{VB}$ which is a pressure difference between the negative pressure chamber 527 and the pressure changing chamber 528:

$$A_M \times P_M = A_{VB} \times P_{VB} + R_P \times F$$

where, $A_M$: effective pressure-receiving area of the pressurizing pistons 14a, 14b of the master cylinder 14, $A_{VB}$: effective pressure-receiving area of the power piston 526 of the vacuum booster 517, $R_P$: ratio of a force received by the vacuum booster 517 to the brake operating force F (boosting ratio (lever ratio) of a brake operating mechanism including the brake pedal 32).

Suppose the master cylinder pressure $P_M$ and the pressure difference $P_{VB}$ are increased by $\Delta P_M$ and $\Delta P_{VB}$, respectively, as a result of an increase $\Delta F$ of the brake operating force F per unit time, a relationship represented by the following equation (2) is satisfied among the brake operating force F, master cylinder pressure $P_M$ and booster negative pressure $P_{VB}$:

$$A_M \times (P_M + \Delta P_M) = A_{VB} \times (P_{VB} + \Delta P_V) + R_P \times (F + \Delta F)$$

This equation can be converted into the following equation (3), using the above equation (1):

$$A_M \times \Delta P_M = A_{VB} \times \Delta P_{VB} + R_P \times \Delta F$$

By the way, a boosting ratio (servo ratio) of the vacuum booster 517 is generally defined by the following equation (4):

$$R_{VB} = (A_{VB} \times \Delta P_{VB} + R_S \times \Delta F)/R_S \times \Delta F$$

In this equation (4), the denominator and the numerator represent an input and an output of the vacuum booster 517, respectively. Using this equation (4), the amount of increase $\Delta F$ is represented by the following equation (5):

$$\Delta F = (A_{VB}/R_S/(R_{VB}-1)) \times \Delta P_{VB}$$

Using this equation (5), the above equation (3) can be converted into the following equation (6):

$$A_M \times \Delta P_M = (A_{VB} \times R_{VB}/(R_{VB}-1) \times \Delta P_{VB}$$

Accordingly, a relationship represented by the following equation (7) is satisfied among the amount of increase $\Delta P_M$ and the amount of increase $\Delta P_{VB}$:

$$\Delta P_M = ((A_{VB}/A_M) \times R_{VB}/(R_{VB}-1)) \times \Delta P_{VB}$$

Suppose that the pressure $P_C$ in the negative pressure chamber 527 does not change for a given period of time, a relationship represented by the following equation (8) is satisfied between the amount of increase $\Delta P_{VB}$ of the booster negative pressure $P_{VB}$ per unit time and the amount of increase $\Delta P_V$ of the pressure $P_V$ in the pressure changing chamber 528 per unit time:

$$\Delta P_{VB} = \Delta P_V$$

Accordingly, a relationship represented by the following equation (9) is satisfied between the amount of increase $\Delta P_M$ and the amount of increase $\Delta P_V$:

$$\Delta P_M = ((A_{VB}/A_M) \times R_{VB}/(R_{VB}-1)) \times \Delta P_V$$

In this equation (9), the value $((A_{VB}/A_M) \times R_{VB}/(R_{VB}-1))$ represents a gradient S of a line of the pressure $P_V$ in the pressure changing chamber 528 and the master cylinder pressure $P_M$ which are taken along the abscissa and the ordinate, respectively, before the boosting limit of the vacuum booster has been reached.

Suppose the "amount of increase $\Delta P_V$" is defined as an amount of increase of the pressure $P_V$ in the pressure changing chamber 528 from the above-indicated reference $P_{V0}$ to the atmospheric pressure $P_{ATM}$, the "amount of increase $\Delta P_M$" means an amount of increase of the master cylinder pressure $P_M$ with an increase of the pressure $P_V$ in the pressure changing chamber 528 from the reference value $P_{V0}$ to the atmospheric pressure $P_{ATM}$, namely, an amount of increase of the master cylinder pressure $P_M$ until the boosting limit of the vacuum booster 517 has been reached. Therefore, a boosting limit value $P_{M0}$ of the master cylinder pressure $P_M$ when the boosting limit of the vacuum booster 517 has been reached is obtained according to the following equation, if the actual value of the master cylinder pressure $P_M$ detected when the pressure $P_V$ in the pressure changing chamber 528 has reached the reference value $P_{V0}$ is determined as a reference value $P_{M1}$:

$$P_{M0} = P_{M1} + \Delta P_M$$

Figure 57:
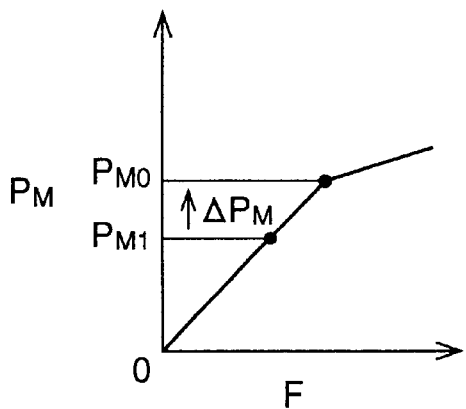
FIG. 57 is a graph showing a relationship between brake operating force F and master cylinder pressure $P_M$ in the case where the braking effect characteristic control is effected while taking account of pressure change in the negative pressure chamber of the vacuum booster, in the above-indicated fifteenth embodiment.

A relationship among the reference value $P_{M1}$, boosting limit value $P_{M0}$ and amount of increase $\Delta P_M$ is represented by the graph of FIG. 57.

Figure 58:
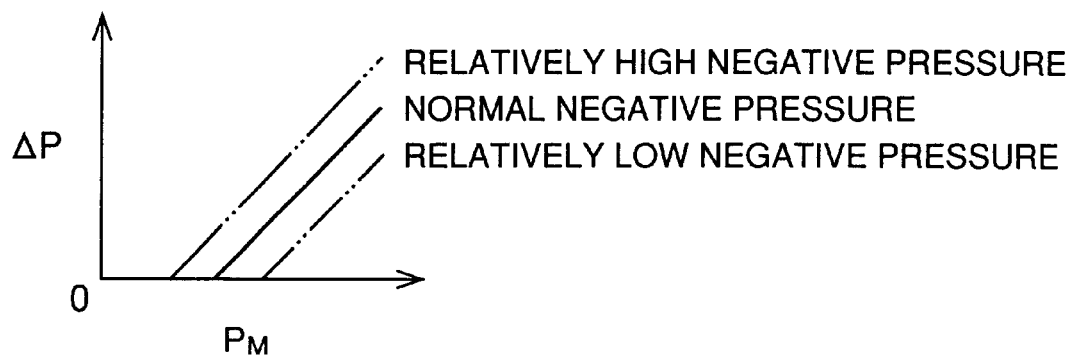
FIG. 58 is a graph showing a relationship between master cylinder pressure $P_M$ and pressure difference $\Delta P$ in the braking effect characteristic control wherein pressure change in the negative pressure chamber of the vacuum booster is taken into account, in the fifteenth embodiment.

In view of the above, the present embodiment is adapted to activate the pump 16 when the actual value of the master cylinder pressure $P_M$ has reached the boosting limit value $P_{M0}$. In the braking effect characteristic control, the electric current I for energizing the solenoid 74 of the pressure control valve 22 is controlled such that the pressure difference $\Delta P$ of the master cylinder 14 and the brake cylinder 10 changes in relation to the master cylinder pressure $P_M$, as indicated in the graph of FIG. 58.

Figure 59:
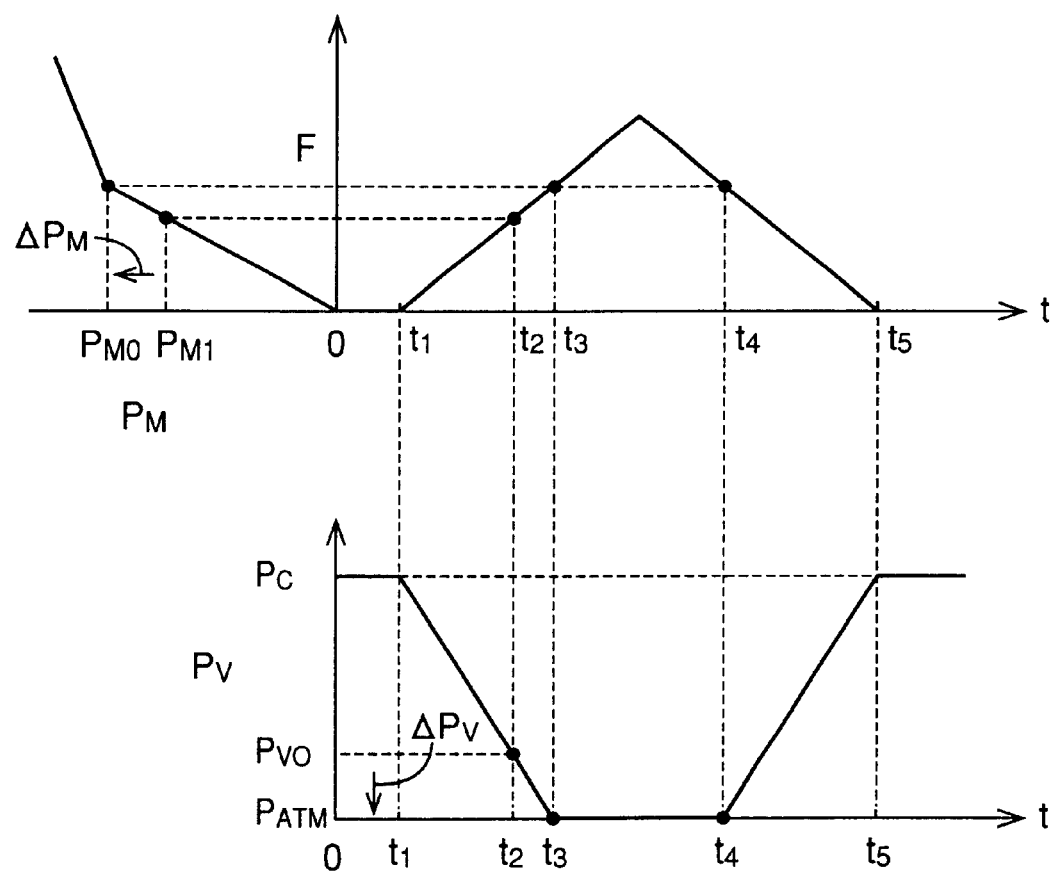
FIG. 59 is a graph for explaining the braking effect characteristic control in relation to the time.

If a braking operation is initiated at point of time t1 when the pressure $P_V$ in the pressure changing chamber 528 is equal to the pressure $P_C$ in the negative pressure chamber 527, as indicated in the graph of FIG. 59, the pressure $P_V$ in the pressure changing chamber 528 begins to rise toward the atmospheric pressure $P_{ATM}$ as a result of an increase of the brake operating force F from the zero value. The actual value of the master cylinder pressure when the pressure $P_V$ in the pressure changing chamber 528 has increased to the reference value $P_{V0}$ at point of time t2 is determined as the reference value $P_{M1}$. The boosting limit value $P_{M0}$ is obtained as a sum of the reference value $P_{M1}$ and the amount of increase $\Delta P_M$ corresponding to the amount of increase $\Delta P_V$. When the actual value of the master cylinder pressure $P_M$ has subsequently increased to the boosting limit value $P_{M1}$ at point of time t3, the pump 16 is activated to increase the brake cylinder pressure $P_B$ even if the pressure $P_V$ in the pressure changing chamber 528 is kept constant at the atmospheric pressure $P_{ATM}$ irrespective of a subsequent increase in the brake operating force F.

When the actual value of the master cylinder pressure $P_M$ has been lowered below the boosting limit value $P_{M0}$ at point of time t4 as a result of a decrease in the brake operating force F, the pump 16 is turned off. Subsequently, the pressure $P_V$ in the pressure changing chamber 528 is lowered, and the brake operating force F is zeroed at point of time t5 so that the pressure $P_V$ in the pressure changing chamber 528 is again made equal to the pressure $P_C$ in the negative pressure chamber 527.

Although the pressure $P_C$ in the negative pressure chamber 527 is kept substantially constant throughout the braking operation, the pressure $P_C$ in the negative pressure chamber 527 in one braking operation may differ from that in another braking operation. On the other hand, the pressure $P_C$ in the negative pressure chamber 527 is reflected on the actual value of the master cylinder pressure $P_M$ when the pressure $P_V$ in the pressure changing chamber 528 has reached the reference value $P_{V0}$, that is, on the reference value $P_{M0}$.

Thus, the present embodiment is adapted to avoid different braking effects during different braking operations in which the pressure $P_C$ in the negative pressure chamber 528 have different values, whereby the present embodiment assures a high degree of stability in the braking effect.

Figure 60:
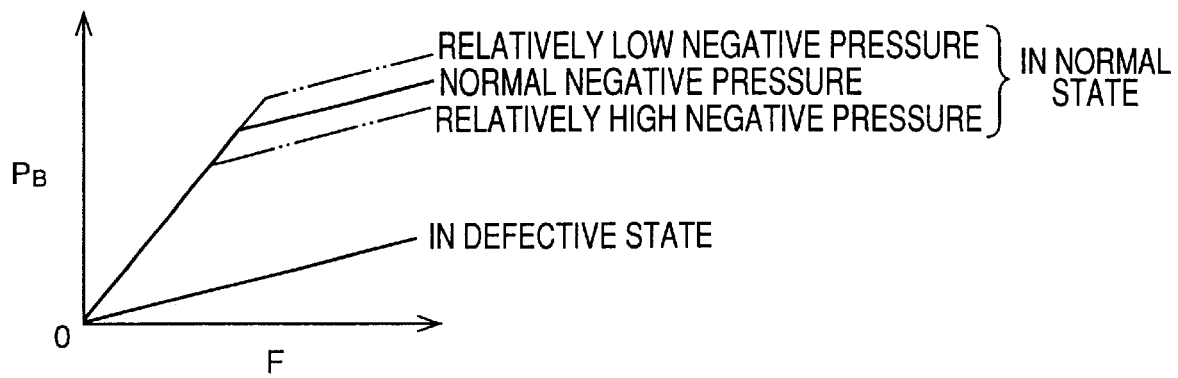
FIG. 60 is a graph showing different relationships between brake operating force F and brake cylinder pressure $P_B$ when vacuum booster is normal and defective, in a braking system equipped with the vacuum booster.

It is also noted that the vacuum booster 517 is not always normally operated, and may be defective for some reason or other, with the pressure $P_C$ in the negative pressure chamber 527 being insufficiently low. The braking effect characteristic varies depending upon whether the vacuum booster 517 is in a normal or defective state, as indicated in the graph of FIG. 60. If the braking effect characteristic control is effected on an assumption that the vacuum booster 517 is always normal, the vehicle operator is required to operate the brake pedal 32 with a large force in the event of some defect of the vacuum booster 517.

Figure 61:
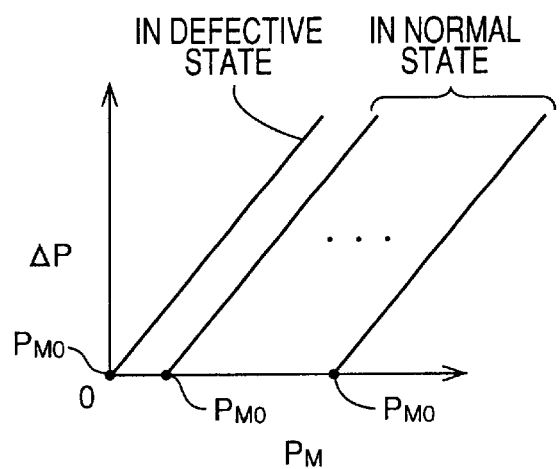
FIG. 61 is a graph showing different relationships between master cylinder pressure $P_M$ and pressure difference $\Delta P$ when the vacuum booster is normal and defective, in the above-indicated fifteenth embodiment.

In the light of the above, the braking effect control according to the present embodiment is adapted to zero the boosting limit value $P_{M0}$ in the event of some defect of the vacuum booster 517, so that the pump 16 is activated when the actual value of the master cylinder pressure $P_M$ becomes slightly higher than zero, as indicated in the graph of FIG. 61.

The braking effect characteristic control may be arranged to determine that the vacuum booster 517 is defective, if the pressure $P_C$ in the negative pressure chamber 527 detected by pressure detecting means such as a pressure sensor or a pressure switch is higher than a reference value $P_{C0}$ lower than the atmospheric pressure $P_{ATM}$, even while the engine is operation. In this case, however, pressure detecting means is required for both of the negative pressure chamber 527 and the pressure changing chamber 528.

In view of the above, the present embodiment is adapted to effect determination as to whether the vacuum booster 517 is defective or not, by utilizing the above-indicated negative pressure switch 534 as the pressure detecting means, based on a fact that the negative pressure chamber 527 and the pressure changing chamber 528 have the same pressure when a braking operation is not performed, so that the pressure $P_C$ in the negative pressure chamber 527 can be obtained by detecting the pressure in the pressure changing chamber 528. That is, the present embodiment uses the pressure detecting means for detecting the pressure in the pressure changing chamber 528, for effecting both the determination as to whether the boosting limit of the vacuum booster 517 has been reached and the determination as to whether the vacuum booster 517 is defective.

Figure 62:
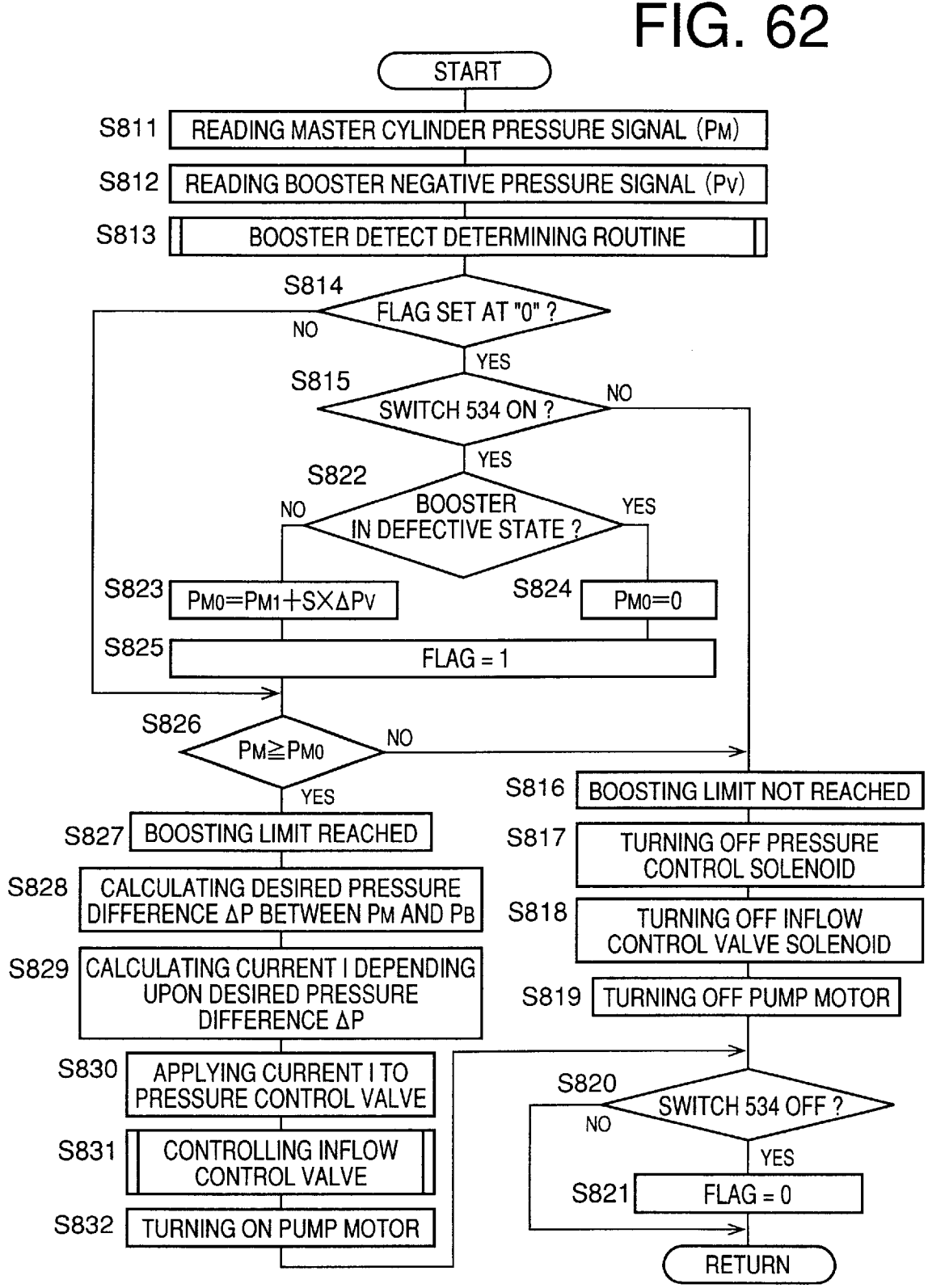
FIG. 62 is a flow chart showing a braking effect characteristic control routine in the fifteenth embodiment.

A routine for the braking effect characteristic control is illustrated in the flow chart of FIG. 62.

This routine is repeatedly executed when the ignition switch of the motor vehicle is turned on by the vehicle operator. Each cycle of execution of the routine is initiated with S811 to read the master cylinder pressure signal received from the master cylinder pressure sensor 80. Then, S812 is implemented to read a booster negative pressure signal received from the booster negative pressure switch 534. Then, S813 is implemented to determine whether the vacuum booster 517 is defective or not.

Figure 63:
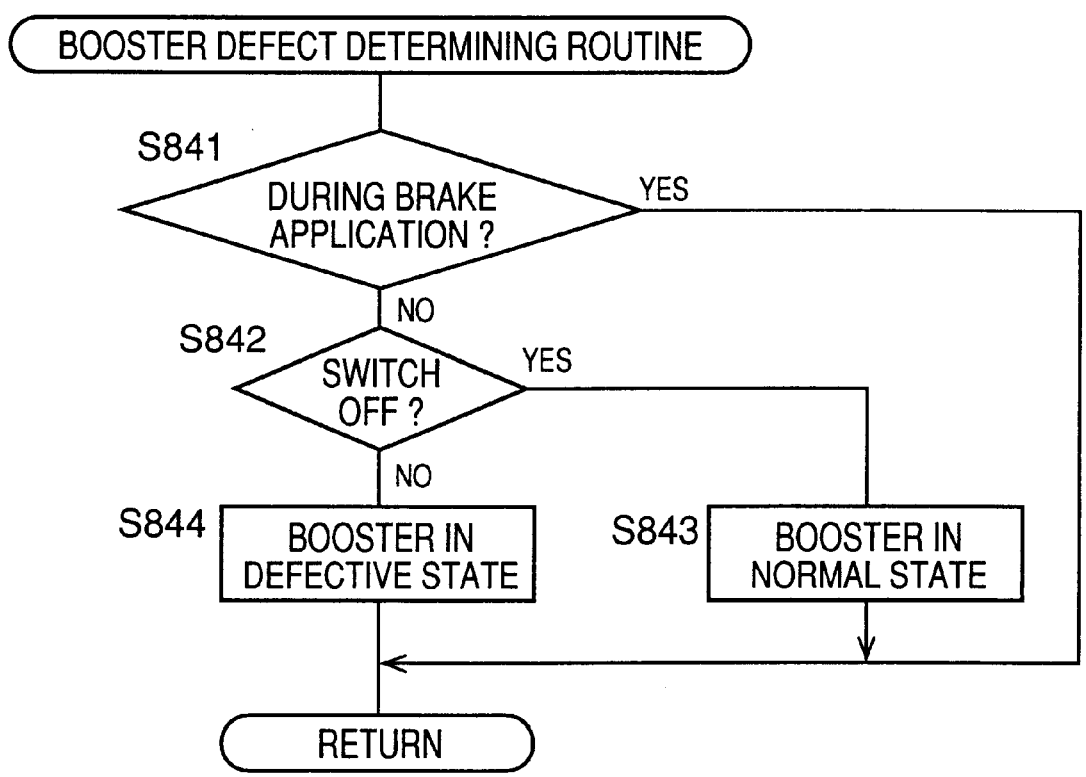
FIG. 63 is a flow chart showing the details of step S813 in FIG. 62, in which a booster defect determining routine is executed.

FIG. 63 shows details of S813, as a booster defect determining routine. This routine is initiated with S841 to read a brake operation signal received from the brake switch 350, and determine whether a braking operation is performed, on the basis of the braking operation signal. If the braking operation is performed in this cycle of execution, an affirmative decision (YES) is obtained, and the present cycle of execution of this routine is immediately terminated. In this case, the control flow goes to S814 of FIG. 62. If the braking operation is not performed in the present cycle, a negative decision (NO) is obtained, and the control flow goes to S842 to determine whether the booster negative pressure switch 534 s in an OFF state or not, that is, whether the relatively low negative pressure is present in the pressure changing chamber 528 which is in communication with the negative pressure chamber 527. If the negative pressure switch 534 is in the OFF state in this control cycle, an affirmative decision (YES) is obtained, and the control flow goes to S843 to determine that the vacuum booster 517 is in a normal state. If the booster negative pressure switch 534 is in the ON state in this control cycle, on the other hand, a negative decision (NO) is obtained in S842, and the control flow goes to S844 to determine that the vacuum booster 517 is in a defective state. In either case, one cycle of execution of the present routine is terminated, and the control flow goes to S814 of FIG. 62.

This S814 is provided to determine whether a control flag provided in the RAM is set at "0" or not. This control flag is provided to inhibit updating of the boosting limit value $P_{M0}$ during a time period from a moment when the boosting limit value $P_{M0}$ is calculated in response to a change of the state of the booster negative pressure switch 534 from the OFF state to the ON state to a moment when the booster negative pressure switch 534 is restored to the OFF state. The control flag is initialized to "0" when power is applied to the computer of the ECU 522. If the control flag is set at "0", an affirmative decision (YES) is obtained, and the control flow goes to S815.

This S815 is provided to determine whether the booster negative pressure switch 534 is in the ON state or not. If the vacuum booster 517 is not defective and if the booster negative pressure switch 534 is not in the ON state as the brake operating force F is relatively small in this control cycle, a negative decision (NO) is obtained, and the control flow goes to S816 to determine that the boosting limit of the vacuum booster 517 has not been reached. Then, S817 is implemented to generate a signal for turning off the solenoid 74 of the pressure control valve 22, so that the pressure control valve 22 is opened. Successively, S818 is implemented to generate a signal for turning off the solenoid 116 of the inflow control valve 138, so that the inflow control valve 138 is closed. Then, the control flow goes to S819 to generate a signal for turning off the pump motor 114.

Then, S820 is implemented to determine whether the booster negative switch 534 is in the OFF state. If the switch 534 is in the OFF state, an affirmative decision (YES) is obtained, and the control flow goes to S821 to generate a signal for resetting the control flag to "0". If the switch 534 is in the ON state, a negative decision (NO) is obtained in S820, and S821 is skipped. Thus, one cycle of execution of the present routine is terminated.

If the vacuum booster 517 is defective or if the vacuum booster is not defective but the booster negative pressure switch 534 is in the ON state with the relatively large brake operating force F, an affirmative decision (YES) is obtained in S815, the control flow goes to S822 and the subsequent steps.

First, S822 is provided to determine whether the vacuum booster 517 has been determined to be defective. If the vacuum booster 517 has not been determined to be defective in this control cycle, a negative decision (NO) is obtained, and the control flow goes to S823 in which the above-indicated reference value $P_{M1}$ is determined on the basis of the master cylinder pressure signal read in the above-indicated step, and the boosting limit value $P_{M0}$ is calculated according to the above-indicated equation $P_{M0}=P_{M1}+S\times$ $\Delta P_V$. In this equation, "S" is a known constant, and is stored in the ROM. If the vacuum booster 517 is defective in this control cycle, on the other hand, an affirmative decision (YES) is obtained in S822, and the control flow goes to S824 in which the boosting limit value $P_{M0}$ is zeroed.

In either case, S825 is then implemented to set the above-indicated control flag to "1". Then, S826 is implemented to determine whether the master cylinder pressure $P_M$ is presently equal to or higher than the boosting limit value $P_{M0}$. This determination is effected on the basis of the above-indicated master cylinder pressure signal. If the master cylinder pressure $P_M$ is lower than the boosting limit value $P_{M0}$ in this control cycle, a negative decision (NO) is obtained, and the control flow goes to S816 and the subsequent steps. If the master cylinder pressure $P_m$ is equal to or higher than the boosting limit value $P_{M0}$ in this control cycle, on the other hand, an affirmative decision (YES) is obtained in S826, and the control flow goes to S827 and the subsequent steps.

Figure 64:
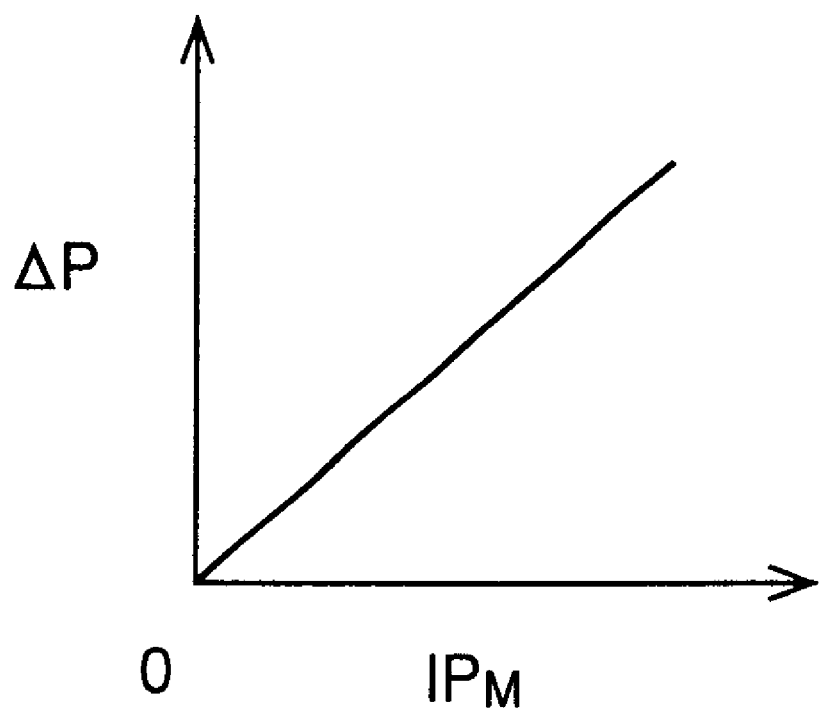
FIG. 64 is a graph showing a relationship between an increment $IP_M$ of actual value of master cylinder pressure $P_M$ from boosting limit value $P_{MO}$ and desired value of the above-indicated pressure difference $\Delta P$, in step S828 in FIG. 62.

First, S827 is implemented to determine that the boosting limit of the vacuum booster 517 has been reached. Then, S828 is implemented to calculate a desired value of the pressure difference $\Delta P$ between the master cylinder pressure $P_M$ and the brake cylinder pressure $P_B$, on the basis of the present master cylinder pressure $P_M$. The ROM stores a predetermined relationship between the desired pressure difference $\Delta P$ and an amount of increase $IP_M$ of the actual value of the master cylinder pressure $P_M$ from the boosting limit value $P_{M0}$. According to this relationship, the desired pressure difference $\Delta P$ corresponding to the present master cylinder pressure $P_M$ is determined. That relationship may be formulated such that the desired pressure difference $\Delta P$ linearly increases with an increase in the amount of increase $IP_M$, as indicated in the graph of FIG. 64.

Then, S829 is implemented to calculate the electric current of the solenoid 74 of the pressure control valve 22, which corresponds to the desired pressure difference $\Delta P$. The ROM stores also a relationship between the desired pressure difference $\Delta P$ and the solenoid current I. The solenoid current I corresponding to the desired pressure difference $\Delta P$ is calculated according to this relationship. S830 is then implemented to apply the calculated electric current I to the solenoid 74, for thereby controlling the pressure control valve 22. Then, S831 is implemented to control the inflow control valve 138.

Figure 65:
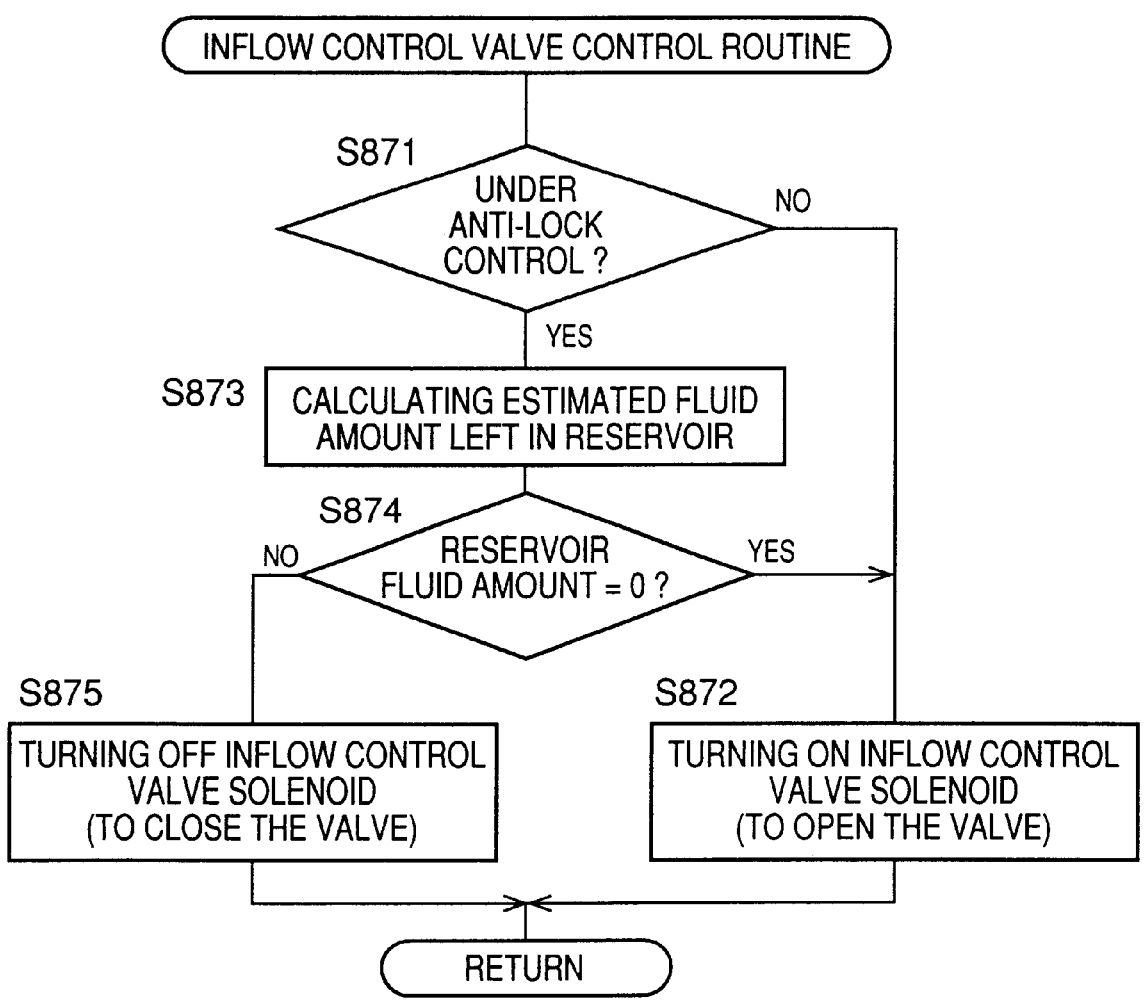
FIG. 65 is a flow chart showing the details of step S831 in FIG. 62, in which an inflow control valve control routine is executed.

Details of S831 are shown as an inflow control valve control routine, in the flow chart of FIG. 65.

Initially, S871 is implemented to determine whether an anti-lock brake pressure control operation is presently performed. If the anti-lock brake pressure control operation is not performed, a negative decision (NO) is obtained, and the control flow goes to S872 to generate a signal for energizing the solenoid 116 of the inflow control valve 138, that is, a signal for opening the inflow control valve 138, so that the working fluid can be supplied from the master cylinder 14 to the pump 16 through the fluid supply passage 130. Thus, one cycle of execution of this routine is terminated.

If the anti-lock brake pressure control operation is presently performed, an affirmative decision (YES) is obtained in S871, and the control flow goes to S873 to estimate the amount of the working fluid that can be pumped up by the pump 16 from the reservoir 132, namely, the amount of the working fluid left in the reservoir 132. Then, S874 is implemented to determine whether the estimated amount of the fluid left in the reservoir is zero or not, that is, whether the fluid that can be pumped up by the pump 16 is absent in the reservoir 132. If the amount of the fluid left in the reservoir is not presently zero in this control cycle, a negative decision (NO) is obtained, and S875 is implemented to generate a signal for de-energizing the solenoid 116 of the inflow control valve 138, that is, a signal for closing the inflow control valve 138. If the amount of the fluid left in the reservoir is presently zero in this control cycle, on the other hand, an affirmative decision (YES) is obtained in S874, and the control flow goes to S872 to generate the signal for opening the inflow control valve 138. In either case, one cycle of execution of the present routine is terminated, and the control flow goes to S832 of FIG. 62. In this S832, a signal for turning on the pump motor 114 is generated, so that the working fluid is pumped up by the pump 16 from the reservoir 132, to deliver the working fluid to each brake cylinder 10, whereby the fluid pressure generated in each brake cylinder 10 is higher than the master cylinder pressure $P_M$ by the desired pressure difference $\Delta P$ which corresponds to the master cylinder pressure $P_M$. Then, the control flow goes to S820. Since the booster negative pressure switch 534 is not presently in the OFF state, a negative decision (NO) is obtained, and S821 is skipped. Thus, one cycle of execution of the present routine is terminated.

When the brake operating force F is reduced at the end of the braking operation, the pressure $P_V$ in the pressure changing chamber 528 is accordingly reduced, and the booster negative pressure switch 534 is turned off. As a result, an affirmative decision (YES) is obtained in S820, and the control flow goes to S821 to initialize the control flow to "0".

While the braking effect characteristic control routine has been described in detail by reference to the drawings, the anti-lock brake pressure control routine will be described only briefly since this routine does not directly relate to the present invention. The anti-lock brake pressure control routine is formulated to prevent locking of each vehicle wheel during brake application to the vehicle, by selectively establishing a pressure-increasing state, a pressure-holding state and a pressure-reducing state, while monitoring the rotating speed of each wheel with the wheel speed sensor 112 and the running speed of the vehicle. In the pressure-increasing state, the pressure increasing valve 50 is placed in the open state, while the pressure reducing valve 50 is placed in the closed state. In the pressure-holding state, the pressure increasing valve 40 and the pressure reducing valve 50 are both placed in the closed state. In the pressure-reducing state, the pressure increasing valve 40 is placed in the closed state while the pressure reducing valve 50 is placed in the open state. The anti-lock brake pressure control routine is further formulated such that the pump motor 114 is activated during an anti-lock brake pressure control operation, to operate the pump 16 to return the fluid from the reservoir 48 to the primary passage 18.

It will be understood from the foregoing explanation of the present embodiment that a portion of the ECU 522 assigned to implement S811–S816 and S822–S827 of FIG. 62 constitutes an example of a "determining device", and an example of "first determining means". It will also be understood that the pump 16 (an example of the hydraulic pressure source), a portion of the ECU 522 assigned to implement S819, S826 and S832 of FIG. 62 (an example of the hydraulic pressure source control device), the pressure control valve 22 (an example of a mechanical part of the pressure control device), and a portion of the ECU 522 assigned to implement S817 and S828–S830 of FIG. 62 (an example of an electrical part of the pressure control device) constitute an example of a ":second boosting device".

It is noted that various improvements may be made in the present embodiment.

For instance, the routine of FIG. 62 may be modified such that the pump 16 is activated when the actual master cylinder pressure $P_M$ becomes higher than a value which is lower than the boosting limit value $P_{M0}$ by a predetermined amount, so that the operation of the pump 16 is initiated before the boosting limit of the vacuum booster 417 has been reached.

The routine of the same figure may also be modified so as to detect abnormality of the booster negative pressure switch 534, and such that S823 is implemented, in the event of detection of abnormality of the switch 534, to determine the boosting limit value $P_{M0}$, assuming that the pressure in the negative pressure chamber 527 is normal. The detection of abnormality of the booster negative pressure switch 534 may be effected so as to determine that the booster negative pressure switch 534 is abnormal, if the booster negative pressure switch 534 is in the OFF state when the ignition switch is in the ON state and when the engine is not operated.

Further, the routine of FIG. 65 may be modified such that the amount of the working fluid left in the reservoir 132 is detected directly by a sensor. For instance, the amount of the fluid left may be detected by a permanent magnet which is provided on the reservoir piston 54 of the reservoir 132 such that the permanent magnet is movable with the reservoir piston 54, and a proximity switch in the form of a reed switch disposed in proximity with the permanent magnet.

The routine of the same figure may also be modified so as to estimate or detect the amount of the working fluid left in the reservoir 132, irrespective of whether an anti-lock brake pressure control operation is performed or not, and such that the inflow control valve 138 is closed when the estimated or detected amount is not zero, and opened when it is zero.

The routine of the same figure may also be modified so as to immediately implement S872 for opening the inflow control valve 138 without detecting the amount of the working fluid left in the reservoir 132, if there is not a possibility that the fluid is left in the reservoir 132 before initiating a plurality of cycles of execution of this routine (before initiating each cycle of execution of the braking effect characteristic control routine), for example, if the present routine is initiated while an anti-lock brake pressure control operation is not performed, and so as to implement S874 to determine whether the working fluid is present, and selectively implement S872 or S875 so that the inflow control valve 138 is opened only when the working fluid is not present. This arrangement prevents an unnecessarily large amount of flow of the working fluid from the master cylinder 14 into the reservoir 132, even in a braking system which is not adapted to activate the pump 16 to evacuate the reservoir 132, upon termination of the braking effect characteristic control, so that the braking system is ready for a subsequent anti-lock brake pressure control operation. Consequently, the present arrangement makes it possible to minimize the amount of the fluid left in the reservoir 132 at the end of the braking effect characteristic control, and thereby avoid an excessive amount of the fluid present in the reservoir 132 upon initiation of the subsequent anti-lock brake pressure control operation, which excessive amount would prevent intended reduction of the fluid pressure in the brake cylinder 10. The reservoir 132 may be connected to the reservoir 536 of the master cylinder 14 through an exclusive return passage which is provided with another pump and another shut-off valve disposed in series with each other, so that the reservoir 132 is fully evacuated at the end of the braking effect characteristic control, by opening the shut-off valve and activating the pump at the end of the braking effect characteristic control.

There will next be described a sixteenth embodiment of this invention. This embodiment has a number of elements which are identical with those of the preceding fifteenth embodiment and which are identified by the same reference signs as used in the fifteenth embodiment. Detailed description of these elements will not be provided, and only the elements specific to the present embodiment will be described in detail.

Figure 66:
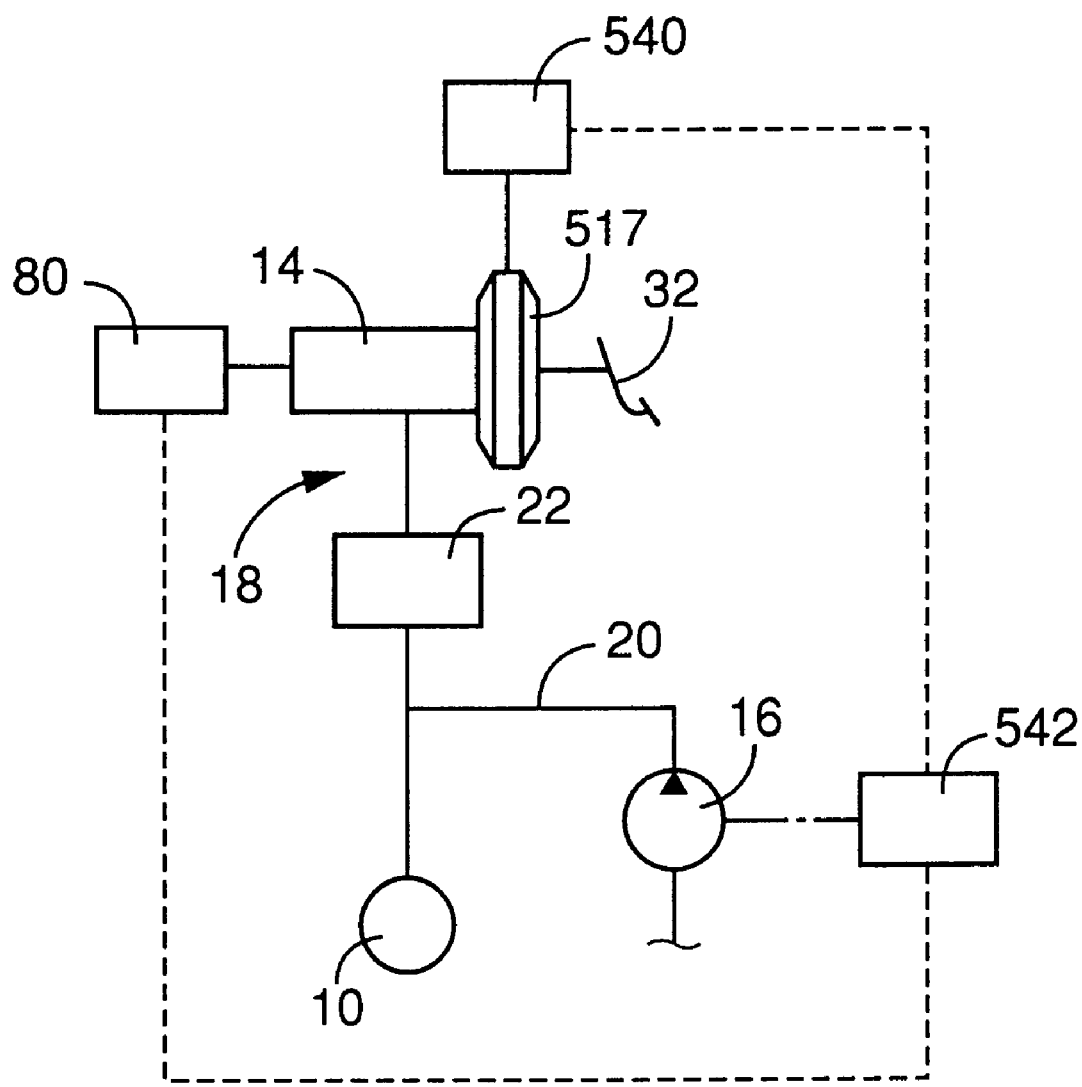
FIG. 66 is a schematic view schematically showing a general arrangement of a braking system of a sixteenth embodiment of this invention.

Unlike the fifteenth embodiment, the present embodiment uses a booster negative switch 540 as shown in FIG. 66, which generates a booster negative pressure signal indicative of an OFF state when the pressure $P_V$ in the pressure changing chamber 528 is lower than the atmospheric pressure $P_{ATM}$, and a booster negative pressure signal indicative of an ON state when the pressure $P_V$ is equal to or higher than the atmospheric pressure $P_{ATM}$. In the present embodiment, an ECU 542 controls the pump 16 on the basis of output signals of the booster negative pressure switch 540 and the master cylinder pressure sensor 80, so as to effect the braking effect characteristic control.

Figure 67:
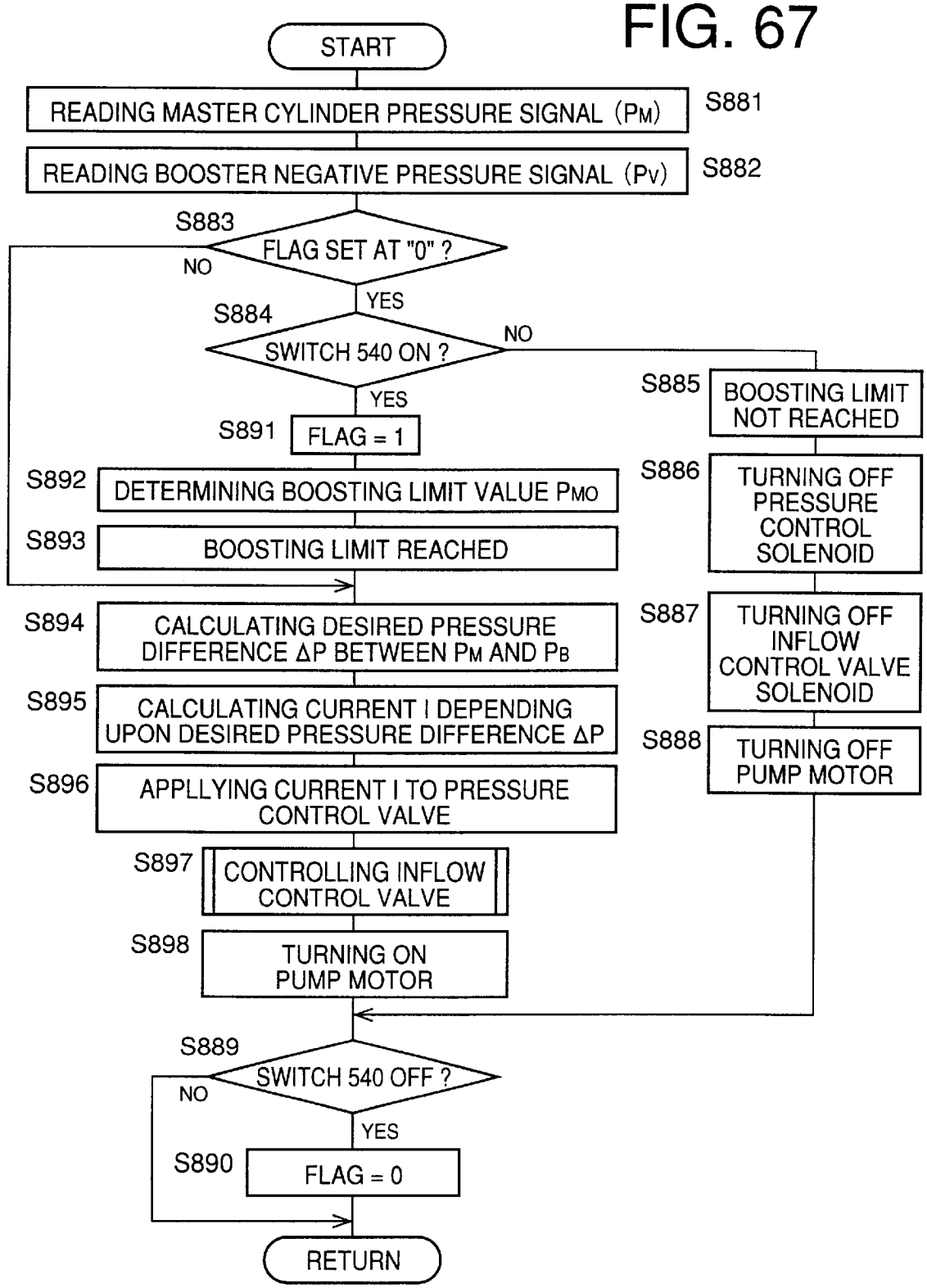
FIG. 67 is a flow chart showing a braking effect characteristic control routine in the sixteenth embodiment.

The braking effect characteristic control routine in the present embodiment is illustrated in the flow chart of FIG. 67. While the braking effect characteristic control in the present embodiment will be described based on this flow chart, the portions of the present routine identical with those in the flow chart of FIG. 62 of the fifteenth embodiment will be described only briefly.

The present routine is also repeatedly executed during running of the motor vehicle. In each cycle of execution, the routine is initiated with S881 to read the master cylinder pressure signal received from the master cylinder pressure sensor 80. Then, S882 is implemented to read the booster negative pressure signal received from the booster negative pressure switch 540. Successively, S883 is implemented to determine whether the above-indicated control flag is set at "0". If the control flag is set at "0" in this control cycle, an affirmative decision (YES) is obtained, and the control flow goes to S884 to determine whether the booster negative pressure switch 540 is in the ON state, that is, whether the pressure $P_V$ in the pressure changing chamber 528 is equal to or higher than the atmospheric pressure $P_{ATM}$. If the switch 540 is not in the ON state in this control cycle, a negative decision (NO) is obtained, and the control flow goes to S885 to determine that the boosting limit of the vacuum booster 517 has not been reached. Then, the control flow goes to S886 to de-energize the solenoid 74 of the pressure control valve 22, S887 to de-energize the solenoid 116 of the inflow control valve 138, and S888 to turn off the pump motor 114. Successively, S889 is implemented to determine whether the booster negative pressure switch 540 is in the OFF state. If the switch 54 is in the OFF state, an affirmative decision (YES) is obtained, and the control flow goes to S890 to reset the control flow to "0". If the switch 540 is in the ON state, a negative decision (NO) is obtained, and S890 is skipped. Since the booster negative pressure switch 540 is supposed to be in the OFF state in this control cycle, the affirmative decision (YES) is obtained, and S890 is implemented to reset the control flag to "0". Thus, one cycle of execution of the present routine is terminated.

If the booster negative switch 540 is in the ON state in this control cycle in which the pressure $P_V$ in the pressure changing chamber 528 is equal to or higher than the atmospheric pressure $P_{ATM}$, an affirmative decision (YES) is obtained in S884, and the control flow goes to S891 and the subsequent steps.

First, S891 is implemented to set the control flag to "1". Then, S892 is implemented to calculate the actual value of the master cylinder pressure $P_M$ on the basis of the above-indicated master cylinder pressure signal, and determine the calculated value as the boosting limit value $P_{M0}$. Successively, S893 is implemented to determine that the boosting limit of the vacuum booster 517 has been reached.

Then, S894 is implemented to calculate the desired value of the pressure difference $\Delta P$ between the master cylinder pressure $P_M$ and the brake cylinder pressure $P_B$, on the basis of the amount of increase $IP_M$ of the present value of the master cylinder pressure $P_M$ from the boosting limit value $P_{MO}$. Then, S895 is implemented to calculate the electric current I of the solenoid 74 of the pressure control valve 22, which electric current I corresponds to the desired pressure difference $\Delta P$. The control flow then goes to S896 to apply the calculated electric current I to the solenoid 74, for controlling the pressure control valve 22. Then, S897 is implemented to control the inflow control valve 138. Successively, the control flow goes to S898 to turn on the pump motor 114. Then, S889 is implemented to determine whether the booster negative pressure switch 540 is in the OFF state. If the switch 540 is presently in the ON state, a negative decision (NO) is obtained, and S890 is skipped. Thus, one cycle of execution of the present routine is terminated.

It will be understood from the above explanation of the present embodiment that a portion of the ECU 542 assigned to implement S881, S882, S884, S885 and S893 constitutes an example of the "determining device", and an example of "second determining means".

It is noted that while the present embodiment is adapted to initiate an operation of the pump 16 when the actual pressure $P_V$ in the pressure changing chamber 528 has become equal to or higher than the atmospheric pressure $P_{ATM}$, the booster negative pressure switch may be adapted such that the state of the output signal is changed to activate the pump 16 when the actual pressure $P_V$ in the pressure changing chamber 528 has become equal or higher than a value which is lower than the atmospheric pressure $P_{ATM}$ by a predetermined amount, so that the operation of the pump 16 is initiated before the boosting limit of the vacuum booster 517 has been reached, with an operation delay of the pump 16 taken into account.

Then, a seventeenth embodiment of this invention will be described. This embodiment has a number of elements which are identical with those of the preceding sixteenth embodiment and which are identified by the same reference signs as used in the sixteenth embodiment. Only the elements specific to the present embodiment will be described in detail.

Figure 68:
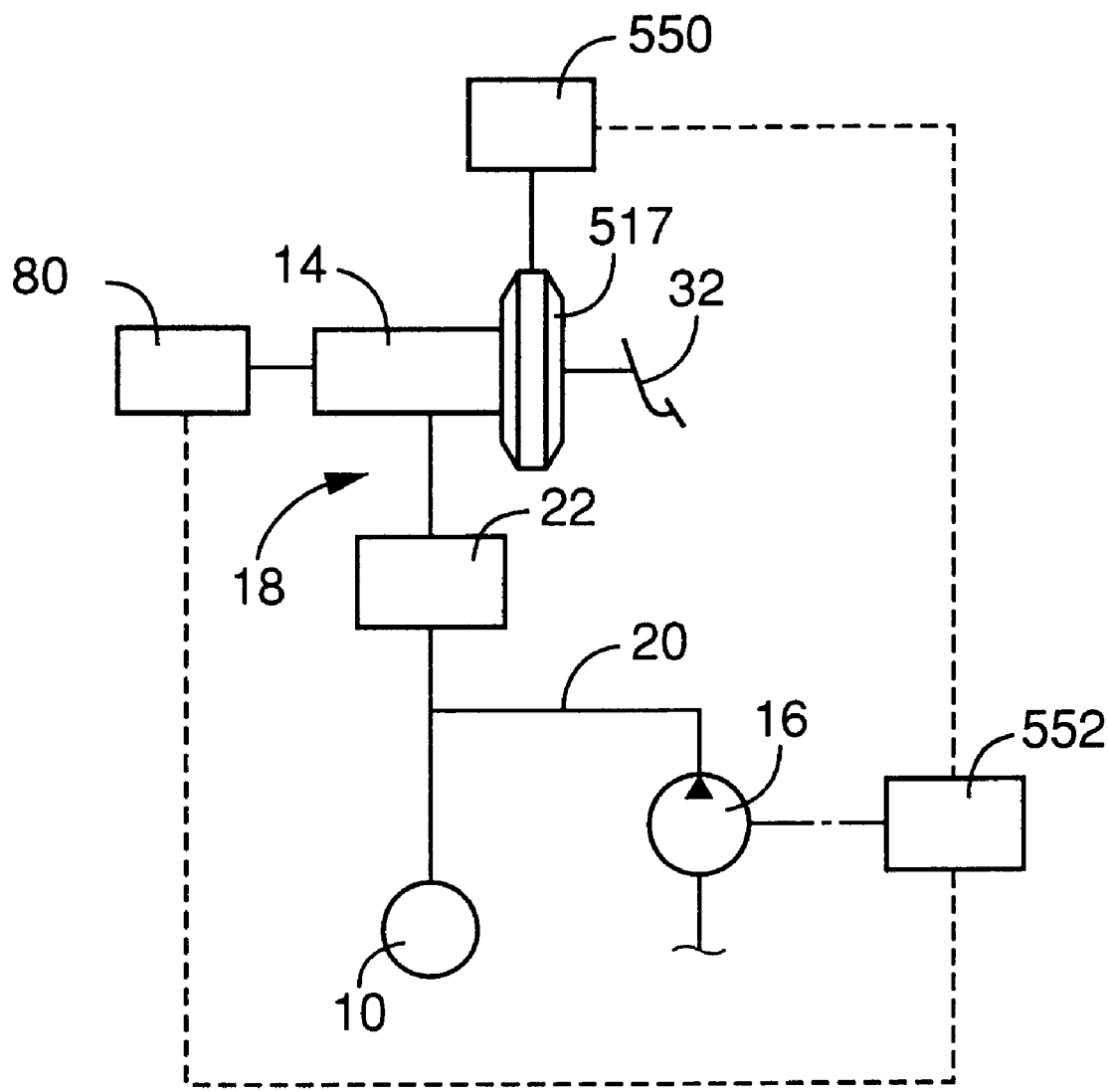
FIG. 68 is a schematic view schematically showing a general arrangement of a braking system of a seventeenth embodiment of this invention.

In the present embodiment, a booster negative pressure sensor 550 is provided in place of the above-indicated booster negative pressure switch 540, as shown in FIG. 68. This booster negative pressure sensor 550 is operated in response to the pressure $P_C$ in the negative pressure chamber 527, such that a booster negative pressure signal generated by this sensor continuously changes with a continuous change in the level of that pressure $P_C$. An ECU 552 executes the braking effect characteristic control on the basis of the output signals of the booster negative pressure sensor 550 and the above-indicated master cylinder pressure sensor 90.

Figure 69:
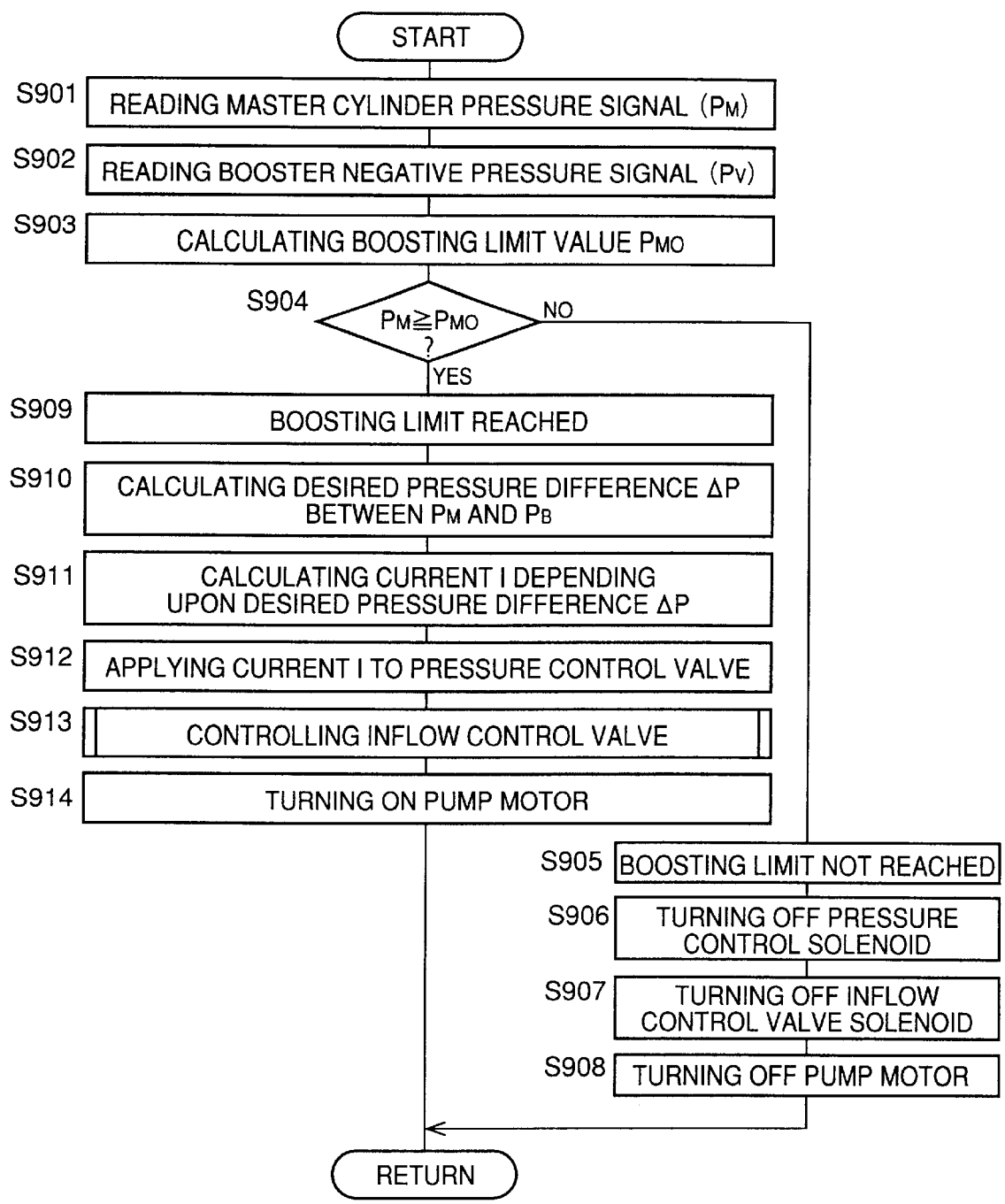
FIG. 69 is a flow chart showing a braking effect characteristic control routine in the seventeenth embodiment.

The braking effect characteristic control routine in the present embodiment is illustrated in the flow chart of FIG. 69. While the braking effect characteristic control in the present embodiment will be described based on this flow chart, the portions of the present routine identical with those in the flow chart of FIG. 67 of the sixteenth embodiment will be described only briefly.

Figure 70:
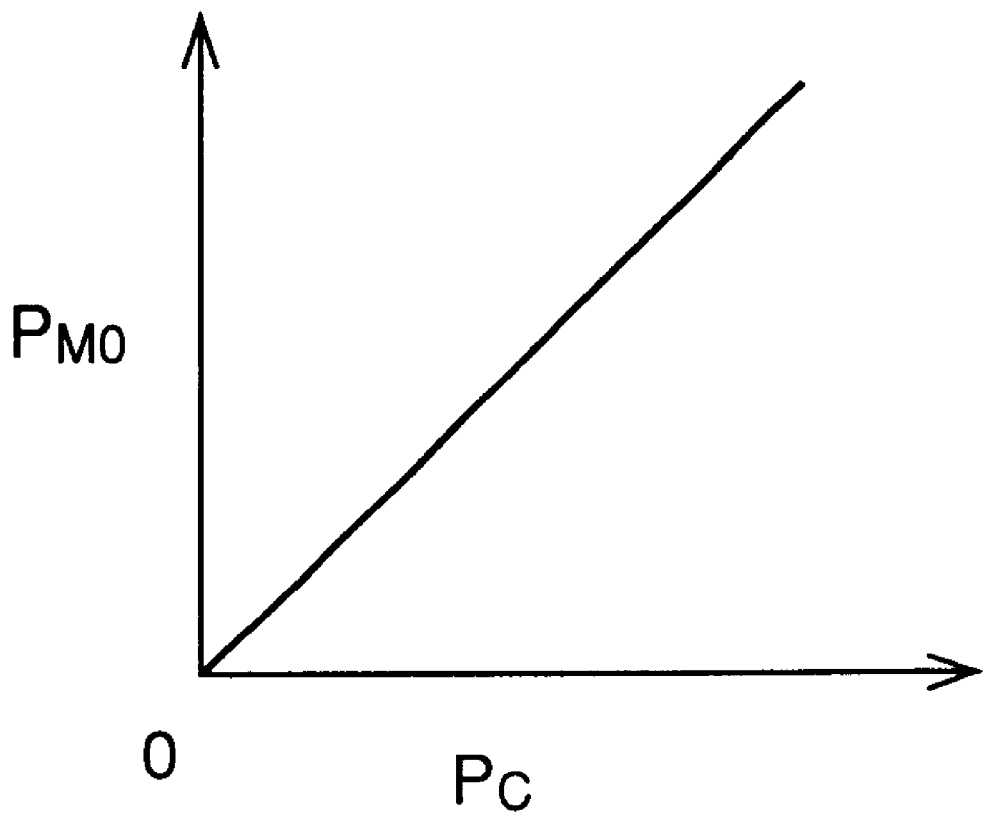
FIG. 70 is a graph showing a relationship between pressure $P_C$ in negative pressure chamber of vacuum booster and boosting limit value $P_{MO}$ of master cylinder pressure $P_M$, in the seventeenth embodiment.

The present routine is also repeatedly executed during running of the motor vehicle. In each cycle of execution, the routine is initiated with S901 to read the master cylinder pressure signal received from the master cylinder pressure sensor 80. Then, S902 is implemented to read the booster negative pressure signal received from the booster negative pressure sensor 550. The control flow then goes to S903 to detect the pressure $P_C$ in the negative pressure chamber 527 on the basis of the booster negative pressure signal, and calculate the boosting limit value $P_{M0}$ corresponding to the actual value of the pressure $P_C$ of the negative pressure chamber 527, on the basis of the detected pressure $P_C$ and according to a predetermined relationship (stored in the ROM) between the pressure $P_C$ and the boosting limit value $P_{MO}$. According to this predetermined relationship, the boosting limit value $P_{M0}$ increases with a decrease in the pressure $P_C$ of the negative pressure chamber 527 (toward the vacuum), as indicated in the graph of FIG. 70 by way of example.

Then, S904 is implemented to determine whether the present master cylinder pressure $P_M$ is equal to or higher than the boosting limit value $P_{MO}$, on the basis of the above-indicated master cylinder pressure signal. If the present master cylinder pressure $P_M$ is not equal to or higher than the boosting limit value $P_{M0}$, a negative decision (NO) is obtained, and the control flow goes to S905 and the subsequent steps, in the same manner as in S909 and the subsequent steps of FIG. 67.

It will be understood from the above explanation of the present embodiment that the booster negative pressure sensor 550 constitutes an example of "booster-pressure-related quantity detecting means" and an example of "negative-pressure-chamber-pressure-related quantity detecting means", and that a portion of the ECU 552 assigned to implement S901–S904 and S909 of FIG. 69 constitutes an example of the "determining device" and "third determining means".

In the present embodiment, it is noted that the relationship between the pressure $P_C$ of the negative pressure chamber 527 and the boosting limit value $P_{M0}$ is stored in the ROM so that the boosting limit value $P_{M0}$ is calculated according to the relationship, as described above.

A difference between a boosting limit value $P_{M01}$ when the pressure $P_C$ of the negative pressure chamber 527 is equal to a certain value $P_{C1}$, and a boosting limit value $P_{M02}$ when the pressure $P_C$ is equal to another value $P_{C2}$ is represented by the following equation:

$$P_{M01} - P_{M02} = S \times (P_{C2} - P_{C1})$$

If the value $P_{C1}$ is used as a reference value, the value $P_{M01}$, means the boosting limit value $P_{M01}$ when the pressure $P_C$ of the negative pressure chamber 527 is equal to the reference value $P_{C1}$. If the value $P_{C2}$ is the present value, the value $P_{M02}$ means the boosting limit value $P_{M0}$ when the pressure $P_C$ of the negative pressure chamber 527 is equal to the present value. That is, the boosting limit value $P_{M0}$ can be obtained according to the following equation:

$$P_{MO} = P_{M01} - S \times (P_C - P_{C1})$$

Based on this finding, therefore, the present embodiment may be adapted to store in the ROM the boosting limit value $P_{M01}$ when the pressure $P_C$ of the negative pressure chamber 527 is equal to the reference value $P_{C1}$, detect the present pressure $P_C$ of the negative pressure chamber 527 by negative-pressure-chamber-pressure-related quantity detecting means, and calculate the boosting limit value $P_{M0}$ corresponding to the present pressure $P_C$ of the negative pressure chamber 527, on the basis of the present pressure $P_C$, the boosting limit value $P_{M01}$ stored in the ROM and the above-indicated equation.

Then, an eighteenth embodiment of this invention will be described. This embodiment has a number of elements which are identical with those of the preceding seventeenth embodiment and which are identified by the same reference signs as used in the seventeenth embodiment. Only the elements specific to the present embodiment will be described in detail.

Figure 71:
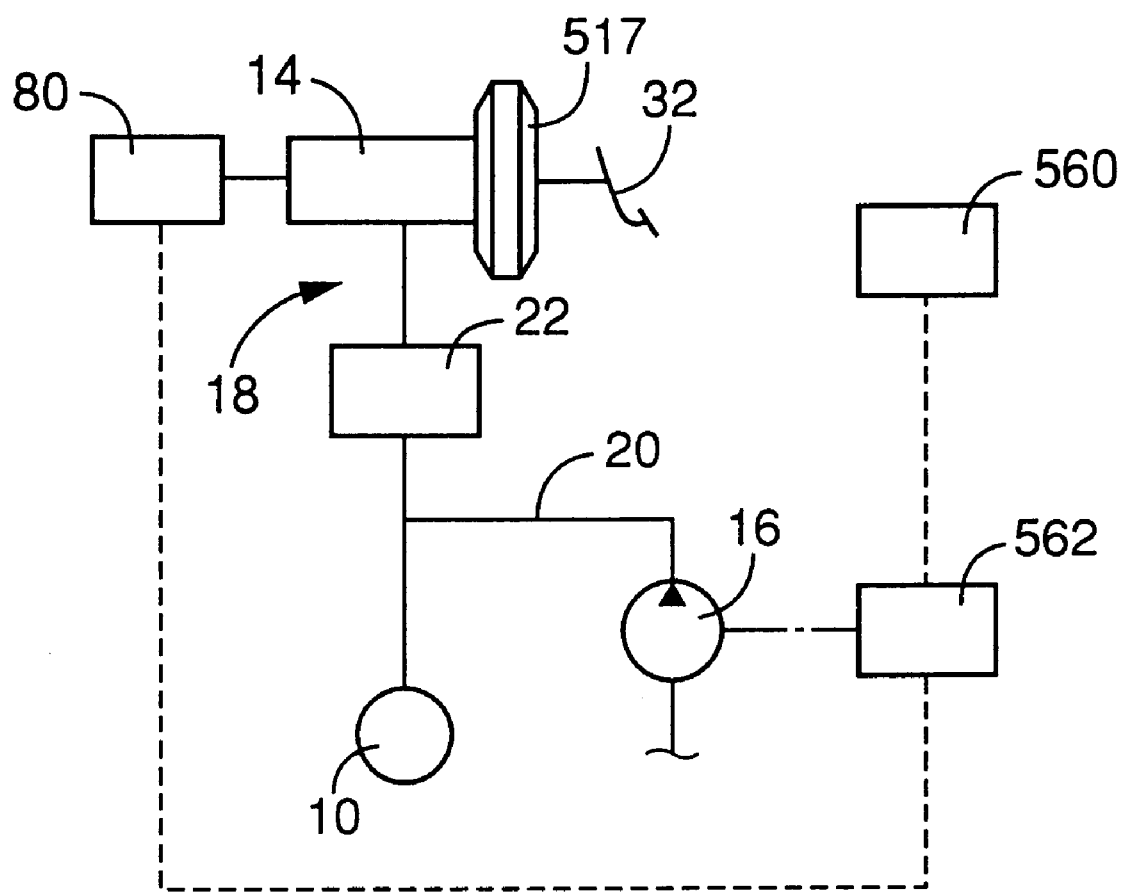
FIG. 71 is a schematic view schematically showing a general arrangement of a braking system of an eighteenth embodiment of this invention.
Figure 72:
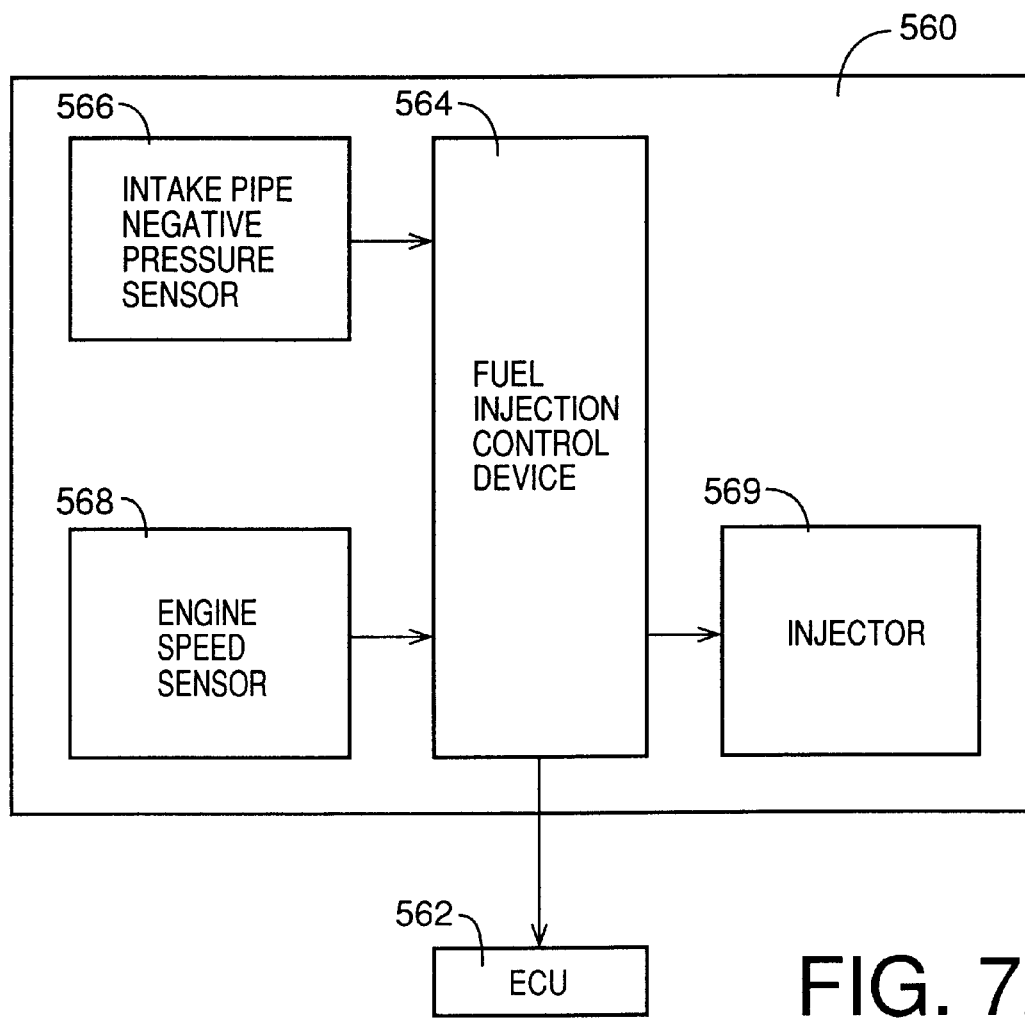
FIG. 72 is a block diagram showing an electrical arrangement of an electronic engine control device in FIG. 71.

In the present embodiment, the above-indicated booster negative pressure sensor 550 is eliminated, and instead a computer of an electronic engine control device 560 is connected to an ECU 562, as shown in FIG. 71. As shown in FIG. 72, the electronic engine control device 560 is provided with a fuel injection control device 564 which is constituted principally by a computer. To the input side of the control device 564, there are connected an intake pipe negative pressure sensor 566 and an engine speed sensor 568. To the output side of the control device 564, there is connected an injector 569. The intake pipe negative pressure sensor 566 is provided in an intake pipe of the engine, and operates in response to the pressure $P_I$ in the intake pipe such that the output signal continuously changes with a continuous change in the pressure $P_I$. The engine speed sensor 568 generates an engine speed signal which continuously changes with a continuous change in speed NE of the engine. The fuel injection control device 564 controls fuel injection from the injector 569 on the basis of the output signals of the intake pipe negative pressure sensor 566 and the engine speed sensor 568.

To the fuel injection control device 560, there is connected the ECU 562 in the present embodiment. The ECU 562 receives the intake pipe pressure $P_I$ from the fuel injection control device 560, and uses this pressure as the pressure $P_C$ of the negative pressure chamber 527.

Figure 73:
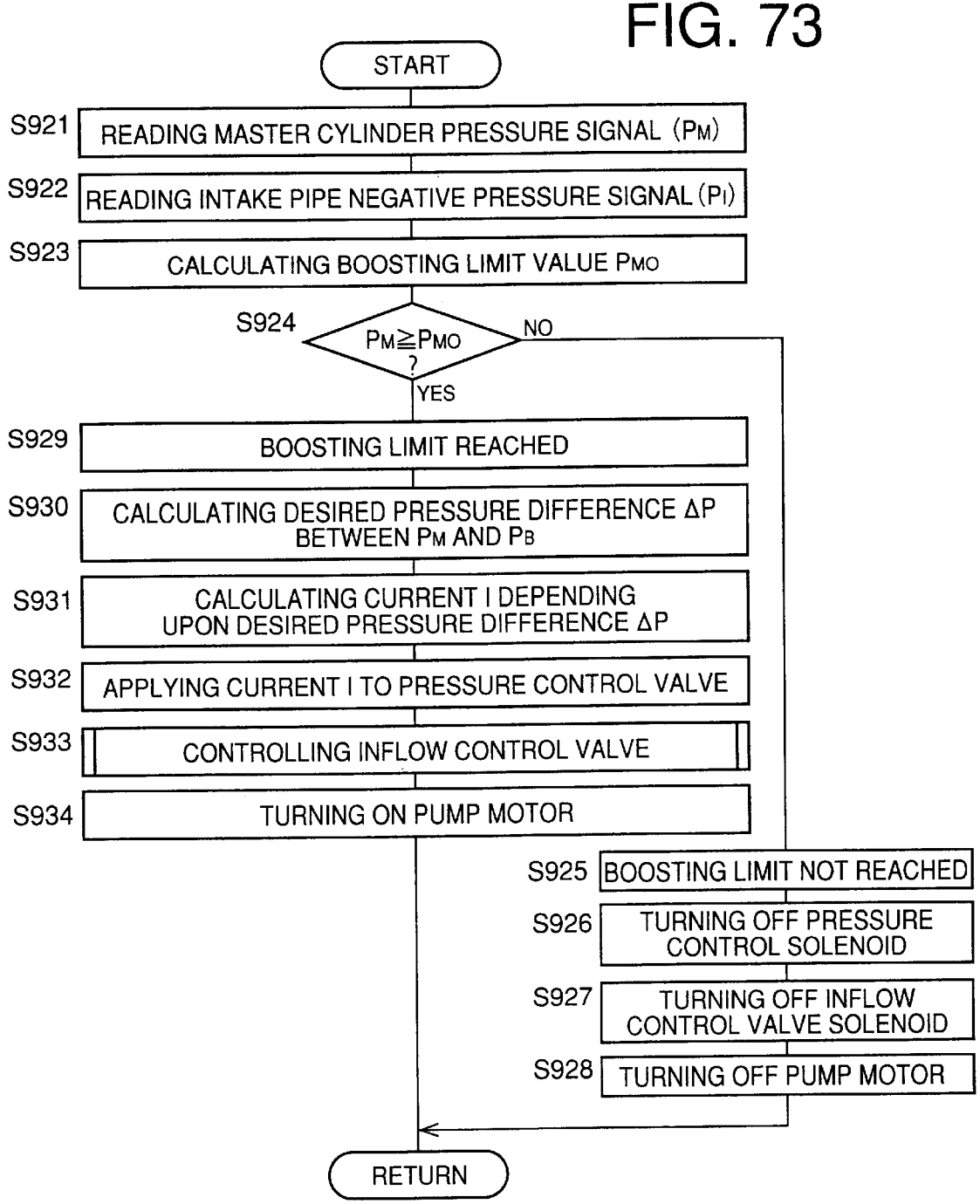
FIG. 73 is a flow chart showing a braking effect characteristic control routine in the above-indicated eighteenth embodiment.

The braking effect characteristic control routine in the present embodiment is illustrated in the flow chart of FIG. 73. While the braking effect characteristic control in the present embodiment will be described based on this flow chart, the portions of the present routine identical with those in the flow chart of FIG. 69 of the seventeenth embodiment will be described only briefly.

The present routine is also repeatedly executed during running of the motor vehicle. In each cycle of execution, the routine is initiated with S921 to read the master cylinder pressure signal received from the master cylinder pressure sensor 80. Then, S922 is implemented to read the intake pipe negative pressure signal received from the intake pipe negative pressure sensor 568 through the fuel injection control device 564. Then, S923 is implemented to detect the pressure $P_C$ of the negative pressure chamber 527 on the basis of the intake pipe negative pressure signal, and calculate the boosting limit value $P_{M0}$ corresponding to the actual value of the pressure $P_C$ of the negative pressure chamber 527, on the basis of the detected pressure $P_C$ and according to a predetermined relationship (stored in the ROM) between the pressure $P_C$ of the negative pressure chamber 527 and the boosting limit value $P_{M0}$.

The control flow then goes to S924 to determine whether the actual master cylinder pressure $P_M$ is equal to or higher than the boosting limit value $P_{M0}$, on the basis of the above-indicated master cylinder pressure signal. If the present master cylinder pressure $P_M$ is not equal to or higher than the boosting limit value $P_{M0}$, a negative decision (NO) is obtained, and the control flow goes to S925 and the subsequent steps, in the same manner as in the case of FIG. 69. If the present master cylinder pressure $P_M$ is equal to or higher than the boosting limit value $P_{M0}$, an affirmative decision (YES) is obtained in S924, and the control flow goes to step S929 and the subsequent steps, in the same manner as in the case of FIG. 69.

It will be understood from the foregoing explanation of the present embodiment that the intake pipe negative pressure sensor 566 constitutes an example of "booster-pressure-related quantity detecting means" and an example of "negative-pressure-chamber-pressure-related quantity detecting means" and that a portion of the ECU 562 assigned to implement S921–S925 and S929 of FIG. 73 constitutes an example of the determining device and an example of third determining means.

A nineteenth embodiment of this invention will be described. The present embodiment has a number of elements which are identical with those of the preceding eighteenth embodiment and which are identified by the same reference signs as used in the eighteenth embodiment. Only the elements specific to the present embodiment will be described in detail.

Figure 74:
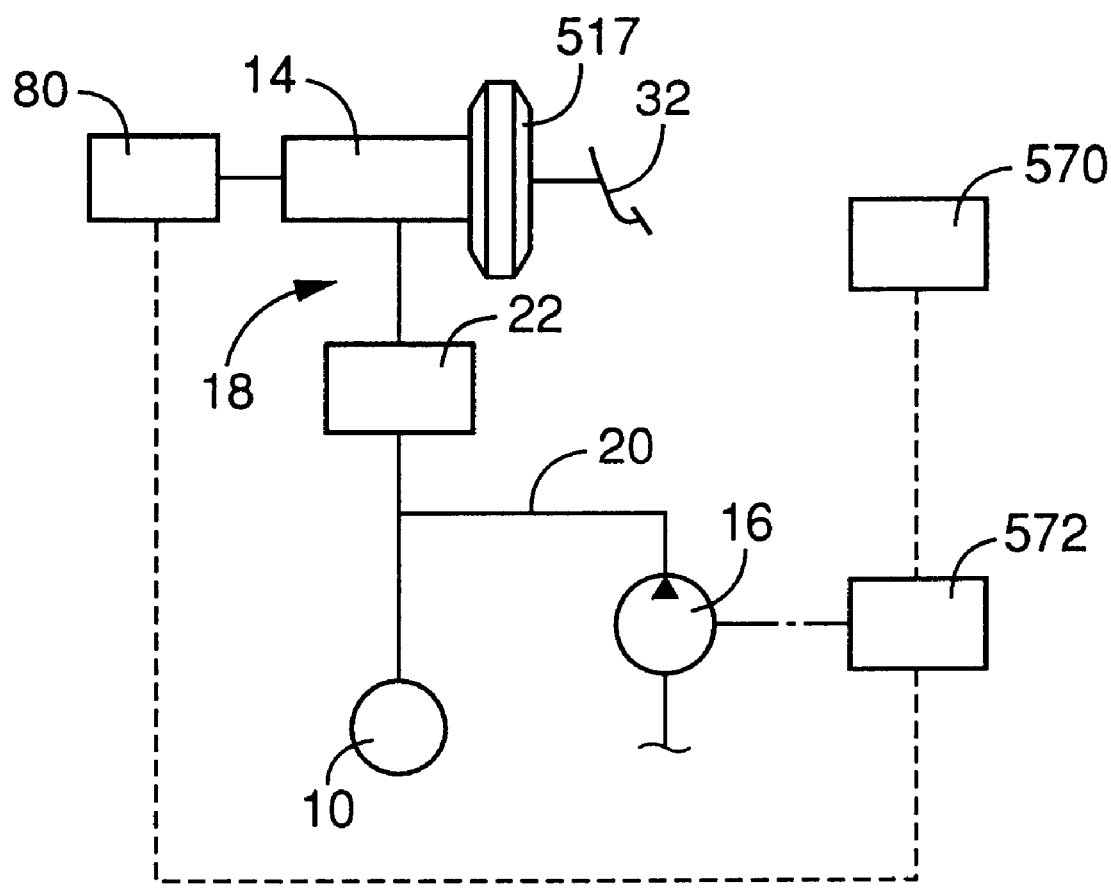
FIG. 74 is a schematic view schematically showing an arrangement of a braking system of a nineteenth embodiment of this invention.
Figure 75:
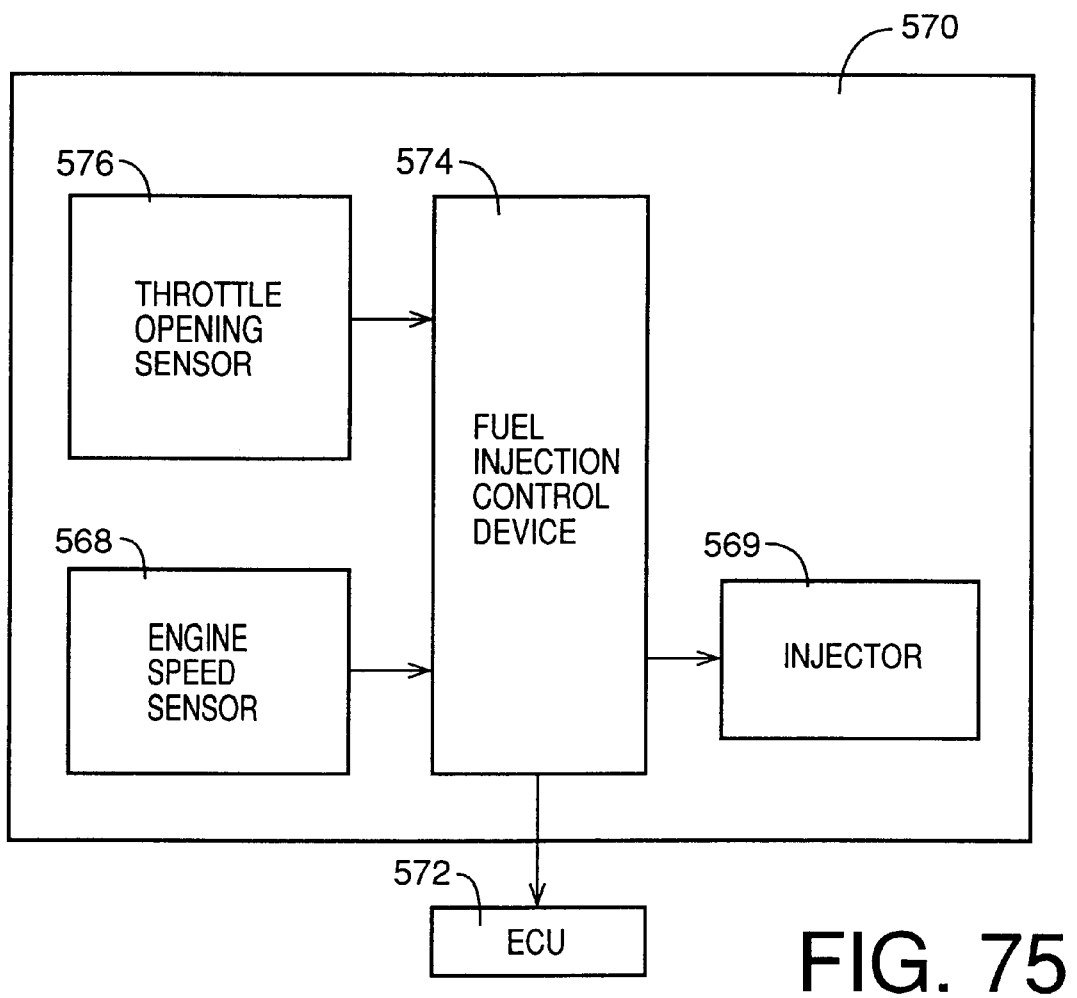
FIG. 75 is a block diagram showing an electrical arrangement of an electronic engine control device in FIG. 74.

In the present embodiment, an electronic engine control device 570 is connected to an ECU 572, as shown in FIG. 74, as in the eighteenth embodiment. As shown in FIG. 75, the electronic engine control device 570 is provided with a fuel injection control device 574 which is constituted principally by a computer. To the input side of the fuel injection control device 574, there are connected a throttle opening sensor 576 and the above-indicated engine speed sensor 568. to the output side of the control device 574, there is connected the above-indicated injector 569. The throttle opening sensor 576 generates a throttle opening signal which continuously changes with a continuous change in the opening angle of a throttle valve provided in the intake pipe of the engine. The engine speed sensor 568 and the injector 569 are the same as used in the eighteenth embodiment. The fuel injection control device 574 controls the fuel injection from the injector 569 on the basis of the output signals of the throttle opening sensor 576 and the engine speed sensor 568.

To the fuel injection control device 574, there is connected the ECU 572. The ECU 572 receives the throttle opening signal and the engine speed signal from the fuel injection control device 574, and detects the pressure P of the negative pressure chamber 527 on the basis of those signals.

Figure 76:
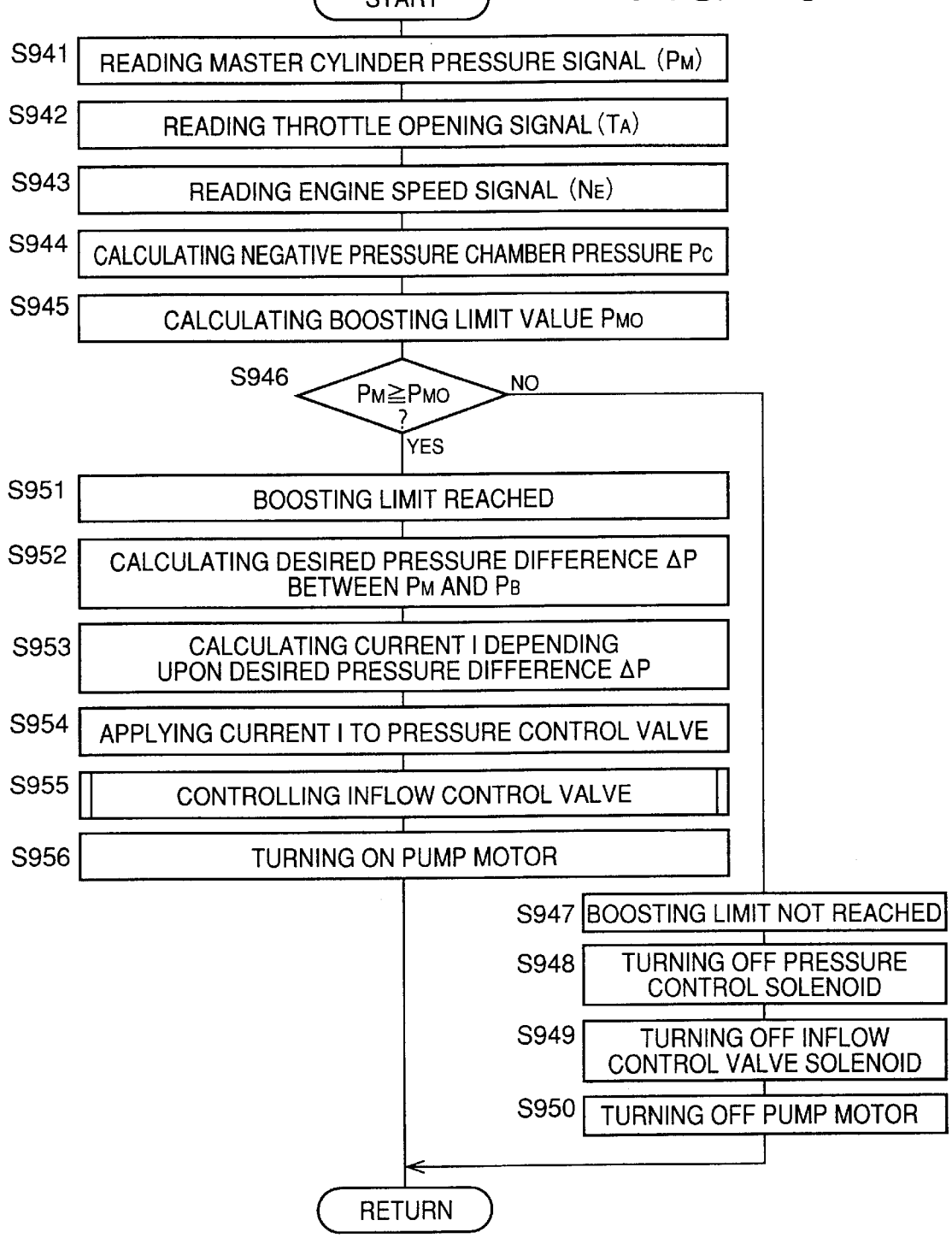
FIG. 76 is a flow chart showing a braking effect characteristic control routine in the above-indicated nineteenth embodiment.

The braking effect characteristic control routine in the present embodiment is illustrated in the flow chart of FIG. 76. While the braking effect characteristic control in this embodiment will be described based on this flow chart, portions of the present routine identical with those in the flow chart of FIG. 73 of the eighteenth embodiment will be described only briefly.

The present routine is also repeatedly executed during running of the motor vehicle. In each cycle of execution, the routine is initiated with S941 to read the master cylinder pressure signal received from the master cylinder pressure sensor 80. Then, S942 is implemented to read the throttle opening signal received from the throttle opening sensor 576. Then, S943 is implemented to receive the engine speed signal received from the engine speed sensor 568. The control flow then goes to S944 to determine the present intake pipe negative pressure $P_I$ on the basis of the throttle opening signal and the engine speed signal and according to a predetermined relationship (stored in the ROM) among the throttle opening angle TA, engine speed NE and intake pipe negative pressure $P_I$, and determine the intake pipe negative pressure $P_I$ as the pressure $P_C$ of the negative pressure chamber 527. In this respect, it is noted that the predetermined relationship exists among the throttle opening TA, engine speed NE and intake pipe negative pressure $P_I$ and that the intake pipe negative pressure $P_I$ can be used as a value approximate to the pressure $P_C$ of the negative pressure chambers 527. Successively, S945 is implemented to calculate the boosting limit value $P_{M0}$ corresponding to the actual value of the pressure $P_C$ of the negative pressure chamber 527, on the basis of the detected pressure $P_C$ and according to a predetermined relationship (stored in the ROM) between the pressure $P_C$ of the negative pressure chamber 527 and the boosting limit value $P_{M0}$.

Then, S946 is implemented to determine whether the present master cylinder pressure $P_M$ is equal to or higher than the boosting limit value $P_{M0}$, on the basis of the above-indicated master cylinder pressure signal. If the present master cylinder pressure $P_M$ is not equal to or higher than the boosting limit value $P_{M0}$, a negative decision (NO) is obtained, and the control flow goes to S947 and the subsequent steps, in the same manner as in the case of FIG. 73. If the present master cylinder pressure $P_M$ is equal to or higher than the boosting limit value $P_{M0}$, an affirmative decision (YES) is obtained, and the control flow goes to S951 and the subsequent steps, in the same manner as in the case of FIG. 73.

It will be understood from the foregoing description of the present embodiment that the throttle opening sensor 576 and the engine speed sensor 568 constitute an example of "booster-pressure-related quantity detecting means" and an example of "negative-pressure-chamber-pressure-related quantity detecting means", and that a portion of the ECU 572 assigned to implement S941-S947 and S951 constitutes an example of the "determining device" and an example of the "third determining means".

It is noted that the preceding eighteenth embodiment is adapted to use, as the pressure $P_C$ of the negative pressure chamber 527, the intake pipe negative pressure $P_I$ detected by the intake pipe negative pressure sensor 566, while the present embodiment is adapted to use, as the pressure $P_C$ the intake pipe negative pressure $P_I$ detected by the throttle opening sensor 576 and the engine speed sensor 568. In either of these embodiments, the intake pipe negative pressure $P_I$ is used as the pressure $P_C$ of the negative pressure chamber 527, and the boosting limit value $P_{M0}$ is determined on the basis of the pressure $P_C$ of the negative pressure chamber 527. However, the boosting limit value $P_{M0}$ may be determined on the basis of the intake pipe negative pressure $P_I$, while taking into account a delayed response of the pressure $P_C$ to a change in the intake pipe negative pressure $P_I$.

For instance, the boosting limit value $P_{M0}$ may be determined on the basis of the pressure $P_C$ of the negative pressure chamber 527, which is calculated with the delayed response of the pressure $P_C$. In this instance, the pressure $P_C$ of the negative pressure chamber 527 can be calculated from the intake pipe negative pressure $P_I$, according to the following equation, for example:

$$P_{C(n)} = k \times P_{I(n)} + (1-k) \times P_{I(n-1)}$$

In this equation, the value $P_{C(n)}$ is a present value of the pressure $P_C$ of the negative pressure chamber 527, and the value $P_{I(n)}$ is a present value of the intake pipe negative pressure $P_I$, while the value $P_{I(n-1)}$ is a last value of the intake pipe negative pressure $P_I$. The value k is determined to be larger than "0" and not smaller than "1", depending upon a time constant representative of a delayed response of the pressure $P_C$ of the negative pressure chamber 527 to the intake pipe negative pressure $P_I$.

Further, the boosting limit $P_{M0}$ may be determined by first calculating the pressure $P_C$ of the negative pressure chamber 527 on the basis of the directly or indirectly detected intake pipe negative pressure $P_I$, without taking account of the delayed response of the pressure $P_C$, then provisionally determining the boosting limit value on the basis of the calculated pressure $P_C$, without taking account of the delayed response of the pressure $P_C$, and finally determining the boosting limit value $P_{M0}$ on the basis of a plurality of provisional values $P_{M0'}$ of the boosting limit value $P_{M0}$, while taking account of the delayed response of the pressure $P_C$. In this case, the final value of the boosting limit value $P_{M0}$ can be calculated from the plurality of provisional values $P_{M0'}$, according to the following equation, for example:

$$P_{M0(n)} = k \times P_{M0'(n)} - (1-k) \times P_{M0'(n-1)}$$

"(n)" and "(n−1)" in this equation have the same meanings as in the above case, and the value "k" is determined in the same manner as in the above case.

There will next be described a twentieth embodiment of this invention. This embodiment is identical in electrical arrangement with the fifteenth embodiment (FIG. 48) and is different only in electrical arrangement from the fifteenth embodiment, with respect to only the braking effect characteristic control routine. Only the elements specific to the present embodiment will be described in detail, but the elements identical with those of the fifteenth embodiment will not be described in detail, with the same reference signs being given to those identical elements.

Figure 77:
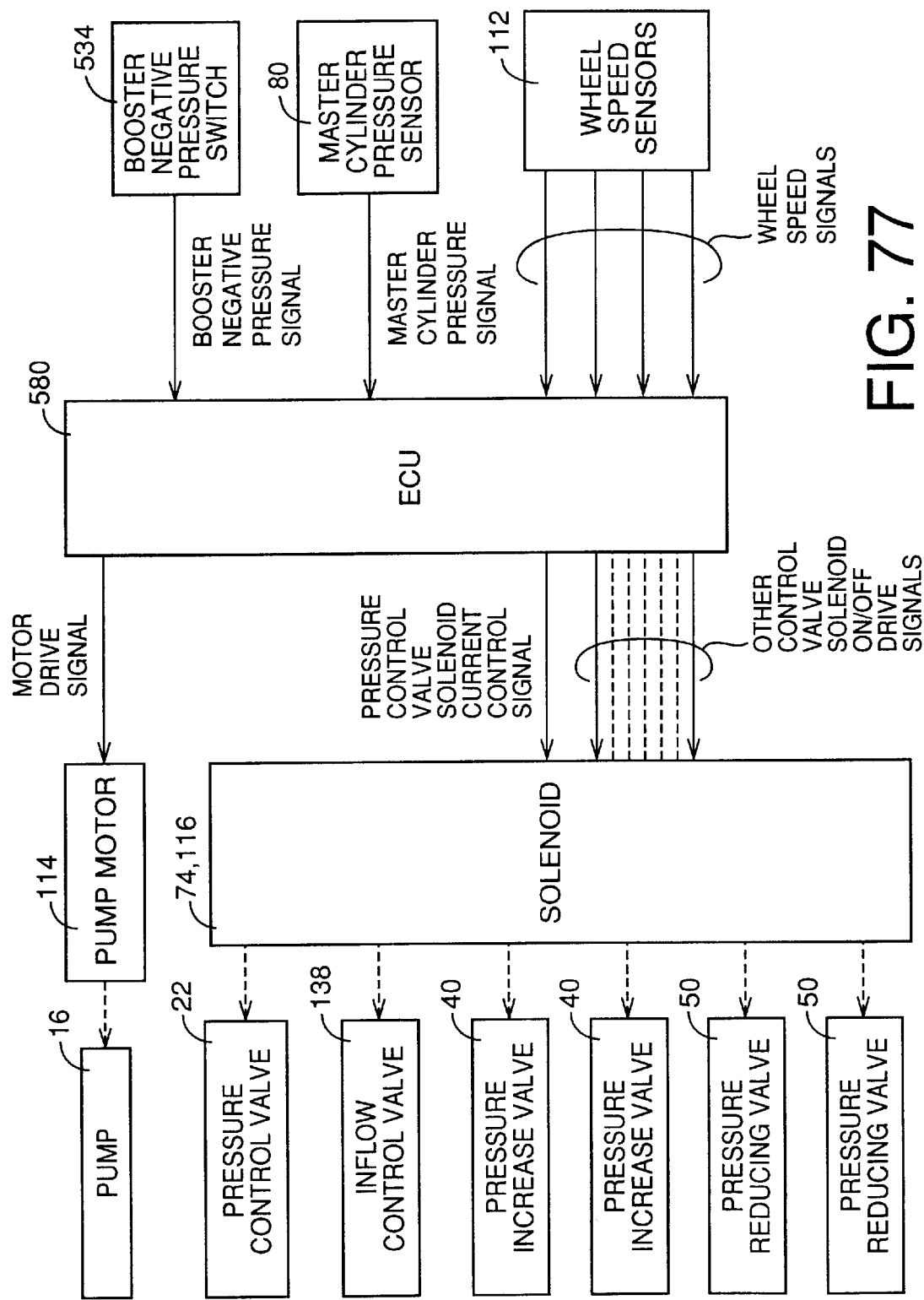
FIG. 77 is a block diagram showing an electrical arrangement of a braking system of a twentieth embodiment of this invention.

FIG. 77 shows an electrical arrangement of this embodiment. Unlike the fifteenth embodiment, the present embodiment does not use the brake switch 350, and uses an ECU 580 in place of the ECU 522.

Figure 78:
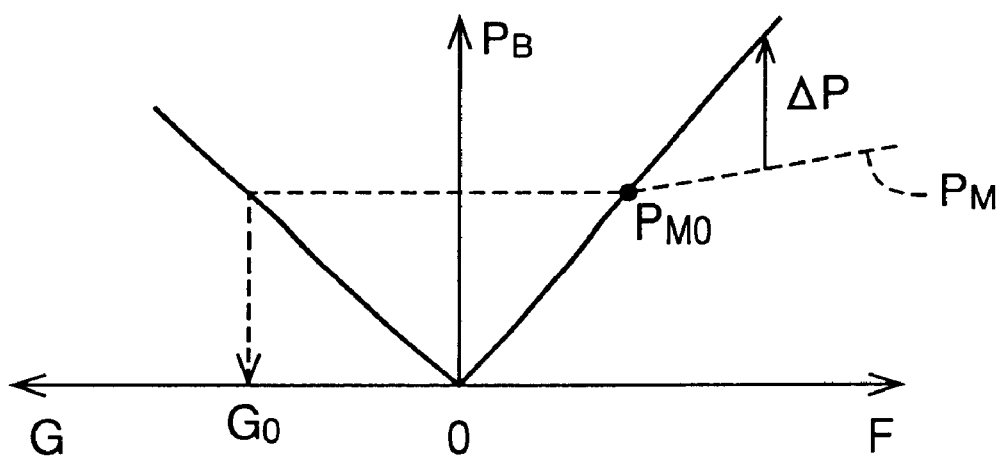
FIG. 78 is a graph for explaining a principle of a braking effect characteristic control based on vehicle deceleration G in the twentieth embodiment.

A graph of FIG. 78 shows a relationship among the brake operating force F, the master cylinder pressure $P_M$, the brake cylinder pressure $P_B$ and the deceleration value G of the vehicle body. IN this embodiment, to, the pump 16 is activated when the boosting limit of the vacuum booster 517 has been reached, for generating a pressure difference ΔP between the master cylinder 14 and the brake cylinder 10, so that the brake cylinder pressure $P_B$ linearly increases with the brake operating force F, both before and after the boosting limit of the vacuum booster 517 has been reached. It will be apparent from this figure, on the other hand, that there exists a relationship between the master cylinder pressure $P_M$ and the vehicle deceleration value G that the vehicle deceleration value G increases with an increase in the master cylinder pressure $P_M$. Therefore, the vehicle deceleration value G when the actual master cylinder pressure $P_M$ has increased to a standard boosting limit value $P_{M0}$ can be determined. Accordingly, if this vehicle deceleration value G is used as a reference value G0, it is possible to determine that the boosting limit of the vacuum booster 517 has been reached, when the actual vehicle deceleration value G has reached the reference value G0.

In the light of the above, the present embodiment is adapted such that the determination as to whether the boosting limit of the vacuum booster 517 has been reached is effected by the cooperation of the booster negative pressure switch 534 and the master cylinder pressure sensor 80, where the booster negative pressure switch 534 is normal, and such that the determination that the boosting limit of the vacuum booster 517 has been reached is made when the monitored actual vehicle deceleration value G has reached the reference value G0, where the booster negative switch 534 is defective. Where the booster negative pressure switch 534 is defective, however, the determination that the boosting limit of the vacuum booster 517 has been reached may be made when the actual master cylinder pressure $P_M$ monitored by the master cylinder pressure sensor 80 has increased to the standard boosting limit value $P_{M0}$.

Figure 79:
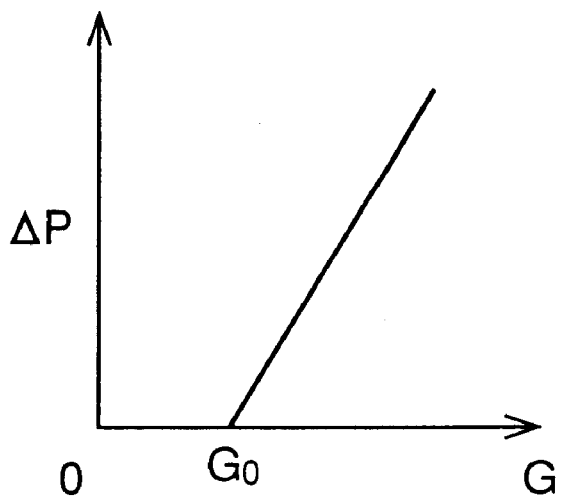
FIG. 79 is a graph showing a relationship between vehicle deceleration G and desired pressure difference ΔP in the twentieth embodiment.

The present embodiment is further adapted such that where the booster negative pressure switch 534 is defective, the desired pressure difference $\Delta P$ is determined so as to increase with the amount of increase IG of the actual value of the vehicle deceleration value G from the reference value G0, as indicated in the graph of FIG. 79, after the determination that the boosting limit of the vacuum booster 517 has been reached is made according to the relationship between the actual vehicle deceleration value G and the reference value G0.

Figure 80:
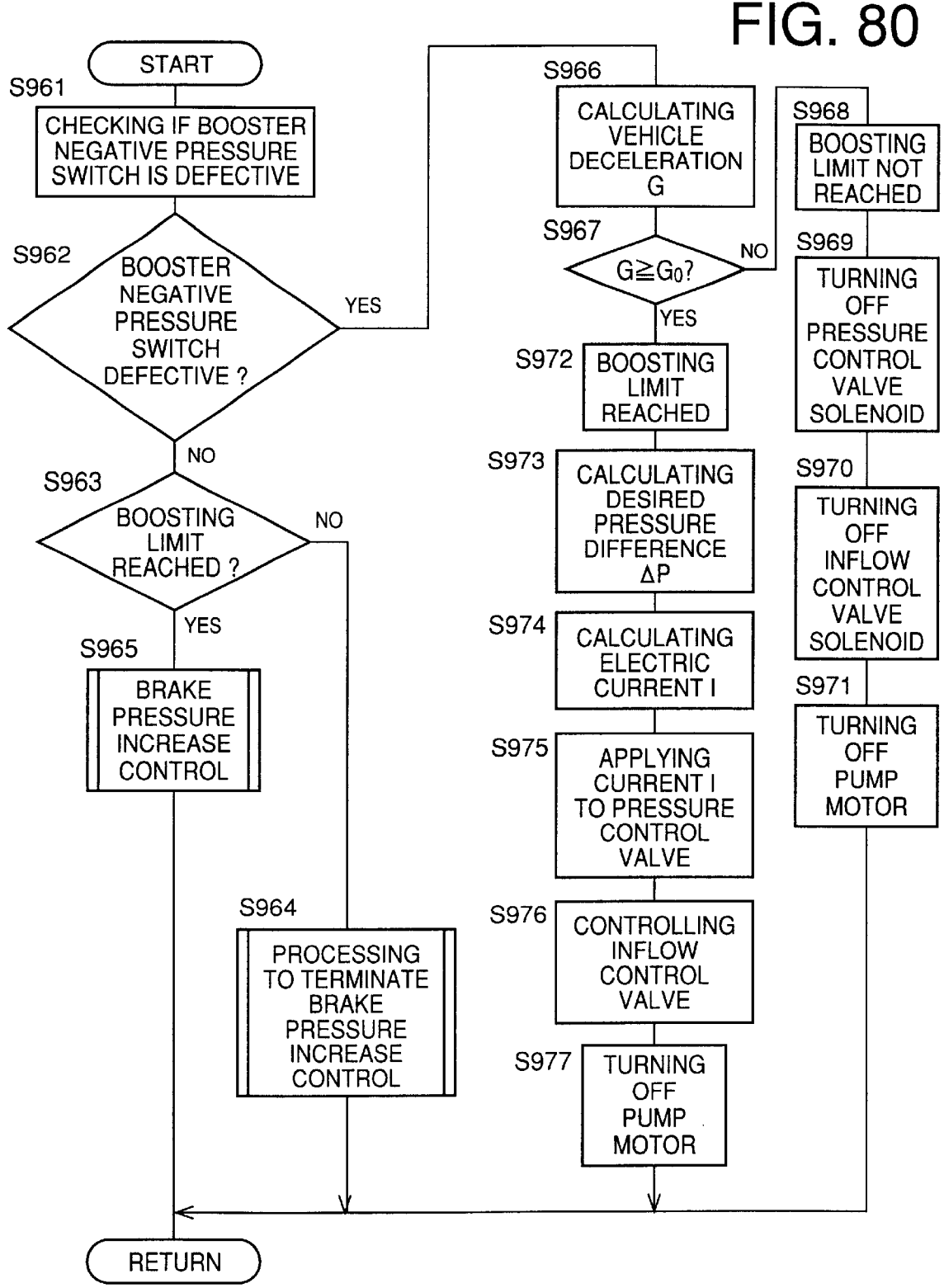
FIG. 80 is a flow chart showing a braking effect characteristic control routine in the twentieth embodiment.

The braking effect characteristic control routine is illustrated in the flow chart of FIG. 80.

Initially, S961 is implemented to check the booster negative pressure switch 534 for any defect. For instance, the booster negative pressure switch 534 is checked for electrical disconnection or short-circuiting. If the electrical disconnection or short-circuiting is detected, the booster negative pressure switch 534 is found to be defective. Then, S962 is implemented to determine whether the booster negative pressure switch 534 has been found defective in S961. If the booster negative pressure switch 534 has not been found defective in S961 in the present control cycle, a negative decision (NO) is obtained, and the control flow goes to S963 to determine whether the boosting limit of the vacuum booster 517 has been reached. This determination is effected by cooperation of the booster negative pressure switch 534 and the master cylinder pressure switch 80, in the same manner as in the fifteenth embodiment. If the boosting limit has not been reached in the present control cycle, a negative decision (NO) is obtained, and the control flow goes to S964 in which a processing to terminate the pressure increase control is effected. Described in detail, this processing includes determining that the boosting limit has not been reached, generating a signal for de-energizing the solenoid 74 of the pressure control valve 22, generating a signal for de-energizing the solenoid 116 of the inflow control valve 138, and generating a signal for turning off the pump motor 114, as in S816–S819 shown in FIG. 62. If the boosting limit has been reached in the present control cycle, on the other hand, an affirmative decision (YES) is obtained in S963, and the control flow goes to S965 in which the pressure increase control is effected. Described in detail, the pressure increase control includes determining that the boosting limit has been reached, calculating the desired pressure difference $\Delta P$ corresponding to the amount of increase $IP_M$ of the actual value of the master cylinder pressure $P_M$ from the boosting limit $P_{M0}$ (not from the fixed standard value, but from the varying actual value of the boosting limit calculating the electric current I to be applied to the solenoid 74 of the pressure control valve 22, depending upon the desired pressure difference $\Delta P$, and applying the electric current I to control the pressure control valve 22, as in S827–S832 shown in FIG. 62. The pressure increase control further includes executing the inflow control valve control routine of FIG. 65 to control the inflow control valve 138, and turning on the pump motor 114. In either case, one cycle of execution of the present routine is terminated.

Figure 81:
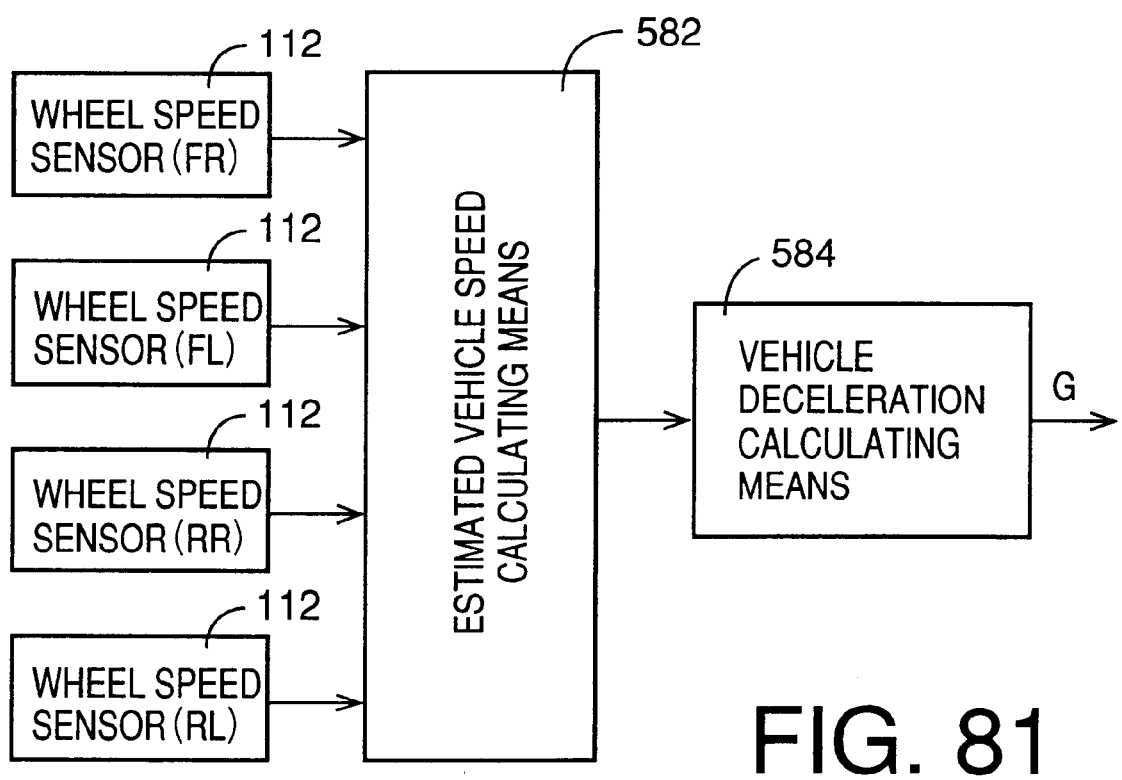
FIG. 81 is a functional block diagram showing vehicle deceleration detecting means in the twentieth embodiment.

While the control flow where the booster negative pressure switch 534 is not defective has been described above, an affirmative decision (YES) is obtained in S962 where the switch 534 is defective. In this case, the control flow goes to S966 to calculate the vehicle deceleration value G. In this embodiment, the estimated vehicle speed is calculated on the basis of the rotating speed of each wheel detected by the wheel speed sensors 112, during execution of the above-indicated anti-lock brake pressure control routine stored in the ROM of the ECU 580. In S966, the vehicle deceleration value G is calculated as a time derivative of the estimated vehicle speed. Block diagram of FIG. 81 shows a process in which the vehicle deceleration value G is calculated from the detected wheel speeds. The output of each wheel speed sensor 112 is connected to the input side of estimated vehicle speed calculating means 582, and the output side of this estimated wheel speed calculating means 582 is connected to the input side of vehicle deceleration calculating means 584. A portion of the ECU 580 assigned to implement S966 corresponds to the vehicle deceleration calculating means 584.

Then, the control flow goes to S967 to determine whether the boosting limit of the vacuum booster 517 has been reached. This determination is effected on the basis of the calculated vehicle deceleration value G. Described in detail, the determination is effected by determining whether the vehicle deceleration value G is equal to or higher than the reference value G0, which is expected to be established when the boosting limit of the vacuum booster 517 has been reached. If the vehicle deceleration value G is not equal to or higher than the reference value G0 in this control cycle, a negative decision (NO) is obtained, and the control flow goes to S968 and the subsequent steps for effecting a processing to terminate the pressure increase control in the same manner as in S964. Described in detail, S968 is implemented to determine that the boosting limit of the vacuum booster 517 has not been reached. Then, the control flow goes to S969 to generate a signal for de-energizing the solenoid 74 of the pressure control valve 22, then to S970 to generate a signal for de-energizing the solenoid 116 of the inflow control valve 138, and finally to S971 to generate a signal for turning off the pump motor 114. If the vehicle deceleration value G is equal to or higher than the reference value G0 in this control cycle, on the other hand, an affirmative decision (YES) is obtained in S967, and the control flow goes to S972 and the subsequent steps to effect the pressure increase control, in the same manner as in S965. Described in detail, S972 is implemented to determine that the boosting limit of the vacuum booster 517 has been reached. Then, the control flow goes to S973 to calculate the desired pressure difference $\Delta P$ corresponding to the 20 amount of increase $IP_M$ of the actual value of the master cylinder pressure $P_M$ from the boosting limit value $P_{M0}$ (from the fixed standard value of the boosting limit value $P_{M0}$) or the amount of increase IG of the actual value of the vehicle deceleration value G from the reference value G0 (from the fixed value corresponding to the standard value of the boosting limit value $P_{M0}$). A relationship between the amount of increase $IP_M$ or IG and the desired pressure difference $\Delta P$ is stored in the ROM as in the first embodiment. Then, S974 is implemented to calculate the electric current I to be applied to the solenoid 74 of the pressure control valve 22, depending upon the desired pressure difference $\Delta P$. The control flow then goes to S975 to apply the electric current to the pressure control valve 22 for controlling the pressure control valve 22, to S976 to control the inflow control valve 138 according to the inflow control valve control routine shown in FIG. 65, and finally to S977 to turn on the pump motor 114. In either case, one cycle of execution of the present routine is terminated.

Thus, the present embodiment is adapted to determine whether the boosting limit of the vacuum booster 517 has been reached, even where the booster negative pressure switch 534 is defective, and to effect the pressure increase control of the brake cylinder 10 by activation of the pump 16 when the boosting limit has been reached. Accordingly, the present embodiment provides an advantage of improved reliability of the braking system in the event of a defect of the booster negative pressure switch 534.

It will be understood from the foregoing explanation of the present embodiment that the wheel speed sensors 112, the estimated vehicle speed calculating means 582 and the vehicle deceleration calculating means 584 (a portion of the ECU 580 assigned to implement S966 of FIG. 80) constitute an example of "vehicle deceleration detecting means", and that a portion of the ECU 580 assigned to implement S961–S963, S967, S968, S972 constitutes an example of the "determining device". It will also be understood that a portion of the ECU 580 assigned to implement S961–S962, S967, S968 and S972 constitutes an example of "defect determining means", while the pressure control valve 22, pump 16, pump motor 114, inflow control valve 138 and a portion of the ECU 580 assigned to implement S964, S965, S969–S971 and S973–S977 constitute an example of the "second boosting device".

Then, a twenty-first embodiment of this invention will be described. Like the preceding twentieth embodiment, this embodiment is identical in mechanical arrangement with the fifteenth embodiment and is different only in electrical arrangement from the fifteenth embodiment, with respect to only the braking effect characteristic control routine. Only the elements specific to the present embodiment will be described in detail, but the elements identical with those of the fifteenth embodiment will not be described in detail, with the same reference signs being given to those identical elements.

Figure 82:
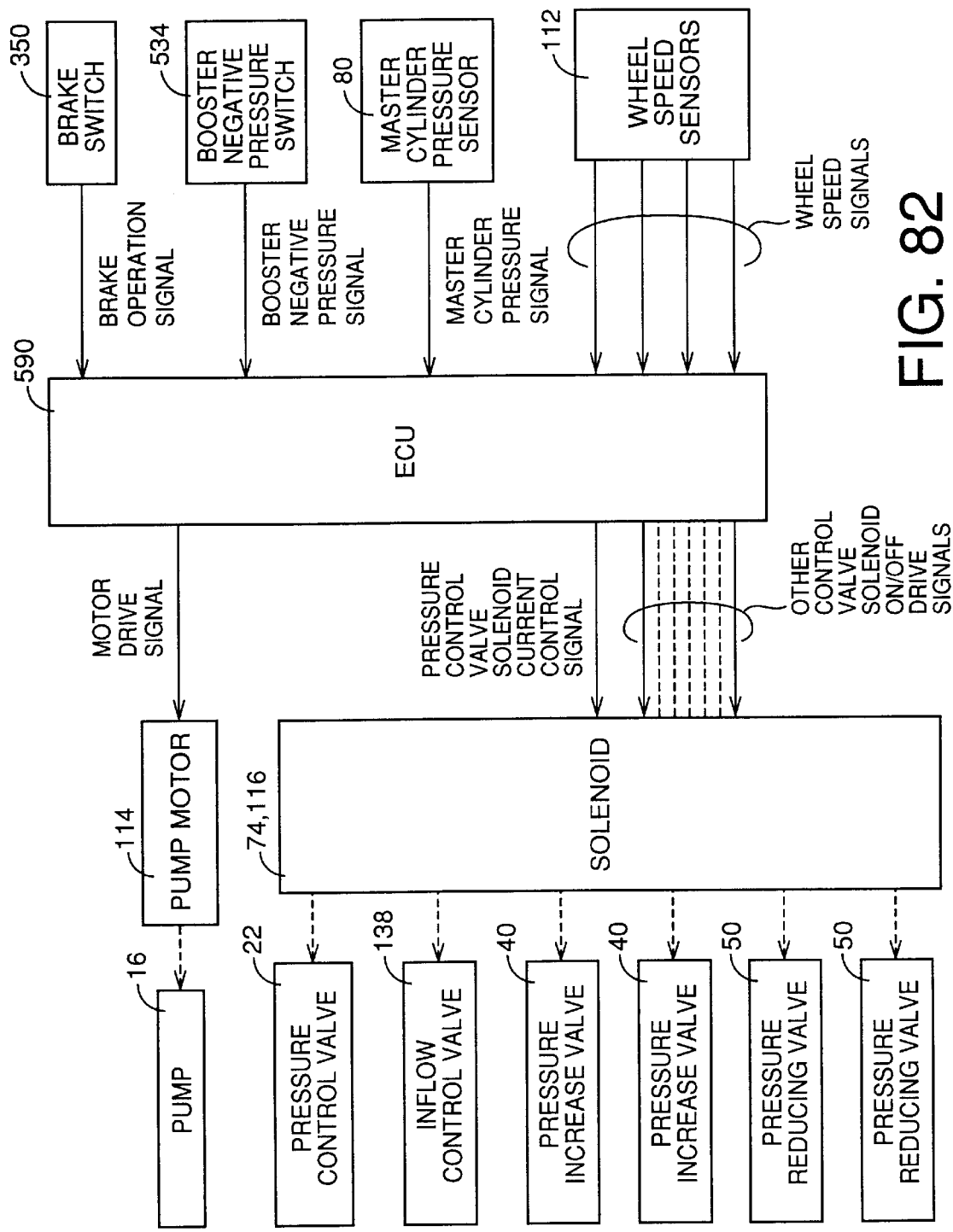
FIG. 82 is a block diagram showing an electrical arrangement of a braking system of a twenty-first embodiment of this invention.

FIG. 82 shows an electrical arrangement of this embodiment. Unlike the fifteenth embodiment, the present embodiment uses an ECU 590 in place of the ECU 522.

Figure 83:
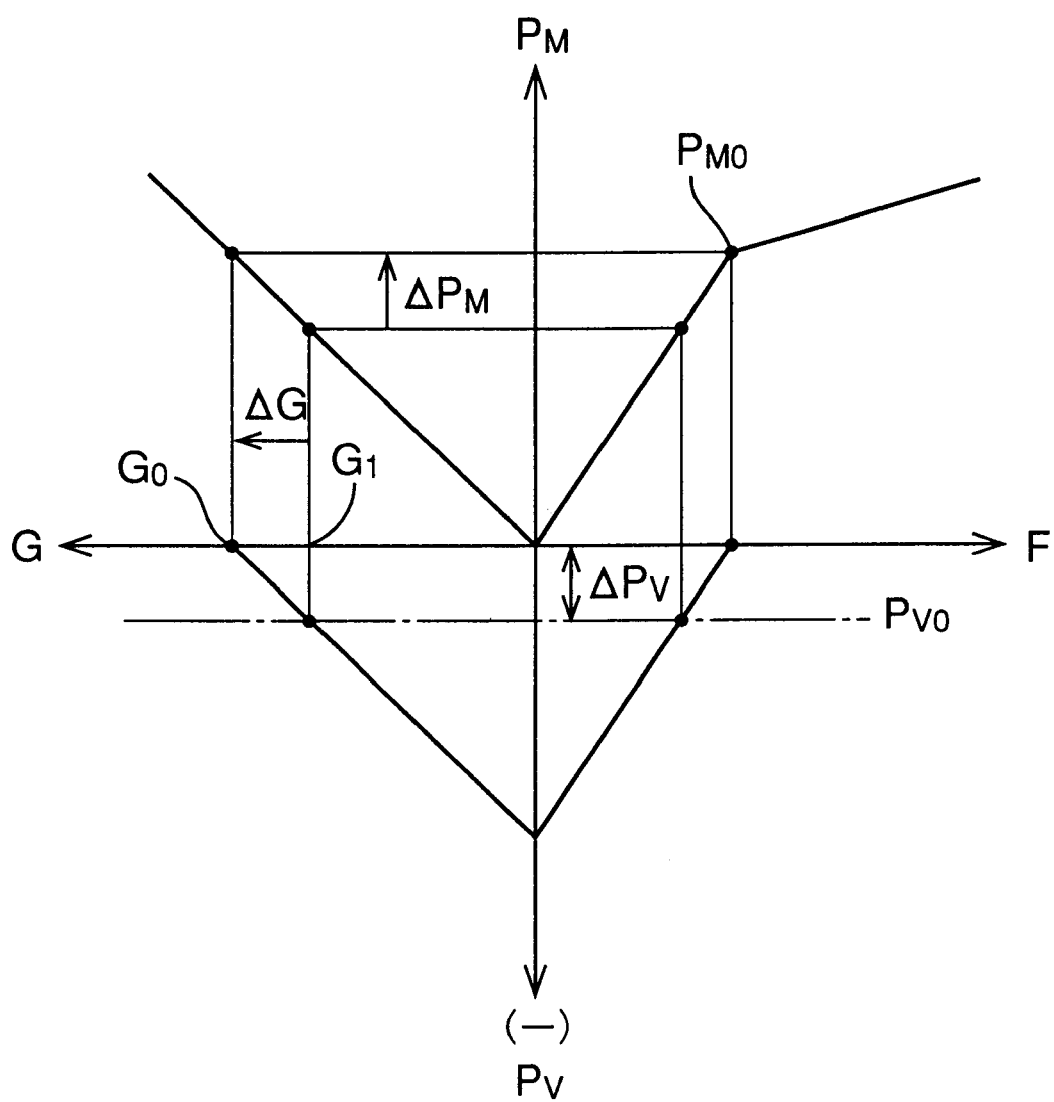
FIG. 83 is a graph for explaining a principle of a braking effect characteristic control based on on vehicle deceleration G in the twenty-first embodiment.

The graph of FIG. 83 shows a relationship among the brake operating force F, master cylinder pressure $P_M$, vehicle deceleration value G and pressure $P_C$ of the negative pressure chamber 528. As described above, there exists a relationship between the master cylinder pressure $P_M$ and the vehicle deceleration value G that the vehicle deceleration value G increases with an increase in the master cylinder pressure $P_M$. Further, the amount of increase ΔG of the vehicle deceleration value G is determined depending upon the amount of increase $\Delta P_M$ of the master cylinder pressure $P_M$. For instance, the relationship between the amount of increase $\Delta P_M$ and the amount of increase ΔG may be represented by the following equation:

$$\Delta G = (1/W) \cdot K \cdot \Delta P_M$$

where,

W: vehicle weight,

K: coefficient determined by the specifications of the braking system.

Therefore, if a reference amount of increase $\Delta P_{M0}$ of the actual value of the master cylinder pressure $P_M$ during a time from the moment when the pressure $P_V$ in the pressure changing chamber 528 has reached the above-indicated reference value $P_{V0}$ to the moment when the boosting limit of the vacuum booster 517 has been reached has been determined, a reference amount of increase ΔG0 is determined depending upon the determined reference amount of increase $\Delta P_{M0}$. Accordingly, the determination that the boosting limit of the vacuum booster 517 has been reached can be made when the amount of increase ΔG of the actual value of the vehicle deceleration value G after the pressure $P_V$ of the pressure changing chamber 528 has reached the reference value $P_{V0}$ has become equal to the reference amount of increase ΔG0.

In the light of the above, the present embodiment is adapted such that the determination as to whether the boosting limit of the vacuum booster 517 has been reached is effected by the cooperation of the master cylinder pressure sensor 80 and the booster negative pressure switch 534, where the master cylinder pressure sensor 80 is normal, and such that the determination that the boosting limit of the vacuum booster 517 has been reached is effected by cooperation of the booster negative pressure switch 534 and vehicle deceleration detecting means used in place of the master cylinder pressure 80, where the master cylinder pressure sensor 80 is defective.

Figure 84:
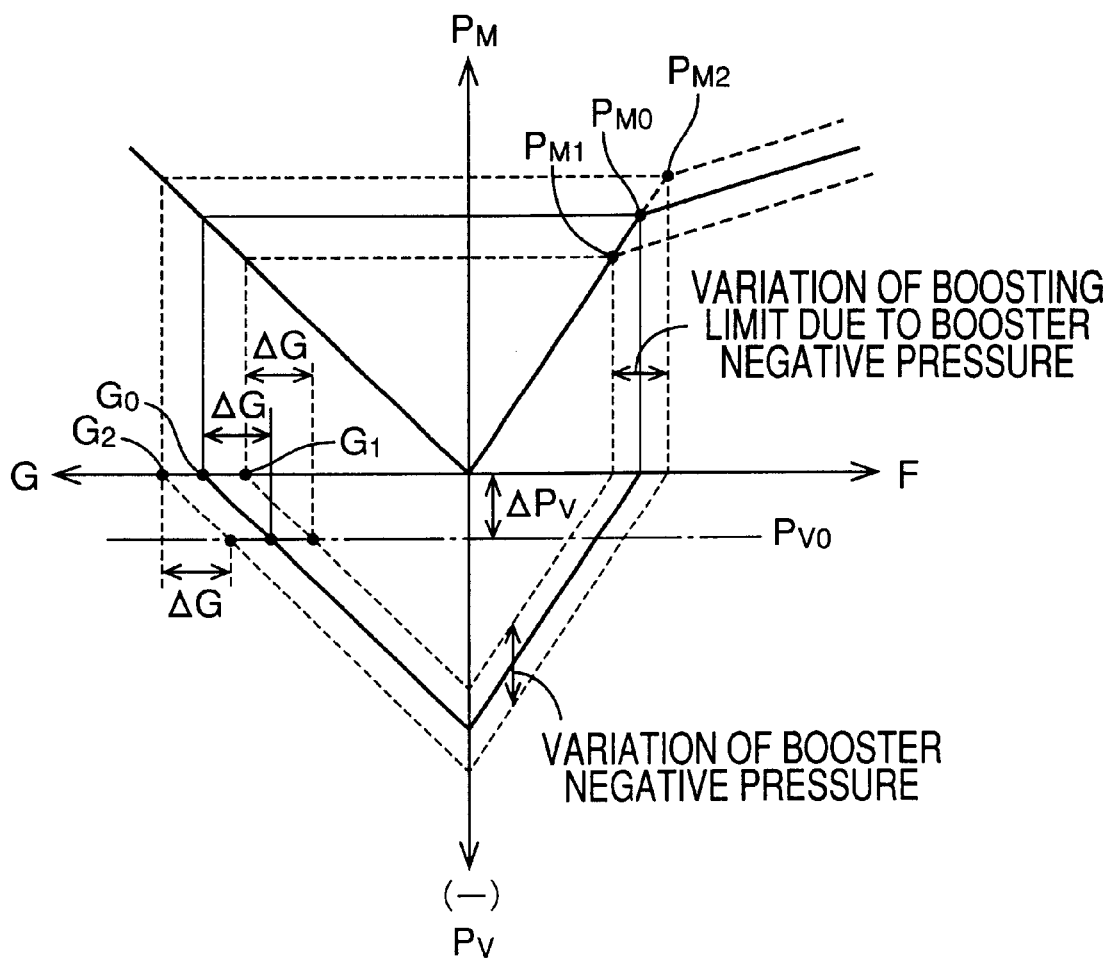
FIG. 84 is a graph for explaining a reason whey boosting limit point of vacuum booster can be correctly determined in spite of a variation in negative pressure of the booster in the twenty-first embodiment.

The graph of FIG. 84 shows an advantage of the arrangement in which the determination that the boosting limit of the vacuum booster 517 has been reached is made when the amount of increase ΔG has reached the reference amount of increase ΔG0. The pressure $P_V$ of the pressure changing chamber 528 when the brake operating force F is zero is equal to the pressure $P_C$ of the negative pressure chamber 527. Therefore, the pressure $P_V$ of the pressure changing chamber 527 when the brake operating force F is zero changes with a change in the pressure $P_C$ of the negative pressure chamber 527, which change takes place due to a change in the pressure of the negative pressure source of the engine which communicates with the negative pressure chamber 527. In the graph, the change in the pressure $P_V$ of the pressure changing chamber 528 is indicated as "variation of booster negative pressure". The graph shows a case where the pressure $P_V$ of the pressure changing chamber 528 is a standard level (as indicated by solid line), a case where the pressure $P_V$ is higher than the standard level (as indicated by upper broken line), and a case where the pressure $P_V$ is lower than the standard level (as indicated by lower broken line).

Generally, a check valve is provided between the negative pressure source of the engine and the negative pressure chamber 527, to prevent a rise of the pressure $P_C$ of the negative pressure chamber 527 with a rise of the pressure of the negative pressure source of the engine. Even in the presence of such a check valve, the pressure $P_C$ of the negative pressure chamber 527 is lowered when the pressure of the negative pressure source of the engine is lowered. Accordingly, the pressure $P_C$ of the negative pressure chamber 527 varies with a variation in the pressure of the negative pressure source of the engine.

The intake pipe of the engine or a surge tank connected to the intake pipe may be selected as the negative pressure source of the engine.

As the pressure $P_V$ of the pressure changing chamber 528 varies, the master cylinder pressure $P_M$ at which the boosting limit of the vacuum booster 517 has been actually reached varies with the variation in the pressure $P_V$. In the graph, "$P_{M0}$" represents the boosting limit value of the master cylinder pressure $P_M$ when the pressure $P_V$ of the pressure changing chamber 528 is the standard level, and "$P_{M1}$" and "$P_{M2}$" represent the boosting limit values when the pressure $P_V$ is higher and lower than the standard level, respectively. The graph also shows the vehicle deceleration value G when the boosting limit of the vacuum booster 517 has been reached, in the above-indicated three cases. In the graph, "G0", "G1" and "G2" represent the vehicle deceleration values G where the boosting limit values of the master cylinder pressure $P_M$ are equal to $P_{M0}$, $P_{M1}$ and $P_{M2}$ respectively. These vehicle deceleration values G0, G1 and G2 are obtained by adding the same amount of increase ΔG to the respective values when the pressure $P_V$ of the pressure changing chamber 528 has reached the reference value $P_{V0}$. It is noted here that the amount of increase ΔG is equal to the above-indicated reference amount of increase ΔG0. Therefore, according to the arrangement wherein the determination that the boosting limit of the vacuum booster 517 has been reached is made when the amount of increase ΔG of the vehicle deceleration value G has become equal to the reference amount of increase ΔG0, the determination can be correctly effected while taking into account of the variation in the pressure $P_V$ of the pressure changing chamber 528.

Accordingly, the present embodiment is capable of correctly determining whether the boosting limit of the vacuum booster 517 has been reached, irrespective of the variation in the pressure $P_V$ of the pressure changing chamber 528, even where the master cylinder pressure sensor 80 is defective. Consequently, the present embodiment is effective to prevent a variation in the brake cylinder pressure $P_B$ for the same brake operating force F, assuring improved stability in the braking effect.

Figure 85:
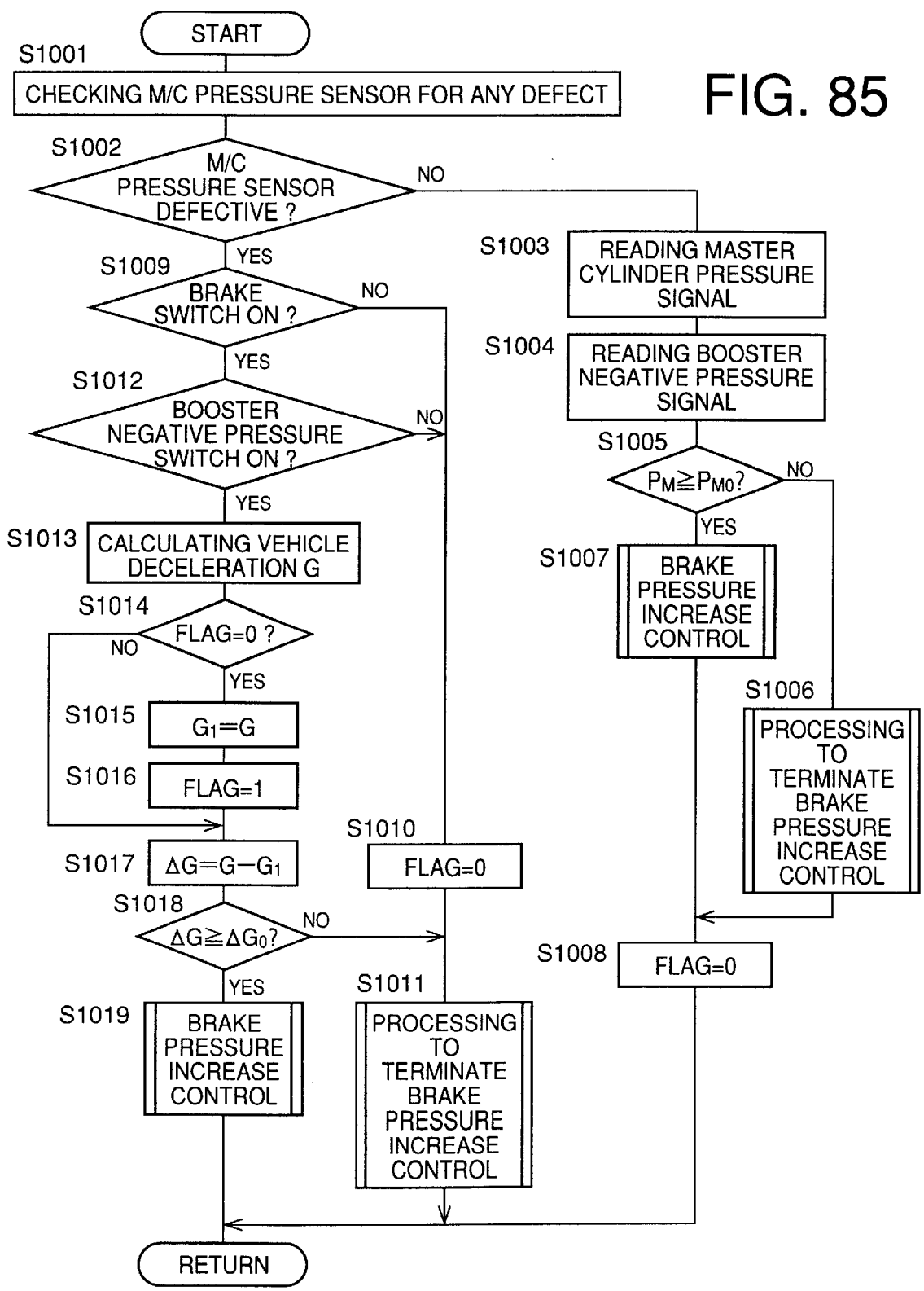
FIG. 85 is a flow chart showing a braking effect characteristic control routine in the twenty-first embodiment.

The braking effect characteristic control routine in the present embodiment is illustrated in the flow chart of FIG. 85.

Initially, step S1001 is implemented to check the master cylinder pressure sensor (indicated as "M/C pressure sensor" in the flow chart) 80 for any defect. Described in detail, the master cylinder pressure sensor 80 is checked for electrical disconnection or short-circuiting, as in S961 of FIG. 80 in the above-described twentieth embodiment. If the electrical disconnection or short-circuiting is found, the master cylinder pressure sensor 80 is found to be defective. Then, S1002 is implemented to determine whether the master cylinder pressure sensor 80 has been found defective in S1001. If the master cylinder pressure sensor 80 has not been found defective in this control cycle, a negative decision (NO) is obtained, and the control flow goes to S1003 to read the master cylinder pressure signal received from the master cylinder pressure sensor 80, and to S1004 to read the booster negative pressure signal received from the booster negative pressure switch 534. Then, S1005 is implemented to determine whether the boosting limit of the vacuum booster 517 has been actually reached, on the basis of the master cylinder pressure signal and the booster negative pressure signal, in the same manner as in the fifteenth embodiment. That is, the determination is effected by determining whether the actual master cylinder pressure $P_M$ is equal to or higher than the boosting limit value $P_{M0}$ which varies with the pressure $P_C$ of the negative pressure chamber 527. If the actual master cylinder pressure $P_M$ is not equal to or higher than the boosting limit value $P_{M0}$ in this control cycle, a negative decision (NO) is obtained, and the control flow goes to S1006 to effect a processing to terminate the pressure increase control in the same manner as in S972 of the twentieth embodiment. If the actual master cylinder pressure $P_M$ is equal to or higher than the boosting limit value $P_{M0}$ in this control cycle, on the other hand, an affirmative decision (YES) is obtained in S1005, and the control flow goes to S1007 to effect the pressure increase control in the same manner as in S965 of the twentieth embodiment. In either case, S1008 is implemented to reset the control flag to "0". Thus, one cycle of execution of this routine is terminated.

While the control flow where the master cylinder pressure sensor 80 is normal has been described, an affirmative decision (YES) is obtained in S1002 where the master cylinder pressure sensor 80 is defective. In this case, S1009 is then implemented to determine whether the brake switch 350 is in the ON state, that is, whether a braking operation is performed or not. If the brake switch 350 is not in the ON state in this control cycle, a negative decision (NO) is obtained, and the control flow goes to S1010 to reset the control flag to "0", and then goes to S1011 to effect the processing to terminate the pressure increase control as in S1006. Thus, one cycle of execution of the present routine is terminated. That is, the present embodiment is adapted such that if the booster switch 350 is not in the ON state, the processing to terminate the pressure increase control is immediately effected without determining whether the pressure increase control is necessary or not. Accordingly, the present arrangement prevents deterioration of the operating reliability of the braking system, which would occur when the determination as to the necessity of the pressure increase control was effected without the master cylinder pressure sensor 80.

If the brake switch 350 is in the ON state in this control cycle, on the other hand, an affirmative decision (YES) is obtained in S1009, and the control flow goes to S1012 to determine whether the booster negative pressure switch 534 is in the ON state. If the booster negative pressure switch 534 is not in the ON state in this control cycle, a negative decision (NO) is obtained, and the control flow goes to S1010 to reset the control flag to "0", and then goes to S1011 to effect the processing to terminate the pressure increase control. Thus, one cycle of execution of the present routine is terminated.

If the booster negative pressure switch 534 is in the ON state in this control cycle, an affirmative decision (YES) is obtained in S1012, and the control flow goes to S1013 to calculate the vehicle deceleration value G in the same manner as in the twentieth embodiment. Then, S1014 is implemented to determine whether the control flag is set at "0". If the control flag is set at "0", an affirmative decision (YES) is obtained, and the control flow goes to S1015 to set the calculated vehicle deceleration value G as a reference value G1. Then, S1016 is implemented to set the control flag to "1". Successively, S1017 is implemented to calculate the amount of increase ΔG by subtracting the reference value G1 from the calculated vehicle deceleration value G. The control flow then goes to S1018 to determine whether the calculated amount of increase ΔG is equal to or larger than the above-indicated reference amount of increase ΔG0. If the calculated amount of increase ΔG is not equal to or larger than the reference amount of increase ΔG0, a negative decision (NO) is obtained, and the control flow goes to S1011 to effect the processing to terminate the pressure increase control. Thus, one cycle of execution of the present routine is terminated.

In the next cycle of execution of the present routine, the vehicle deceleration value G is newly calculated in S1013. Since the control flag is set at "1" in this control cycle, a negative decision (NO) is obtained in S1014, and the control flow goes to S1017, skipping S1015 and S1016. In S1017, the new amount of increase ΔG is calculated by subtracting the same reference value G1 as in the last cycle from the calculated vehicle deceleration value G. Then, S1018 is implemented to determine whether the calculated amount of increase ΔG is equal to or larger than the reference amount of increase ΔG0. If the calculated amount of increase ΔG is equal to or larger than the reference amount of increase ΔG0 in this control cycle, a negative decision (NO) is obtained in S1018, and the control flow goes to S1019 in which the pressure increase control is effected as in S972–S977 in the twentieth embodiment. Thus, one cycle of execution of the present routine is terminated.

In the present embodiment, therefore, it is possible to correctly determine that the boosting limit of the vacuum booster 517 has been actually reached, irrespective of a variation in the pressure $P_C$ in the negative pressure chamber 527, even when the master cylinder pressure sensor 80 is defective.

It will be understood from the foregoing explanation of the present embodiment that the master cylinder pressure sensor 80 constitutes an example of "master-cylinder-pressure-directly-related quantity detecting means" and that the wheel speed sensors 112, estimated vehicle speed calculating means 582 and vehicle deceleration calculating means 584 (a portion of the ECU 590 assigned to implement S1013 of FIG. 85) constitute an example of "vehicle deceleration calculating means". It will also be understood that a portion of the ECU 590 assigned to implement S1001–S1005, S1008–S1010, S1012 and S1014–S1018 of FIG. 85 constitutes an example of the "determining device", while a portion of the ECU 590 assigned to implement S1001, S1002, S1009, S1010 and S1014–S1018 constitutes an example of "defect determining means", and that the pressure control valve 22, pump 16, pump motor 114, inflow control valve 138 and a portion of the ECU 590 assigned to implement S1006, S1007, S1011 and S1019 constitutes an example of the "second boosting device".

Then, a twenty-second embodiment of this invention will be described. However, this embodiment is identical in mechanical arrangement with the fifteenth embodiment (FIG. 48) and is different only in electrical arrangement from the fifteenth embodiment. Only the elements specific to the present embodiment will be described in detail, but the elements identical with those of the fifteenth embodiment will not be described in detail, with the same reference signs being given to those identical elements.

Figure 86:
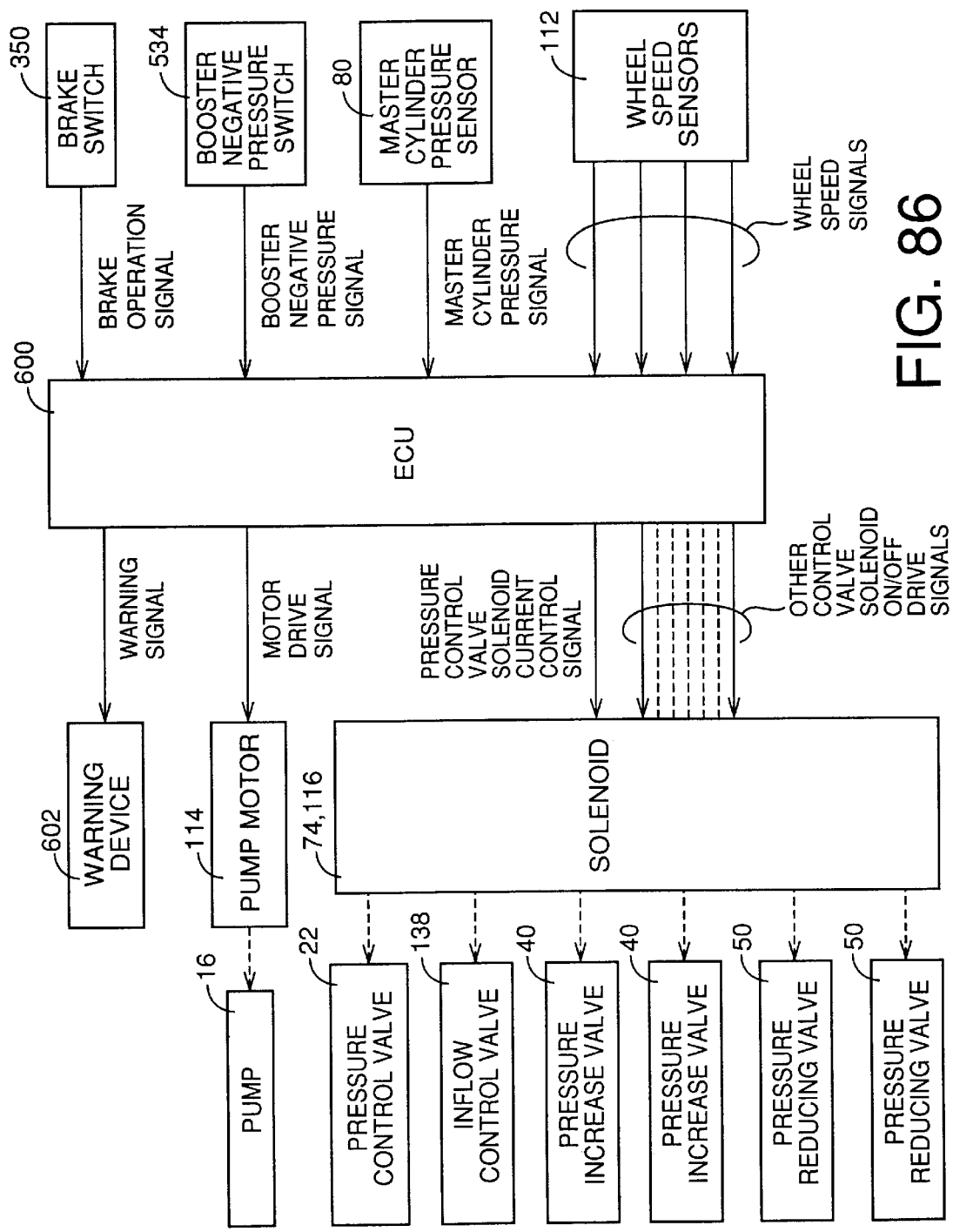
FIG. 86 is a block diagram showing an electrical arrangement of a braking system of a twenty-second embodiment of this invention.

FIG. 86 shows an electrical arrangement of this embodiment. Unlike the fifteenth embodiment, the present embodiment uses an ECU 600 in place of the ECU 522, and additionally includes a warning device 602. The warning device 602, which is controlled by the ECU 600, is adapted to provide a visual, audio or tactual warning by light, sound or vibration that the braking system has a certain abnormality.

Figure 87:
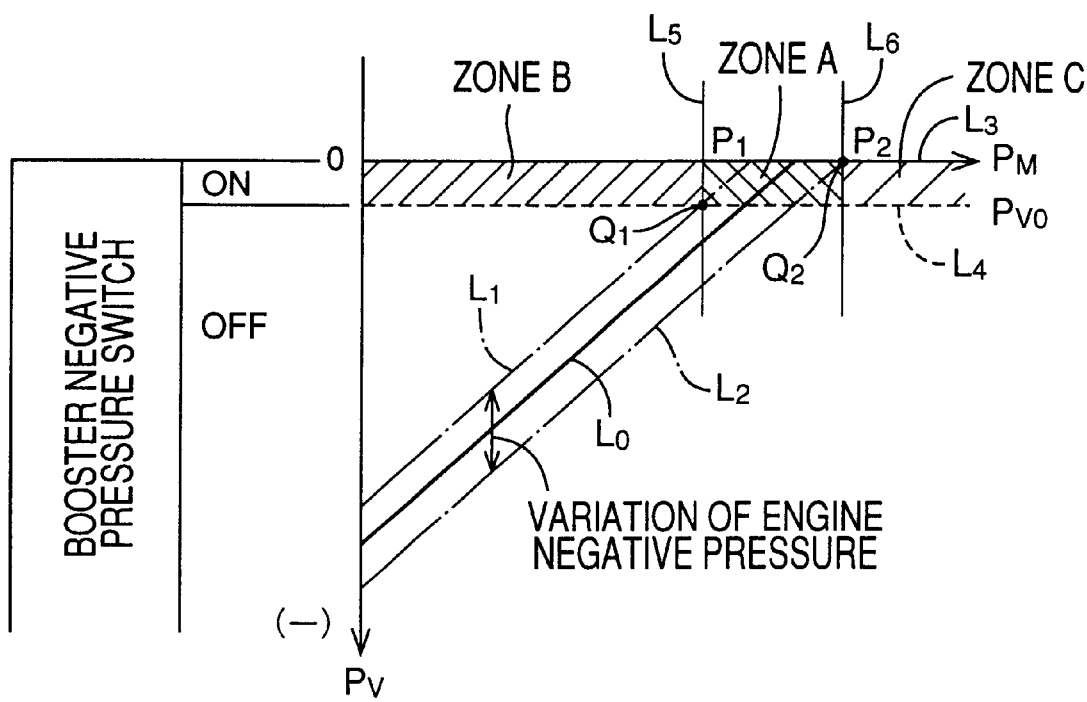
FIG. 87 is a graph for explaining a principle of determination of abnormality of the braking system of the twenty-second embodiment.

The graph of FIG. 87 shows a relationship between the master cylinder pressure $P_M$ and the pressure $P_V$ of the pressure changing chamber 528. As the brake operating force F increases, the reduced pressure $P_V$ of the pressure changing chamber 528 accordingly increases toward the atmospheric pressure, while the master cylinder pressure $P_M$ increases from zero. Accordingly, there is a relationship as indicated by solid line $L_0$ in the graph of the figure, between the master cylinder pressure $P_M$ and the pressure of the pressure changing chamber 528. It is noted here that the pressure $P_V$ of the pressure changing chamber 528 depends upon the pressure $P_C$ of the negative pressure chamber 527, which in turn depends upon the pressure of the negative pressure source of the engine (referred to as "engine negative pressure"). The engine negative pressure varies depending upon the operating condition of the engine. Consequently, the pressure $P_V$ of the negative pressure chamber 527 varies with a variation in the engine negative pressure. Accordingly, the relationship between the master cylinder pressure $P_M$ and the pressure $P_V$ of the pressure changing chamber 528 is represented by a width area which are defined by two parallel one-dot chain lines $L_1$ and $L_2$ in the graph and whose center is represented by the solid line $L_0$. The booster negative pressure switch 534 is switched between OFF and ON states indicative of two ranges of the pressure $P_V$ of the pressure changing chamber 528. The switch 534 is in the OFF state when the pressure $P_V$ is lower than the reference value $P_{V0}$, and in the ON state when the pressure $P_V$ is higher than the reference value $P_{V0}$.

Therefore, there are the following five cases with respect to the master cylinder pressure $P_M$ detected by the master cylinder pressure sensor 80 when the booster negative pressure switch 534 is in the ON state:

(1) Where the vacuum booster 517, booster negative switch 534 and master cylinder pressure sensor 80 are all normal:

In this case, the master cylinder pressure $P_M$ detected by the master cylinder pressure sensor 80 when the booster negative pressure switch 534 is in the ON state lies in a band zone A between reference values P1 and P2 indicated in the figure.

(2) Where the vacuum booster 517 is defective, and the pressure in the pressure changing chamber 528 is not normal:

In this case wherein the booster negative pressure switch 534 is kept in the ON state irrespective of the detected master cylinder pressure $P_M$, the detected master cylinder pressure $P_M$ lies in a band zone B in which the master cylinder pressure $P_M$ is lower than in the band zone A.

(3) Where the booster negative pressure switch 534 is defective:

In this case, the detected master cylinder pressure $P_M$ when the booster negative pressure switch 534 is in the ON state lies in the band zone B or in a band zone C in which the master cylinder pressure $P_M$ is higher than in the band zone A.

(4) Where the master cylinder 14 (more precisely, one of the two mutually independent braking sub-systems in which the fluid pressure is detected by the master cylinder pressure sensor 80) is defective, and incapable of generating a hydraulic pressure:

In this case, the detected master cylinder pressure $P_M$ when the booster negative pressure switch 534 is in the ON state is lower than the normal value, and lies in the zone B.

(5) Where the master cylinder pressure switch 534 is defective:

In this case, the detected master cylinder pressure $P_M$ when the booster negative switch 534 is in the ON state lies in the zone B or C.

Thus, it is possible to determine whether the elements of the braking system are all normal and which one of the elements is defective, by determining one of the zones A, B and C in which the master cylinder pressure $P_M$ detected when the booster negative pressure switch 534 is in the ON state lies.

It is noted that the zone in which the master cylinder pressure $P_M$ lies when the vacuum booster 517, booster negative pressure switch 534, master cylinder 14 and master cylinder pressure sensor 80 are normal is precisely a parallelogrammic zone defined by the two one-dot chain lines $L_1$ and $L_2$, a horizontal axis $L_3$ indicating the zero value of the pressure $P_V$ of the pressure changing chamber 528, and a broken line $L_4$ indicating that the pressure $P_V$ of the pressure changing chamber 528 is equal to the reference value $P_{V0}$. In the present embodiment, however, only the two ranges of the pressure $P_V$ of the pressure changing chamber 528 which are lower and higher than the reference value $P_{V0}$, respectively, can be detected, as discussed above. In the present embodiment, therefore, the zone A is a rectangular zone defined by a solid line $L_5$, a solid line $L_6$, the horizontal axis $L_3$ and the broken line $L_4$. The solid line $L_5$ indicates that the master cylinder pressure $P_M$ is equal to a reference value $P_1$ which corresponds to an intersection point $Q_1$ between the upper one-dot chain line $L_1$ and the broken line $L_3$, while the solid line $L_6$ indicates that the master cylinder pressure $P_M$ is equal to a reference $P_2$ which corresponds to an intersection point $Q_2$ between the lower one-dot chain line $L_2$ and the horizontal axis $L_4$.

In summary, the booster negative pressure signal of the booster negative switch 534, the master cylinder pressure signal of the master cylinder pressure sensor 80 and the operating sate of the braking system have a predetermined relationship, which can be utilized to determine whether the braking system is normal or defective. A routine for effecting this normal/defective determination is stored in the ROM of the ECU 590.

Figure 88:
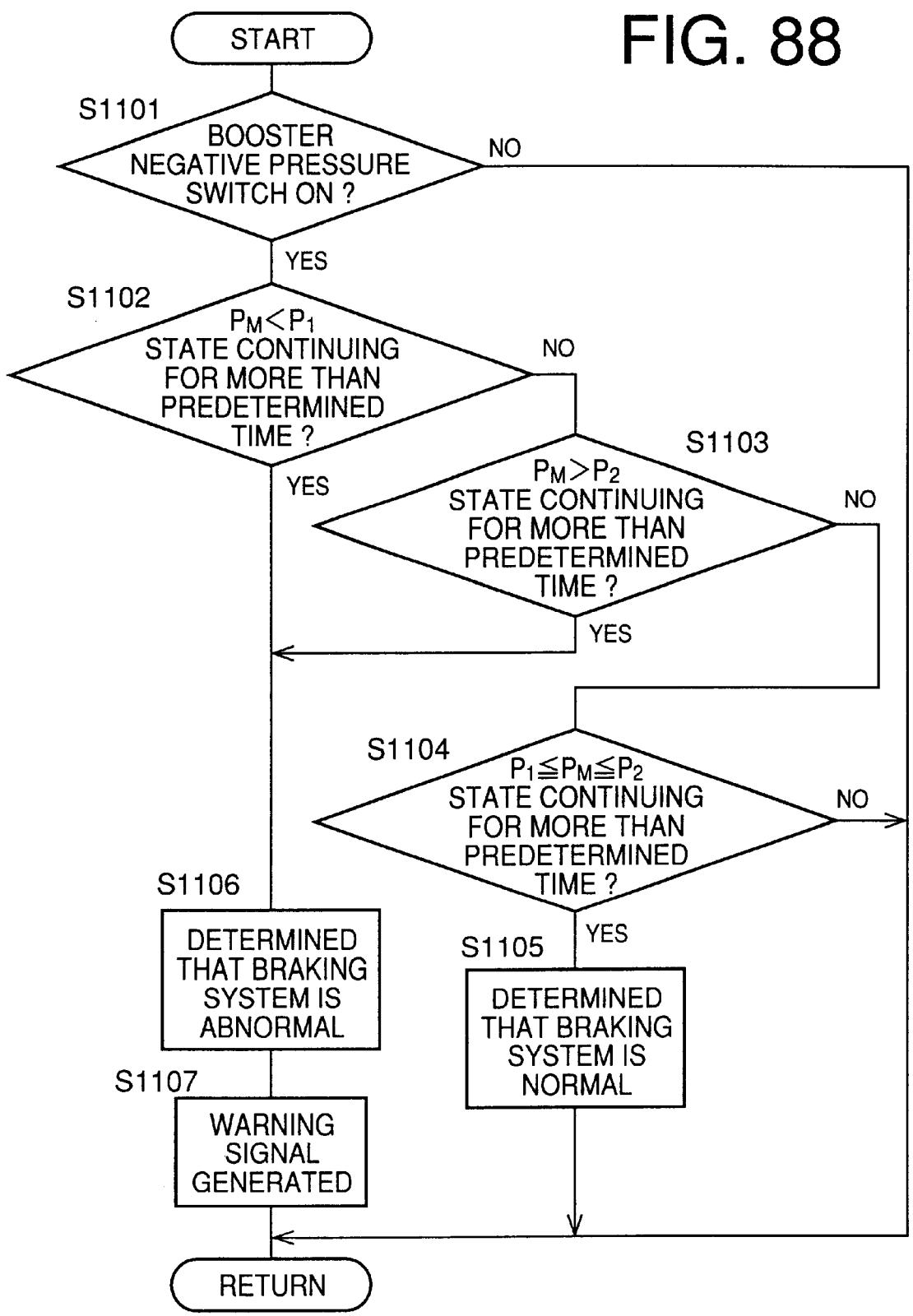
FIG. 88 is a flow chart showing abnormality determining routine in the twenty-second embodiment.

This normal/defective determination routine is illustrated in the flow chart of FIG. 88. Initially, S1101 is implemented to determine whether the booster negative pressure switch 534 is in the ON state. If the switch 534 is not in the ON state in this control cycle, a negative decision (NO) Is obtained, and one cycle of execution of the present routine is immediately terminated.

If the booster negative pressure switch 534 is in the ON state in this control cycle, on the other hand, an affirmative decision (YES) is obtained in S1101, and the control flow goes to S1102 to determine whether the detected master cylinder pressure $P_M$ has been kept abnormally low being lower than the lower reference value $P_1$ for more a predetermined time. If the master cylinder pressure $P_M$ has not been kept abnormally low for more than the predetermined time in this control cycle, a negative decision (NO) is obtained, and the control flow goes to S1103 to determine whether the detected master cylinder pressure $P_M$ has been kept abnormally high being higher than the upper reference value $P_2$ for more than a predetermined time. If the master cylinder pressure $P_M$ has not been kept abnormally high for more than the predetermined time in this control cycle, a negative decision (NO) is obtained, and the control flow goes to S1104 to determine whether the detected master cylinder pressure $P_M$ has been kept in a normal state in which the pressure $P_M$ is equal to or higher than the reference value $P_1$ and equal to or lower than the reference value $P_2$. If the pressure $P_M$ has not been kept in the normal state for more than the predetermined time in this control cycle, a negative decision (NO) is obtained, and one cycle of execution of the present routine is terminated. If the pressure $P_M$ has been kept in the normal state for more than the predetermined time, an affirmative decision (YES) is obtained, and the control flow goes to S1105 to determine that the braking system is in a normal state. Thus, one cycle of execution of the present routine is terminated.

If the master cylinder pressure $P_M$ has been kept abnormally low for more than the predetermined time in this control cycle, an affirmative decision (YES) is obtained in S1102. If the master cylinder pressure $P_M$ has been kept abnormally high for more than the predetermined time in this -control cycle, an affirmative decision (YES) is obtained in S1103. In either case, the control flow goes to S1106 to determine that the braking system is in a defective state, and then goes to S1107 in which the above-indicated warning device 602 is activated to provide a warning signal, warning the vehicle operator of some abnormality existing in the braking device. Thus, one cycle of execution of the present routine is terminated.

As described above, the present embodiment is advantageous in its capability of enabling the vehicle operator to promptly detecting a defect of the braking system, by utilizing the booster negative pressure switch 534 and the master cylinder pressure sensor 80 which are provided for increasing the pressure of the brake cylinder 10.

In the present embodiment, the braking effect characteristic control routine is also stored in the ROM of the ECU 600. Since this routine is the same as the routine in the fifteenth embodiment, the description is omitted.

There will next be described a twenty-third embodiment of this invention. Like the preceding twenty-second embodiment, this embodiment is identical in mechanical arrangement with the fifteenth embodiment, and is different only electrical arrangement from the fifteenth embodiment. Only the elements specific to the present embodiment will be described in detail, but the elements identical with those of the fifteenth embodiment will not be described in detail, with the same reference signs being given to those identical elements. Like the twenty-second embodiment, the present embodiment is provided with a device for effecting the normal/defective determination of the braking system.

Figure 89:
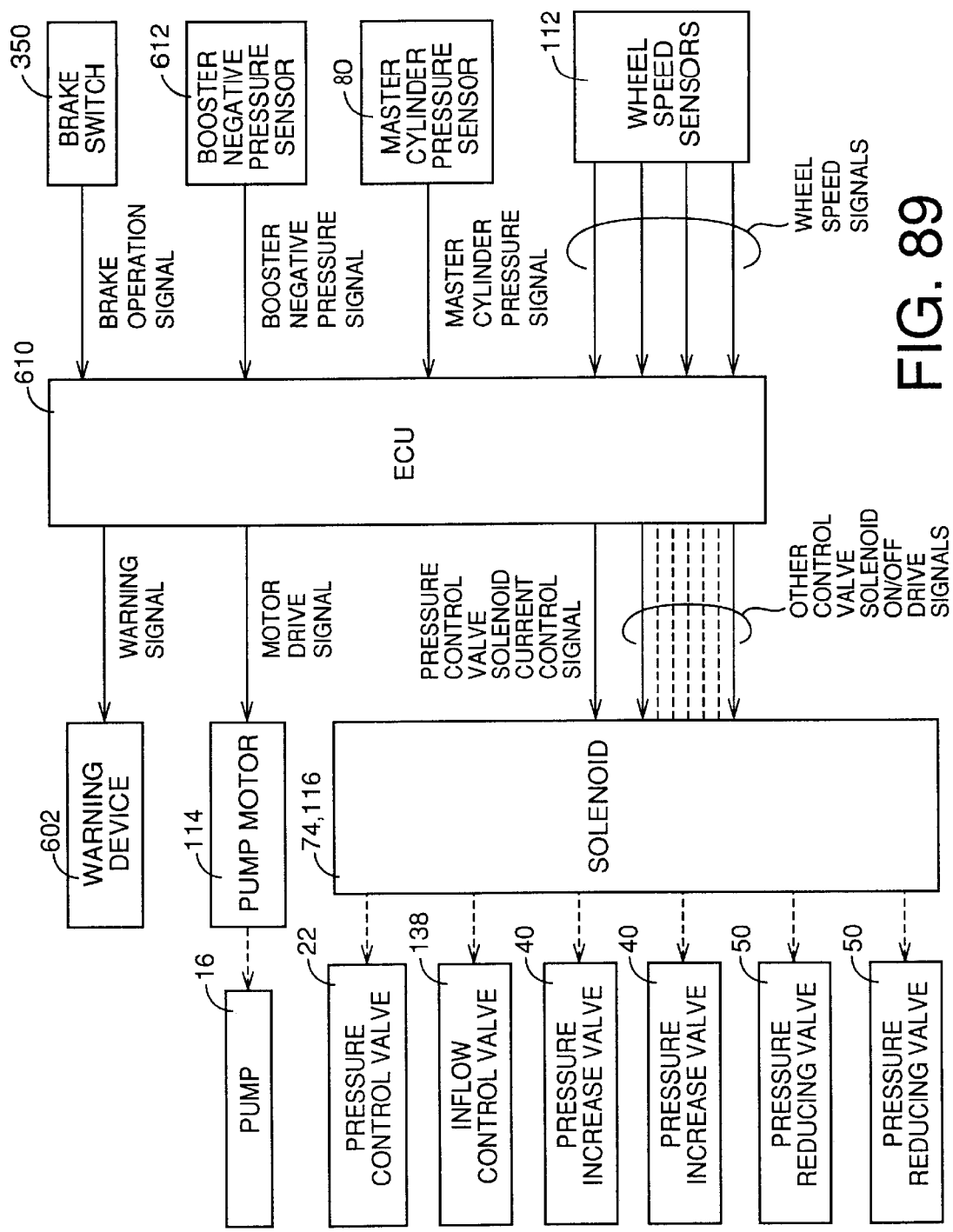
FIG. 89 is a block diagram showing an electrical arrangement of a braking system of a twenty-third embodiment of this invention.

FIG. 89 shows an electrical arrangement of the present embodiment. Unlike the fifteenth embodiment, the present embodiment uses an ECU 610 in place of the ECU 522, and a booster negative pressure sensor 612 in place of the booster negative pressure switch 534. The booster negative pressure sensor 612 generates a booster negative pressure signal which continuously changes with a continuous change in the pressure $P_V$ of the pressure changing chamber 528. Like the twentieth embodiment, the present embodiment additionally includes the warning device 620.

Figure 90:
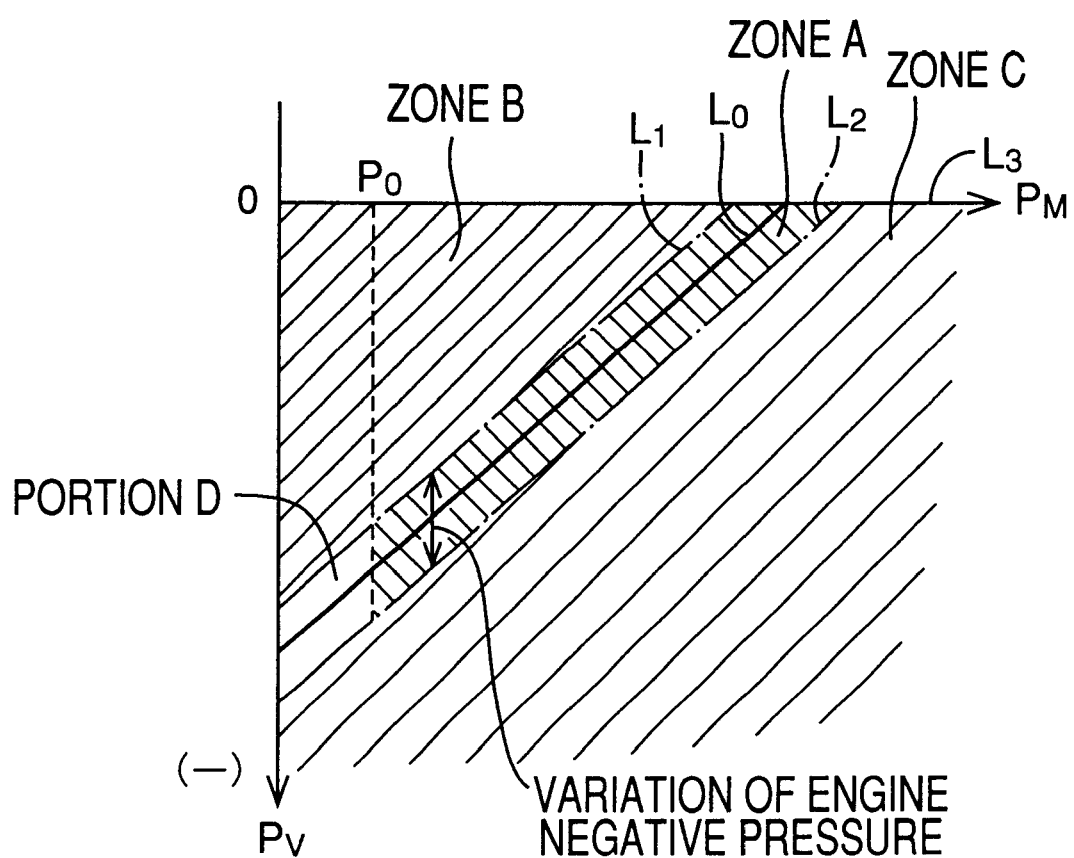
FIG. 90 is a graph for explaining a principle of determination of abnormality of the braking system in the twenty-third embodiment.

FIG. 90 is a graph similar to that of FIG. 87. In the present embodiment wherein the booster negative pressure sensor 612 continuously detects the pressure $P_V$ of the pressure changing chamber 528, the three zones A, B and C are larger than in the twentieth embodiment.

Described in detail, (1) where the vacuum booster 517, booster negative pressure sensor 612, master cylinder 14 and master cylinder pressure sensor 80 are normal, the point corresponding to the pressure $P_V$ detected by the booster negative pressure 612 and the master cylinder pressure $P_M$ detected by the master cylinder pressure 80 lie in the band zone A whose width corresponds to the variation in the engine negative pressure; (2) where the vacuum booster 517 is defective and the reduced pressure in the pressure changing chamber 528 is not normal, the point corresponding to the detected pressures lies in the triangular zone B in which the master cylinder pressure $P_M$ is lower than in the zone A; (3) where the booster negative pressure sensor 612 is defective, the point corresponding to the detected pressures lies in either the zone B or the triangular zone C in which the master cylinder pressure $P_M$ is higher than in the zone A; (4) where the master cylinder 14 (more precisely, one of the mutually independent two braking sub-systems in which the fluid pressure is detected by the master cylinder pressure sensor 80) is defective, incapable of generating a hydraulic pressure, the point corresponding to the detected pressures lies in the zone B; and (5) where the master cylinder pressure sensor 80 is defective, the point corresponding to the detected pressures lies in the zone B or C.

Thus, it is possible to determine whether the elements of the braking system are all normal and which one of the elements is defective, by determining one of the zones A, B and C in which the point corresponding to the detected pressures lies.

Based on the above finding, therefore, a routine for effecting the normal/defective determination of the braking system is stored in the ROM of the ECU 610 in the present embodiment.

Figure 91:
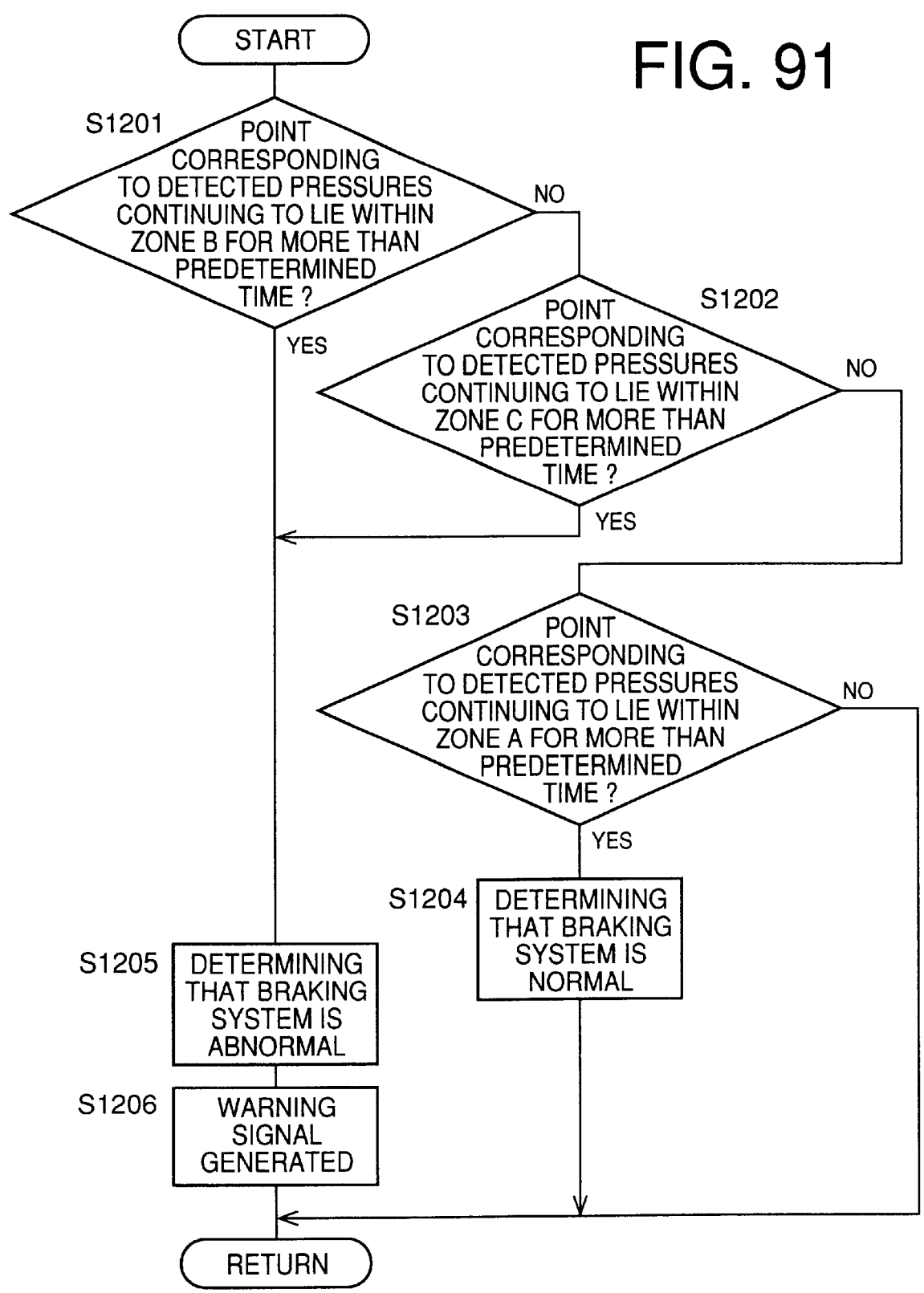
FIG. 91 is a flow chart showing abnormality determining routine in the twenty-third embodiment.

This normal/defective determination routine is illustrated in the flow chart of FIG. 91. Initially, S1201 is implemented to determine whether the point corresponding to the detected pressures has been lying in the zone B for more than a predetermined time. If the point has not been lying in the Zone B for more than the predetermined time in this control cycle, a negative decision (NO) is obtained, and the control flow goes to S1202 to determine whether the point corresponding the detected pressures has been lying in the zone C for more than a predetermined time. if the point has not been lying in the zone C for more than the predetermined time in this control cycle, a negative decision (NO) is obtained, and the control flow goes to S1203 to determine whether the point corresponding to the detected pressures has been lying in the zone A for more than a predetermined time in this control cycle, a negative decision (NO) is obtained, and one cycle of execution of the present routine is immediately terminated. If the point corresponding to the detected pressures has been lying in the zone A for more than the predetermined time in this control cycle, on the other hand, an affirmative decision (YES) is obtained in S1203, and the control flow goes to S1204 to determine that the braking system is in the normal state. Thus, one cycle of execution of the present routine is terminated.

If the point corresponding to the detected pressures has been lying in the zone B for more than the predetermined time in this control cycle, on the other hand, an affirmative decision (YES) is obtained in S1201. If the point has been lying in the zone C for more than the predetermined time in this control cycle, an affirmative decision (YES) is obtained in S1202. In either of these cases, the control flow then goes to S1205 to determine that the braking system is in a defective state. Then, the control flow goes to S1206 in which the above-indicated warning device 602 is activated to provide a warning signal, warning the vehicle operator of some abnormality existing in the braking device. Thus, one cycle of execution of the present routine is terminated.

As shown in FIG. 90, the zone A in this embodiment does not consist of an entire area between the zones B and C, and does not include an area D in which the detected master cylinder pressure $P_M$ is equal to or lower than the reference value $P_0$. Unless the area D is excluded from the zone A, the braking system which is in fact in a defective state would be erroneously determined to be in a normal state, where the detected master cylinder pressure $P_M$ is zero due to a defect in the master cylinder 14 or master cylinder pressure sensor 80, and while the point corresponding to the detected pressures is moved from the area D along the vertical axis in the upward direction as seen in the figure. The present embodiment is therefore adapted not to effect the normal/defective determination of the braking system as long as the point corresponding to the detected pressures lies in the area D, for preventing an erroneous determination and thereby improving the reliability of the normal/defective determination device. It is noted that while the present embodiment is adapted to execute the normal/defective determination routine irrespective of whether the detected master cylinder pressure $P_M$ is equal to or lower than the reference value $P_0$ or not, the embodiment may be modified not to effect the routine when the pressure $P_M$ is equal to or lower than the reference value $P_0$, to prevent an erroneous determination.

The pressure $P_C$ of the negative pressure chamber 527 is not necessarily normal immediately after the start of the engine even where the vacuum booster 517 is free of any defect. That is, the pressure $P_C$ upon starting of the engine may be higher than the normal value, and it takes a time for the pressure $P_C$ to be lowered to the normal reduced value. Therefore, the present embodiment is arranged not to execute the normal/defective determination routine or not to output a result of the determination, until a predetermined reference time necessary for the pressure of the pressure changing chamber 527 to become equal to the normal value has passed after the start of the engine has been detected by an engine start sensor. Therefore, this embodiment prevents erroneous normal/defective determination of the braking system due to the pressure $P_V$ of the negative pressure chamber 527 upon starting of the engine, thereby improving the reliability of the normal/defective determination device.

In the present routine, the braking effect characteristic control routine is also stored in the ROM of the ECU 610. This routine, which is different from that in any of the preceding embodiments, uses the booster negative pressure sensor 612 to determine whether the boosting limit of the vacuum booster 517 has been actually reached.

Figure 92:
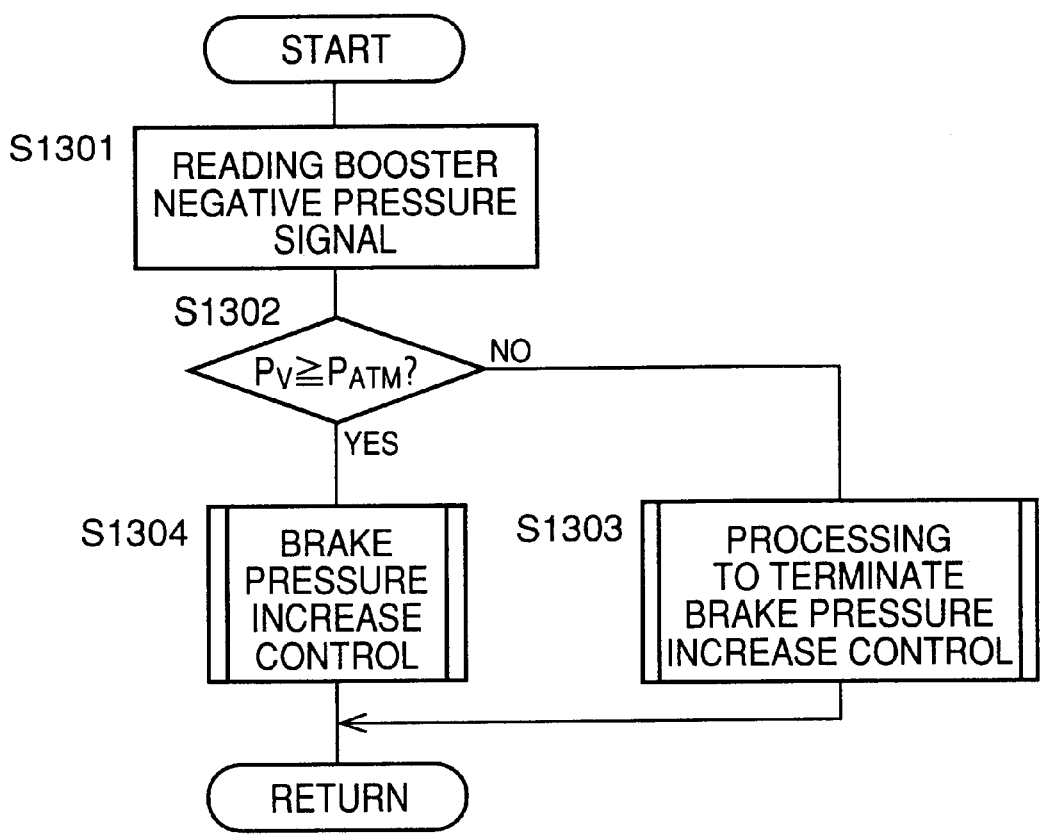
FIG. 92 is a flow chart showing a braking effect characteristic control routine in the twenty-third embodiment.

The braking effect characteristic control routine in this embodiment is illustrated in the flow chart of FIG. 92. Initially, S1301 is implemented to read the booster negative pressure signal received from the booster negative pressure sensor 612. Then, S1302 is implemented to calculate the pressure $P_V$ of the pressure changing chamber 528 on the basis of the booster negative pressure signal, and determine whether the calculated pressure $P_V$ is equal to or higher than the atmospheric pressure $P_{ATM}$. If the pressure $P_V$ is not equal to or higher than the atmospheric pressure $P_{ATM}$ in this control cycle, a negative decision (NO) is obtained, and the control flow goes to S1303 to determine that the boosting limit of the vacuum booster 517 has not been reached, and to effect the processing to terminate the pressure increase control. Thus, one cycle of execution of the present routine is terminated.

If the pressure $P_V$ in the pressure changing chamber 528 is equal to or higher than the atmospheric pressure $P_{ATM}$ in this control cycle, an affirmative decision (YES) is obtained in S1302, and the control flow goes to S1304 to determine that the boosting limit of the vacuum booster 517 has been reached, and to effect the pressure increase control. In this pressure increase control, the above-indicated desired pressure difference $\Delta P$ is calculated depending upon the amount of increase $IP_M$ from the master cylinder pressure $P_M$ detected by the master cylinder pressure sensor 80 when the pressure $P_V$ of the pressure changing chamber 528 has reached the atmospheric pressure $P_{ATM}$, namely, when the boosting limit of the vacuum booster 517 has been reached. The pressure control valve 22 is controlled so as to establish the calculated desired pressure difference $\Delta P$. Thus, one cycle of execution of the present routine is terminated.

As described above, the present embodiment is advantageous in its capability of enabling the vehicle operator to promptly detecting a defect of the braking system, by utilizing the booster negative pressure sensor 612 and the master cylinder pressure sensor 80 which are provided for increasing the pressure of the brake cylinder 10.

While the preceding twenty-second embodiment cannot effect the normal/defective determination of the braking system unless the pressure $P_V$ of the pressure changing chamber 528 lies within the specified range, the present embodiment uses the booster negative pressure sensor 612 for continuously detecting the pressure $P_V$ of the pressure changing chamber 528. In the present embodiment, therefore, it is always possible to effect the normal/defective determination.

Then, a twenty-fourth embodiment of this invention will be described.

Figure 93:
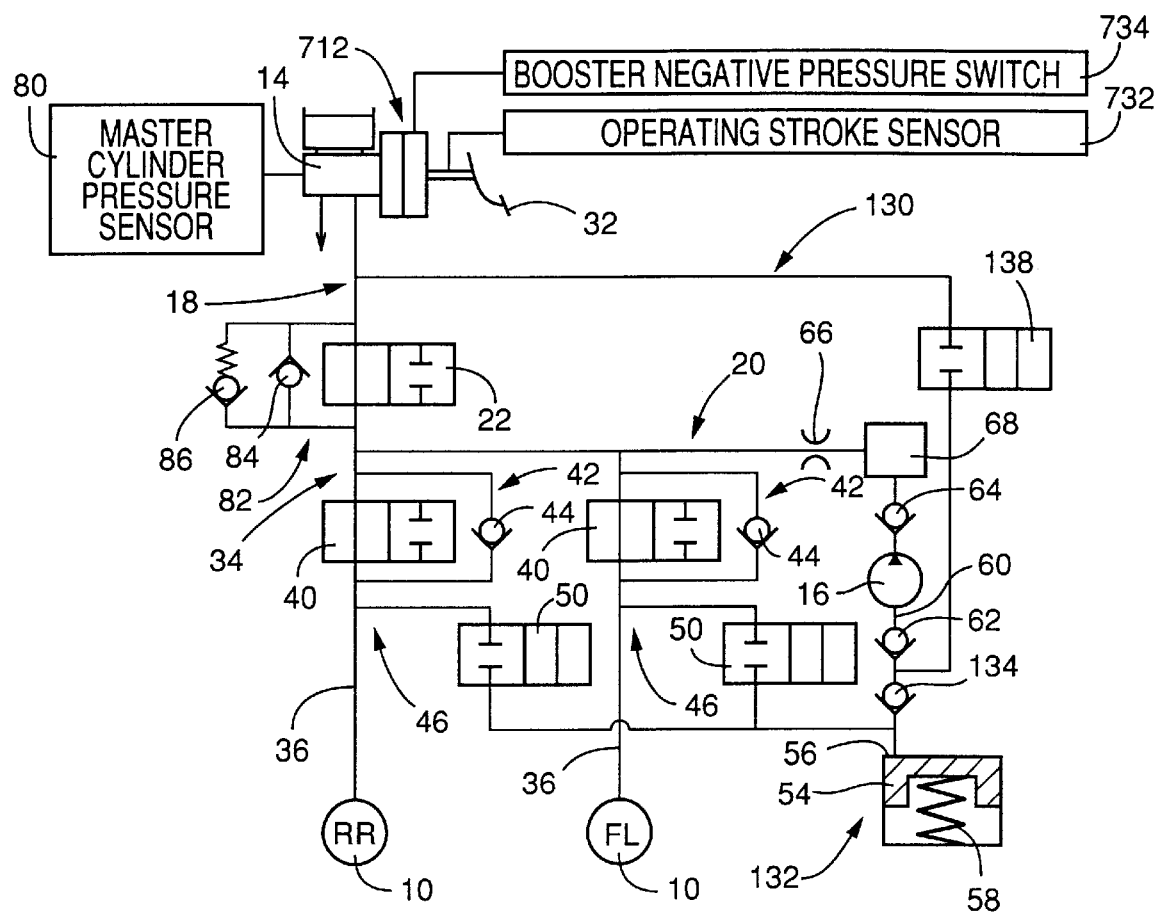
FIG. 93 is a schematic view showing a braking system of a twenty-four embodiment of this invention.

FIG. 93 shows the braking system according to the present embodiment. Like the preceding several embodiments, this braking system is installed on a four-wheel motor vehicle, and is provided with a vacuum booster 712 for boosting the operating force of the brake pedal 32 and transferring the boosted operating force to the master cylinder.

Like the preceding several embodiments, this braking system is further provided with an anti-lock brake pressure control device and a braking effect characteristic control device. The anti-lock brake pressure control device is a device for preventing an excessive locking tendency of each wheel during brake application to the motor vehicle. This anti-lock brake pressure control device has the pump 16 which circulates the working fluid within the braking pressure circuit. On the other hand, the braking effect characteristic control device is a device for controlling the braking effect characteristic which is a relationship between the brake operating force and the deceleration value of the vehicle body, while taking into account that the vacuum booster 712 has a boosting limit, so that the deceleration value of the vehicle body increases with the brake operating force during brake application to the motor vehicle, at a substantially constant rate before and after the boosting limit has been reached. This braking effect characteristic control device is operated using the above-indicated pump 16. That is, the pump 16 is used commonly for the anti-lock brake pressure control device and the braking effect characteristic control device.

Figure 94:
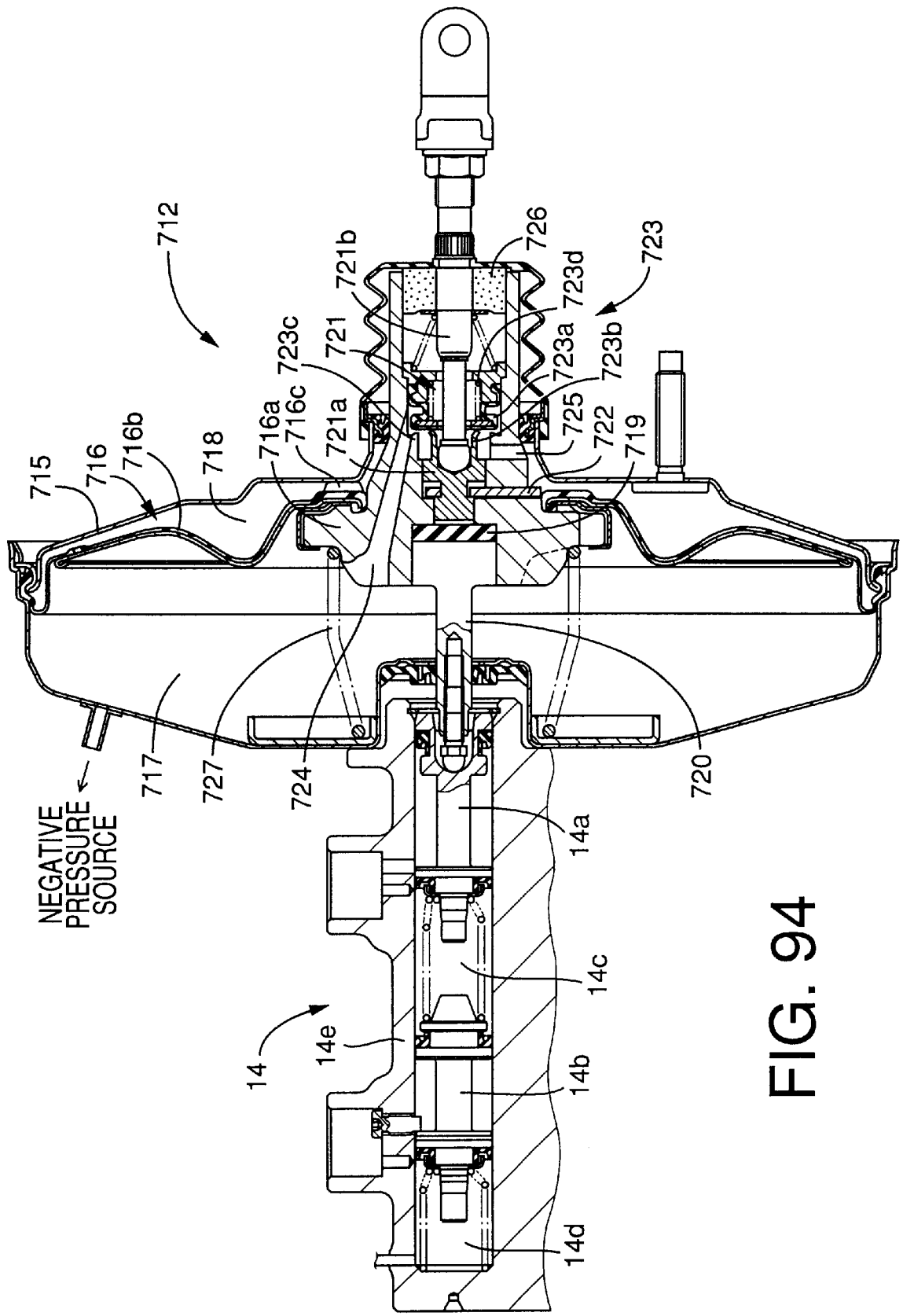
FIG. 94 is a side view in cross section of vacuum booster along with master cylinder in FIG. 93.

The vacuum booster (hereinafter referred to simply as "booster") 712 has a construction similar to the conventional booster, as shown in FIG. 94. This construction will be described in detail by reference to the same figure, and the operation will be described in detail by reference to FIGS. 95–99.

The booster 712 has a hollow booster housing 715, as shown in FIG. 94. The space within the booster housing 715 is divided by a power piston 716 into a negative pressure chamber 717 on the side of the master cylinder 14 and a pressure changing chamber 718 on the side of the brake pedal 32. The negative pressure chamber 717 is connected to an intake pipe of an engine or other negative pressure source in which there is generated a negative pressure by operation of the engine.

The power piston 716 has (a) a hub 716a supported by the booster housing 715 such that the hub 716a is movable back and forth, and (b) a diaphragm 716b which is an annular disc that is mounted at its inner periphery on the hub 716a and attached at its outer periphery to the booster housing 715. On the diaphragm 716b, there is provided a stopper 716c for defining a maximum distance of backward movement of the diaphragm 716b relative to the booster housing 715.

The hub 716a is slidably connected, at its end portion on the side of the master cylinder 14, to an end portion (a right-hand side end portion as viewed in the figure) of a booster piston rod 720 (an example of an output member) through a reaction disc 719 made of a rubber material. The other end portion (left-hand side end portion as viewed in the figure) of the booster piston rod 720 is linked with the pressurizing piston 14a of the master cylinder 14, so that the booster piston rod 720 transfers the operating force of the power piston 716 to the pressurizing piston 14a of the master cylinder 14.

The hub 716a is linked, at its end portion on the side of the brake pedal 32, with the brake pedal 32 through an input member 721. The input member 721 consists of a reaction rod 721a and a valve operating rod 721b which are coaxially connected to each other. The input member 721 is slidably connected at its reaction rod 721a to the hub 716a, and is linked at its valve operating rod 721b with the brake pedal 32 through a pedal operating mechanism not shown. The minimum and maximum distances of the reaction rod 721a to the hub 716a are defined by a stopper key 722 (an example of a stop). While the stopper key 722 extends through both the hub 716a and the reaction rod 721a, there are provided a large axial clearance between the reaction rod 721a and the rear surface of the stopper key 722, and a small axial clearance between the hub 716a and the front surface of the stopper key 722.

The front end of the reaction rod 721a is engageable with the reaction disc 719. When the booster 712 is placed in a non-operated state of FIG. 94, the reaction rod 721a is not in engagement with the reaction disc 719. When the booster 712 is placed in an operated position, the reaction rod 721a is in engagement with the reaction disc 719, as shown in FIGS. 96–99, so that a reaction force of the booster piston rod 720 acts on the reaction rod 721a.

Between the negative pressure chamber 717 and the pressure changing chamber 718, there is provided a valve mechanism 723 (an example of a power piston drive mechanism). The valve mechanism 723 is operated based on a relative movement between the valve operating rod 721b and the power piston 716, and includes a control valve 723a, an air valve 723b, a vacuum valve 723c and a control valve spring 723d. The air valve 723b cooperates with the control valve 723a to selectively connect and disconnect the pressure changing chamber 718 to and from the atmosphere. The air valve 723b is movable with the valve operating rod 721b. The control valve 723a is attached to the valve operating rod 721b such that the control valve 723a is biased by the control valve spring 723d in a direction for seating the control valve 723a onto the air valve 723b. The vacuum valve 723c cooperates with the control valve 723a to selectively connect and disconnect the pressure changing chamber 718 to and from the negative pressure chamber 717. The vacuum valve 723c is movable with the power piston 716.

The hub 716a has a passage 724 for communication of the pressure changing chamber 717 with the negative pressure chamber 718 through the vacuum valve 723c, and a passage 725 for communication of the pressure changing chamber 718 with the atmosphere through the air valve 723b. The hub 716a further has an air cleaner element 726 disposed in a space at its end on the side of the brake pedal 32. Between the hub 716a and the booster housing 715, there is provided a return spring 727 for returning the power piston 716 to its fully retracted position.

Then, the operation of the booster 712 will be explained by reference to FIGS. 96–99. These figures show a relevant portion of the booster 712 in enlargement.

Figure 95:
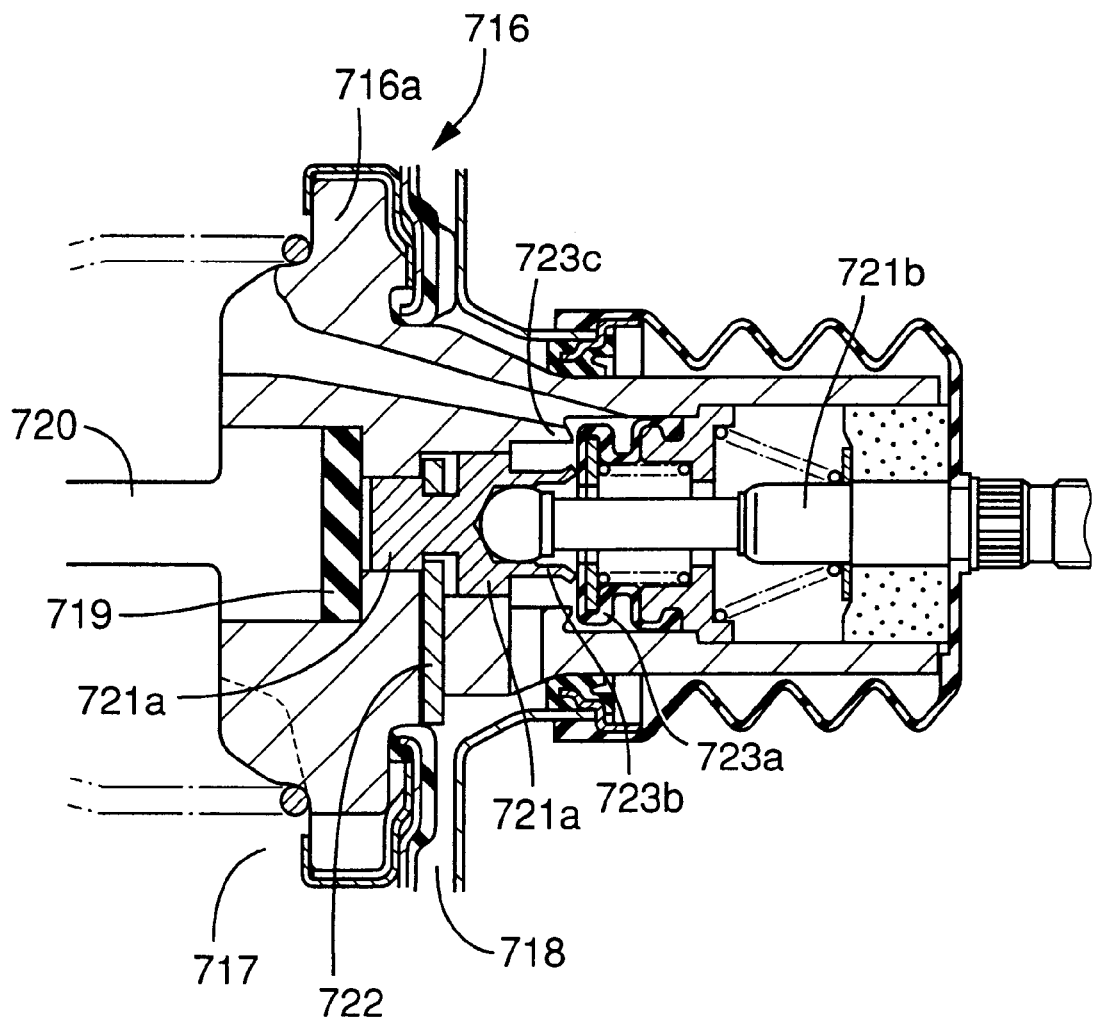
FIG. 95 is an fragmentary side view in cross section showing in enlargement of the vacuum booster in FIG. 94 in non-operated state.

When the booster 712 is placed in the non-operated position, the control valve 723a is seated on the air valve 723b and spaced apart from the vacuum valve 723c, as shown in FIG. 95, so that the pressure changing chamber 718 is disconnected from the atmosphere and communicated with the negative pressure chamber 717. In this state, therefore, both the negative pressure chamber 717 and the pressure changing chamber 718 have the same negative pressure due to a negative pressure (lower than the atmospheric pressure) in the negative pressure source.

Figure 96:
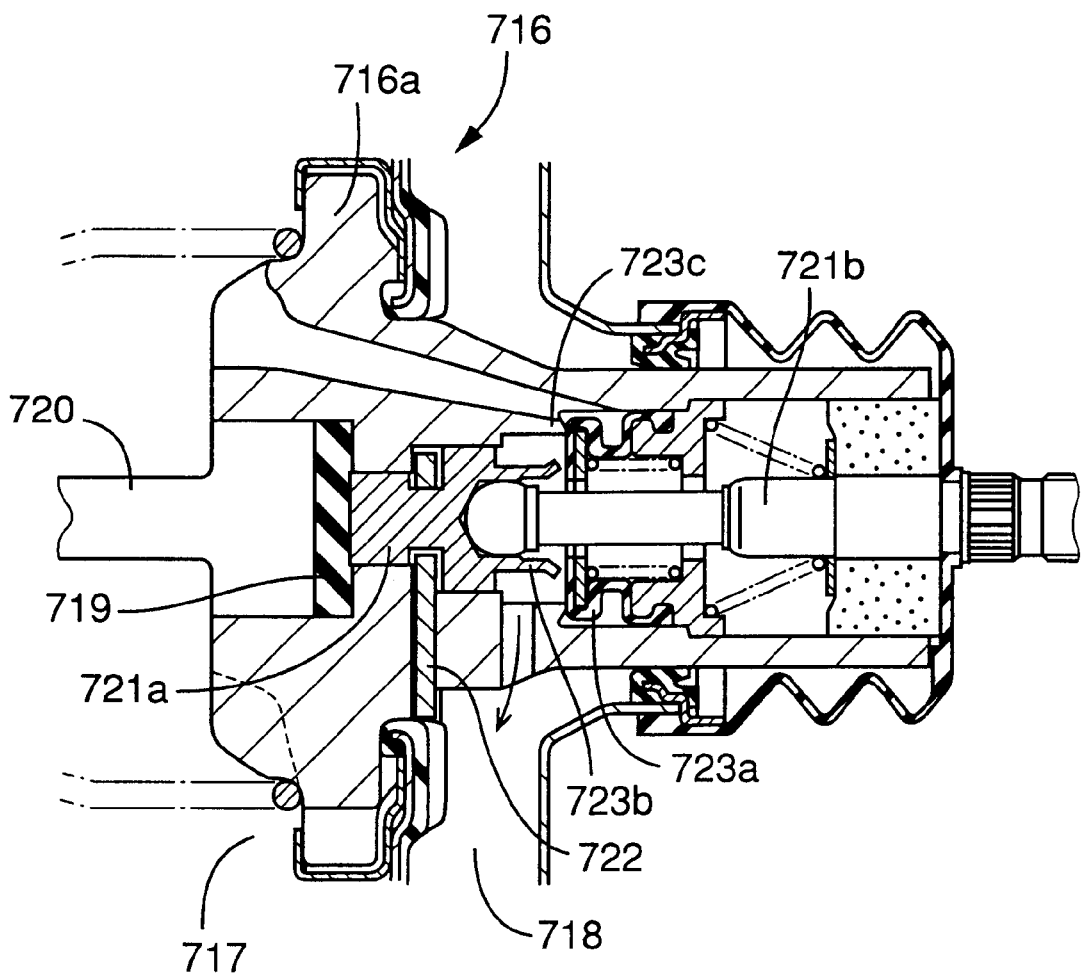
FIG. 96 is a fragmentary side view in cross section showing in enlargement of the vacuum booster in a transient state.
Figure 97:
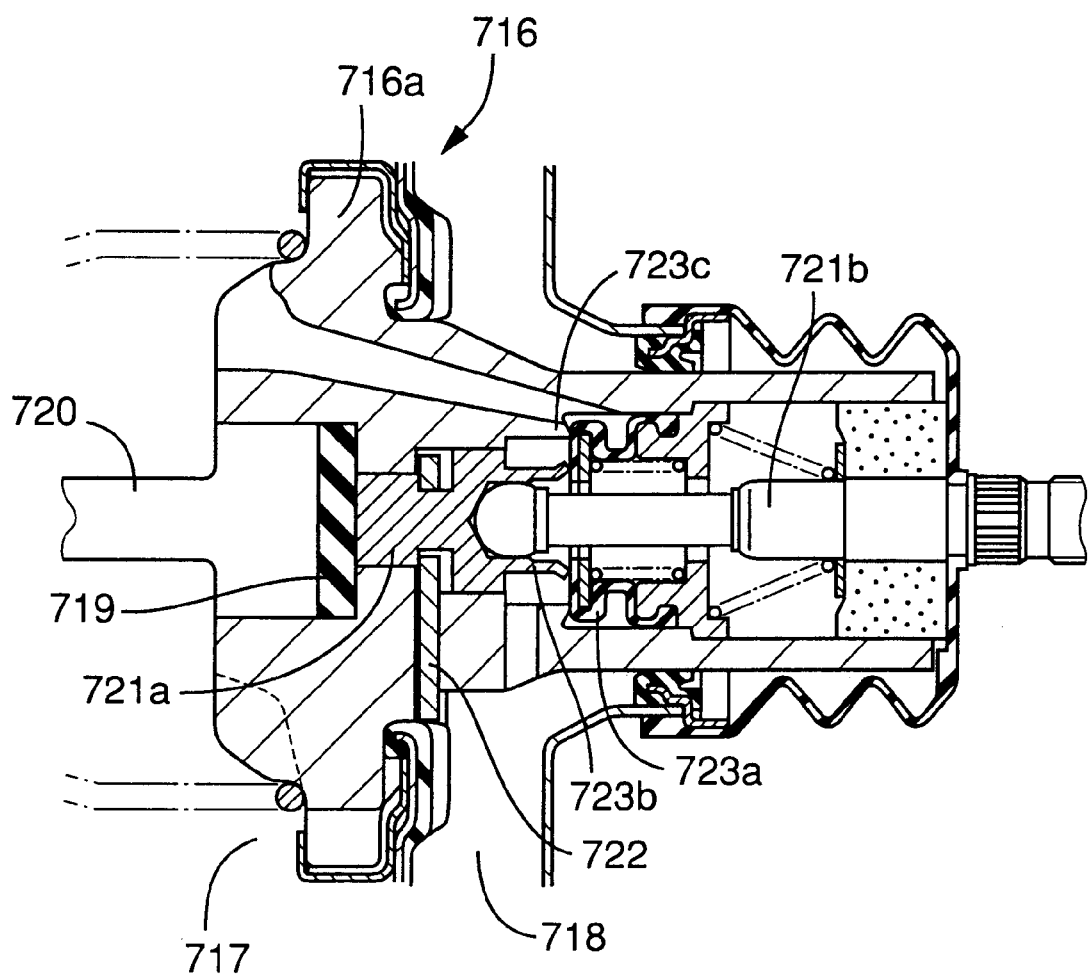
FIG. 97 is a fragmentary side view in cross section showing in enlargement of the vacuum booster in a hold state.

When the booster 712 is in a transient state, namely, while the brake pedal 32 is being operated to raise the master cylinder pressure, the valve operating rod 721b is moved toward the power piston 716, and the control valve 723a is eventually seated onto the vacuum valve 723c, as shown in FIG. 96, so that the pressure changing chamber 718 is disconnected from the negative pressure chamber 717.

When the valve operating rod 721b is subsequently moved a further distance toward the power piston 716, the air valve 723b is spaced apart from the control valve 723a, so that the pressure changing chamber 718 is communicated with the atmosphere. In this state, the pressure in the pressure changing chamber 718 is increased, causing a pressure difference between the negative pressure chamber 717 and the pressure changing chamber 718, so that the power piston 716 is operated by this pressure difference.

While the booster 712 is kept in a hold state, that is, while the operating force of the brake pedal 32 is kept constant, the control valve 723a is seated on both the air valve 723b and the vacuum valve 723c, and the pressure changing chamber 718 is disconnected from both the negative pressure chamber 717 and the atmosphere, so that the pressure in the negative pressure chamber 717 is held constant. As a result, the operating force of the power piston 716 is held constant.

Figure 98:
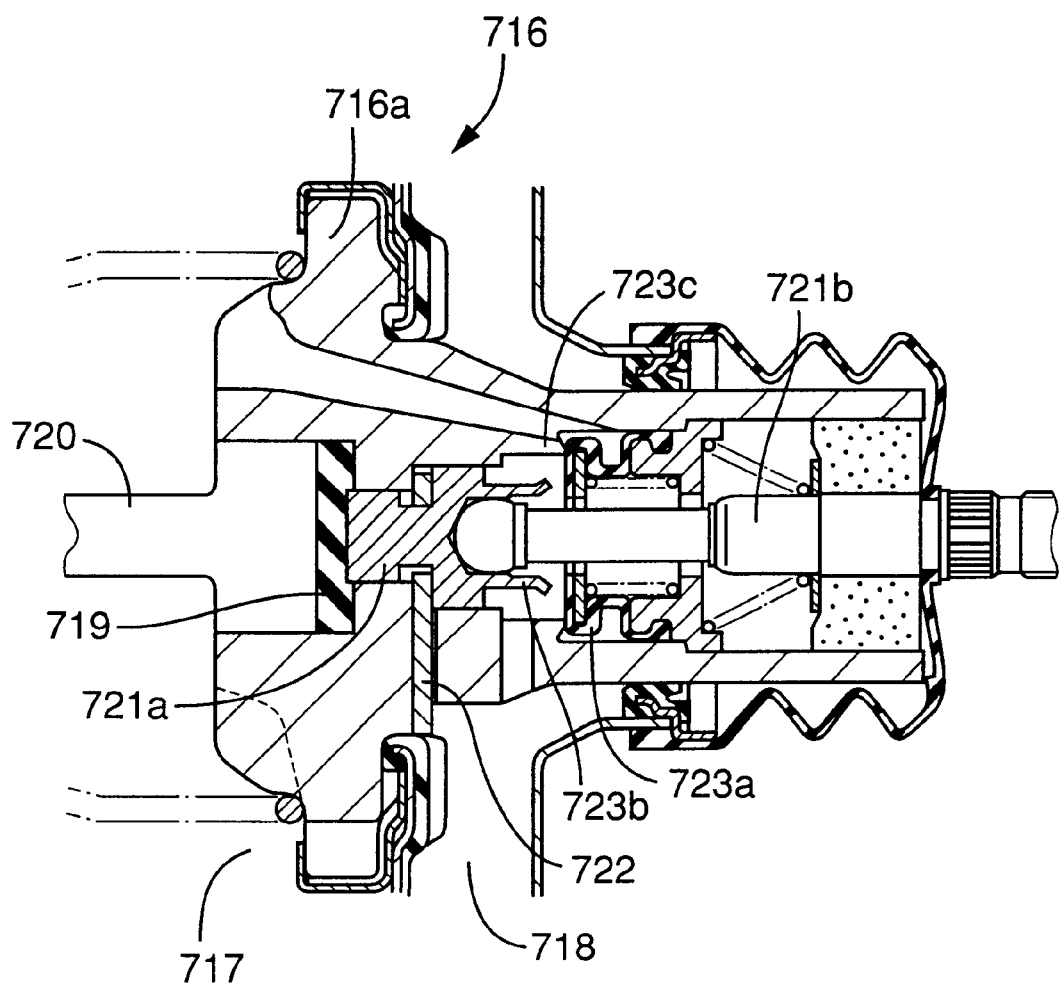
FIG. 98 is a fragmentary side view in cross section showing in enlargement of the vacuum booster in a maximum boosting state.

When the pressure in the pressure changing chamber 717 of the booster 712 has become equal to the atmospheric pressure, the boosting limit of the booster 712 has been reached. If the brake pedal 32 is further operated in this condition, the reaction rod 721a is advanced while depressing the reaction disc 719, without an advancing movement of the power piston. Consequently, the reaction rod 721a is moved toward the power piston 716, and the axial clearance between the rear surface of the stopper key 722 and the reaction rod 721a is eventually eliminated, whereby the reaction rod 721a is brought into abutting contact with the stopper key 722. At this time, the clearance between the front surface of the stopper key 722 and the hub 716a of the power piston 716 is also eliminated, whereby the reaction rod 721a is forced onto the hub 716a via the stopper key 722. In this condition, the booster 712 is in the maximum boosting state as shown in FIG. 98. When the brake pedal 32 is further operated in this state, the reaction rod 721a is advanced together with the power piston 716, and the operating force of the booster piston rod 720 is increased, so that the master cylinder pressure is increased.

Figure 99:
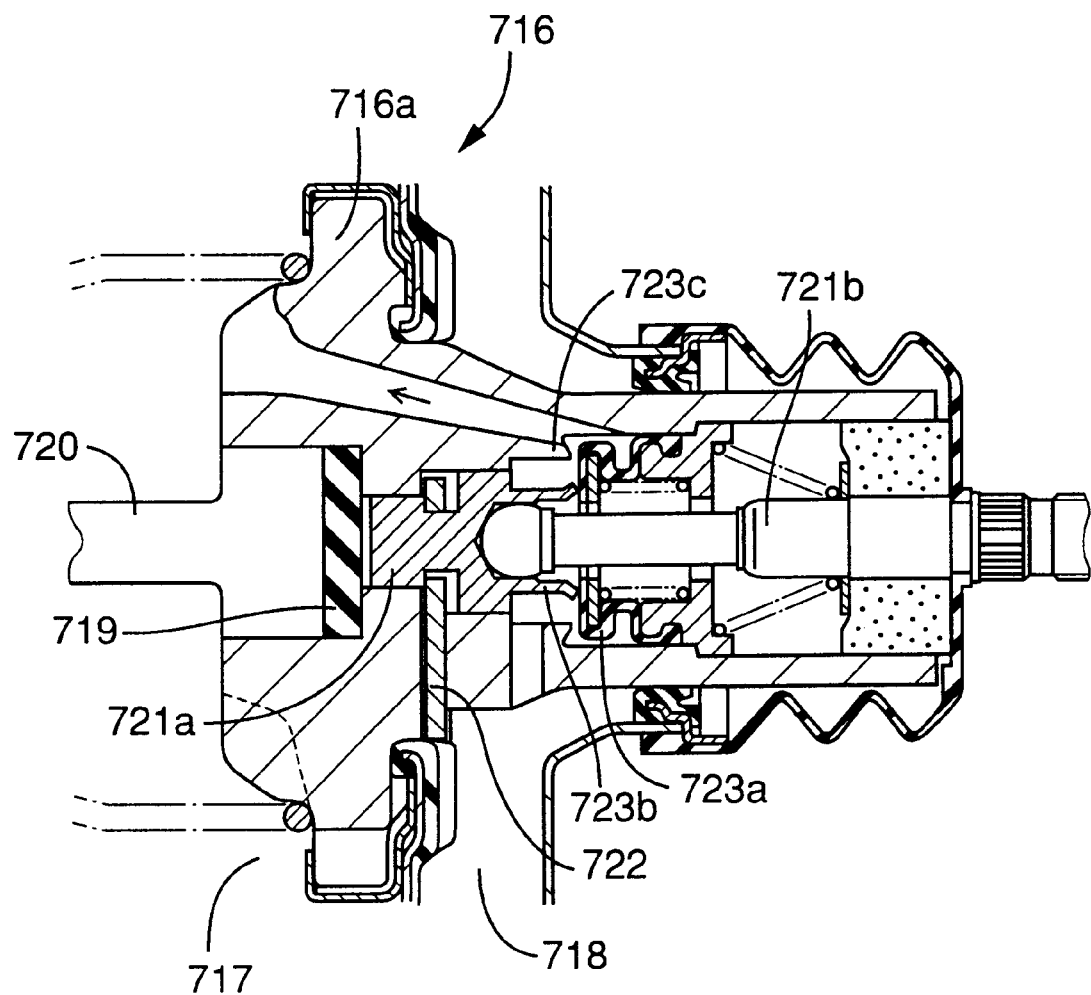
FIG. 99 is a fragmentary side view in cross section showing in enlargement of the vacuum booster in a released state.

When the booster 712 is placed in a released state, that is, while the brake pedal 32 is being operated so as to lower the master cylinder pressure, the control valve 723a is seated on the air valve 723b and is spaced apart from the vacuum valve 723c, as shown in FIG. 99, so that the pressure changing chamber 718 is disconnected from the atmosphere and communicated with the negative pressure chamber 717, whereby the pressure of the pressure changing chamber 718 is lowered. As a result, the pressure difference between the negative pressure chamber 717 and the pressure changing chamber 718 is reduced.

The master cylinder 14 is of a tandem type wherein two pressurizing pistons 14a, 14b are slidably disposed in series with each other within a master cylinder housing 14e, as shown in FIG. 94. The two pressurizing pistons 14a, 14b are operated based on an output of the booster 712, so that the same hydraulic pressure is generated in pressurizing chambers 15c, 14d which are formed in front of the respective pressurizing pistons 14a, 14b.

The one pressurizing chamber 14c is connected to the brake cylinder 10 for operating a brake for the front left wheel FL, and the brake cylinder 10 for operating a brake for the rear right wheel RR. The other pressurizing chamber 14d is connected to the brake cylinder 10 for operating a brake for the front right wheel FR, and the brake cylinder 10 for operating a brake for the rear left wheel RL. The brakes (disc type, drum type, etc.) are arranged such that friction members are forced by a force based on the hydraulic pressure, onto the friction surfaces of disc rotors rotating with the vehicle wheels, to restrain the rotations of the wheels.

Thus, the present braking system is a diagonal type system having two mutually independent braking sub-systems arranged diagonally with each other. Since these two braking sub-systems are identical with those in the fifteenth embodiments, detailed description of these sub-system is omitted, with the same reference numerals as used in the fifteen embodiment being used in the present embodiment.

Figure 100:
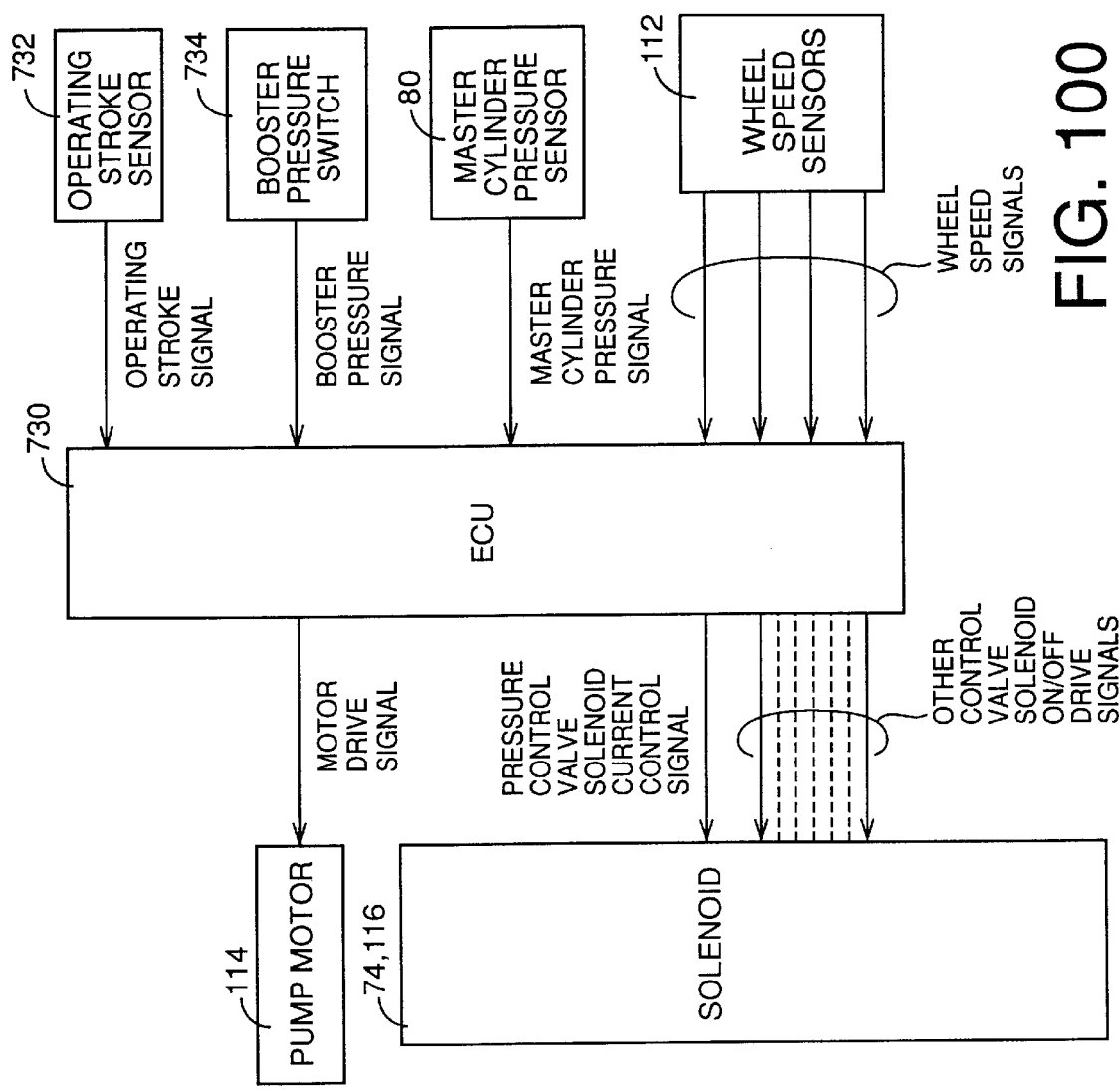
FIG. 100 is a block diagram showing an electrical arrangement of the twenty-fourth embodiment.

FIG. 100 shows an electrical arrangement of the braking system. The braking system is provided with an ECU (electronic control unit) 730 which is principally constituted by a computer incorporating a CPU, a ROM and a RAM. The ROM stores a braking effect characteristic control routine (illustrated in the flow charts of FIGS. 101–103), and an anti-lock brake pressure control routine (now shown). The CPU executes these routines, while utilizing the RAM, to effect the braking effect characteristic control and the anti-lock brake pressure control.

To the input side of the ECU 730, there are connected an operating stroke sensor 732 (an example of an operating-stroke-related quantity sensor), a booster pressure switch 734 (an example of a booster pressure sensor) and the above-indicated master cylinder pressure sensor 80 (an example of a master-cylinder-pressure-related quantity sensor). The operating stroke sensor 732 is adapted to detect an operating stroke S of the brake pedal 32 and generates an operating stroke signal representative of the operating stroke S. The booster pressure switch 734 is a switch which generates two different booster pressure signals depending upon the pressure of the pressure changing chamber 728. That is, the booster pressure switch 734 generates an OFF signal when the pressure in the pressure changing chamber 718 is lower than the atmospheric pressure, and an OFF signal when the pressure is equal to or higher than the atmospheric pressure.

To the output side of the ECU 730, on the other hand, there is connected the above-indicated pump motor 114, so that a motor drive signal is applied to the pump motor 114. Also connected to the output side of the ECU 730 are the solenoid 74 of the above-indicated pressure control valve 22, and the solenoids 116 of the pressure increasing valve 40, pressure reducing valve 100 and inflow control valve 138. A current control signal is applied to the solenoid 74 of the pressure control valve 22, for linearly controlling the magnetic force of the solenoid 74, and ON/OFF drive signals are applied to the solenoids 116 of the pressure increasing valve 40, pressure reducing valve 50 and inflow control valve 138, to energize and de-energize the solenoids 116.

While the braking effect characteristic control by the ECU 730 will be described, it will be briefly explained first.

The boosting limit of the booster 712 is reached when the operating force F of the brake pedal 32 has increased to a certain value at which the pressure of the pressure changing chamber has been raised to the atmospheric pressure. After the boosting limit has been reached, the booster 712 is not able to boost the operating force F, and the braking effect characteristic would be deteriorated as indicated in the graph of FIG. 52, if no measures were taken. In view of this fact, the braking effect characteristic control is implemented. Described in detail, after the boosting limit of the booster 712 has been reached, the pump 16 is activated to cause the pressure in the brake cylinder 10 to be higher than the master cylinder pressure $P_M$ by an amount equal to a pressure difference $\Delta P$ (an amount of increase of the brake cylinder pressure $P_B$ with respect to the master cylinder pressure $P_M$, as indicated in the graph of FIG. 54), as shown in the graph of FIG. 53, so that the braking effect is stabilized irrespective of whether the boosting limit of the booster 712 has been reached or not.

In the present embodiment, the determination as to whether the boosting limit of the booster 712 has been reached is effected by a method based on the signal of the booster pressure switch 734, and by a method based on the signals of the operating stroke sensor 732 and the master cylinder pressure sensor 80. The former method is based on a fact that the boosting limit of the booster 712 has been reached when the pressure in the pressure changing chamber 718 has become equal to the atmospheric pressure. In this method, the boosting limit is detected by directly detecting that the pressure of the pressure changing chamber 728 has become equal to the atmospheric pressure.

On the other hand, the latter method is based on the characteristic of the booster 712 which will be described.

Figure 105:
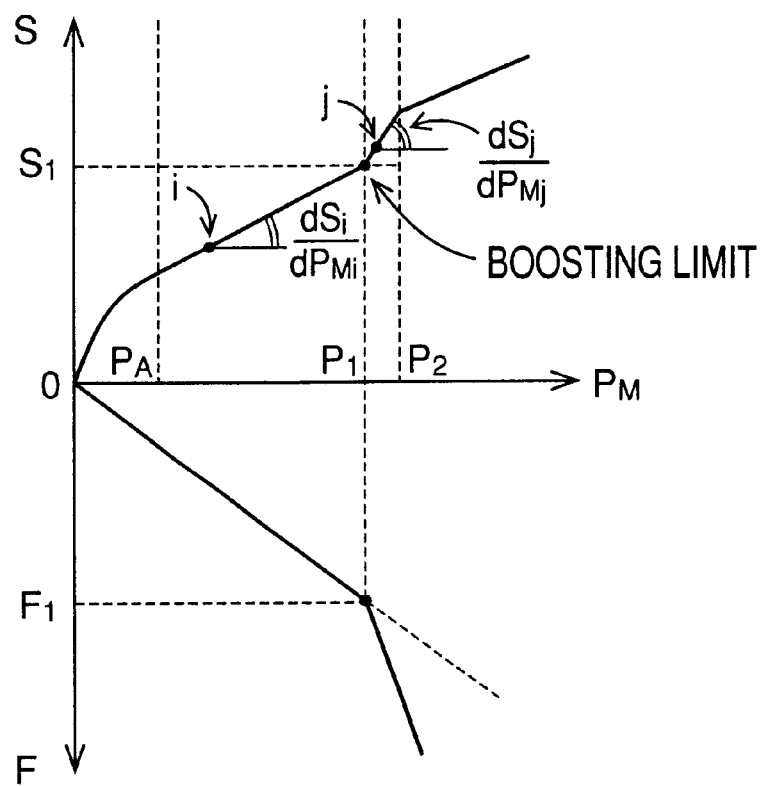
FIG. 105 is a graph showing a relationship among operating force F, master cylinder pressure $P_M$ and operating stroke S in a common braking system equipped with a vacuum booster.

The graph of FIG. 105 shows a relationship between the operating force F of the brake pedal 32, the master cylinder pressure $P_M$ and the operating stroke S of the brake pedal 32, which relationship is established when the brake pedal 32 is operated from the non-operated position. In the figure, "F1", "P1" and "S1" represent the operating force F, master cylinder pressure $P_M$ and operating stroke S, respectively, when the boosting limit of the booster 712 has been reached. The present graph shows the characteristic of the booster confirmed by the present inventors, namely, an abrupt temporary increase in a rate of increase $dS/dP_M$ of the operating stroke S with an increase of the master cylinder pressure $P_M$, immediately after the boosting limit of the booster 712 has been reached. The rate of increase $dS/dP_M$ of the operating stroke S at a point of time "i" before the boosting limit has been reached is represented by $(dSi/dP_{Mi})$, while the rate of increase $dS/dP_M$ at a point of time "j" after the boosting limit has been reached is represented by $(dSj/dP_{Mj})$. These rates of increase $(dSi/dP_{Mi})$ and $(dSj/dP_{Mj})$ satisfy the following inequality:

$$(dSi/dP_{Mi}) < (dSj/dP_{Mj})$$

This characteristic is considered to exist for the following reason:

After the pressure of the pressure changing chamber 718 has become equal to the atmospheric pressure during a braking operation, a further advancing movement of the input member 721 by a further operation of the brake pedal 32 will not cause an increase in the pressure difference between the negative pressure chamber 717 and the pressure changing chamber 718, nor will it cause an increase in the operating force of the power piston 716. Accordingly, the input member 721 alone is advanced. Before the input member 712 comes into abutting contact with the stopper key 722, the input member 712 applies an operating force to the booster piston rod 720 in the direction for increasing the master cylinder pressure $P_M$, through the reaction disc 719, but not through the power piston 716. Consequently, the input member 712 locally contacts the reaction disc 719, before the input member 712 comes into abutting contact with the stopper key 822, so that the reaction disc 719 is easily depressed, with a result of increasing the amount of increase of the operating stroke of the input member 712 as compared with the amount of increase of the force applied to the reaction disc 719, namely, as compared with the amount of increase of the master cylinder pressure $P_M$. Accordingly, the rate of increase of the operating stroke of the input member 721 with an increase in the master cylinder pressure $P_M$, that is, the rate of increase $dS/dP_M$ of the operating stroke is made higher before abutting contact of the input member 721 with the stopper key 722 after the boosting limit of the booster 712 has reached, than before the boosting limit has been reached.

A further advancing movement of the input member 712 by a further operation of the brake pedal 32 will cause the input member 721 to comes into abutting contact with the stopper key 722. In this state, the input member 721 applies an operating force to the booster piston rod 720 in the direction for increasing the master cylinder pressure $P_M$, through the stopper key 722, power piston 716 and reaction disc 719. After the abutting contact of the input member 721 with the stopper key 722, therefore, the input member 721 contact the entire surface of the reaction disc 719 through the power piston 716, so that the reaction disc 719 will not be easily depressed. Consequently, the amount of increase of the operating stroke of the input member 721 is made smaller than the amount of increase of the force applied to the reaction disc 719, namely, the amount of increase of the master cylinder pressure $P_M$. After the abutting contact of the input member 721 with the stopper key 722, therefore, the rate of increase $dS/dP_M$ of the operating stroke is lower than that before the abutting contact with the stopper key 722, after the boosting limit of the booster 712 has been reached. After the abutting contact of the input member 721 with the stopper key 722, the input member 721 is advanced together with the power piston 716 and the booster piston rod 720, so that the master cylinder pressure $P_M$ is increased without boosting of the brake operating force by the booster 712, whereby the master cylinder pressure $P_M$ is increased with the operating force F, at a rate lower than that before the boosting limit has been reached.

Since there exists the characteristic that the rate of increase $dS/dP_M$ of the operating stroke temporarily increases immediately after the boosting limit of the booster 712 has been reached, the input member 721 need not indirectly contact the booster piston rod 720 via the reaction disc 179 or directly contact the booster piston rod 720 before the input member 721 comes into abutting contact with the stopper key 722. This characteristic exists for a booster of the type wherein the input member 721 indirectly or directly engages the booster piston rod 720 for the first time when the input member 721 has been brought into abutting contact with the stopper key 722, that is, for a booster of the type wherein the input member 721 does not directly or indirectly engages the booster piston rod 720 after the boosting limit of the booster 712 has been reached and before the input member 721 has been brought into abutting contact with the stopper key 722.

While the characteristic of the booster 712 has been explained, the latter method described above utilizes this characteristic to determine whether the boosting limit has been reached.

One example of the latter method is referred to as a relative determining method, which is adapted to determine whether the present value of the rate of increase $dS/dP_M$ of the operating stroke during a braking operation is higher than the last value. However, the present embodiment employs an absolute determining method which is adapted to determine whether the rate of increase $dS/dP_M$ of the operating stroke has become higher than a predetermined value X (an example of a predetermined value) during the braking operation. Where this absolute determining method is employed, there is a possibility that a determination that the boosting limit of the booster 712 has been reached is erroneously made even when the boosting limit has not in fact been reached, if there is a tendency that the rate of increase $dS/dP_M$ of the operating stroke is relatively high immediately after the initiation of the braking operation, as indicated in FIG. 105. Based on a fact that the master cylinder pressure $P_M$ is relatively high when the boosting limit of the booster 712 has been reached, the present embodiment is adapted to determine that the boosting limit of the booster 712 has been reached, when the rate of increase $dS/dP_M$ of the operating stroke has exceeded the predetermined value X and when the master cylinder pressure $P_M$ has exceeded a reference value $P_A$ (an example of a reference value).

The condition that the rate of increase $dS/dP_M$ of the operating stroke is higher than the predetermined value X is not satisfied throughout a time period after the boosting limit of the booster 712 has been reached, but is satisfied only temporarily immediately after the boosting limit has been reached. If a determination as to whether the above-indicated two conditions have been satisfied is effected after these two conditions are found to have satisfied simultaneously, that is, after the determination that the boosting limit of the booster 712 has been reached is made for the first time, a determination that the boosting limit has not bee reached is erroneously made even when the boosting limit has been in-fact reached. To avoid this, the present embodiment uses another rule for determining whether the boosting limit has been reached, after the above-indicated two conditions have been satisfied simultaneously for the first time. The application of this rule is not limited to a short time period immediately after the boosting limit has been limited, but the rule is applicable for correct determination throughout the time period after the boosting limit has been reached. Described in detail, a determination that the boosting limit of the booster 712 has been reached is made as long as the present value of the master cylinder pressure $P_M$ is higher than a reference value $P_{M0}$ which is a value when the two conditions have been simultaneously satisfied for the first time.

The present embodiment is further adapted to use the former method for the boosting limit determination when the booster pressure switch 734 is normal, and the latter method when the booster pressure switch 734 is defective.

Figure 101:
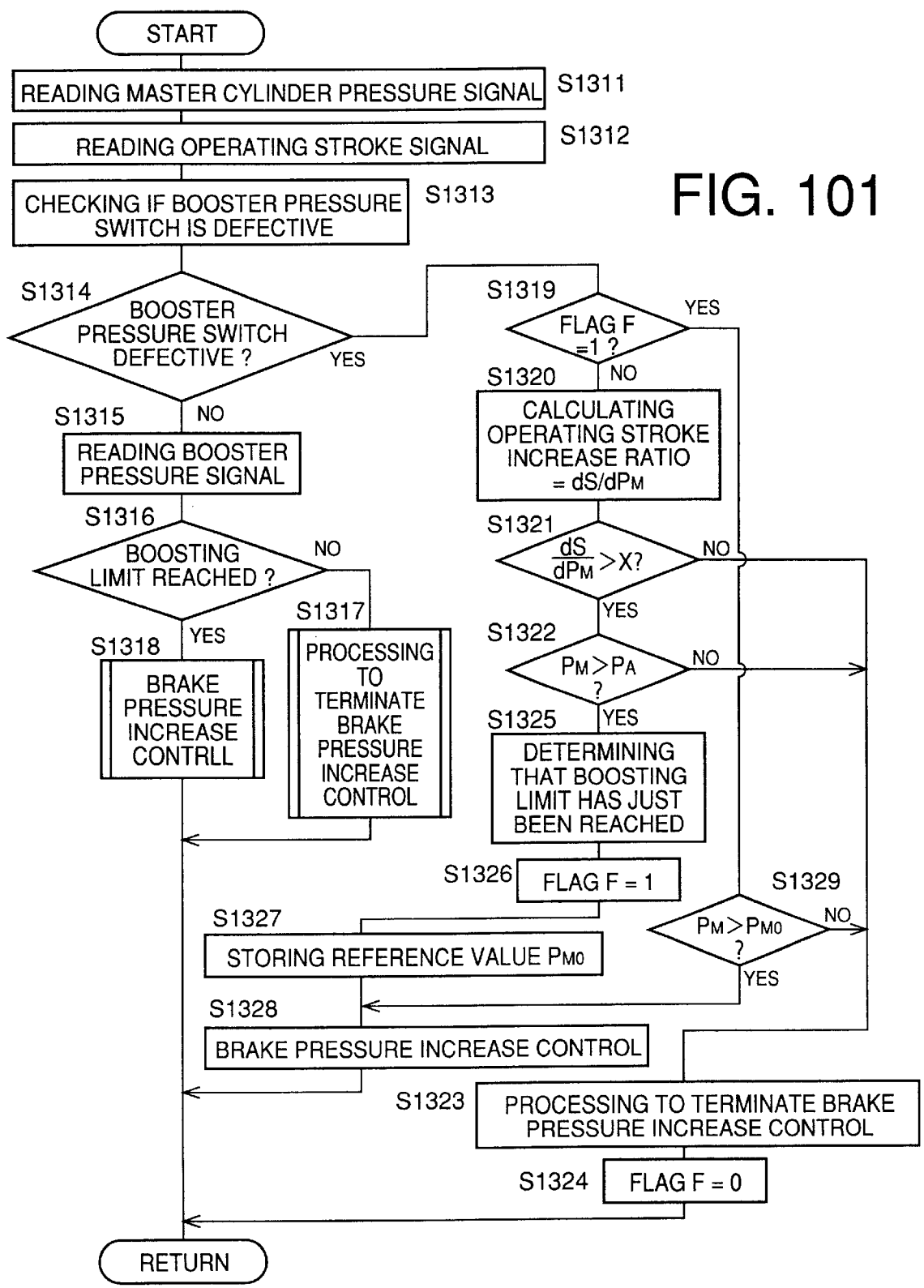
FIG. 101 is a flow chart showing a braking effect characteristic control routine stored in ROM of a computer of an ECU in FIG. 100.
Figure 102:
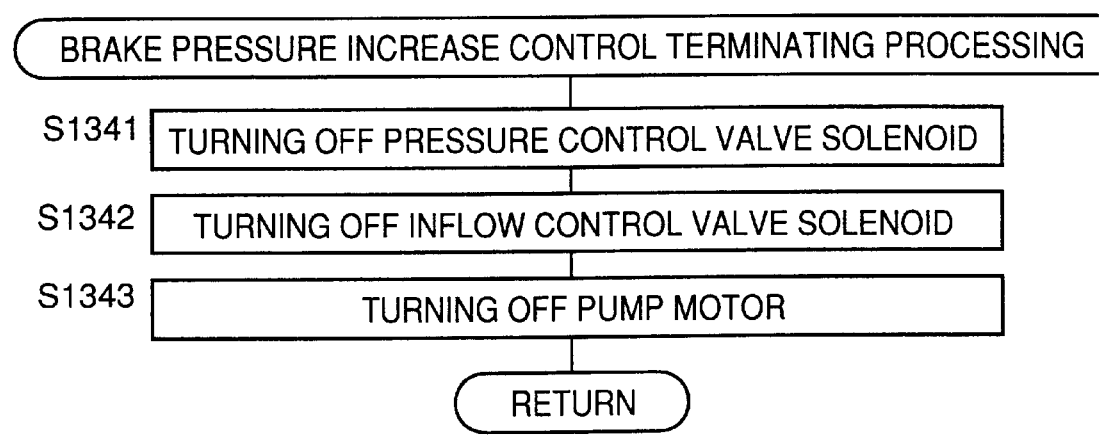
FIG. 102 is a flow chart showing the details of steps S1307 and S1313 in FIG. 101, in which a routine for processing to terminate pressure increase control is executed.
Figure 103:
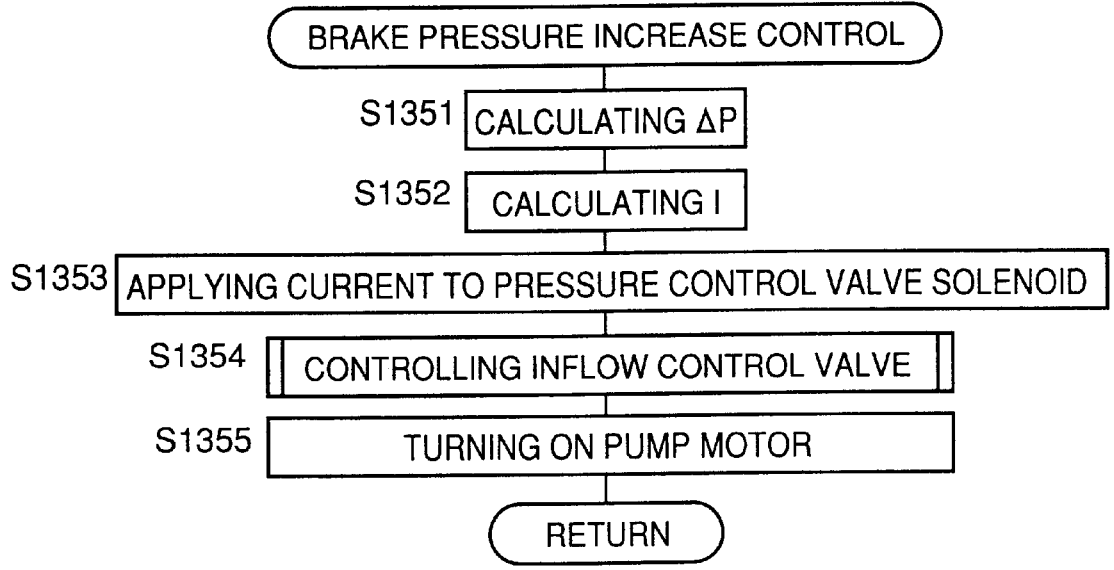
FIG. 103 is a flow chart showing the details of steps S1308 and S1318 in FIG. 101, in which a pressure increase control routine is executed.
Figure 104:
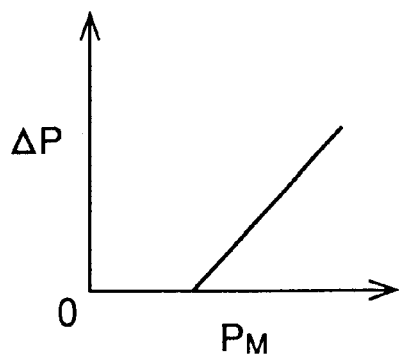
FIG. 104 is a graph showing a relationship between master cylinder pressure $P_M$ and pressure difference ΔP between the master cylinder $P_M$ and brake cylinder $P_B$, in the above-indicated twenty-fourth embodiment.

The braking effect characteristic control which has been briefly explained will be explained in detail by reference to FIGS. 101–103 illustrating a routine for the braking effect characteristic control.

The present routine is repeatedly executed with a predetermined cycle time $T_0$ after the ignition switch is operated by the vehicle operator from the OFF position to the ON position. In each cycle of execution of the routine, S1311 is initially implemented to read a master cylinder pressure signal received from the master cylinder pressure sensor 90. Then, S1312 is implemented to read an operating stroke signal received from the operating stroke sensor 732. Then, the control flow goes to S1313 to check if the booster pressure switch 734 is defective or not, that is, whether the booster pressure switch 734 suffers from electrical disconnection, short-circuiting or other defect. Successively, the control flow goes to S1314 to determine whether the booster pressure switch 734 has been found defective in S1313. If the booster pressure switch 734 is not defective in this control cycle, a negative decision (NO) is obtained, and the control flow goes to S1315 to read a booster pressure signal received from the booster pressure switch 734. Then, S1316 is implemented to determine whether the boosting limit of the booster 712 has been reached (whether the booster 712 is not able to perform its boosting function, irrespective of whether the boosting limit has just been reached). This determination is effected on the basis of the booster pressure signal. Described in detail, if the pressure of the pressure changing chamber 718 is lower than the atmospheric pressure and the OFF signal is generated from the booster pressure switch 734, a determination that the boosting limit of the booster 712 has not been reached is made. If the pressure of the pressure changing chamber 718 has reached the atmospheric pressure and the ON signal is generated from the booster pressure switch 734, a determination that the boosting limit of the booster 712 has been reached is made.

If the boosting limit of the booster 712 has not been reached in this control cycle, a negative decision (NO) is obtained, and the control flow goes to S1317 to effect the processing to terminate the pressure increase control. This processing in S1317 is effected according to a pressure increase control terminating processing routine illustrated in detail in the flow chart of FIG. 102. This processing routine is initiated with S1341 to generate a signal for de-energizing the solenoid 74 of the pressure control valve 22. Then, S1342 is implemented to generate a signal for de-energizing the solenoid 116 of the inflow control valve 138. The control flow then goes to S1343 to generate a signal for turning off the pump motor 114. Thus, one cycle of execution of the processing routine is terminated, and one cycle execution of the braking effect characteristic control routine is accordingly terminated.

If the boosting limit of the booster 712 has been reached in the present control cycle, an affirmative decision (YES) is obtained in S1316, and the control flow goes to S1318 to effect the pressure increase control. This pressure increase control in S1318 is effected according to a pressure increase control routine illustrated in detail in the flow chart of FIG. 103. This pressure increase control routine is initiated with S1351 to calculate a desired pressure difference $\Delta P$ between the master cylinder 14 and the brake cylinder 10, which is an amount of increase of the brake cylinder pressure $P_B$ from the master cylinder pressure $P_M$. This calculation is effected on the basis of the master cylinder pressure $P_M$ detected in this control cycle. The ROM stores a relationship as shown in the graph of FIG. 64, between the desired pressure difference $\Delta P$ and an amount of increase $IP_M$ of the present value of the master cylinder pressure $P_M$ from the above-indicated reference value $P_{M0}$ (the master cylinder pressure $P_M$ at which the decision in S1316 is changed from "NO" to "YES"). The present value of the desired pressure difference $\Delta P$ is determined according to this relationship. The relationship is formulated so that the brake cylinder pressure $P_B$ after the boosting limit of the booster 712 has been reached linearly increases with the operating force F at a rate equal to that before the boosting limit has been reached.

Then, the control flow goes to S1352 to determine the electric current I to be supplied to the solenoid 74 of the pressure control valve 22, on the basis of the determined desired pressure difference $\Delta P$. A relationship between the desired pressure difference $\Delta P$ and the solenoid electric current I is stored in the ROM, and the solenoid electric current I corresponding to the desired pressure difference $\Delta P$ is determined according to this relationship. Successively, S1358 is implemented to apply the determined electric current I to the solenoid 74 of the pressure control valve 22, for controlling the pressure control valve 22. Then, the control flow goes to S1354 to control the inflow control valve 138. The control of the inflow control valve 138 is effected according to an inflow control valve control routine illustrated in detail in the flow chart of FIG. 65.

Then, S1355 in FIG. 103 is implemented to generate a signal for turning on the pump motor 114, so that the working fluid is pumped up by the pump 16 from the reservoir 132, and is delivered to each brake cylinder 10, whereby the fluid pressure in the brake cylinder 10 is made higher than the master cylinder pressure $P_M$ by the desired pressure difference $\Delta P$. Thus, one cycle of execution of the pressure increase control routine is terminated, and one cycle of execution of the braking effect characteristic control routine is accordingly terminated.

While the operation where the booster pressure switch 734 is normal has been described, an affirmative decision (YES) is obtained in S1314 of FIG. 101 if the booster pressure switch 734 is defective. In this case, the control flow goes to S1319 and the following steps.

S1319 is implemented to determine whether a flag F is set at "1" or not. This flag F is reset to "0" when power is applied to the computer. If the flag F is not set at "1" in this control cycle, a negative decision (NO) is obtained, and the control flow goes to S1320 to calculate the rate of increase $dS/dP_M$ of the operating stroke, according to the following equation:

$$dS/dP_M = (S(n) - S(n-1))/(P_{M(n)} - P_{M(n-1)})$$

wherein

S(n)=present value of the operating stroke S,

S(n−1)=last value of the operating stroke S, $P_{M(n)}$=present value of the master cylinder pressure $P_M$, $P_{M(n-1)}$=last value of the master cylinder pressure $P_M$ The numerator of the fraction of the right member in the above equation represents an amount of change of the operating stroke S per unit time $T_0$, while the denominator of the fraction represents an amount of change of the master cylinder pressure $P_M$ per unit time $T_0$.

Then, S1321 is implemented to determine whether the calculated rate of increase $dS/dP_M$ of the operating stroke is higher than the predetermined value X. If the rate of increase $dS/dP_M$ is not higher than the predetermined value X in this control cycle, a negative decision (NO) is obtained, and the control flow goes to S1323 to effect the processing to terminate the pressure increase control as in the above-indicated step S1317. Successively, S1324 is implemented to generate a signal for resetting the above-indicated flag F to "0". Thus, one cycle of execution of this braking effect characteristic control routine is terminated.

If the calculated rate of increase $dS/dP_M$ of the operating stroke is higher than the predetermined value X, an affirmative decision (YES) is obtained in S1321, and the control flow goes to S1322 to determine whether the master cylinder pressure $P_M$ is higher than a reference value $P_A$. If the master cylinder pressure $P_M$ is not higher than the reference value $P_A$ in this control cycle, a negative decision (NO) is obtained, and the control flow goes to S1323. If the master cylinder pressure $P_M$ is higher than the reference value $P_A$ in this control cycle, an affirmative decision (YES) is obtained, and the control flow goes to S1325 to determine that the boosting limit of the booster 712 has just been reached. Then, S1326 is implemented to set the above-indicated flag F to "1". That is, the flag F set at "1" indicates that the decision that the boosting limit has just been reached has been obtained in S1325, and the flag F set at "0" indicates that the decision that the boosting limit has just been reached has not been in S1325. Then, S1327 is implemented to store in the RAM the present value of the master cylinder pressure $P_M$ as the above-indicated reference value $P_{M0}$ (the master cylinder pressure $P_M$ when the decision that the boosting limit of the booster 712 has just been reached is obtained). The control flow then goes to S1328 to effect the pressure increase control as in the above-indicated step S1318. Thus, one cycle of execution of this braking effect characteristic control is terminated.

When the present routine is executed again, an affirmative decision (YES) is obtained in S1319 since the flag F is presently set at "1", the control flow goes to S1329, while skipping S1320–S1322 and S1325–S1327, to determine whether the present value of the master cylinder pressure $P_M$ is higher than the above-indicated reference value $P_{M0}$, that is, whether the boosting limit of the booster 712 has been reached (whether the booster 712 is not able to perform its boosting function, with its boosting limit having been reached some time ago). If the master cylinder pressure $P_M$ is higher than the reference value $P_{M0}$ in this control cycle, an affirmative decision (YES) is obtained, and the pressure increase control is effected in S1328. If the master cylinder pressure $P_M$ is not higher than the reference value $P_{M0}$, a negative decision (NO) is obtained, and the control flow goes to S1323 to effect the processing to terminate the pressure increase control. Then, S1324 is implemented to reset the flag F to "0". Thus, one cycle of execution of the present routine is terminated.

It will be understood from the foregoing explanation of this embodiment that the operating stroke sensor 732 constitutes an example of an "operating-stroke-related quantity sensor, while the master cylinder pressure sensor 80 constitutes an example of a "master-cylinder-pressure-related quantity sensor", and that a portion of the ECU 730 assigned to implement S1311, S1312, S1319–S1322, S1324–S1327 and S1329 of FIG. 101 constitutes an example of "boosting ratio reduction determining means". It will also be understood that a portion of the ECU 730 assigned to implement S1311, S1312, S1320, S1321, S1322 and S1325 constitutes an example of "boosting limit reaching determining means", while a portion of the ECU 730 assigned to implement S1319, S1324, S1326, S1327 and S1329 constitutes an example of "boosting-limit state determining means". It will further be understood that the booster pressure switch 734, the master cylinder pressure sensor 80 (sensor portion), a portion (control portion) of the ECU 730 assigned to implement S1313–S1318, S1323 and S1328, the pressure control valve 22, the pump 16, the pump motor 114 and the inflow control valve 138 (actuator portion) cooperate with each other to constitute an example of the "pressure increasing device", and that a portion of the ECU 730 assigned to implement S1343 of FIG. 102 and S1355 of FIG. 103 constitutes an example of a "pump operating device".

Then, a twenty-fifth embodiment of this invention will be described.

Figure 106:
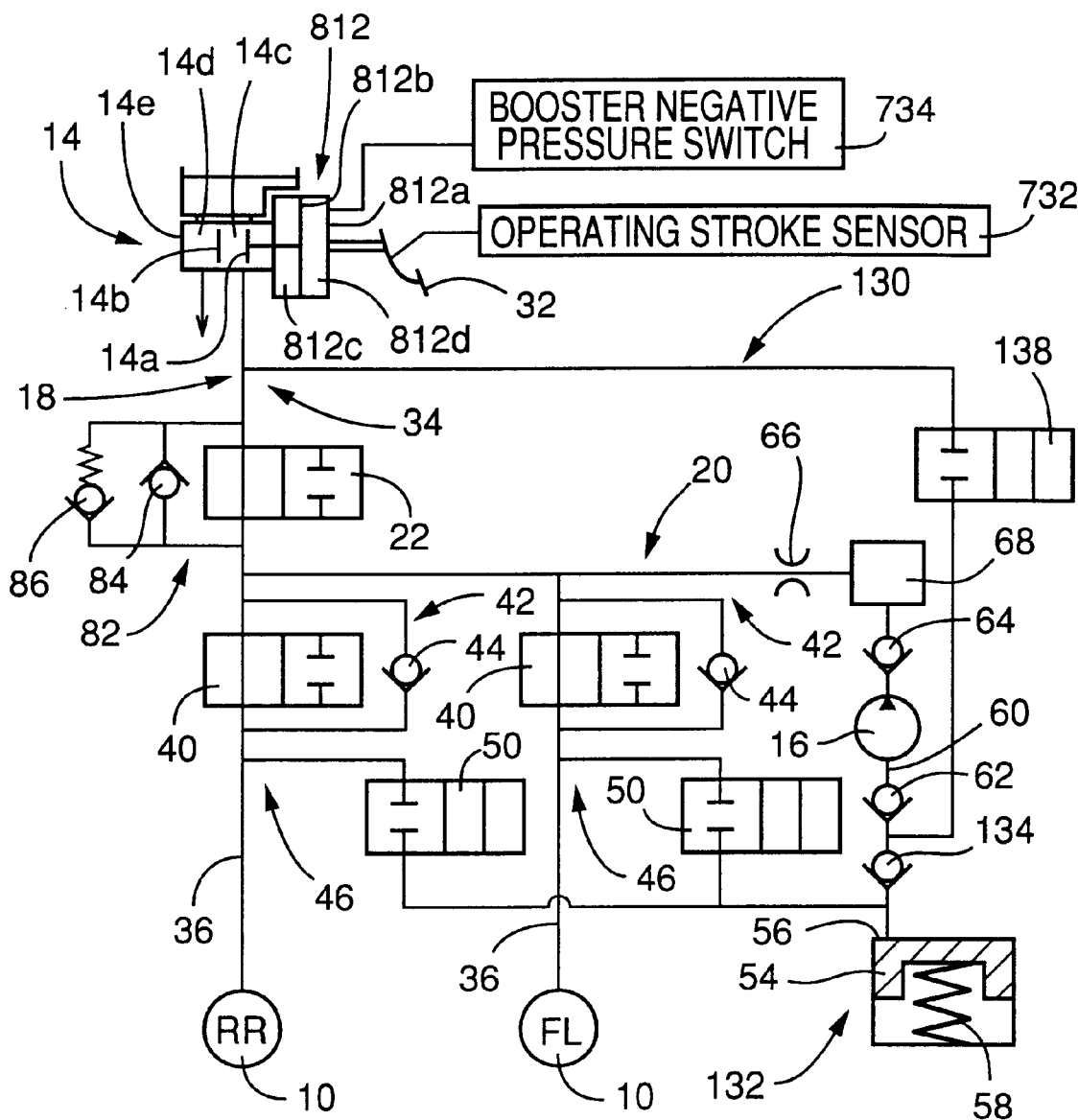
FIG. 106 is a schematic view showing a braking system of a twenty-fifth embodiment of this invention.

FIG. 106 shows a braking system according to the present embodiment for a four-wheel motor vehicle. Like the preceding several embodiments, the present braking system is provided with a booster in the form of a vacuum booster 812 (hereinafter referred to simply as "booster") disposed between the brake pedal 32 and the master cylinder 14. The braking system is further provided with an anti-lock brake pressure control device and a braking effect characteristic control device. The anti-lock brake pressure control device is a device for preventing an excessive locking tendency of each wheel during brake application to the motor vehicle. This anti-lock brake pressure control device includes a pump 16 operated to recirculate the working fluid in the braking pressure circuit.

Figure 107:
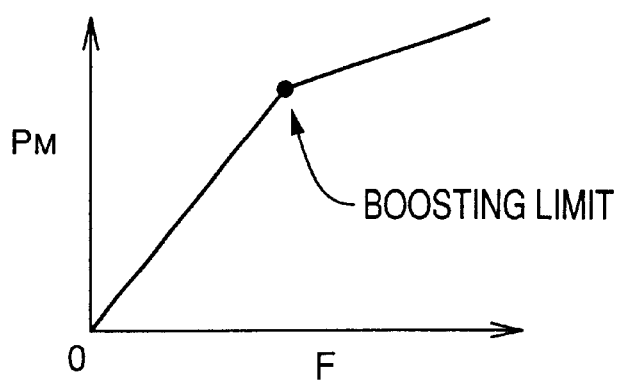
FIG. 107 is a graph showing a relationship between operating stroke F and master cylinder pressure $P_M$ in the twenty-fifth embodiment.
Figure 108:
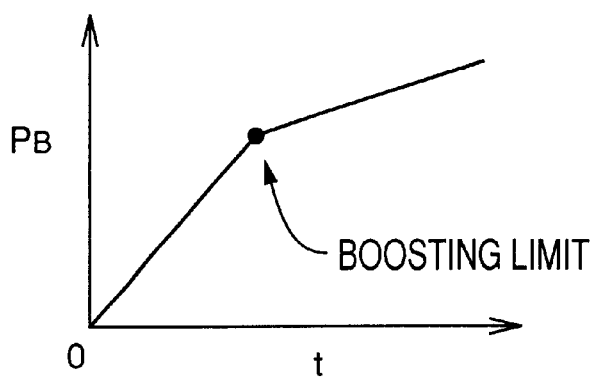
FIG. 108 is a graph showing a change with the time in brake cylinder $P_B$ in a conventional braking system.
Figure 109:
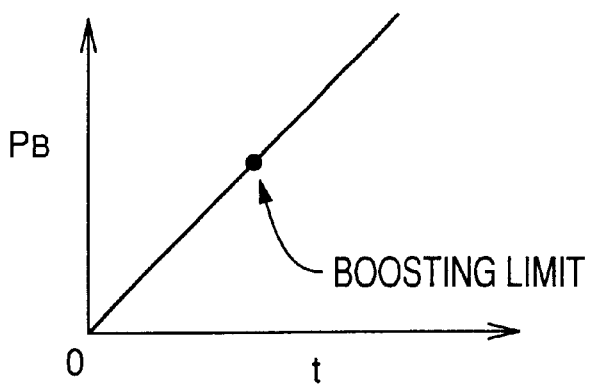
FIG. 109 s a graph showing a change with the time in brake cylinder pressure $P_B$ in the above-indicated twenty-fifth embodiment.

As described above, the booster 812 has a boosting limit, so that the master cylinder pressure $P_M$ does not increase with the brake operating force F at a constant rate, as indicated in the graph of FIG. 107. Accordingly, where the brake operating force F increases with time t at a substantially constant rate, the brake cylinder pressure $P_B$ changes with the time, as indicated in the graph of FIG. 108. On the other hand, the braking effect characteristic control device is adapted to compensate a shortage of boosting of the booster 812 after its boosting limit has been reached, so as to control the braking effect characteristic, that is, the relationship between the brake operating force F and the brake cylinder pressure $P_B$, namely, the vehicle deceleration value G, so that the brake cylinder pressure $P_B$ changes with the time as indicated in the graph of FIG. 109. That is, the pump 16 is used for both the anti-lock brake pressure control device and the braking effect characteristic control device.

The master cylinder 14 is a tandem type wherein two pressurizing pistons 14a, 14b are slidably received in a master cylinder housing 14e, in series with each other, such that pressurizing chambers 14c, 14d are mutually independently formed in front of the respective pressurizing pistons 14a, 14b. This master cylinder is linked through the booster 812 to the brake pedal 32.

The booster 812 has a booster housing 812a whose space is divided by a power piston 812b into a negative pressure chamber 812c communicating with the intake pipe of an engine which serves as a negative pressure source, and a pressure changing chamber 812c which is selectively communicated with the negative pressure chamber 812c and the atmosphere. The booster 812 is adapted to operate the master cylinder with the operating force F of the power piston 812b, based on a pressure difference between the negative pressure chamber 812c and the pressure changing chamber 812d. Thus, the operating force F of the brake pedal 32 is boosted by the booster 812, and the boosted operating force is transferred to the master cylinder 14, so that the fluid pressure corresponding to the boosted operating force F is generated in each pressurizing chamber 14c, 14d.

To the one pressurizing chamber 14c of the master cylinder 14, there is connected a first braking sub-system for the front left wheel FL and the rear right wheel RR of a first braking sub-system. To the other pressurizing chamber 14d, there is connected a second braking sub-system for the front right wheel FR and the rear left wheel RL. That is, this braking system is of a diagonal type having two braking sub-systems. Since the two braking sub-systems are identical in construction with those in the preceding twenty-fourth embodiment, detailed description thereof will not be provided, with the same reference signs being used.

Figure 110:
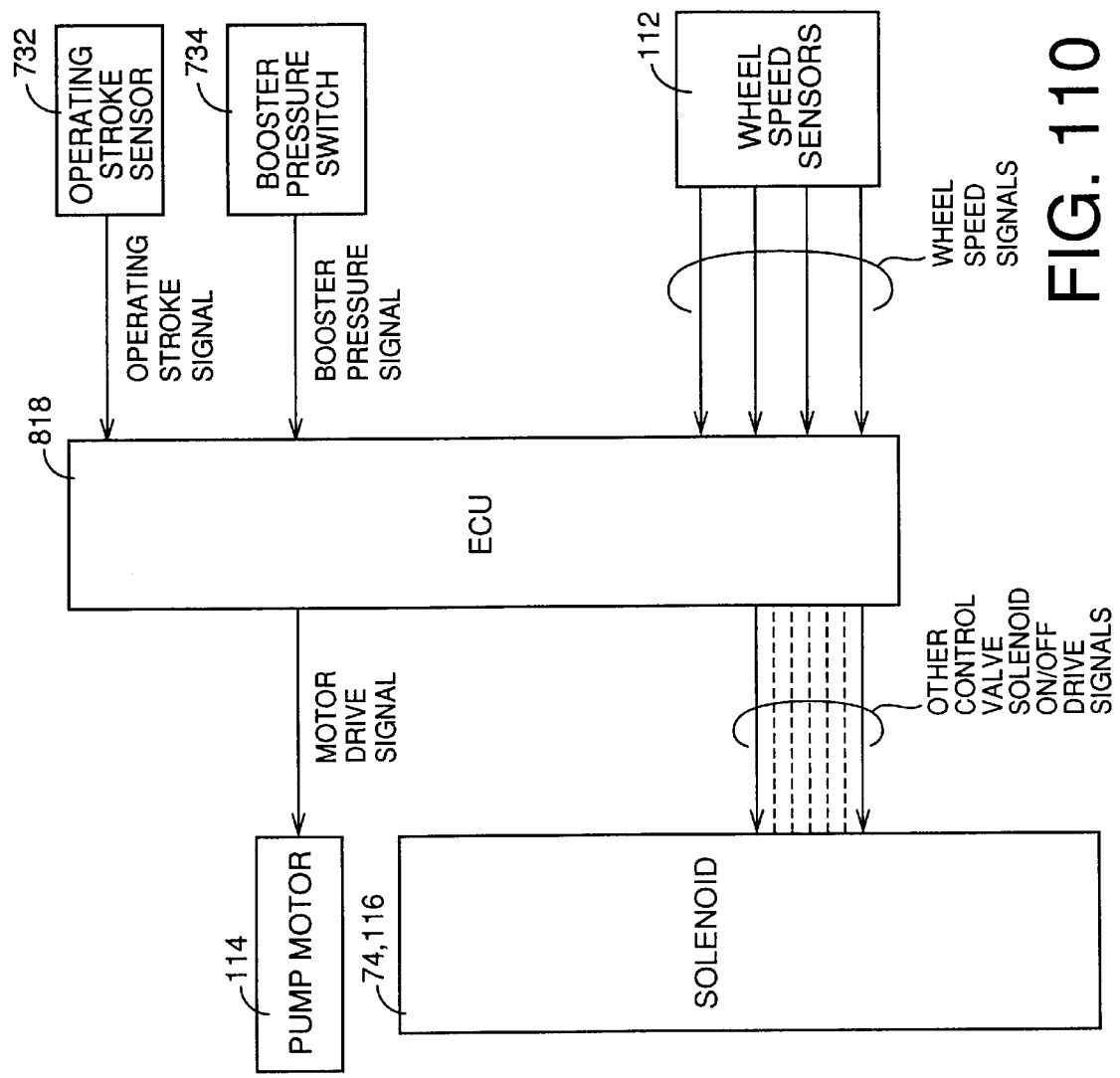
FIG. 110 is a block diagram showing an electrical arrangement of the twenty-fifth embodiment.

FIG. 110 shows an electrical arrangement of the braking system. The braking system is provided with an ECU (electronic control unit) 818 which is principally constituted by a computer incorporating a CPU, a ROM and a RAM. The ROM stores various routines including a braking effect characteristic control routine (illustrated in the flow charts of FIGS. 111–112), an operating stroke change amount detecting routine (illustrated in the flow chart of FIG. 113) and an anti-lock brake pressure control routine (not shown). The CPU executes these routines, while utilizing the RAM, to effect the braking effect characteristic control and the anti-lock brake pressure control.

To the input side of the ECU 818, there are connected the above-indicated operating stroke sensor 732, booster pressure switch 734 and wheel speed sensors 112.

On the other hand, the above-indicated pump motor 114 is connected to the output side of the ECU 818, for applying a motor drive signal to the pump motor 114. To the output side of the ECU 818, there are further connected the solenoid 74 of the above-indicated pressure control valve 22 and the solenoids 116 of the above-indicated inflow control valve 138, pressure increasing valve 40 and pressure reducing valve 50. To each solenoid 74, 116, an ON/OFF drive signal is applied to energize or de-energize the solenoid.

There will be described the braking effect characteristic control by the ECU 818. Initially, it will be briefly described.

Figure 114:
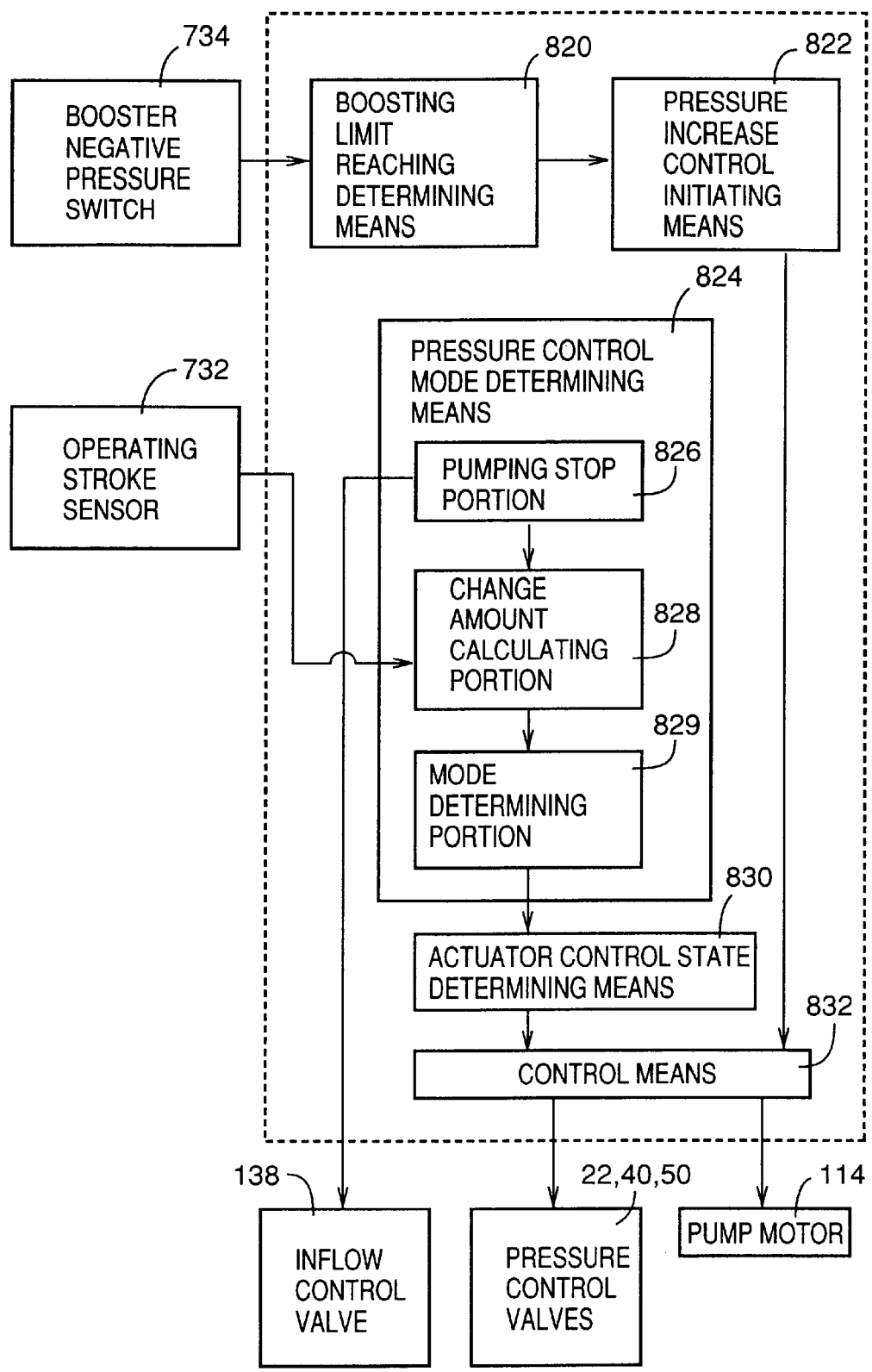
FIG. 114 is a functional block diagram showing an arrangement of the above-indicated twenty-fifth embodiment.

The functional block diagram of FIG. 114 shows an arrangement of the braking effect characteristic control device. The braking effect characteristic control device is provided with boosting limit reaching determining means 820. The boosting limit reaching determining means 820 determines, on the basis of the output signal of the booster pressure switch 734, that the boosting limit of the booster 812 has been reached, when the pressure of the negative pressure chamber 812d of the booster 812 has been raised to the atmospheric pressure. This boosting limit reaching determining means 820 is connected to pressure increase control initiating means 822 for generating a command for initiating the pressure increase control of the brake cylinder 10 when the boosting limit of the booster 812 is determined to have been reached. Namely, a condition that the boosting limit of the booster 812 has been reached is a "pressure increase control initiating condition" in the present embodiment.

The braking effect characteristic control device is further provided with pressure control mode, determining means 824. This pressure control mode determining means 824 selects the pressure control mode for the brake cylinder pressure $P_B$, from a rapid pressure increase mode, a slow pressure increase mode, a pressure hold mode, a slow pressure decrease mode and a rapid pressure decrease mode. This pressure control mode determining means 824 has a pumping stop portion 826, a change amount calculating portion 828 and a mode determining portion 829.

Figure 115:
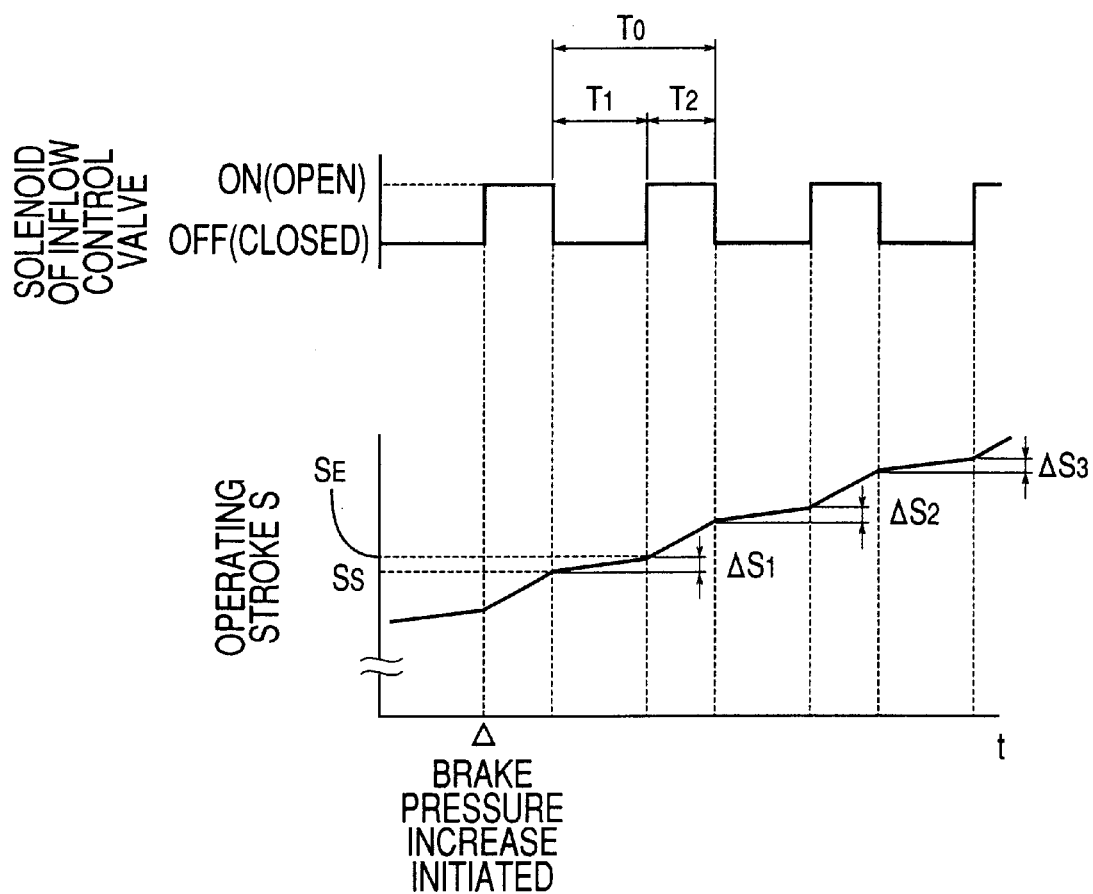
FIG. 115 is a graph showing a relationship between ON/OFF switching of solenoid of an inflow control valve and change amount ΔS of operating stroke S in the twenty-fifth embodiment.

The pumping stop portion 826 is connected to the inflow control valve 138, and is adapted to turn ON and OFF the solenoid 116 of the inflow control valve 138 with the time t, during the pressure increase control, as indicated in the time chart of FIG. 115. Described in detail, the pumping stop portion 826 holds the solenoid 116 in the OFF state for a predetermined time T1 during the pressure increase control, to inhibit the flow of the working fluid from the master cylinder 14 into the pump 16, for thereby stopping the pumping of the working fluid by the pump from the master cylinder, even while the pump 16 is held operated. The pumping stop portion 826 then holds the solenoid 116 in the ON state for a predetermined time T2, to permit the working fluid to flow from the master cylinder 14 into the pump 16, namely, permit the pumping of the working fluid by the pump 16 from the master cylinder 14 during operation of the pump 16. Subsequently, the pumping stop portion 826 alternately places the solenoid 116 in the ON and OFF states until the pressure increase by the pump 16 becomes unnecessary.

Figure 116:
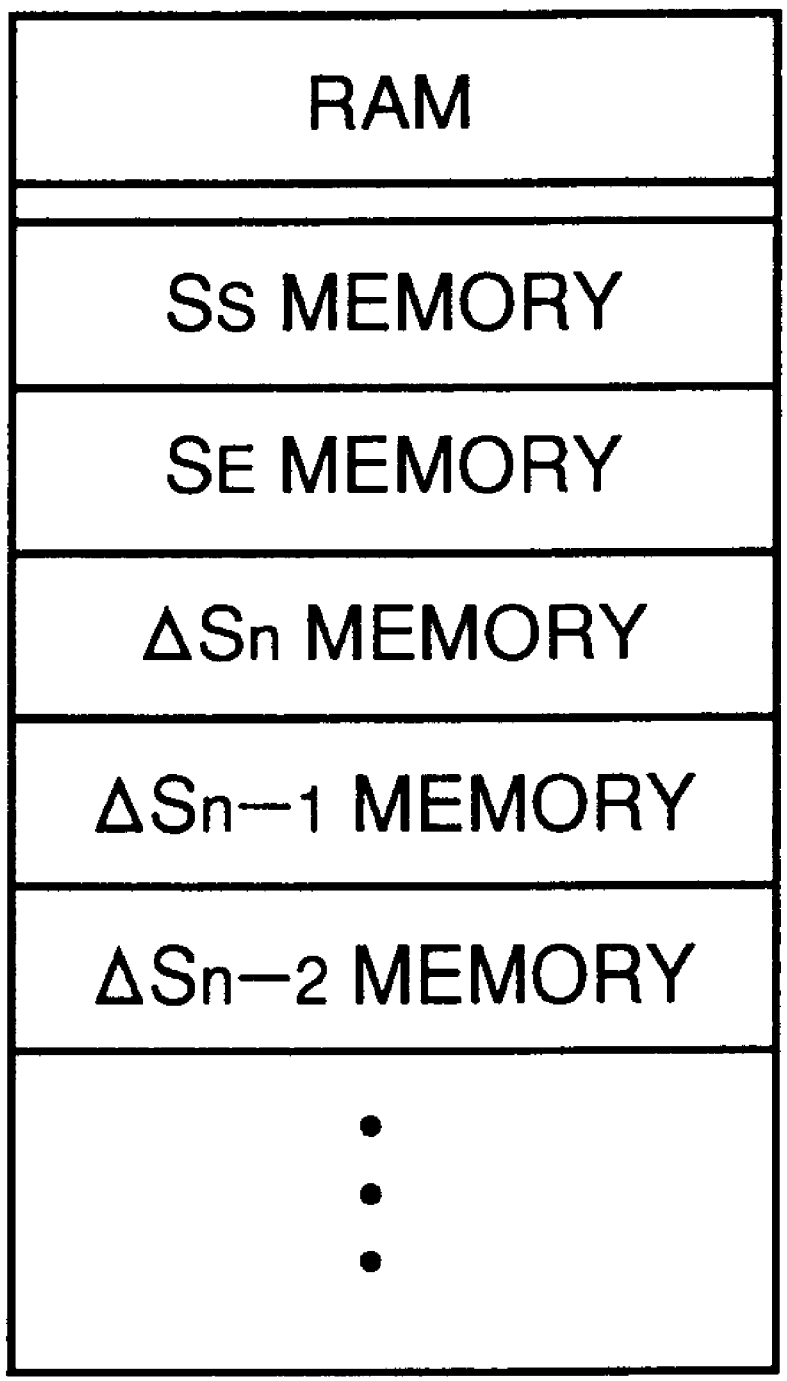
FIG. 116 is a view schematically showing an arrangement of RAM of a computer in the twenty-fifth embodiment.

On the other hand, the change amount calculating portion 828 is operated in synchronization with the pumping stop portion 826, to obtain the operating stroke S detected by the operating stroke sensor 732, as an initial value $S_S$ at the time of initiation of the OFF state of the solenoid 116, and as a terminal value $S_E$ at the time of termination of the OFF state of the solenoid 116, as shown in FIG. 115. The obtained initial value $S_S$ and terminal value $S_E$ are stored in an $S_S$ memory and an $S_E$ memory (memory areas) of the RAM of the computer of the ECU 818, as schematically shown in FIG. 116. Further, the change amount calculating portion 826 calculates an amount of change $\Delta S$ by subtracting the initial value $S_S$ from the terminal value $S_E$, as indicated in FIG. 115. The amount of change $\Delta S$ is calculated each time the pumping of the working fluid is stopped by the pumping stop portion 826. Only the last three values of the plurality of change amounts ΔS calculated are stored in $\Delta S_n$, $\Delta S_{n-1}$ and $\Delta S_{n-2}$ memories, respectively, as shown in FIG. 116. That is, the last value $\Delta S_n$ is stored in the $\Delta S_n$ memory, and the first preceding value $\Delta S_{n-1}$ is stored in the $\Delta S_{n-1}$ memory, while the second preceding value $\Delta S_{n-2}$ is stored in the $\Delta S_{n-2}$ memory.

In the present embodiment, the pumping by the pump 16 is permitted and inhibited by the inflow control valve 138, at a predetermined time interval T0(=T1+T2) after the pressure increase initiating condition has been satisfied, and the predetermined time T1 is the same for all pumping permitting and inhibiting cycles, namely, is held constant throughout the control. Accordingly, the amount of change ΔS directly represents the rate of change of an operating quantity in the form of the operating stroke S.

The mode determining portion 829 determines the pressure control mode on the basis of the calculated amount of change ΔS. However, the mode determining means 829 determines the pressure control mode on the basis of a total amount of change Σ which is a sum of the above-indicated three amounts of change ΔS. IN the example of FIG. 115, a first amount of change ΔS1, a second amount of change ΔS3 and a third amount of change ΔS3 in a pressure increase control are summed to obtain a first total amount of change Σ. Described in detail by reference to the table of FIG. 117, the mode determining means 829 selects the rapid increase mode when the total amount of change Σ is larger than a first reference value +Σ1, and selects the slow increase mode when the total amount of change Σ is equal to or smaller than the first reference value +Σ1 and is larger than a second reference value +Σ2 (<+Σ1). Further, the mode determining means 829 selects the hold mode when the total amount of change Σ is equal to or smaller than the second reference value +Σ2 and is equal to or larger than a third reference value −Σ3, selects the slow pressure decrease mode when the total amount of change Σ is smaller than the third reference value −Σ3 and is equal to or larger than a fourth reference value −Σ4 (<−S3 ), and selects the rapid decrease mode when the total amount of change Σ is smaller than the fourth reference value −Σ4.

As shown in FIG. 114, the braking effect characteristic control device is further provided with actuator control state determining means 830. This actuator control state determining means 830 determine control states of the pressure control valve 22, pressure increasing valve 40 and pressure reducing valve 50 (hereinafter collectively referred to as "valve device") and a control state of the pump motor 114, on the basis of the pressure control mode which is determined as described above by the pressure control mode determining means 824. Described more specifically, the actuator control state determining means 830 determines the ON and OFF states of the valve device 22, 40, 50 and the duty ratio of the pump motor 114, as indicated in FIG. 117. The duty ratio is defined as a ratio of an ON state time $T_{ON}$ of the pump motor 114 to a duty-ratio control period $T_{CYCLE}$ for the pump motor 114.

Where the determined pressure control mode is the rapid pressure increase mode or slow pressure increase mode, the pressure control valve 22 is placed in the ON state while the pressure increasing valve 40 and the pressure reducing valve 50 are both placed in the OFF state, as indicated in FIG. 117. In this condition, the working fluid delivered from the pump 16 is entirely supplied to the brake cylinder 10, whereby the pressure of the brake cylinder 10 is increased. However, the duty ratio is determined to be higher where the determined pressure control mode is the rapid pressure increase mode than where the determined pressure control mode is the slow increase mode. In the present embodiment, the duty ratio is determined to be a first predetermined value of 100 (%) where the determined pressure control mode is the rapid pressure increase mode, and is determined to be a second predetermined value of 30 (%) where the determined pressure control mode is the slow pressure increase mode. Hence, the amount of delivery of the pump 16 is larger to increase the pressure of the brake cylinder 10 at a higher rate, in the rapid pressure increase mode than in the slow pressure increase mode, even though the valve device 22, 40, 50 is placed in the same state in the rapid and low pressure increase modes.

Where the determined pressure control mode is the hold mode, on the other hand, the pressure control valve 22 is placed in the ON state, and the pressure increasing and reducing valves 40, 50 are both placed in the OFF state, as in the rapid and slow pressure increase modes, but the duty ratio is determined to be a third predetermined value of 0 (%). As a result, no working fluid is delivered from the pump 16, so that the brake cylinder pressure $P_B$ is held constant.

Where the determined pressure control mode is the slow or rapid pressure decrease mode, the pressure increasing and decreasing valves 40, 50 are both placed in the OFF state, and the duty ratio is determined to be a fourth predetermined value of 0 (%), so that no working fluid is delivered from the pump 16. Where the determined pressure control mode is the slow pressure decrease mode, the pressure control valve 22 is duty-controlled, that is, alternately placed in the ON and OFF states. Where the determined pressure control mode is the rapid pressure increase mode, the pressure control valve 22 is held in the OFF state. Therefore, where the determined pressure control mode is the rapid pressure decrease mode, the amount of the working fluid which is returned from the brake cylinder 10 to the master cylinder is larger to decrease the pressure of the brake cylinder 10 at a higher rate, than where the determined pressure control mode is the slow pressure decrease mode.

While the actuator control state determining means 830 shown in FIG. 114 has been described, the braking effect characteristic control device is further provided with control means 832 connected to that actuator control state determining means 830. This control means 832 is also connected to the above-indicated pressure increase control initiating means 822. When a command to initiate a pressure increase operation is generated, the control means 832 controls the pressure control valve 20, pressure increasing and reducing valves 40, 50 and pump motor 114, so as to establish the determined pressure control mode and the determined duty ratio.

Figure 111:
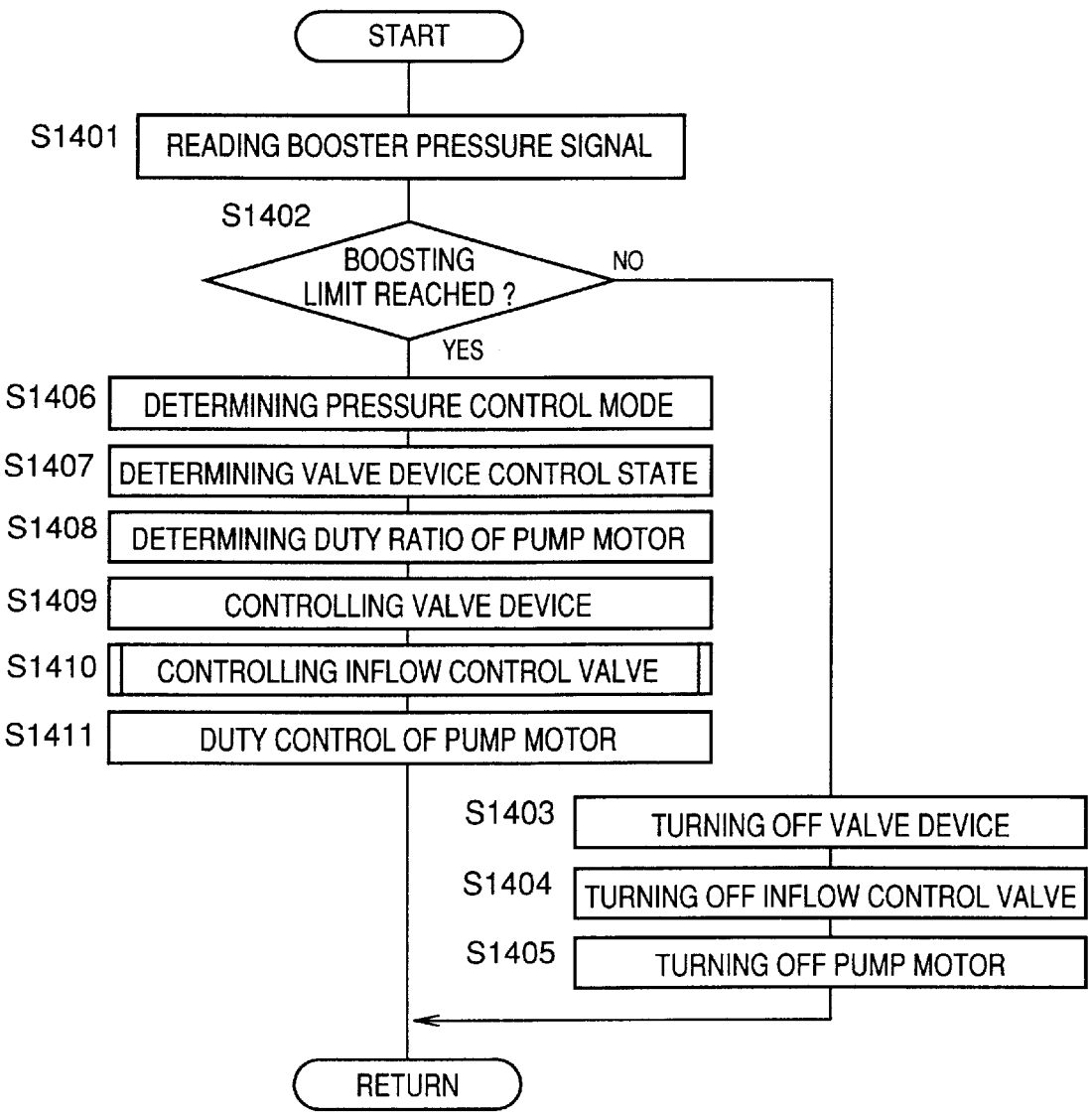
FIG. 111 is a flow chart showing a braking effect characteristic control routine stored in ROM of a computer of an ECU in FIG. 110.
Figure 112:
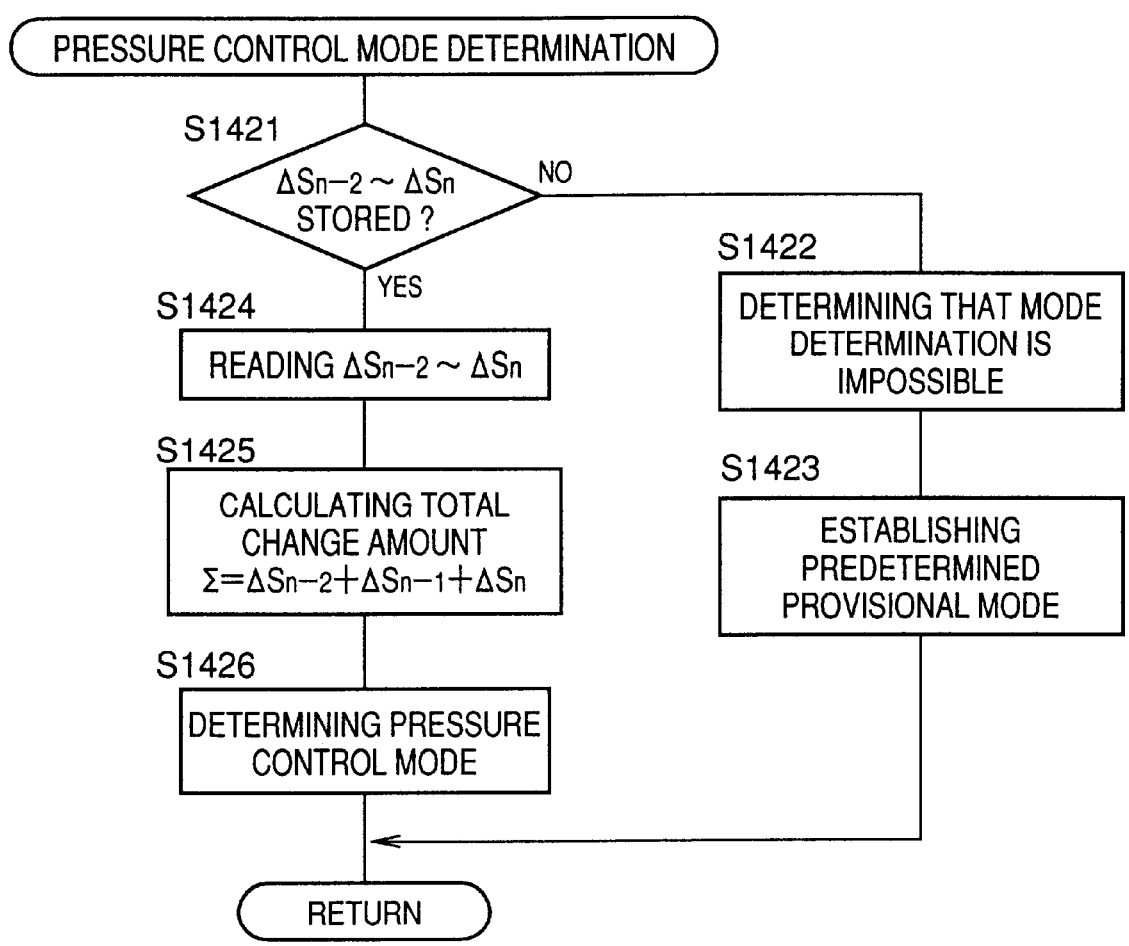
FIG. 112 is a flow chart showing the details of step S1406 in FIG. 111, in which pressure control mode determining routine is executed.
Figure 113:
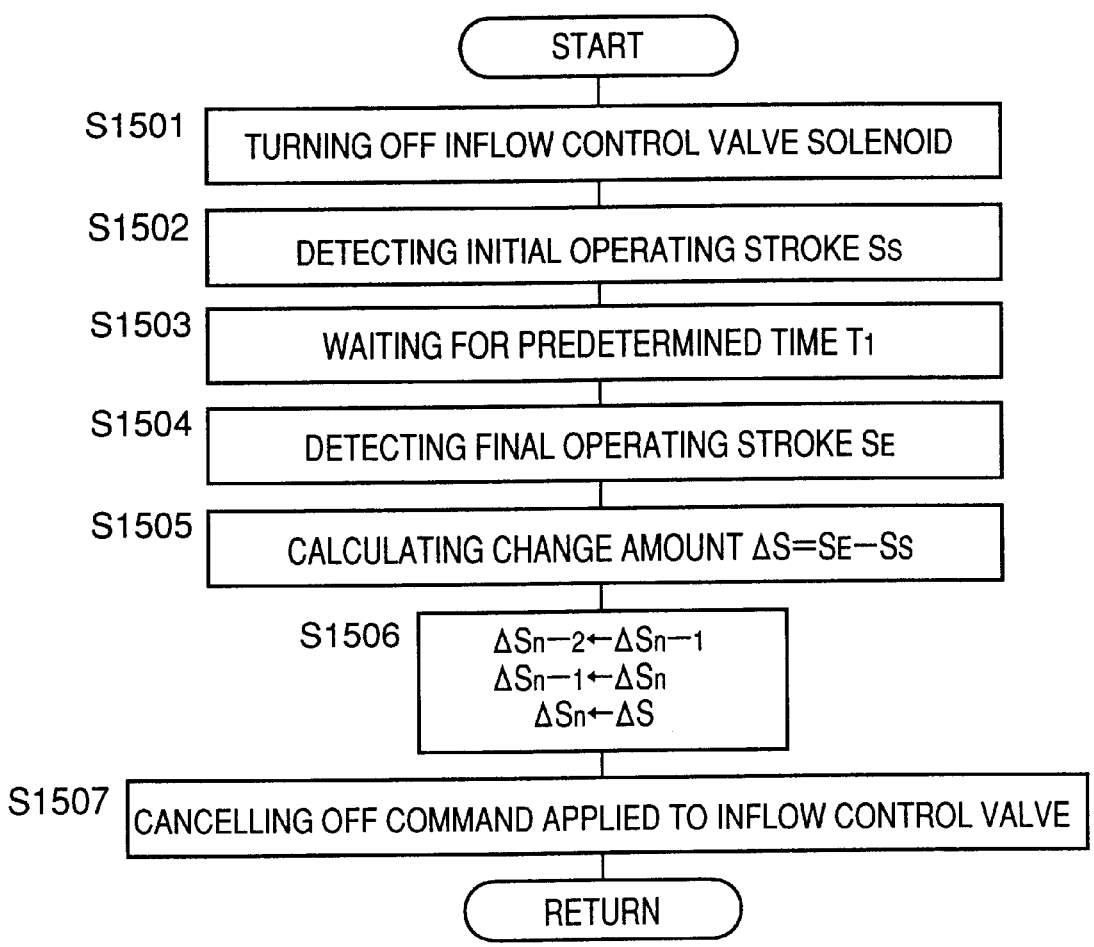
FIG. 113 is a flow chart showing an operating stroke change amount detecting routine stored in the above-indicated ROM.

The braking effect characteristic control which has been described briefly is executed according to the braking effect characteristic control routine illustrated in the flow charts of FIGS. 111–112 and the operating stroke change amount detecting routine illustrated in the flow chart of FIG. 113.

The braking effect characteristic control routine of FIGS. 111–112 is repeatedly executed after the ignition switch of the motor vehicle is turned on by the operator. Each cycle of execution of this routine is initiated with S1401 to read the booster pressure signal received from the booster pressure switch 734. Then, S1402 is implemented to determine, on the basis of the booster pressure signal, whether the boosting limit of the booster 812 has been reached, as described above. If the boosting limit of the booster 812 has not been reached in this control cycle, a negative decision (NO) is obtained, and the control flow goes to S1403 to generate a signal for de-energizing the solenoids 74, 116 of the valve device 22, 40, 50, so that the pressure control valve is opened while the pressure increasing and reducing valves 40, 50 are opened and closed, respectively. Successively, S1404 is implemented to generate a signal for de-energizing the solenoid 116 of the inflow control valve 138, so that the inflow control valve 138 is closed. Then, S1405 is implemented to generate a signal for turning off the pump motor 114. Thus, one cycle of execution of this routine is terminated.

If the boosting limit of the booster 812 has been reached, on the other hand, an affirmative decision (YES) is obtained in S1402, and the control flow goes to S1406 to determine the pressure control mode, as described above.

A pressure control mode routine in S1406 is illustrated in detail in the flow chart of FIG. 112. This routine is initiated with S1421 to determine whether the three amounts of change $\Delta S_{n-2}$ (second preceding value), $\Delta S_{n-1}$ (first preceding value) and $\Delta S_n$ (last value) are stored in the RAM. If all of these amounts of change have not been stored yet, a negative decision (NO) is obtained, and the control flow goes to S1422 to determine that the mode determination is impossible in this control cycle. Then, S1423 is implemented to establish a predetermined provisional mode. For example, the provisional mode may be the slow increase mode. Thus, one cycle of execution of this routine is terminated. If the three amounts of change $\Delta S_{n-2}$, $\Delta S_{n-1}$ and $\Delta S_n$ are stored in the RAM in this control cycle, an affirmative decision (YES) is obtained in S1421, and the control flow goes to S1424 to read the three amounts of change $\Delta S_{n-2}$, $\Delta S_{n-1}$ and $\Delta S_n$ from the RAM, and to S1425 to calculate the total amount of change $\Sigma$. Then, S1426 is implemented to determine the pressure control mode depending upon the total change mount $\Sigma$, according to the relationship as indicated in FIG. 117, as described above. Thus, one cycle of execution of this routine is terminated.

While the braking effect characteristic control routine has bee described, there will next be described the operating stroke change amount detecting routine of FIG. 113.

This routine is repeatedly executed with a predetermined time cycle time T0 as long as the brake pressure increase by the pump 116 is required, namely, for a period of time after the determination that the boosting limit of the booster 812 and until the determination that the boosting limit has not been reached. Each cycle of execution of the routine is initiated with S1501 to generate a signal for de-energizing the solenoid 116 of the inflow control valve 138. It is noted that the solenoid 116 is controlled not only in this routine also also in the inflow control valve control routine described above. Therefore, the present routine may require the inflow control valve 138 to be turned off while the inflow control valve 138 is placed in the ON state according to the inflow control valve control routine. The present embodiment is adapted to meet this requirement of turning off the inflow control valve according to the present routine.

Then, the control flow goes to S1502 to detect the initial value $S_S$ of the operating stroke. Described in detail, the operating stroke signal from the operating stroke sensor 732 is read, and the initial value $S_S$ of the operating stroke is calculated on the basis of this signal. The calculated initial value $S_S$ is stored in the RAM. Then, the control flow goes to S1503 to wait until a predetermined time T1 has passed. After the predetermined time has passed, S1504 is implemented to detect the terminal value $S_E$ of the operating stroke, in the same manner used for the initial value $S_S$, and store the calculated terminal value $S_E$ in the RAM.

Successively, S1505 is implemented to subtract the detected initial value $S_S$ from the detected terminal value $S_E$, to calculate an amount of change $\Delta S$ in this control cycle. Then, the control flow goes to S1506 to store in the above-indicated $S_{n-2}$ memory the amount of change $\Delta S_{n-1}$ which has been stored in the above-indicated $S_{n-1}$ memory, and store in the $S_{n-1}$ memory the amount of change $\Delta S_n$ which has been stored in the $S_n$ memory. Then, S1505 is implemented to store the calculated last amount of change $\Delta S$ in the $S_n$ memory. Thus, the last three amounts of change $\Delta S_n$, $\Delta S_{n-1}$ and $\Delta S_{n-2}$ are updated each time the last amount of change $\Delta S$ is calculated.

Then, the control flow goes to S1507 to terminate the generation of the signal for de-energizing the solenoid 116 of the inflow control valve 138, so that the subsequent ON/OFF state of the solenoid 116 depends upon the inflow control valve control routine. That is, the solenoid 116 is energized and de-energized according to the ON and OFF signals generated according to the inflow control valve control routine. Thus, one cycle of execution of the present routine is terminated.

The cycle time of the present routine, which is the predetermined time period T0 as described above, is equal to the sum of the predetermined times T1 and T2. When the inflow control valve 138 is placed in the ON state according to the inflow control valve control routine, the inflow control valve 138 is held in the OFF state for the predetermined time T1 of the cycle time of this routine. In this case, therefore, the inflow control valve 138 is placed in the ON state for the rest of the cycle time, that is, for the time T0–T1, which is equal to the predetermined time T2.

The above-indicated anti-lock brake pressure control routine is formulated to prevent locking of each wheel during brake application to the motor vehicle, by selectively establishing a pressure increase state, a pressure hold state and a pressure decrease state, while monitoring the speed of each wheel and the running speed of the motor vehicle with the wheel speed sensors 112. In the pressure increase state, the pressure increasing valve 40 is placed in the open state while the pressure reducing valve 50 is placed in the closed state. In the pressure hold state, the pressure increasing and reducing valves 40, 50 are both placed in the closed state. In the pressure decrease state, the pressure increasing valve 40 is placed in the closed state while the pressure reducing valve 50 is placed in the open state. Further, the anti-lock brake pressure control routine is formulated to activate the pump 114 during the anti-lock brake pressure control operation, so that the working fluid pumped by the pump 16 from the reservoir 98 is returned to the primary passage 48.

This anti-lock brake pressure control routine is executed irrespective of whether the braking effect characteristic control routine is executed or not. Accordingly, the anti-lock brake pressure control routine is executed if the locking tendency of each wheel becomes excessive due to an increase of the pressure of each brake cylinder 10 by the pump 16. Thus, an excessive increase in the braking force for each wheel is prevented.

It will be understood from the foregoing explanation that a portion of the ECU 818 assigned to implement S1401 and S1402 of FIG. 111 constitutes the boosting limit reaching determining means 820 and the pressure increase control initiating means 822, while a portion of the ECU 818 assigned to implement S1406 constitutes the pressure control mode determining means 824, and that a portion of the ECU 818 assigned to implement S1501, S1503 and S1507 of FIG. 113 constitutes the pumping stop portion 826. It will also be understood that a portion of the ECU 818 assigned to implement S1421, S1424 and S1425 of FIG. 112 and S1502 and S1504–S1506 of FIG. 113 constitutes the change amount calculating portion 828, while a portion of the ECU 818 assigned to implement S1422, S1423 and S1426 of FIG. 112 constitutes the mode determining means 829, and that a portion of the ECU 818 assigned to implement S1407 and S1408 of FIG. 111 constitutes the actuator control state determining means 830, while a portion of the ECU 818 assigned to implement S1403–S1405, S1409 and S1411 of FIG. 111 constitutes the control means 832.

In the present embodiment, it will also be understood that the operating stroke sensor 732 constitutes "operation-related quantity detecting means", while the "pressure increasing device" is constituted by a combination of the booster pressure switch 734 (sensor portion), the pressure control valve 22, the pressure increasing valve 40, the pressure reducing valve 50, the pump 16, the pump motor 114 (actuator portion), and a portion of the ECU 818 assigned to effect the braking effect characteristic control (control portion). It will further be understood that the pumping stop portion 826 constitutes "pumping stop means" and "inflow control valve utilizing type pumping stop means", while the change amount calculating portion 828, the mode determining portion 829, the actuator control state determining means 830 and the control means 832 cooperate to constitute "change rate depending type control means" and "pressure increase rate control means".

Then, a twenty-sixth embodiment of the present invention will be described. This embodiment has a number of elements which are identical with those of the preceding twenty-fifth embodiment and which are identified by the same reference signs as used in the twenty-fifth embodiment. Detailed description of these elements will not be provided, and only the elements specific to the present embodiment will be described in detail.

Figure 119:
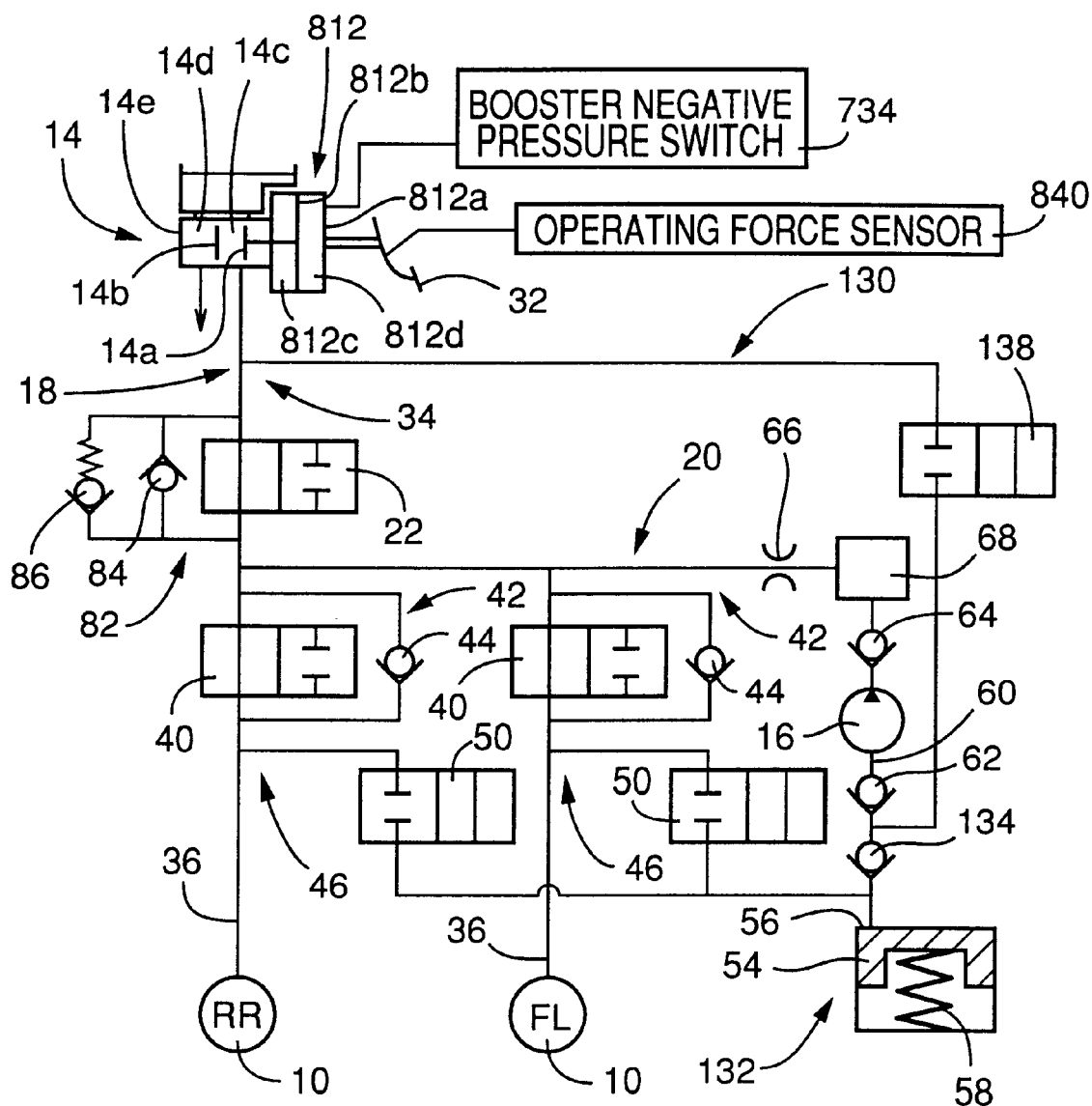
FIG. 119 is a schematic view showing a braking system of a twenty-sixth embodiment of this invention.
Figure 120:
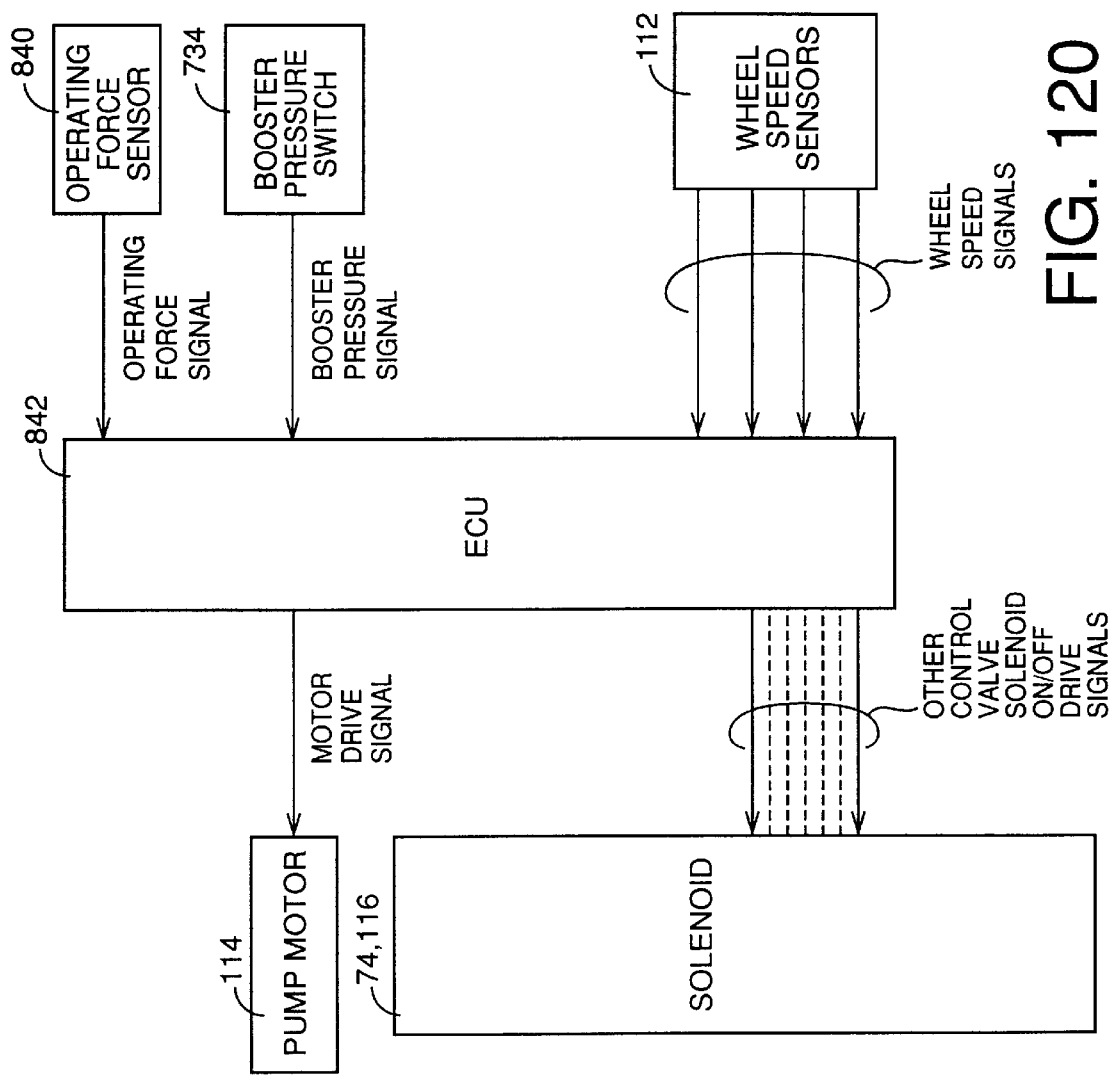
Figure 121:
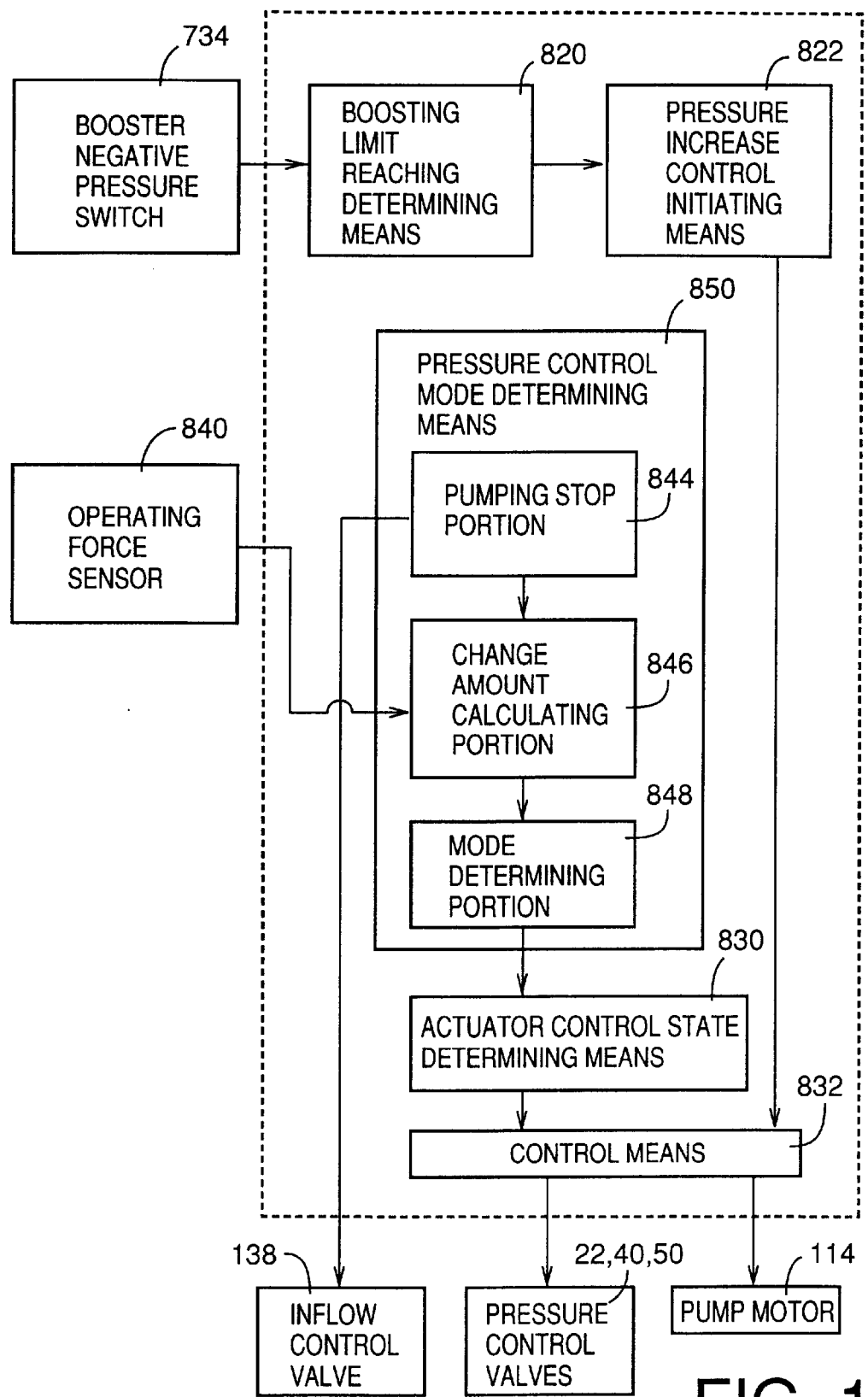
Figure 122:
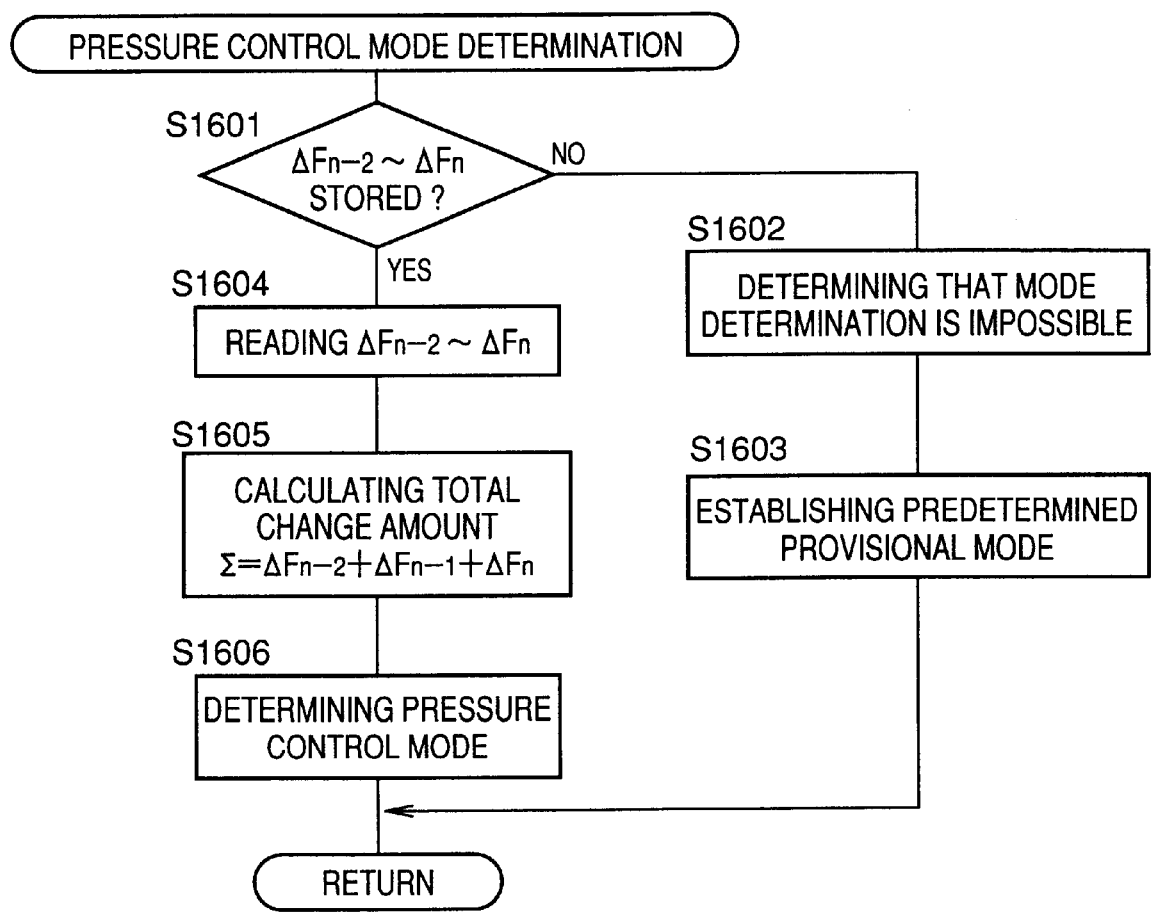

FIG. 119 shows an arrangement of the braking system according to the present embodiment. IN this embodiment, an operating force sensor 840 is for detecting the operating force F of the brake pedal 32 and generating an operating force signal indicative of the operating force F is provided in place of the above-indicated operating stroke sensor 732. In the electrical arrangement of the braking system shown in FIG. 120, an ECU 842 is provided in place of the above-indicated ECU 818. The functional block diagram of FIG. 121 shows an arrangement of a braking effect characteristic control device of the present braking system. In the braking effect characteristic control device, pressure control mode determining means 824 including a pumping stop portion 826, a change amount calculating portion 828 and a mode determining portion 829 is provided in place of the pressure control mode determining means 824 including the above-indicated pumping stop portion 826, change amount calculating portion 828 and mode determining portion 829. A pressure control mode determining routine executed by a computer of the ECU 842 for the mode determining portion 848 to perform its function is illustrated in the flow chart of FIG. 122. This routine is different from the pressure control mode determining routine (FIG. 112) in the preceding twenty-fifth embodiment, only in that an amount of change ΔF of the operating force F is used in place of the amount of change ΔS of the operating stroke S. Since this routine is identical with that of the preceding embodiment in the other aspects, the description of the routine is omitted. The ROM of the computer of the ECU 842 stores an operating force change amount detecting routine illustrated in the flow chart of FIG. 123. This routine is different from the operating stroke change amount detecting routine (FIG. 113) in the preceding twenty-fifth embodiment, only in that the operating force F is used in place of the operating stroke S. Since the routine is identical with that of the preceding embodiment in the other aspects, the description of the routine is omitted.

It will be understood from the foregoing explanation that a portion of the ECU 842 assigned to implement S1401 and S1402 of FIG. 111 constitutes the boosting limit reaching determining means 820 and the pressure increase control initiating means 822, while a portion of the ECU 842 assigned to implement S1406 constitutes the pressure control mode determining means 850, and that a portion of the ECU 842 assigned to implement S1701, S1703 and S1707 of FIG. 123 constitutes the pumping stop portion 844. It will also be understood that a portion of the ECU 842 assigned to implement S1601, S1604 and S1605 of FIG. 122 and S1702 and S1704–S1706 of FIG. 123 constitutes the change amount calculating portion 828, while a portion of the ECU 842 assigned to implement S1602, S1603 and S1606 of FIG. 122 constitutes the mode determining means 844, and that a portion of the ECU 842 assigned to implement S1407 and S1408 of FIG. 111 constitutes the actuator control state determining means 830, while a portion of the ECU 842 assigned to implement S1403–S1405, S1409 and S1411 of FIG. 111 constitutes the control means 832.

In the present embodiment, it will also be understood that the operating force sensor 840 constitutes "operation-related quantity detecting means", while the "pressure increasing device" is constituted by a combination of the booster pressure switch 734 (sensor portion), the pressure control valve 22, the pressure increasing valve 40, the pressure reducing valve 50, the pump 16, the pump motor 114 (actuator portion), and a portion of the ECU 842 assigned to effect the braking effect characteristic control (control portion). It will further be understood that the pumping stop portion 826 constitutes "pumping stop means" and "inflow control valve utilizing type pumping stop means", while the change amount calculating portion 828, the mode determining portion 829, the actuator control state determining means 830 and the control means 832 cooperate to constitute "change rate depending type control means" and "pressure increase rate control means".

While the several embodiments of the present invention have been described above in detail based on the drawings, it is to be understood that the present invention may be otherwise embodied with various changes and improvements which may occur based on the knowledge of those skilled in the art, without departing from the scope of the invention defined by the claims.

What is claimed is:

1. A braking system comprising:

a brake operating member operated by an operator of a motor vehicle;

a master cylinder for generating a fluid pressure based on an operation of said brake operating member;

a brake including a brake cylinder which is connected through a primary passage to said master cylinder and which is activated by the fluid pressure supplied through said primary passage, to restrain rotation of a wheel of the motor vehicle; and a pressure increasing device for increasing the fluid pressure in said brake cylinder, so as to be higher than the fluid pressure in said master cylinder, said pressure increasing device including:

(a) a fluid flow control device which is disposed in said primary passage and which has a plurality of selectively established states including a first state for permitting flows of a working fluid in opposite directions between said master cylinder and said brake cylinder, and a second state for inhibiting at least the flow of the fluid from said brake cylinder toward said master cylinder, (b) a hydraulic pressure source which is connected through an auxiliary passage to a portion of said primary passage between said fluid flow control device and said brake cylinder and which is operated to pressurize the working fluid to deliver the pressurized working fluid, (c) a hydraulic pressure source control device for commanding said hydraulic pressure source to deliver the pressurized working fluid when the fluid pressure in said brake cylinder is required to be higher than the fluid pressure in said master cylinder during operation of said brake operating member, and (d) a pressure changing device for changing the fluid pressure in said brake cylinder to a level higher than that in said master cylinder, such that said level changes with a change of an operating force acting on said brake operating member.

2. A braking system according to claim 1, wherein said fluid flow control device and said pressure changing device comprise a pressure control device disposed in said primary passage and operated while the pressurized working fluid is supplied thereto from said hydraulic pressure source such that said pressure control device is placed in said second state when a second fluid pressure on one of opposite sides of said pressure control device which is nearer to said brake cylinder is higher than a first pressure on the other side of said pressure control device which is nearer to said master cylinder, by a difference not larger than a desired pressure difference value, and placed in said first state when said difference is larger than said desired pressure difference value, whereby said second pressure is controlled to be higher than said first fluid pressure by said desired pressure difference value.

3. A braking system according to claim 2, wherein said pressure control device includes (a) an electromagnetic pressure control valve having a valve member and a valve seat for controlling flows of the working fluid through said primary passage between said master cylinder and said brake cylinder, and magnetic force generating means for generating a magnetic force which acts on at least one of the valve member and the valve seat, for controlling a relative movement between the valve member and the valve seat, so that said desired pressure difference value changes on the basis of the magnetic force, and (b) a magnetic force control device for controlling said magnetic force.

4. A braking system according to claim 3, wherein said hydraulic pressure source comprises a pump which sucks the working fluid on its suction side and delivers the working fluid from its delivery side, said pump being connected on its delivery side through said auxiliary passage to said primary passage, the braking system further comprising an automatic hydraulic pressure control device for automatically controlling the fluid pressure in said brake cylinder, said automatic hydraulic pressure control device including (a) a reservoir which is connected to the suction side of said pump through a pump passage and which stores the working fluid, and (b) an electromagnetic hydraulic pressure control device which are connected to a portion of said primary passage between said brake cylinder and a point of connection thereof to said auxiliary passage, said electromagnetic hydraulic pressure control device having a plurality of selectively established states including a state for communication of said brake cylinder with the delivery side of said pump, and a state for communication of said brake cylinder with said reservoir, and wherein said magnetic force control device for controlling said magnetic force of said pressure control device so as to hold the valve member seated on the valve seat for thereby inhibiting the flow of the working fluid from said pump toward said master cylinder, during operation of said automatic hydraulic pressure control device.

5. A braking system according to claim 2, wherein said pressure control device includes a mechanical pressure control device including (a) a valve member and a valve seat for controlling fluid flows through said primary passage between said master cylinder and said brake cylinder, and (b) a stepped piston having a large-diameter portion and a small-diameter portion which receive said first fluid pressure and said second fluid pressure, respectively, in opposite directions, said stepped piston generating a mechanical force acting on at least one of said valve member and said valve seat, for controlling a relative movement between the valve member and the valve seat, said desired pressure difference value changing on the basis of pressure-receiving areas of said large-diameter and small-diameter portions of the piston and said first fluid pressure.

6. A braking system according to claim 1, further comprising a booster which is disposed between said brake operating member and said master cylinder, to boost an operating force acting on said brake operating member and transmit the boosted operating force to said master cylinder, and wherein said hydraulic pressure source control device includes post-boosting-abnormality control means for commanding said hydraulic pressure source to deliver the pressurized working fluid when the booster is not normally functioning to perform a boosting operation.

7. A braking system according to claim 1, wherein said hydraulic pressure source comprises a pump which sucks the working fluid on its suction side and delivers the working fluid from its delivery side which is connected through said auxiliary passage to said primary passage, the braking system further comprising a fluid supply device which is connected to an upstream portion of said primary fluid passage between said master cylinder and said fluid flow control device and to the suction side of said pump, for supplying the working fluid from said upstream portion to the suction side of said pump, without reduction of the pressure of the working fluid.

8. A braking system according to claim 7, wherein said master cylinder has a master cylinder housing and a pressurizing piston slidably received in said master cylinder housing and cooperating with said master cylinder housing to define a pressurizing chamber there between, said braking system further comprising operation-related quantity detecting means for detecting an operation amount consisting of at least one of an operating force and an operating stroke of said brake operating member, and wherein sad pressure increasing device is adapted such that said pump is activated to pump up the working fluid from the pressurizing chamber of sad master cylinder and deliver the working fluid toward the brake cylinder to thereby increase the fluid pressure of the brake cylinder to be higher than the fluid pressure of the master cylinder, after a pressure increase initiating condition for initiating an increase of the fluid pressure of said brake cylinder is satisfied during an operation of the brake operating member, while at least a flow of the working fluid from said brake cylinder toward said master cylinder is inhibited by said fluid flow control device, and such that pumping of the working fluid by said pump is temporarily stopped at least once after said pressure increase initiating condition is satisfied, said pressure increasing device controlling the fluid pressure of said brake cylinder on the basis of at least one value detected by said operation-related quantity detecting means while the pumping is stopped.

9. A braking system according to claim 1, further comprising a booster disposed between said brake operating member and said master cylinder, for boosting an operating force of the brake operating member and transmitting the boosted operating force to the master cylinder, and wherein said hydraulic pressure source control device includes post-boosting-limit control means for commanding said hydraulic pressure source to deliver the working fluid after a boosting limit of said booster has been reached.

10. A braking system according to claim 9, wherein said pressure changing device includes means operated after said boosting limit of said booster has been reached, for changing the fluid pressure in said brake cylinder with the operating force of said brake operating member, such that a rate of change of the fluid pressure in said brake cylinder with the operating force after said boosting limit has been reached is substantially equal to that before said boosting limit has been reached.

11. A braking system according to claim 1, wherein said pressure increasing device further includes at least one brake-operating-force-related quantity sensor for detecting a brake-operating-force-related quantity relating to the operating force acting on said brake operating member, and said hydraulic pressure control device includes post-reference-value control means for commanding said hydraulic pressure source to deliver the working fluid after said brake-operating-force-related quantity has reached a reference value.

12. A braking system according to claim 11, wherein said at least one brake-operating-force-related quantity sensor includes a vehicle deceleration sensor for detecting a deceleration value of a body of the motor vehicle.

13. A braking system according to claim 11, wherein said at least one brake-operating-force-related quantity sensor consists of a plurality of brake-operating-force-related quantity sensors for detecting respective brake-operating-force-related quantities relating to the operating force of said braking operating member.

14. A braking system according to claim 13, wherein said plurality of brake-operating-force-related quantity sensors consist of a first sensor consisting of predetermined at least one of said plurality of brake-operating-force-related quantity sensors, and a second sensor consisting of the other of said plurality of brake-operating-force-related quantity sensors, and said hydraulic pressure control device includes fail-safe means for commanding said hydraulic pressure source to deliver the working fluid after the brake-operating-force-related quantity detected by said first sensor has reached said reference value, when said first sensor is normal, and commanding said hydraulic pressure source to deliver the working fluid after the brake-operating-force-related quantity detected by said second sensor has reached said predetermined value, when said first sensor is not normal.

15. A braking system according to claim 14, wherein said plurality of brake-operating-force-related quantity sensors includes a master cylinder pressure sensor for detecting the fluid pressure of said master cylinder, and a vehicle deceleration sensor for detecting a deceleration value of a body of the motor vehicle, said first sensor including said master cylinder pressure sensor, and said second sensor including said vehicle deceleration sensor.

16. A braking system according to claim 13, wherein said hydraulic pressure source control device includes fail-safe means for commanding said hydraulic pressure source to deliver the working fluid when all of the brake-operating-force-related quantities detected by said plurality of brake-operating-force-related quantity sensors have reached respective reference values.

17. A braking system according to claim 16, wherein said plurality of brake-operating-force-related quantity sensors include a master cylinder pressure sensor for detecting the fluid pressure of said master cylinder, and a brake operation sensor for detecting an operation of said brake operating member, said fail-safe means including first means for commanding said hydraulic pressure source control device to deliver the working fluid when the fluid pressure of the master cylinder detected by said master cylinder pressure sensor has reached said reference value and when the operation of said brake operating member is detected by said brake operation sensor.

18. A braking system according to claim 17, wherein said plurality of brake-operating-force-related quantity sensors further include a vehicle deceleration sensor for detecting a deceleration value of a body of the motor vehicle, and said first means commands said hydraulic pressure source to deliver the working fluid when the fluid pressure of the master cylinder detected by said master cylinder pressure sensor has reached said reference value and when the operation of said brake operating member is detected by said brake operation sensor, where said brake operation sensor is normal, said fail-safe means further including second means for commanding said hydraulic pressure source to deliver the working fluid when the fluid pressure of the master cylinder detected by said master cylinder pressure sensor has reached said reference value and when the deceleration value of the body of the motor vehicle detected by said vehicle deceleration sensor has reached said reference value, where said brake operation sensor is not normal.

19. A braking system according to claim 1, wherein said pressure increasing device includes (a) vehicle stationary state detecting means for detecting that the motor vehicle is in a stationary state, and (b) operation initiation control means for operating such that an operation of the pressure increasing device is less likely to be initiated when the stationary state of the motor vehicle is detected than when the stationary state is not detected.

20. A braking system according to claim 19, wherein said pressure increasing device further includes a brake-operating-force-related quantity sensor for detecting a brake-operating-force-related quantity relating to an operating force of said brake operating member, and said hydraulic pressure source control device includes post-reference-value control means for commanding said hydraulic pressure source to deliver the working fluid when the brake-operating-force-related quantity has reached a reference value, said operation initiation control means includes reference value determining means for determining said reference value such that said brake-operating-force-related quantity is less likely to have reached said reference value when said stationary state of the motor vehicle is detected than when said stationary state is not detected.

21. A braking system according to claim 1, further comprising:
    a vacuum booster for boosting the operating force of said brake operating member on the basis of a pressure difference between a negative pressure chamber and a pressure changing chamber which is selectively communicated with the negative pressure chamber and an atmosphere, and transferring the boosted operating force to said master cylinder;

booster-pressure-related quantity detecting means for detecting a booster-pressure-related quantity relating to at least one of pressures in said negative pressure chamber and said pressure changing chamber, and generating an output signal representative of said quantity; and a determining device for determining, on the basis of said output signal of said booster-pressure-related quantity detecting means, whether a boosting limit of said vacuum booster has been reached as a result of an increase of the pressure of said pressure changing chamber to an atmospheric pressure, and wherein said pressure increasing device is operated to increase the pressure in said brake cylinder when said determining device determines that the boosting limit of the vacuum booster has been reached.

22. A braking system according to claim 21, further comprising master-cylinder-pressure-related quantity detecting means for detecting a master-cylinder-pressure-related quantity relating to the fluid pressure of said master cylinder and generating an output signal representative of the master-cylinder-pressure-related quantity, and wherein said determining device includes means for determining whether the boosting limit of said vacuum booster has been reached, on the basis of the output signals of said master-cylinder-pressure-related quantity detecting means and said booster-pressure-related quantity detecting means.

23. A braking system according to claim 22, wherein said master-cylinder-pressure-related quantity detecting means includes vehicle deceleration detecting means for detecting a deceleration value of the motor vehicle as said master-cylinder-pressure-related quantity and generating an output signal representative of said deceleration value.

24. A braking system according to claim 20, wherein said master-cylinder-pressure-related quantity detecting means includes (a) vehicle deceleration detecting means for detecting a deceleration value of the motor vehicle as said master-cylinder-pressure-related quantity and generating an output signal representative of said deceleration value, and (b) master-cylinder-pressure-directly-related quantity detecting means for detecting a quantity which more directly relates to the fluid pressure of said master cylinder than said deceleration value of the motor vehicle, and wherein said determining device determines whether said boosting limit has been reached, on the basis of the output signals of said master-cylinder-pressure-directly-related quantity detecting means and said booster-pressure-related quantity detecting means, when said master-cylinder-pressure-directly-related quantity detecting means is normal, and determines whether said boosting limit has been reached, on the basis of the output signals of said vehicle deceleration detecting means and said booster-pressure-related quantity detecting means, when said master-cylinder-pressure-directly-related quantity detecting means is defective.

25. A braking system according to claim 21, wherein said booster-pressure-related quantity detecting means includes pressure-changing-chamber-pressure-related quantity detecting means for detecting a pressure-changing-chamber-pressure-related quantity relating to the pressure of said pressure changing chamber and generating an output signal representative of said pressure-changing-chamber-pressure-related quantity, said braking system further comprising master-cylinder-pressure-related quantity detecting means for detecting a master-cylinder-pressure-related quantity relating to the fluid pressure of said master cylinder and generating an output signal representative of the master-cylinder-pressure-related quantity, and wherein said determining device includes first determining means for determining whether the boosting limit of said vacuum booster has been reached, on the basis of the output signals of said pressure-changing-chamber-pressure-related quantity detecting means and said booster-pressure-related quantity detecting means.

26. A braking system according to claim 25, wherein said first determining means includes means for determining that the boosting limit of said vacuum booster has been reached, when an actual amount of increase of the fluid pressure of said master cylinder after the pressure of said pressure changing chamber has reached a reference value has become equal to an expected amount of increase thereof during a period of increase of the pressure of the pressure changing chamber from said reference value to an atmospheric pressure.

27. A braking system according to claim 26, wherein said master cylinder-pressure-related quantity detecting means includes (a) vehicle deceleration detecting means for detecting a deceleration value of the motor vehicle as said master-cylinder-pressure-related quantity and generating an output signal representative of said deceleration value, and (b) master-cylinder-pressure-directly-related quantity detecting means for detecting a quantity which more directly relates to the fluid pressure of said master cylinder than said deceleration value of the motor vehicle, and wherein said first determining means is operated on the basis of the output signals of said master-cylinder-pressure-directly-related quantity detecting means and said pressure-changing-chamber-pressure-related quantity detecting means, where said master cylinder-pressure-directly-related quantity detecting means is normal, to determine that the boosting limit of said vacuum booster has been reached, when an actual amount of increase of the fluid pressure of said master cylinder after the pressure of said pressure changing chamber has reached a reference value has become equal to an expected amount of increase thereof during a period of increase of the pressure of the pressure changing chamber from said reference value to an atmospheric pressure, and operated on the basis of said vehicle deceleration detecting means and said pressure-changing-chamber-pressure-related quantity detecting means, where said master-cylinder-pressure-directly-related quantity detecting means is defective, to determine that the boosting limit of said vacuum booster has been reached, when an actual amount of increase of the deceleration value of the motor vehicle after the pressure of the pressure changing chamber has reached the reference value has become equal to an expected amount of increase thereof during a period of increase of the pressure of the pressure changing chamber from said reference value to the atmospheric pressure.

28. A braking system according to claim 25, further comprising vehicle deceleration detecting means for detecting a deceleration value of the motor vehicle as said master-cylinder-pressure-related quantity and generating an output signal representative of said deceleration value, and wherein said determining device determines whether said boosting limit has been reached, on the basis of at least the output signal of said vehicle deceleration detecting means, where said booster-pressure-related quantity detecting means is defective.

29. A braking system according to claim 21, wherein said booster-pressure-related quantity detecting means includes pressure-changing-chamber-pressure-related quantity detecting means for detecting a pressure-changing-chamber-pressure-related quantity relating to the pressure of said pressure changing chamber and generating an output signal representative of said pressure-changing-chamber-pressure-related quantity, and said determining device includes second determining means for determining, on the basis of the output signal of said pressure-changing-chamber-pressure-related quantity detecting means, that the boosting limit of said vacuum booster has been reached, when the pressure of said pressure changing chamber has increased to an atmospheric pressure.

30. A braking system according to claim 21, wherein said booster-pressure-related quantity detecting means includes negative-pressure-chamber-pressure-related quantity detecting means for detecting a negative-pressure-chamber-pressure-related quantity relating to the pressure of said negative pressure chamber and generating an output signal representative of said negative-pressure-chamber-pressure-related quantity, said braking system further comprising master-cylinder-pressure-related quantity detecting means for detecting a master-cylinder-pressure-related quantity relating to the fluid pressure of said master cylinder and generating an output signal representative of said master-cylinder-pressure-related quantity, said determining means including third determining means boosting of said vacuum booster has been reached, on the basis of said output signals of said negative-pressure-chamber-pressure-related quantity detecting means and said master-cylinder-pressure-related quantity detecting means.

31. A braking system according to claim 30, wherein said third determining means includes means for determining that the boosting limit of said vacuum booster has been reached, when the actual fluid pressure of said master cylinder has increased to a value which is expected to be established when the pressure of said pressure changing chamber has increased to an atmospheric pressure under the actual pressure of said negative pressure chamber.

32. A braking system according to claim 21, wherein said booster-pressure-related quantity detecting means includes a pressure switch which is subjected to the pressure of at least one of said negative pressure chamber and said pressure changing chamber and which generates respective two different signals when the pressure is higher and not higher than a predetermined value.

33. A braking system according to claim 1, further comprising:

a booster for boosting the operating force of said brake operating member and transferring the boosted operating force to said master cylinder;

an operating-stroke-related quantity sensor for detecting an operating-stroke-related quantity relating to an operating stroke of said brake operating member;

a master-cylinder-pressure-related quantity sensor for detecting a master-cylinder-pressure-related quantity relating to the fluid pressure of said master cylinder; and boosting limit reaching determining means for determining, on the basis of output signals of said operating-stroke-related quantity sensor and said master-cylinder-pressure-related quantity sensor, that a boosting limit of said booster has been reached, when a rate of increase of said operating stroke with an increase in the fluid pressure in said master cylinder has exceeded a predetermined value after said operating stroke or the fluid pressure of said master cylinder has exceeded a reference value, and wherein said pressure increasing device is operated to increase the pressure in said brake cylinder when said boosting limit reaching determining means determines that the boosting limit of the booster has been reached.

34. A braking system according to claim 1, wherein a difference between the fluid pressures in said brake cylinder and said master cylinder changes with said change of said operating force acting on said brake operating member, as a result of the operation of said pressure changing device.

35. A braking system according to claim 34, wherein said pressure changing device changes the fluid pressure in said brake cylinder to said level such that said difference changes with said change of said operating force acting on said brake operating member.

* * * * *